(12) United States Patent
Kawahira et al.

(10) Patent No.: US 10,241,364 B2
(45) Date of Patent: Mar. 26, 2019

(54) LIQUID CRYSTAL DISPLAY DEVICE

(71) Applicant: Sharp Kabushiki Kaisha, Sakai, Osaka (JP)

(72) Inventors: Yuichi Kawahira, Sakai (JP); Isamu Miyake, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 62 days.

(21) Appl. No.: 15/500,614

(22) PCT Filed: Jul. 24, 2015

(86) PCT No.: PCT/JP2015/071056
§ 371 (c)(1),
(2) Date: Aug. 1, 2017

(87) PCT Pub. No.: WO2016/017536
PCT Pub. Date: Feb. 4, 2016

(65) Prior Publication Data
US 2018/0129101 A1    May 10, 2018

(30) Foreign Application Priority Data

Jul. 31, 2014  (JP) .................................. 2014-157115
Nov. 27, 2014  (JP) .................................. 2014-240381
Jul. 2, 2015  (JP) .................................. 2015-133822

(51) Int. Cl.
*G02F 1/1333* (2006.01)
*G02F 1/1335* (2006.01)
(Continued)

(52) U.S. Cl.
CPC ...... *G02F 1/133528* (2013.01); *G02F 1/1337* (2013.01); *G02F 1/1343* (2013.01);
(Continued)

(58) Field of Classification Search
CPC ........................ G02F 1/1337; G02F 1/133528
See application file for complete search history.

(56) References Cited

U.S. PATENT DOCUMENTS

2006/0061717 A1* 3/2006 Ichihashi .......... G02F 1/133528
                                                349/117
2008/0218672 A1* 9/2008 Ichihashi .......... G02F 1/134363
                                                349/118

(Continued)

FOREIGN PATENT DOCUMENTS

JP       2005-309382 A     11/2005
WO       2013/024750 A1     2/2013

*Primary Examiner* — Michael H Caley
*Assistant Examiner* — Mariam Qureshi
(74) *Attorney, Agent, or Firm* — Keating & Bennet, LLP

(57) ABSTRACT

The present invention is a liquid crystal display device including a first polarizer, a first protective layer, a first substrate, a first optical alignment film, a liquid crystal layer, a second optical alignment film, a second substrate including a signal electrode and an opposite electrode, a second protective layer, a second polarizer in this order, in which the layers satisfy the relationship nx=ny≥nz, an in-plane retardation of each of optical alignment films is greater than or equal to 1 nm, given that $R_1$ is a thickness-direction retardation of each of the protective layers and that $R_2$ is the in-plane retardation of each of optical alignment films, the relationship $R_1 \leq 0.047 R_2^2 - 2.1 R_2 + 44.3$ is satisfied, the liquid crystal layer has a positive dielectric anisotropy, and a transmission axis of the second polarizer is perpendicular to an initial alignment direction of the liquid crystal molecules.

4 Claims, 72 Drawing Sheets

(51) Int. Cl.
*G02F 1/1337* (2006.01)
*G02F 1/1343* (2006.01)
*G02F 1/13363* (2006.01)

(52) U.S. Cl.
CPC .. *G02F 1/133345* (2013.01); *G02F 1/133602* (2013.01); *G02F 1/133634* (2013.01); *G02F 1/134363* (2013.01); *G02F 1/133784* (2013.01); *G02F 1/133788* (2013.01); *G02F 2001/133635* (2013.01); *G02F 2001/133749* (2013.01); *G02F 2001/134372* (2013.01); *G02F 2201/50* (2013.01); *G02F 2202/40* (2013.01); *G02F 2413/02* (2013.01); *G02F 2413/05* (2013.01); *G02F 2413/11* (2013.01); *G02F 2413/13* (2013.01)

(56) References Cited

U.S. PATENT DOCUMENTS

| | | | |
|---|---|---|---|
| 2012/0200792 A1* | 8/2012 | Nishida | G02B 5/3083 349/15 |
| 2014/0211132 A1 | 7/2014 | Miyachi et al. | |
| 2014/0347613 A1* | 11/2014 | Kim | G02B 5/3016 349/117 |
| 2016/0216564 A1 | 7/2016 | Miyachi et al. | |
| 2017/0114277 A1* | 4/2017 | Furusato | C09K 19/3066 |

* cited by examiner

FIG. 2
(a)
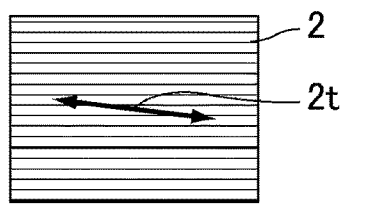
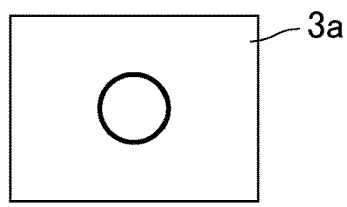
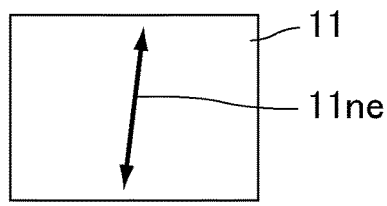
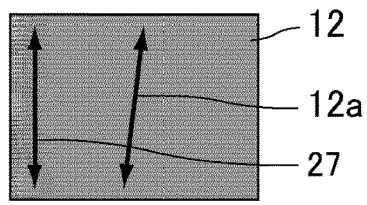
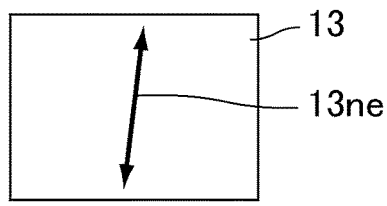
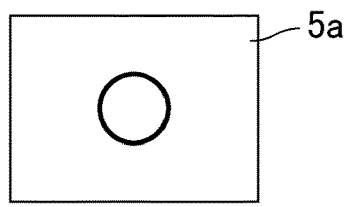
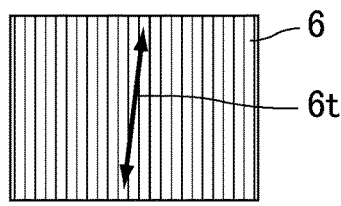
(b)
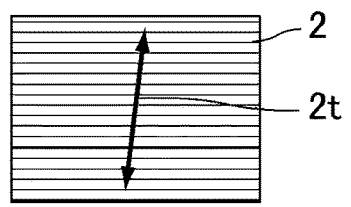
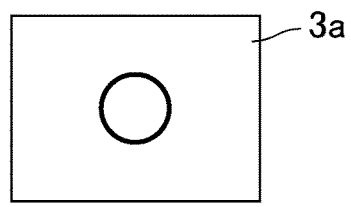
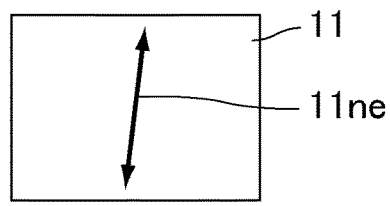
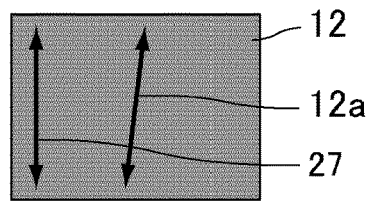
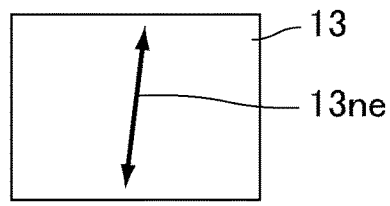
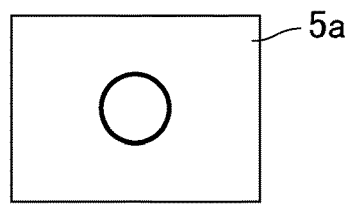
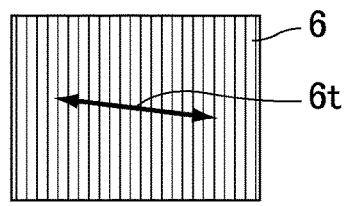

FIG. 3
(a) 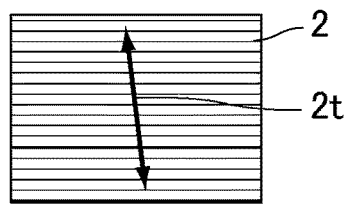 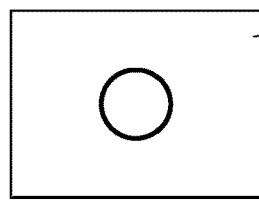 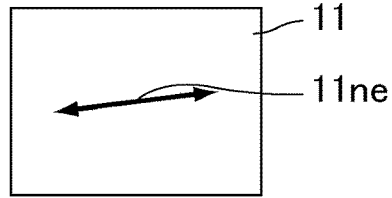 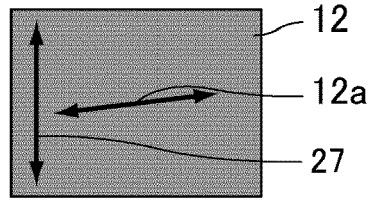 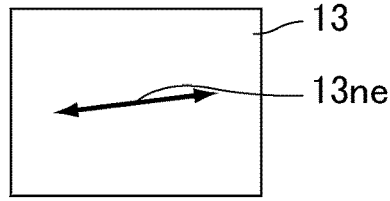 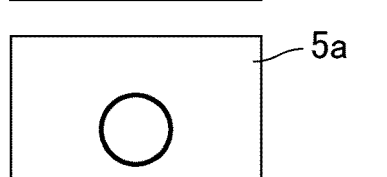 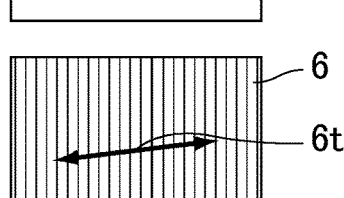
(b) 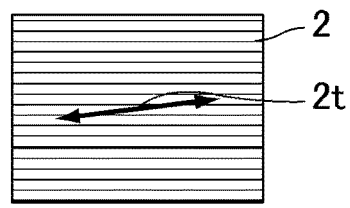 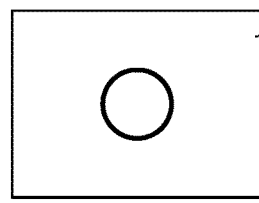 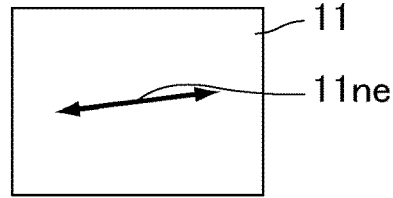 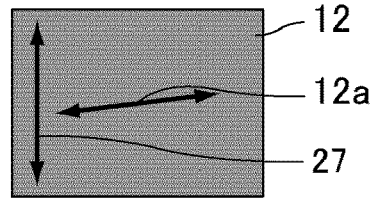 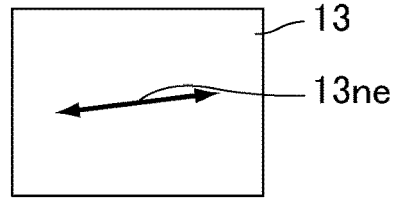 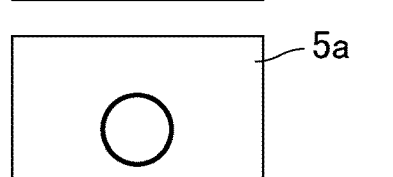 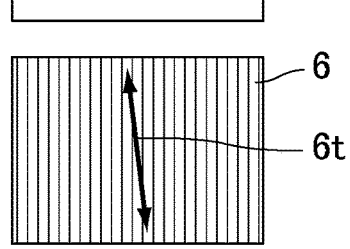

FIG. 9
(a)
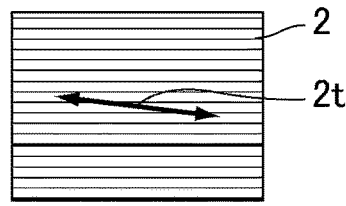
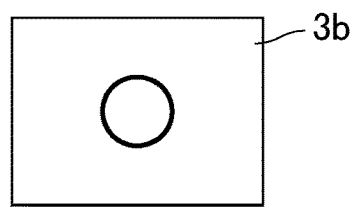
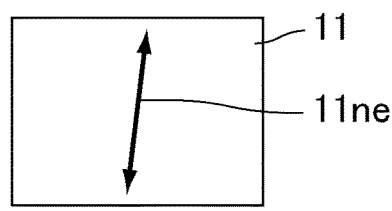
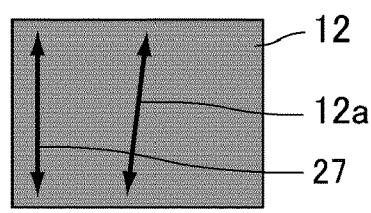
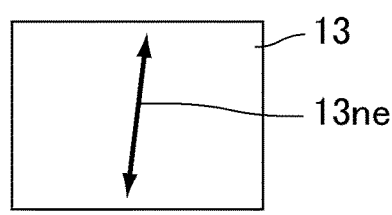
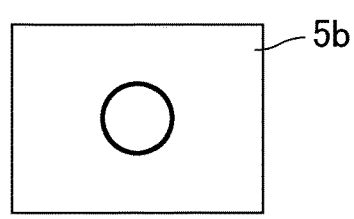
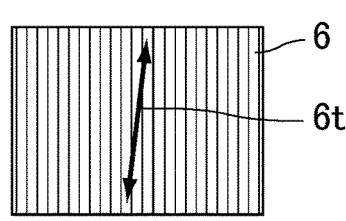
(b)
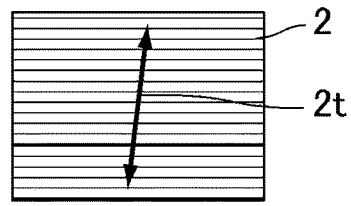
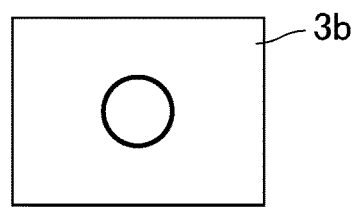
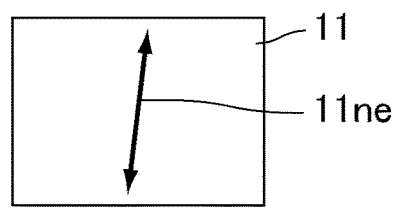
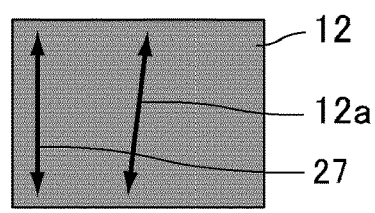
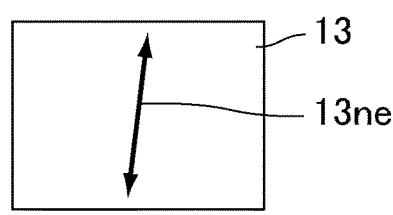
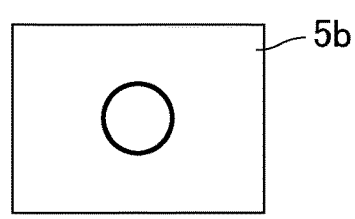
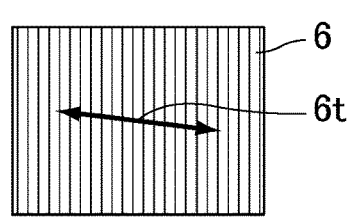

FIG. 10
(a) (b)
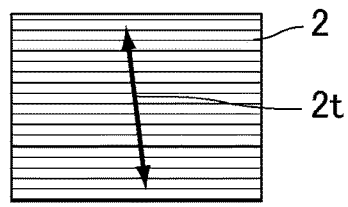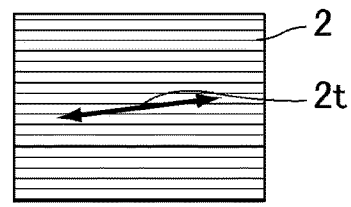
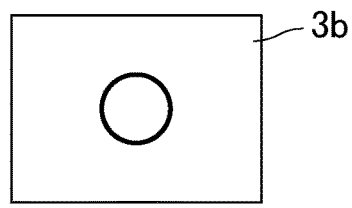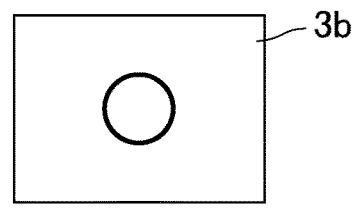
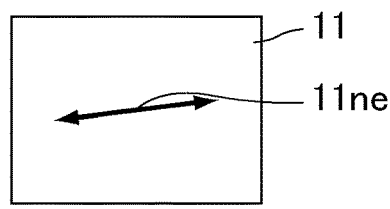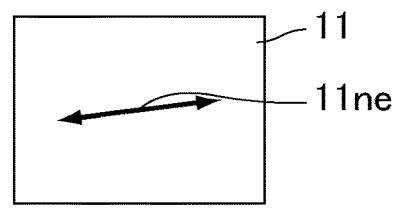
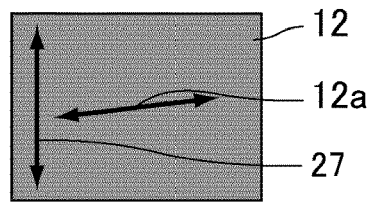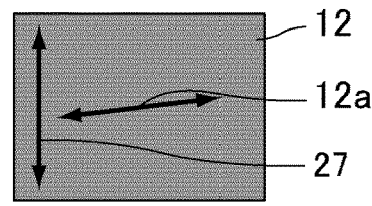
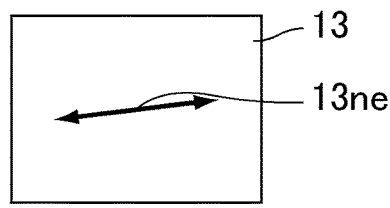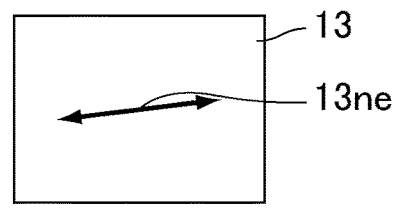
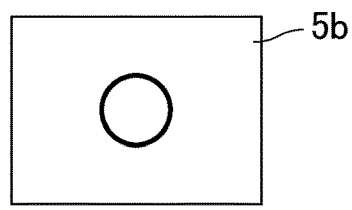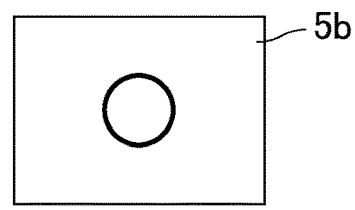
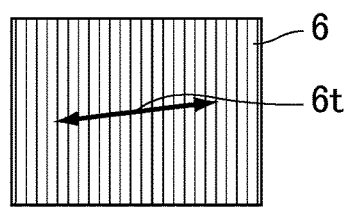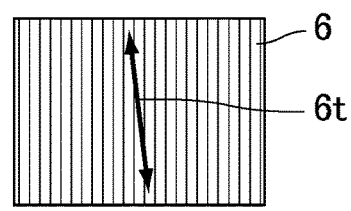

FIG. 16
(a)
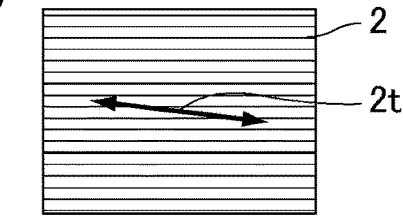
SLANTED AT −7° TO x AXIS
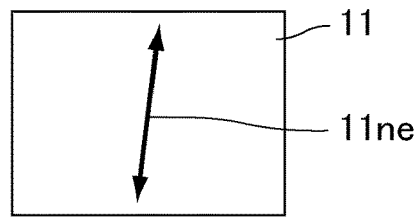
SLANTED AT 83° TO x AXIS
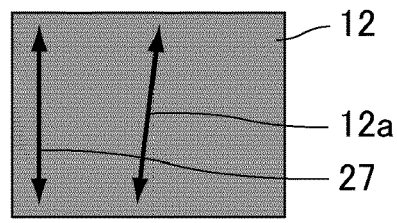
SLANTED AT 83° TO x AXIS
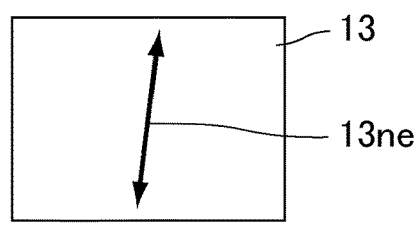
SLANTED AT 83° TO x AXIS
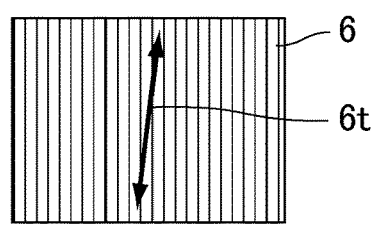
SLANTED AT 83° TO x AXIS
BACKLIGHT SIDE
(b)
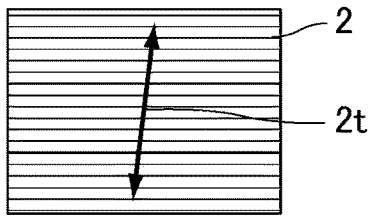
SLANTED AT 83° TO x AXIS
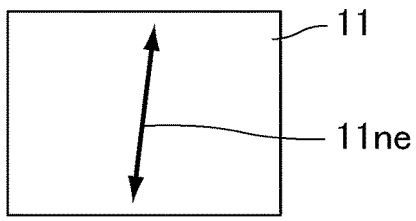
SLANTED AT 83° TO x AXIS
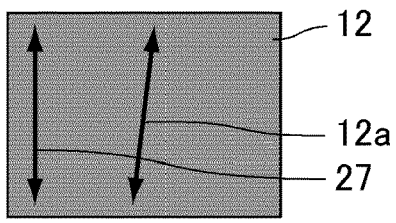
SLANTED AT 83° TO x AXIS
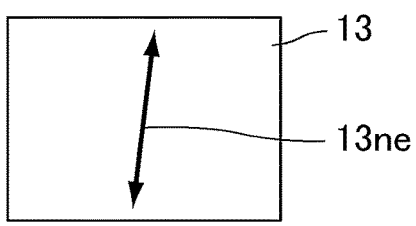
SLANTED AT 83° TO x AXIS
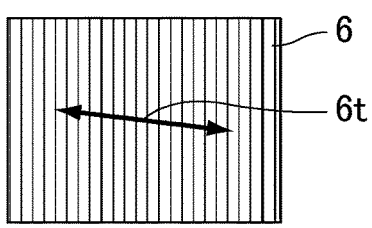
SLANTED AT −7° TO x AXIS
BACKLIGHT SIDE
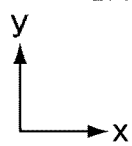

FIG. 23
(a)
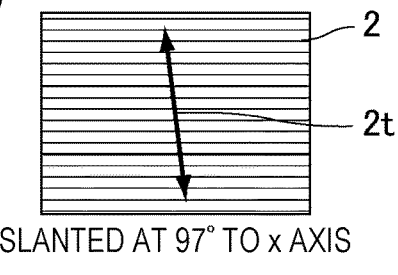
SLANTED AT 97° TO x AXIS
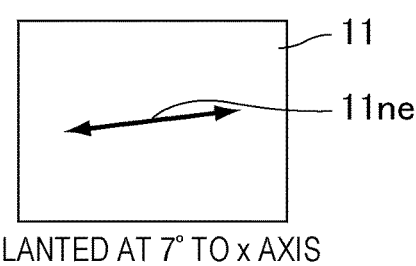
SLANTED AT 7° TO x AXIS
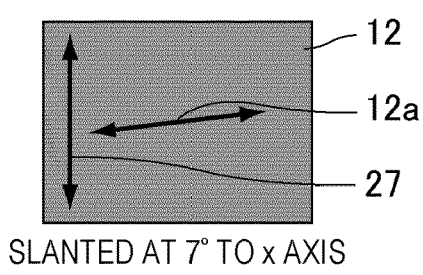
SLANTED AT 7° TO x AXIS
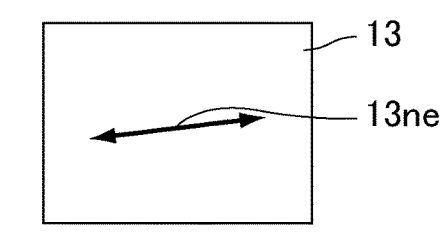
SLANTED AT 7° TO x AXIS
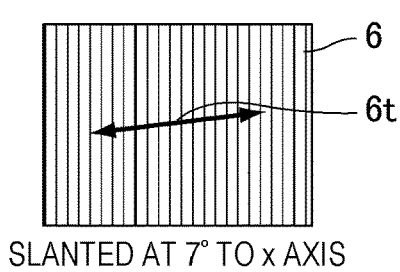
SLANTED AT 7° TO x AXIS
BACKLIGHT SIDE
(b)
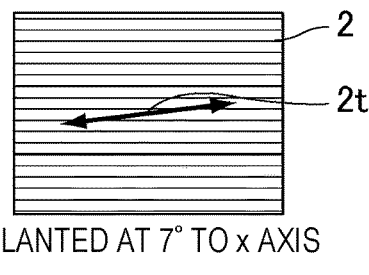
SLANTED AT 7° TO x AXIS
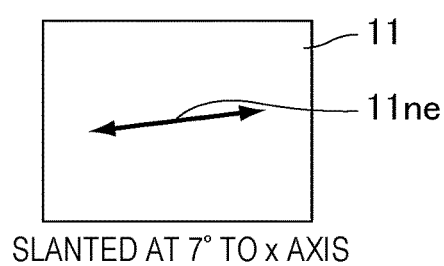
SLANTED AT 7° TO x AXIS
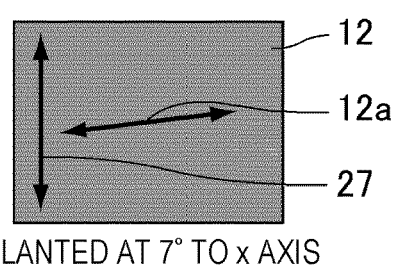
SLANTED AT 7° TO x AXIS
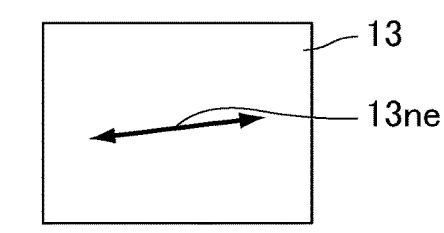
SLANTED AT 7° TO x AXIS
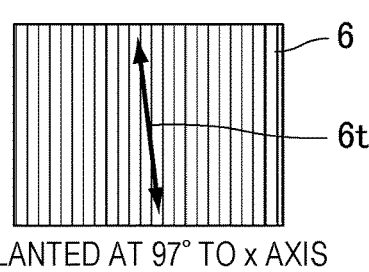
SLANTED AT 97° TO x AXIS
BACKLIGHT SIDE
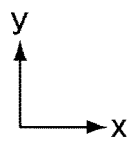

FIG. 29
(a)
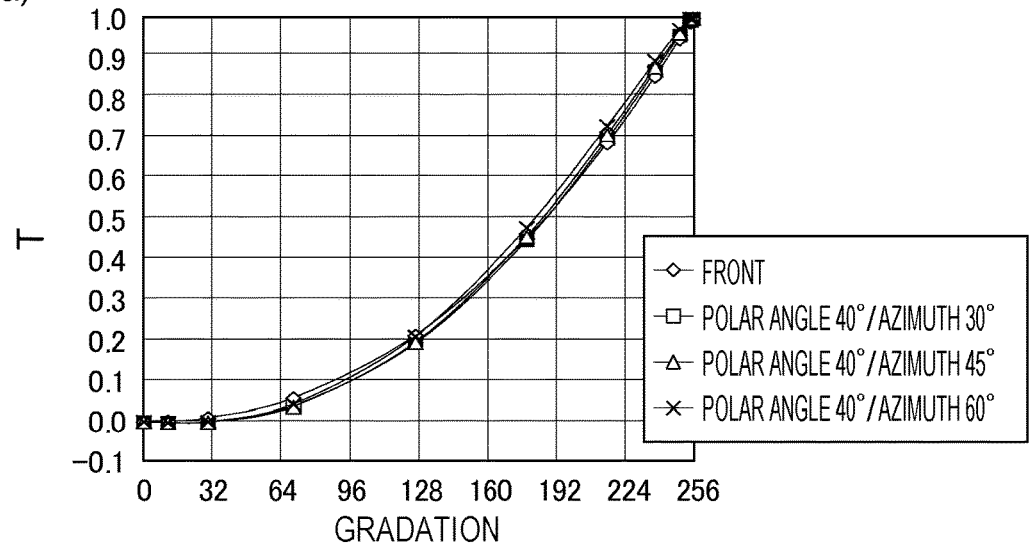
(b)
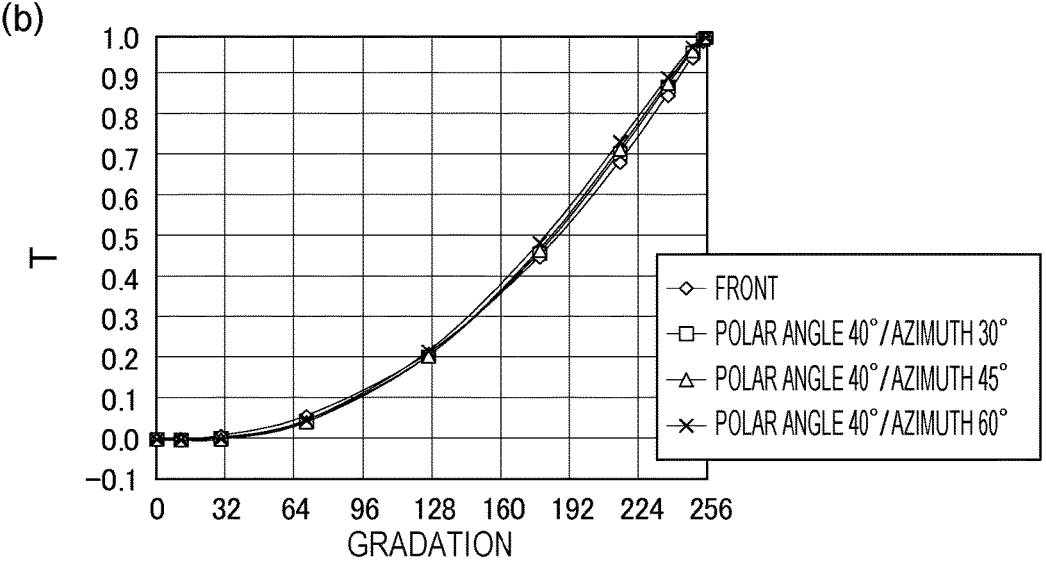

FIG. 30
(a)
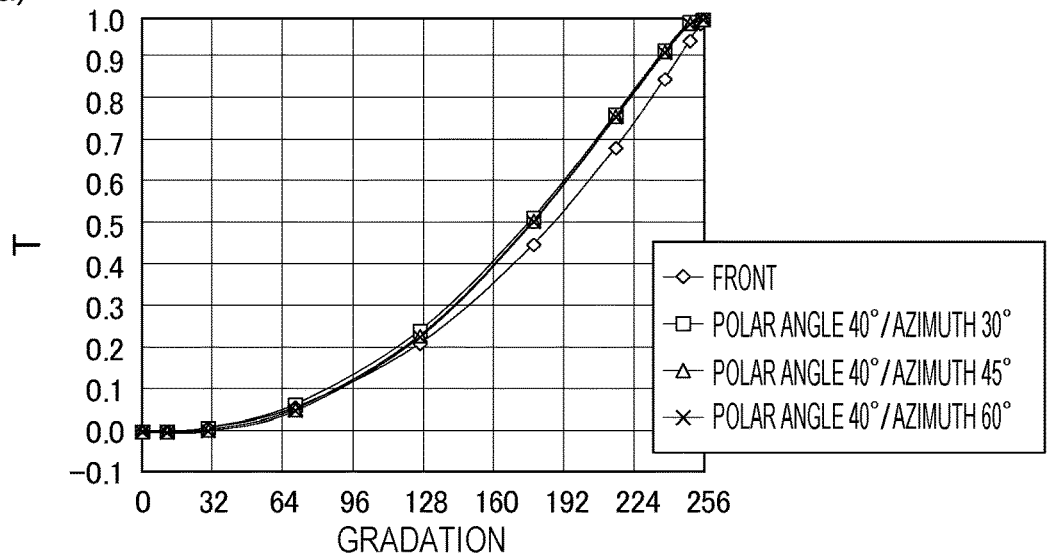
(b)
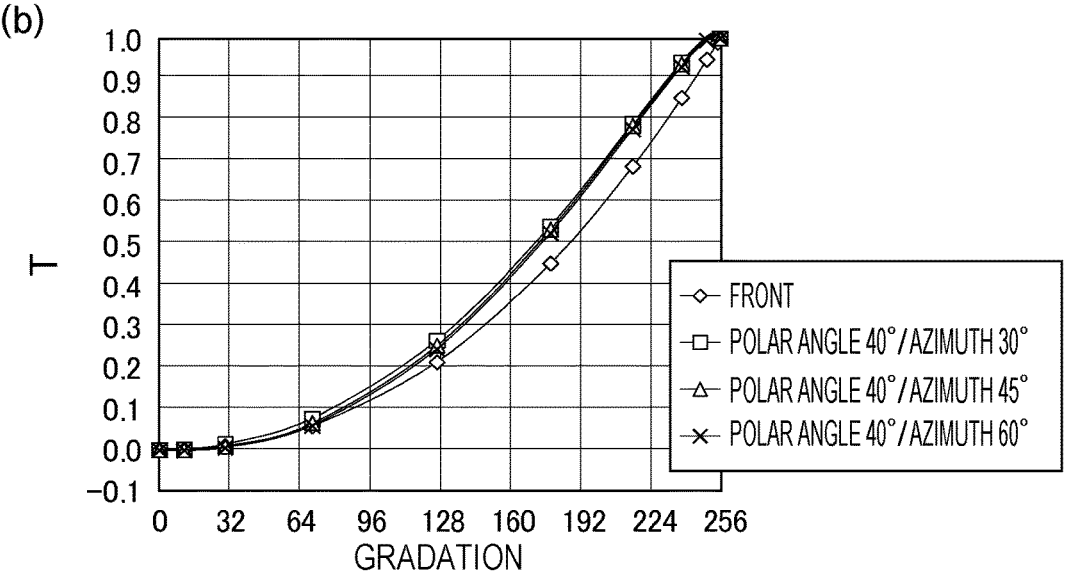

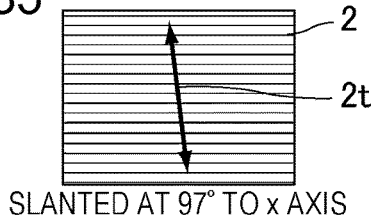
SLANTED AT 97° TO x AXIS

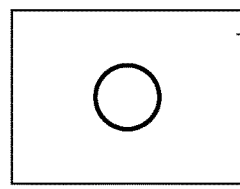
NO REFRACTIVE INDEX ANISOTROPY IN xy PLANE

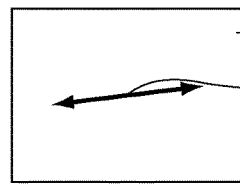
SLANTED AT 7° TO x AXIS

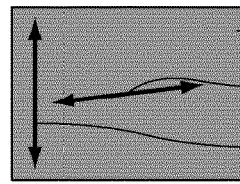
SLANTED AT 7° TO x AXIS

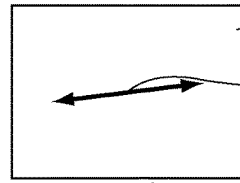
SLANTED AT 7° TO x AXIS

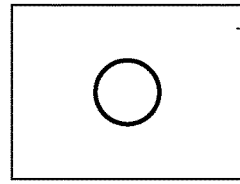
NO REFRACTIVE INDEX ANISOTROPY IN xy PLANE

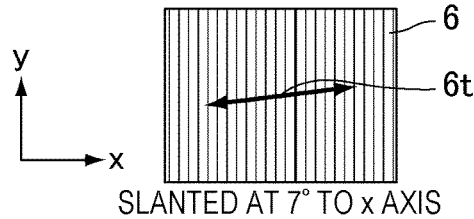
SLANTED AT 7° TO x AXIS (b)

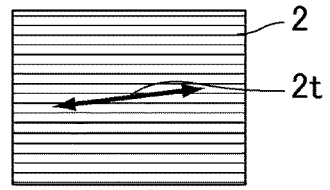
SLANTED AT 7° TO x AXIS

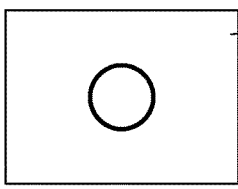
NO REFRACTIVE INDEX ANISOTROPY IN xy PLANE

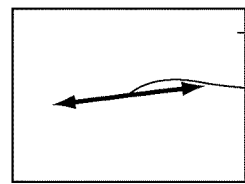
SLANTED AT 7° TO x AXIS

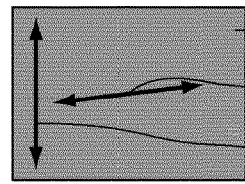
SLANTED AT 7° TO x AXIS

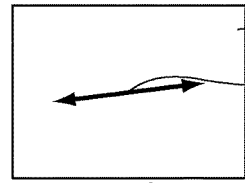
SLANTED AT 7° TO x AXIS

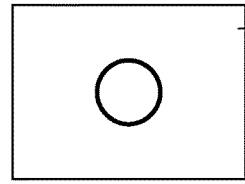
NO REFRACTIVE INDEX ANISOTROPY IN xy PLANE

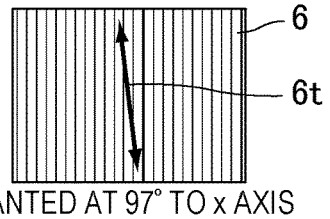
SLANTED AT 97° TO x AXIS

FIG. 110
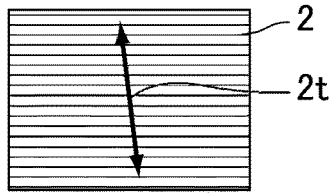
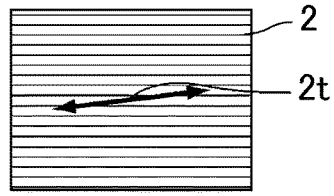
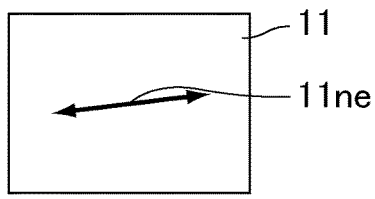
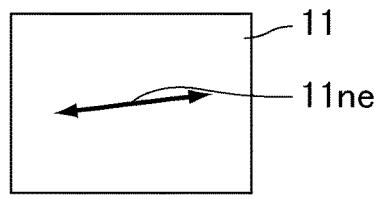
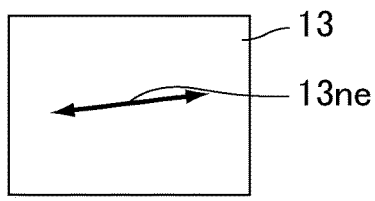
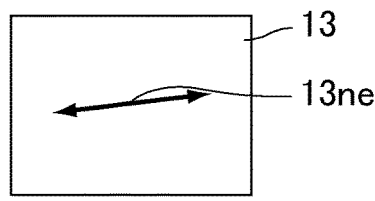
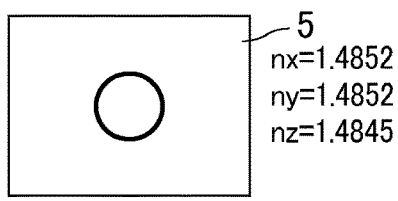
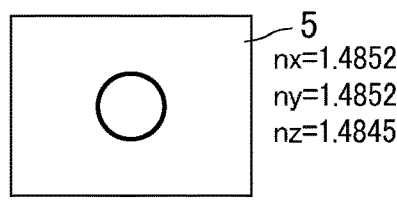
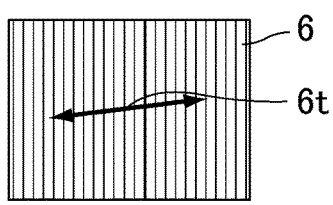
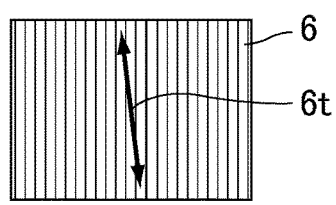
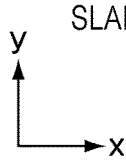

LIQUID CRYSTAL DISPLAY DEVICE

TECHNICAL FIELD

The present invention relates to a liquid crystal display device. More specifically, the present invention relates to a transverse electric field type liquid crystal display device that has excellent viewing angle characteristics.

BACKGROUND ART

A liquid crystal display device has advantages such as being lightweight and thin and having low power consumption and thus is actively developed. In recent years, a liquid crystal display device employing a transverse electric field type that is referred to as an in-plane switching (IPS) type or a fringe field switching (FFS) type has been known as a liquid crystal display device that is widely used for portable electronic devices such as a smartphone or a tablet PC.

As an IPS type liquid crystal display device, disclosed is a liquid crystal display device (refer to, for example, PTL 1) in which, for example, a first polarizing film, a first retardation area and a second retardation area, a first substrate, a liquid crystal layer, a second substrate, and a second polarizing film are arranged in this order, and liquid crystal molecules of the liquid crystal layer are aligned parallel to the surfaces of the pair of substrates at the time of display in black. In the liquid crystal display device, an in-plane retardation Re of the second retardation area is less than or equal to 100 nm, and a thickness-direction retardation Rth thereof is 50 nm to 200 nm. The first retardation area has a negative refractive index anisotropy and has an optical axis substantially parallel to the surface of the layer. The slow axis of the first retardation area is orthogonal with respect to the direction of the transmission axis of the first polarizing film and of the slow axis of the liquid crystal molecules at the time of display in black.

Also disclosed is a liquid crystal display device (refer to, for example, PTL 2) in which at least one of a pair of substrates has an optical alignment film and an electrode in order from the liquid crystal layer side. The optical alignment film aligns liquid crystal molecules horizontally with respect to the surface of the optical alignment film. The direction of the polarized light transmission axis of a polarizing element on the observed surface side of a liquid crystal cell intersects with the alignment direction of the liquid crystal molecules at a voltage less than a threshold in a liquid crystal layer. A material constituting the optical alignment film includes a material that aligns the liquid crystal molecules in a direction intersecting with the polarization direction of polarized light with which the optical alignment film is irradiated.

CITATION LIST

Patent Literature

PTL 1: Japanese Unexamined Patent Application Publication No. 2005-309382
PTL 2: International Publication No. 2013/024750

SUMMARY OF INVENTION

Technical Problem

As a technique of realizing high contrast in a liquid crystal display device employing an IPS or FFS type, an optical alignment process, not an alignment process by rubbing in the related art, in which the alignment direction is defined by irradiating an alignment film with light is developed.

However, an IPS or FFS type liquid crystal panel employing the optical alignment process may have worse viewing angle characteristics than an IPS or FFS type liquid crystal panel employing the alignment process by rubbing.

A first cause that worsens the viewing angle characteristics considered is that, with liquid crystal molecules having a great pretilt angle (polar angle), it is confirmed that the pretilt angle of the liquid crystal molecules is almost 0° with respect to the surface of the substrate in the optical alignment process, while that angle is a few degrees in rubbing. Thus, the pretilt angle of the liquid crystal molecules is determined not to be the cause of worsening of the viewing angle characteristics.

The inventors of the present invention have found that, as a result of repeating various reviews, the cause of worsening of the viewing angle characteristics at the time of employing the optical alignment process is the existence of a greater retardation in a self-assembled optical alignment film, than in an alignment film for rubbing used in the related art, that is employed for acquiring high contrast.

FIG. 57 is a schematic perspective view of a liquid crystal display device according to comparative embodiment 1 reviewed by the inventors of the present invention.

As illustrated in FIG. 57, a liquid crystal display device 101 according to the present comparative embodiment includes a first polarizer 102, a liquid crystal panel 104, a second polarizer 106, and backlight 107 in this order from the observer side. The liquid crystal panel 104 includes a first substrate 110, a self-assembled first optical alignment film 111, a horizontal-alignment liquid crystal layer 112 including liquid crystal molecules, a self-assembled second optical alignment film 113, and a second substrate 114 including a signal electrode (pixel electrode) and an opposite electrode (common electrode) opposite the signal electrode in this order from the observer side. An initial alignment direction 112a of the liquid crystal molecules is parallel to axes (extraordinary light refractive index axes) 111ne and 113ne along which the refractive index with respect to extraordinary light is induced in each of the optical alignment films 111 and 113. The polarizers 102 and 106 are arranged in the form of crossed Nicols. The angle formed between a transmission axis 102t of the first polarizer 102 and a transmission axis 106t of the second polarizer 106 is 90°.

In the case of viewing the liquid crystal display device 101 from the front, if the transmission axis 106t of the second polarizer 106 on the backlight 107 side is set to be parallel or perpendicular to the initial alignment direction 112a of the liquid crystal molecules, light that is transmitted by the second polarizer 106 on the backlight 107 side is transmitted by each of the optical alignment films 111 and 113 as isotropic layers even if there is an in-plane and/or thickness-direction retardation in each of the optical alignment films 111 and 113. However, in the case of viewing the liquid crystal display device 101 from a slantwise direction, even if the transmission axis 106t of the second polarizer 106 on the backlight 107 side is set to be parallel or perpendicular to the initial alignment direction 112a of the liquid crystal molecules, light that is transmitted by the second polarizer 106 on the backlight 107 side is transmitted by each of the optical alignment films 111 and 113 as layers having a refractive index anisotropy. Thus, viewing angle characteristics are worse unless optical design that considers a retardation, particularly an in-plane retardation, of each of the optical alignment films 111 and 113 is performed.

PTL 1 mainly assumes an alignment film for a rubbing process (even in an example thereof, disclosed is performing a rubbing process on an alignment film). In this case, the in-plane retardation of the alignment film is less than or equal to 0.5 nm, and optical design (design of the first retardation area and the second retardation area) is performed in a state where the retardation of the alignment film can be ignored. Therefore, in the case of employing a self-assembled optical alignment film that has a greater retardation than the alignment film for rubbing, compensation of a viewing angle may not be sufficient in the above design.

The present invention is conceived in view of the above phenomenon, and an object thereof is to provide a liquid crystal display device having excellent viewing angle characteristics.

Solution to Problem

An aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \leq 0.047R_2^2 - 2.1R_2 + 44.3$, the liquid crystal layer has a positive dielectric anisotropy, and a transmission axis of the second polarizer is perpendicular to an initial alignment direction of the liquid crystal molecules in a plan view.

Another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \geq 0.047R_2^2 - 2.1R_2 + 44.3$, the liquid crystal layer has a positive dielectric anisotropy, and a transmission axis of the second polarizer is parallel to an initial alignment direction of the liquid crystal molecules in a plan view.

Still another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first protective layer satisfies the relationship nx=ny≥nz, the second protective layer is optically isotropic, an in-plane retardation of each of the first and second optical alignment films is greater than or equal to 1 nm, given that $R_1$ is a thickness-direction retardation of the first protective layer and that $R_2$ is the in-plane retardation of each of the first and second optical alignment films, $R_1$ and $R_2$ satisfy the relationship $R_1 \leq -0.027R_2^2 - 0.4R_2 + 38.7$, the liquid crystal layer has a positive dielectric anisotropy, and a transmission axis of the second polarizer is perpendicular to an initial alignment direction of the liquid crystal molecules in a plan view.

Still another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first protective layer satisfies the relationship nx=ny≥nz, the second protective layer is optically isotropic, an in-plane retardation of each of the first and second optical alignment films is greater than or equal to 1 nm, given that $R_1$ is a thickness-direction retardation of the first protective layer and that $R_2$ is the in-plane retardation of each of the first and second optical alignment films, $R_1$ and $R_2$ satisfy the relationship $R_1 \geq -0.027R_2^2 - 0.4R_2 + 38.7$, the liquid crystal layer has a positive dielectric anisotropy, and a transmission axis of the second polarizer is parallel to an initial alignment direction of the liquid crystal molecules in a plan view.

Still another aspect of the present invention may be a liquid crystal display device of a transverse electric field type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first protective layer is optically isotropic, the second protective layer satisfies the relationship nx=ny≥nz, an in-plane retardation of each of the first and second optical alignment films is greater than or equal to 1 nm, and a transmission axis of the second polarizer is perpendicular to an initial alignment direction of the liquid crystal molecules in a plan view.

Preferred embodiments in this aspect are exemplified by, for example, an embodiment in which the transverse electric field type is an IPS type, and an embodiment in which the transverse electric field type is an FFS type.

Still another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \leq 0.040R_2^2 - 2.2R_2 + 44.0$, the liquid crystal layer has a negative dielectric anisotropy, and a transmission axis of the second polarizer is perpendicular to an initial alignment direction of the liquid crystal molecules in a plan view.

Still another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \geq 0.040R_2^2 - 2.2R_2 + 44.0$, the liquid crystal layer has a negative dielectric anisotropy, and a transmission axis of the second polarizer is parallel to an initial alignment direction of the liquid crystal molecules in a plan view.

Still another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first protective layer satisfies the relationship nx=ny≥nz, the second protective layer is optically isotropic, an in-plane retardation of each of the first and second optical alignment films is greater than or equal to 1 nm, given that $R_1$ is a thickness-direction retardation of the first protective layer and that $R_2$ is the in-plane retardation of each of the first and second optical alignment films, $R_1$ and $R_2$ satisfy the relationship $R_1 \leq -0.053R_2^2 + 0.6R_2 + 35.3$, the liquid crystal layer has a negative dielectric anisotropy, and a transmission axis of the second polarizer is perpendicular to an initial alignment direction of the liquid crystal molecules in a plan view.

Still another aspect of the present invention may be a liquid crystal display device of an FFS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first protective layer satisfies the relationship nx=ny≥nz, the second protective layer is optically isotropic, an in-plane retardation of each of the first and second optical alignment films is greater than or equal to 1 nm, given that $R_1$ is a thickness-direction retardation of the first protective layer and that $R_2$ is the in-plane retardation of each of the first and second optical alignment films, $R_1$ and $R_2$ satisfy the relationship $R_1 \geq -0.053R_2^2 + 0.6R_2 + 35.3$, the liquid crystal layer has a negative dielectric anisotropy, and a transmission axis of the second polarizer is parallel to an initial alignment direction of the liquid crystal molecules in a plan view.

Still another aspect of the present invention may be a liquid crystal display device of an IPS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R \leq 0.140R_2^2 - 5.7R_2 + 95.0$, the liquid crystal layer has a positive dielectric anisotropy, and a transmission axis of the second polarizer is perpendicular to an initial alignment direction of the liquid crystal molecules in a plan view.

Still another aspect of the present invention may be a liquid crystal display device of an IPS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \geq 0.140R_2^2 - 5.7R_2 + 95.0$, the liquid crystal layer has a positive dielectric anisotropy, and a transmission axis of the second polarizer is parallel to an initial alignment direction of the liquid crystal molecules in a plan view.

Still another aspect of the present invention may be a liquid crystal display device of an IPS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \leq 0.107R_2^2 - 4.4R_2 + 72.0$, the liquid crystal layer has a negative dielectric anisotropy, and a transmission axis of the second polarizer is perpendicular to an initial alignment direction of the liquid crystal molecules in a plan view.

Still another aspect of the present invention may be a liquid crystal display device of an IPS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first and second protective layers satisfy the relationship nx=ny≥nz, an in-plane retardation of each of the first and second optical alignment films is greater than or equal to 1 nm, given that $R_1$ is a thickness-direction retardation of each of the first and second protective layers and that $R_2$ is the in-plane retardation of each of the first and second optical alignment films, $R_1$ and $R_2$ satisfy the relationship $R_1 \geq 0.107 R_2^2 - 4.4 R_2 + 72.0$, the liquid crystal layer has a negative dielectric anisotropy, and a transmission axis of the second polarizer is parallel to an initial alignment direction of the liquid crystal molecules in a plan view.

Still another aspect of the present invention may be a liquid crystal display device of an IPS type including a first polarizer, a first protective layer, a first substrate, a first optical alignment film, a horizontal-alignment liquid crystal layer including liquid crystal molecules, a second optical alignment film, a second substrate including a signal electrode and an opposite electrode opposite the signal electrode, a second protective layer, a second polarizer, and backlight in this order, in which the first protective layer satisfies the relationship nx=ny≥nz, the second protective layer is optically isotropic, an in-plane retardation of each of the first and second optical alignment films is greater than or equal to 1 nm, and a transmission axis of the second polarizer is perpendicular to an initial alignment direction of the liquid crystal molecules in a plan view.

Preferred embodiments in this aspect are exemplified by, for example, an embodiment in which the liquid crystal layer has a negative dielectric anisotropy, and an embodiment in which the liquid crystal layer has a positive dielectric anisotropy.

Hereinafter, the liquid crystal display device according to those aspects will be referred to as a display device according to the present invention as well.

Another preferred embodiment of the display device according to the present invention will be described below. The above preferred embodiments and the preferred embodiment below may be appropriately combined. An embodiment that is configured by combining two or more of the above preferred embodiments and the preferred embodiment below is also one preferred embodiment.

Each of the first and second optical alignment films may be formed by applying an alignment agent containing an alignment film material having an optical functional group and a solvent to a substrate to form a film, then prefiring the film, immediately irradiating the prefired film with light to cause a reaction of the optical functional group, and then firing the film irradiated with light.

Advantageous Effects of Invention

According to the present invention, a liquid crystal display device having excellent viewing angle characteristics can be realized.

BRIEF DESCRIPTION OF DRAWINGS

FIGS. 2(a) and 2(b) are schematic diagrams illustrating arrangement (in the axial direction) of the optical axis of each layer in a plan view in the liquid crystal display device according to the embodiment 1 and illustrate the case of a liquid crystal layer having a positive dielectric anisotropy.

FIGS. 3(a) and 3(b) are schematic diagrams illustrating arrangement (in the axial direction) of the optical axis of each layer in a plan view in the liquid crystal display device according to the embodiment 1 and illustrate the case of the liquid crystal layer having a negative dielectric anisotropy.

FIGS. 9(a) and 9(b) are schematic diagrams illustrating arrangement (in the axial direction) of the optical axis of each layer in a plan view in the liquid crystal display device according to the embodiment 2 and illustrate the case of a liquid crystal layer having a positive dielectric anisotropy.

FIGS. 10(a) and 10(b) are schematic diagrams illustrating arrangement (in the axial direction) of the optical axis of each layer in a plan view in the liquid crystal display device according to the embodiment 2 and illustrate the case of the liquid crystal layer having a negative dielectric anisotropy.

FIGS. 16(a) and 16(b) are schematic diagrams illustrating arrangement (in the axial direction) of the optical axis of each layer of the liquid crystal display device according to the example 1 when viewed from the direction of a z axis.

FIG. 17(a) illustrates the case of first and second optical alignment films having an in-plane retardation (Δnd) of 5 nm. FIG. 17(b) illustrates the case of the first and second optical alignment films having an in-plane retardation (Δnd) of 10 nm. FIG. 17(c) illustrates the case of the first and second optical alignment films having an in-plane retardation (Δnd) of 20 nm.

FIG. 18(a) illustrates the case of the first and second optical alignment films having an in-plane retardation (Δnd) of 5 nm. FIG. 18(b) illustrates the case of the first and second optical alignment films having an in-plane retardation (Δnd) of 10 nm. FIG. 18(c) illustrates the case of the first and second optical alignment films having an in-plane retardation (Δnd) of 20 nm.

FIGS. 23(a) and 23(b) are schematic diagrams illustrating arrangement (in the axial direction) of the optical axis of each layer of the liquid crystal display device according to the example 3 when viewed from the direction of the z axis.

FIGS. 29(a) and 29(b) illustrate gradation to normalized transmittance calculation results in the configuration of the example 4 in the case of the arrangement (parallel relationship) of the optical axes illustrated in FIG. 28(a). FIG. 29(a) illustrates the case of first and second optical alignment films having an in-plane retardation (Δnd) of 10 nm. FIG. 29(b) illustrates the case of the first and second optical alignment films having an in-plane retardation (Δnd) of 20 nm.

FIGS. 30(a) and 30(b) illustrate gradation to normalized transmittance calculation results in the configuration of the example 4 in the case of the arrangement (perpendicular relationship) of the optical axes illustrated in FIG. 28(b). FIG. 30(a) illustrates the case of the first and second optical alignment films having an in-plane retardation (Δnd) of 10 nm. FIG. 30(b) illustrates the case of the first and second optical alignment films having an in-plane retardation (Δnd) of 20 nm.

FIGS. 35(a) and 35(b) are schematic diagrams illustrating arrangement (in the axial direction) of the optical axis of each layer of the liquid crystal display device according to the example 6 when viewed from the direction of the z axis.

FIGS. 110(a) and 110(b) are schematic diagrams illustrating arrangement (in the axial direction) of the optical axis of each layer of the liquid crystal display device according to the example 18 when viewed from the direction of the z axis.

DESCRIPTION OF EMBODIMENTS

Figure 1:
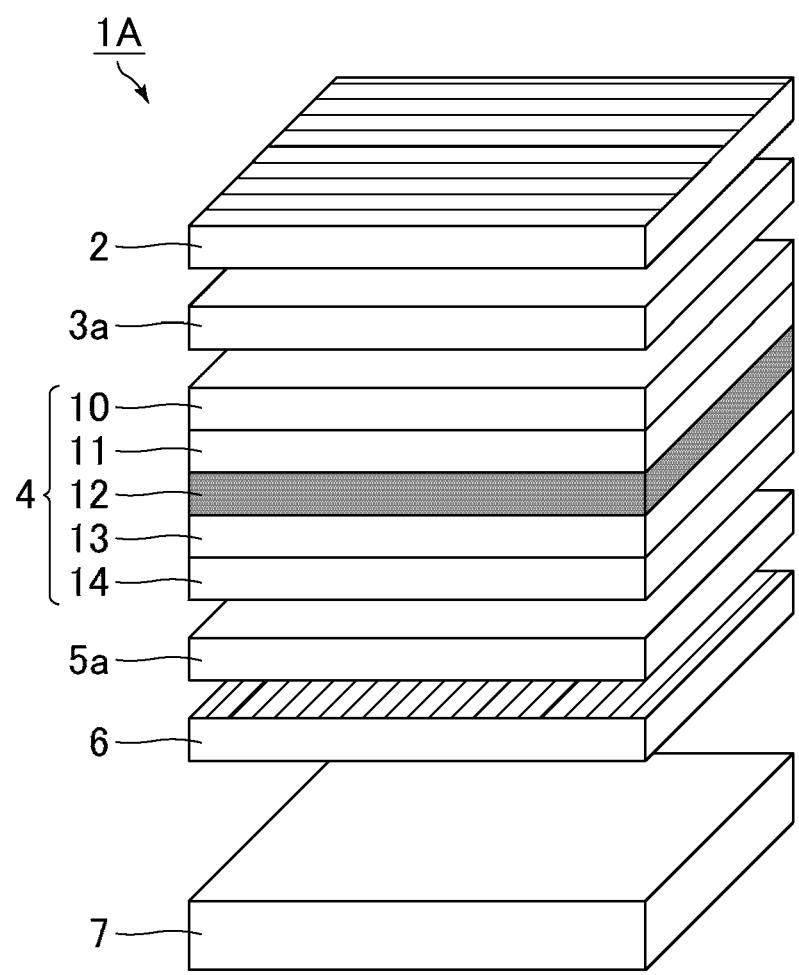
FIG. 1 is a schematic perspective view of a liquid crystal display device according to embodiment 1.

Hereinafter, embodiments and examples of the present invention will be described with reference to the drawings. It is to be noted that the present invention is not limited to the embodiments and the examples below. Configurations of each of the embodiments and the examples may be appropriately combined or modified to the extent not departing from the gist of the present invention. In each drawing, members exhibiting the same functions will be designated by the same reference signs.

First, definitions of terms and a measuring method for physical properties in the present specification will be described.

The term "polarizer" refers to only a layer having an action of controlling (defining in one direction) the vibration direction of light and does not include layers such as a protective layer having a retardation and a phase difference compensation layer. The contrast of the polarizer is not necessarily be infinite and may be greater than or equal to 5,000, preferably greater than or equal to 10,000, and more preferably greater than or equal to 20,000.

The expression "protective layer satisfying the relationship nx=ny≥nz" means a protective layer that satisfies nx≥nz and ny≥nz and has an in-plane retardation of less than or equal to 10 nm (preferably less than or equal to 8 nm and more preferably less than or equal to 5 nm) and a thickness-direction (out-of-plane) retardation of greater than or equal to 0 nm and less than or equal to 100 nm (preferably greater than or equal to 0 nm and less than or equal to 80 nm, more preferably greater than or equal to 0 nm and less than or equal to 60 nm, and particularly preferably greater than or equal to 0 nm and less than or equal to 56 nm). Accordingly, a protective layer satisfying the relationship nx=ny≥nz may have a refractive index anisotropy or may be optically isotropic. nx and ny represent main refractive indices in the in-plane direction, and nz represents a main refractive index in the thickness direction (out-of-plane direction).

The expression "protective layer that is optically isotropic" means a protective layer that has an in-plane retardation of less than or equal to 10 nm (preferably less than or equal to 8 nm and more preferably less than or equal to 5 nm) and a thickness-direction retardation of less than or equal to 10 nm (preferably greater than or equal to 0 nm and less than or equal to 8 nm and more preferably greater than or equal to 0 nm and less than or equal to 5 nm).

Given that nx and ny are defined as the main refractive indices of a certain layer in the in-plane direction, that nz is defined as the main refractive index of the layer in the thickness direction (out-of-plane direction), and that d is defined as the thickness of the layer, the in-plane retardation of the layer is defined as $|nx-ny|\times d$ and has a value of greater than or equal to zero (absolute value in units of nm), and the thickness-direction (out-of-plane) retardation of the layer is defined as $|nz-(nx+ny)/2|\times d$ and has a value of greater than or equal to zero (absolute value in units of nm).

The in-plane retardation, the thickness-direction (out-of-plane) retardation, nx, ny, nz, and the relationship in arrangement between the transmission axis of the polarizer and the initial alignment direction of liquid crystal molecules can be measured by using a polarization and retardation measuring device (Axoscan manufactured by Axometrics, Inc.). According to the device, both the magnitude of each retardation and the direction of an axis along which the refractive index with respect to extraordinary light (hereinafter, referred to as an extraordinary light refractive index ne as well) is induced (hereinafter, referred to as an extraordinary light refractive index axis as well) can be measured at the same time. If a quartz substrate on which an alignment film is formed is used as a sample, the in-plane retardation of the alignment film and the direction of the extraordinary light refractive index axis of the alignment film can be accurately measured. A quartz substrate on which an alignment film is formed is a quartz substrate on which an alignment film is formed by applying an alignment film material (varnish) by, for example, spin coating and then performing a predetermined process (for example, processes such as prefiring, light irradiation, and firing). Unless otherwise specified, a main refractive index or the measured wavelength of a retardation is 550 nm in the present specification.

In a self-assembled optical alignment film, any of the extraordinary light refractive index axis and an axis along which the refractive index with respect to ordinary light (hereinafter, referred to as an ordinary light refractive index no as well) is induced (ordinary light refractive index axis) exists in plane in the optical alignment film (parallel to the in-plane direction). Thus, the in-plane retardation ($R_2$) of the self-assembled optical alignment film can be defined as a product $\Delta nd$ (=(ne−no)×d) of a refractive index anisotropy $\Delta n$ (=ne−no), which is the difference between the ordinary refractive index no and the extraordinary refractive index ne, and the film thickness d and has a value of greater than or equal to zero (absolute value in units of nm).

The expression "initial alignment direction of liquid crystal molecules" means the long-axis direction of liquid crystal molecules when a voltage is not applied between a signal electrode and an opposite electrode (hereinafter, referred to as when no voltage is applied), that is, the direction of the extraordinary light refractive index axis of liquid crystal molecules.

The term "optical axis" is different from the exact meaning of an optical axis in the field of crystal optics and follows the following definition. That is, the term "optical axis" means a main axis that corresponds to a main refractive index of three main refractive indices nx, ny, and nz for which the absolute value of the difference between the main refractive index and the average value of the three main refractive indices nx, ny, and nz is the maximum. Thus, even when a certain layer is optically biaxial, the number of "optical axes" of the layer is one and not two. Accordingly, the "optical axis" of a biaxial layer corresponds to the definition of the optical axis in the related art in the case of optically approximating the layer to a uniaxial layer.

Embodiment 1

A liquid crystal display device according to the present embodiment is a transverse electric field type liquid crystal display device and has a display area in which a picture (screen) is displayed, and the display area is configured of a plurality of pixels arranged in a matrix.

FIG. 1 is a schematic perspective view of the liquid crystal display device according to embodiment 1. FIGS. 2(a) and 2(b) are schematic diagrams illustrating arrangement (in the axial direction) of the optical axis of each layer in a plan view in the liquid crystal display device according to the embodiment 1 and illustrate the case of a liquid crystal layer having a positive dielectric anisotropy. FIGS. 3(a) and 3(b) are schematic diagrams illustrating arrangement (in the axial direction) of the optical axis of each layer in a plan view in the liquid crystal display device according to the embodiment 1 and illustrate the case of the liquid crystal layer having a negative dielectric anisotropy.

As illustrated in FIG. 1, a liquid crystal display device 1A according to the present embodiment includes a first polarizer 2, a first protective layer 3a satisfying the relationship nx=ny≥nz, a liquid crystal panel 4, a second protective layer 5a satisfying the relationship nx=ny≥nz, a second polarizer 6, and backlight 7 in this order from the observer side. The liquid crystal panel 4 includes a first substrate 10, a first optical alignment film 11, a horizontal-alignment liquid crystal layer 12 including liquid crystal molecules, a second optical alignment film 13, and a second substrate 14 including a signal electrode (pixel electrode) and an opposite electrode (common electrode) opposite the signal electrode in this order from the observer side.

Each of the optical alignment films 11 and 13 is a self-assembled optical alignment film.

The term "self-assembled optical alignment film" refers to an alignment film that is formed by forming a film through application of an alignment agent (varnish) containing an alignment film material having an optical functional group and a solvent to a substrate, then prefiring the film (the film formed through application), immediately irradiating the prefired film with light to cause a reaction of the optical functional group, and then firing the film irradiated with light. Performing such processes increases the aligning ability of the optical functional group. Therefore, according to the optical alignment films 11 and 13, liquid crystals can be aligned with high accuracy, and the liquid crystal layer 12 can have a pretilt angle of approximately zero. Consequently, the contrast of the liquid crystal display device 1A can be improved.

In the case of the self-assembled optical alignment film, an anisotropy is generated (induced) on the film surface by light irradiation, and subsequent firing increases the magnitude of the anisotropy. Liquid crystal molecules near the film surface are aligned in the same direction as the direction of the induced anisotropy by electrical interaction with the film surface. Therefore, as illustrated in FIGS. 2(a) and 2(b) and FIGS. 3(a) and 3(b), an initial alignment direction 12a of liquid crystal molecules is parallel to extraordinary light refractive index axes 11ne and 13ne of the optical alignment films 11 and 13.

Each of the optical alignment films 11 and 13 which are self-assembled optical alignment films have a greater in-plane retardation than a rubbing alignment film (an alignment film on which rubbing is performed as an alignment process) used in the related art, and the in-plane retardation is greater than or equal to 1 nm. Thus, viewing angle characteristics are worsened unless optical design considering the in-plane retardation of each of the optical alignment films 11 and 13 is performed. In the present embodiment, optical design considering these retardations is performed.

More specifically, the relationship between a transmission axis 6t of the second polarizer 6 and the initial alignment direction 12a of liquid crystal molecules is defined according to the relationship between a thickness-direction retardation $R_1$ of each of the protective layers 3a and 5a and an in-plane retardation $R_2$ of each of the optical alignment films 11 and 13.

First, as an assumption, it is important that the initial alignment direction 12a of liquid crystal molecules be perpendicular or parallel to the transmission axis 6t of the second polarizer 6. The reason is to make polarized light that enters the liquid crystal layer 12 when no voltage is applied not receive optical influence from liquid crystal molecules to the extent possible and to realize excellent display quality, for example, display in black with high quality.

The transmission axis 6t of the second polarizer 6 is arranged perpendicular to the initial alignment direction 12a of liquid crystal molecules in a plan view as illustrated in FIG. 2(b) and FIG. 3(b) in the case of employing an FFS type as the transverse electric field type, the retardations $R_1$ and $R_2$ satisfying the relationship $R_1 \leq 0.047R_2^2 - 2.1R_2 + 44.3$, and the liquid crystal layer 12 having a positive dielectric anisotropy, in the case of employing an FFS type as the transverse electric field type, the retardations $R_1$ and $R_2$ satisfying the relationship $R_1 \leq 0.040R_2^2 - 2.2R_2 + 44.0$, and the liquid crystal layer 12 having a negative dielectric anisotropy, in the case of employing an IPS type as the transverse electric field type, the retardations $R_1$ and $R_2$ satisfying the relationship $R_1 \leq 0.140R_2^2 - 5.7R_2 + 95.0$, and the liquid crystal layer 12 having a positive dielectric anisotropy, or in the case of employing an IPS type as the transverse electric field type, the retardations $R_1$ and $R_2$ satisfying the relationship $R_1 \leq 0.107R_2^2 - 4.4R_2 + 72.0$, and the liquid crystal layer 12 having a negative dielectric anisotropy. Accordingly, viewing angle characteristics can be improved compared with the case of parallel arrangement.

The transmission axis 6t of the second polarizer 6 is arranged parallel to the initial alignment direction 12a of liquid crystal molecules in a plan view as illustrated in FIG. 2(a) and FIG. 3(a) in the case of employing an FFS type as the transverse electric field type, the retardations $R_1$ and $R_2$ satisfying the relationship $R_1 \geq 0.047R_2^2 - 2.1R_2 + 44.3$, and the liquid crystal layer 12 having a positive dielectric anisotropy, in the case of employing an FFS type as the transverse electric field type, the retardations $R_1$ and $R_2$ satisfying the relationship $R_1 \geq 0.040R_2^2 - 2.2R_2 + 44.0$, and the liquid crystal layer 12 having a negative dielectric anisotropy, in the case of employing an IPS type as the transverse electric field type, the retardations $R_1$ and $R_2$ satisfying the relationship $R_1 \geq 0.140R_2^2 - 5.7R_2 + 95.0$, and the liquid crystal layer 12 having a positive dielectric anisotropy, or in the case of employing an IPS type as the transverse electric field type, the retardations $R_1$ and $R_2$ satisfying the relationship $R_1 \geq 0.107R_2^2 - 4.4R_2 + 72.0$, and the liquid crystal layer 12 having a negative dielectric anisotropy. Accordingly, viewing angle characteristics can be improved compared with the case of perpendicular arrangement.

In the present specification, the expression "the transmission axis of the second polarizer is perpendicular to the initial alignment direction of liquid crystal molecules in a plan view" means the angle formed between the transmission axis and the initial alignment direction is 89° to 91°, preferably 89.5° to 90.5°, and more preferably 89.9° to 90.1° in a plan view. The expression "the transmission axis of the second polarizer is parallel to the initial alignment direction of liquid crystal molecules in a plan view" means the angle formed between the transmission axis and the initial alignment direction is −1.0° to 1.0°, preferably −0.5° to 0.5°, and more preferably −0.1° to 0.1° in a plan view.

The transmission axis 6t of the second polarizer 6 may be arranged perpendicular or parallel to the initial alignment direction 12a of liquid crystal molecules in the case of employing an FFS type as the transverse electric field type, $R_1$ and $R_2$ satisfying the relationship $R_1 = 0.047R_2^2 - 2.1R_2 + 44.3$, and the liquid crystal layer 12 having a positive dielectric anisotropy, in the case of employing an FFS type as the transverse electric field type, $R_1$ and $R_2$ satisfying the relationship $R_1 = 0.040R_2^2 - 2.2R_2 + 44.0$, and the liquid crystal layer 12 having a negative dielectric anisotropy, in the case of employing an IPS type as the transverse electric field type, the retardations $R_1$ and $R_2$ satisfying the relationship $R_1 = 0.140R_2^2 - 5.7R_2 + 95.0$, and the liquid crystal layer 12 having a positive dielectric anisotropy, or in the case of employing an IPS type as the transverse electric field type, the retardations $R_1$ and $R_2$ satisfying the relationship $R_1 = 0.107R_2^2 - 4.4R_2 + 72.0$, and the liquid crystal layer 12 having a negative dielectric anisotropy.

Hereinafter, the liquid crystal display device 1A and each member will be further described.

Each of the polarizers 2 and 6 is a layer having an action of controlling (defining in one direction) the vibration direction of light and does not include layers such as a protective layer having a retardation and a phase difference compensation layer. Each of the polarizers 2 and 6 has a function of changing natural light (non-polarized light), partially polarized light, or polarized light into linearly polarized light, that is, acquiring linearly polarized light from natural light (non-polarized light), partially polarized light, or polarized light. A specific example of each of the polarizers 2 and 6 is exemplified by, for example, a polyvinyl alcohol (PVA) film in which an anisotropic material (for example, an iodine complex) having dichroism is adsorbed and aligned. Accordingly, particularly in the case of using a PVA film, each of the polarizers 2 and 6 does not have sufficient mechanical strength and resistance to moist heat. However, the protective layers 3a and 5a are respectively bonded to the polarizers 2 and 6, and the polarizers 2 and 6 are protected. A protective film such as a triacetylcellulose (TAC) film is bonded to the opposite surfaces of the polarizers 2 and 6 from the substrates 10 and 14.

The liquid crystal display device 1A does not include another retardation layer between the first substrate 10 and the first polarizer 2 and between the second substrate 14 and the second polarizer 6. That is, a retardation layer is not interposed between the first polarizer 2 and the first protective layer 3a. A retardation layer is not interposed between the first protective layer 3a and the first substrate 10. A retardation layer is not interposed between the second substrate 14 and the second protective layer 5a. A retardation layer is not interposed between the second protective layer 5a and the second polarizer 6. In the present specification, the term "retardation layer" means a layer having a refractive index anisotropy and having at least one of an in-plane retardation and a thickness-direction retardation thereof greater than or equal to 10 nm. The first protective layer 3a is bonded to the first polarizer 2 and the first substrate 10 by a bonding member, and the second protective layer 5a is bonded to the second polarizer 6 and the second substrate 14 by a bonding member. The bonding member is exemplified by a bonding agent (includes an adhesive).

The polarizers 2 and 6 are typically arranged in the form of parallel Nicols as illustrated in FIGS. 2(a) and 2(b) and FIGS. 3(a) and 3(b) and may be arranged in the form of crossed Nicols. In this case, the angle formed between a transmission axis 2t of the first polarizer 2 and the transmission axis 6t of the second polarizer 6 is preferably 89° to 91°, more preferably 89.5° to 90.5°, and further preferably 89.9° to 90.1° in a plan view.

Each of the protective layers 3a and 5a satisfies the relationship $nx = ny \geq nz$. That is, each of the protective layers 3a and 5a may be a layer having a refractive index anisotropy (a so-called negative C-plate) or may be optically isotropic. Thus, a polymer film (for example, a triacetylcellulose (TAC) film) that is suitable for a protective film for a polarizer can be used as each of the protective layers 3a and 5a. In either case, each of the protective layers 3a and 5a almost does not exhibit a refractive index anisotropy at least in plane, and the concept of setting an optical axis is not applied to each of the protective layers 3a and 5a at least in plane. Therefore, FIGS. 2(a) and 2(b) and FIGS. 3(a) and 3(b) do not illustrate the optical axis of each of the protective layers 3a and 5a.

The optical characteristics of the first protective layer 3a may be different from the optical characteristics of the second protective layer 5a. Typically, the protective layers 3a and 5a are substantially the same and have substantially the same optical characteristics. Accordingly, the protective layers 3a and 5a may have substantially the same thickness-direction retardation $R_1$. In this case, the absolute value of the difference between $R_1$ of the first protective layer 3a and $R_1$ of the second protective layer 5a is preferably greater than or equal to 0 nm and less than or equal to 10 nm, more preferably greater than or equal to 0 nm and less than or equal to 5 nm, and further preferably greater than or equal to 0 nm and less than or equal to 1 nm.

Each of the protective layers 3a and 5a may be configured of multiple layers or may be configured of only one layer. In the case of being configured of multiple layers, the sum (total sum) of the thickness-direction retardations of all layers constituting each of the protective layers 3a and 5a may be used as $R_1$.

The optical alignment films 11 and 13 are formed to cover at least the entire area of the display area without a break. Each of the optical alignment films 11 and 13 can align nearby liquid crystal molecules in an approximately parallel direction to the film surface and functions as a horizontal alignment film.

The in-plane retardation $R_2$ of each of the optical alignment films 11 and 13 is not particularly limited if having a lower limit value of 1 nm, can be appropriately set according to matters such as the material, the film thickness, and the like of each of the optical alignment films 11 and 13, and is preferably greater than or equal to 1 nm and less than or equal to 20 nm, more preferably greater than or equal to 1 nm and less than or equal to 10 nm, and further preferably greater than or equal to 1 nm and less than or equal to 5 nm.

The thickness-direction retardation of each of the optical alignment films 11 and 13 is not particularly limited and is preferably greater than or equal to 0 nm and less than or equal to 10 nm, more preferably greater than or equal to 0 nm and less than or equal to 8 nm, and further preferably greater than or equal to 0 nm and less than or equal to 5 nm.

The optical characteristics of the first optical alignment film 11 may be different from the optical characteristics of the second optical alignment film 13. Typically, the optical alignment films 11 and 13 are substantially the same, that is, formed through substantially the same process by using substantially the same material, and have substantially the same optical characteristics. Accordingly, the optical alignment films 11 and 13 may have substantially the same in-plane retardation $R_2$. In this case, the absolute value of the difference between $R_2$ of the first optical alignment film 11 and $R_2$ of the second optical alignment film 13 is preferably greater than or equal to 0 nm and less than or equal to 10 nm, more preferably greater than or equal to 0 nm and less than or equal to 8 nm, and further preferably greater than or equal to 0 nm and less than or equal to 5 nm. The absolute value of the difference between the thickness-direction retardations of the first optical alignment film 11 and the second optical alignment film 13 is preferably greater than or equal to 0 nm and less than or equal to 10 nm, more preferably greater than or equal to 0 nm and less than or equal to 8 nm, and further preferably greater than or equal to 0 nm and less than or equal to 5 nm.

The film thickness of each of the optical alignment films 11 and 13 is not particularly limited and is preferably greater than or equal to 50 nm and less than or equal to 300 nm, more preferably greater than or equal to 70 nm and less than or equal to 200 nm, and further preferably greater than or equal to 80 nm and less than or equal to 150 nm.

Figure 58:
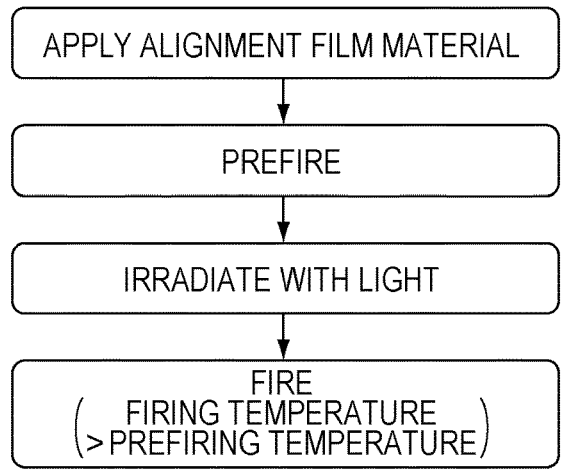
FIG. 58 illustrates a formation process of a self-assembled optical alignment film in the embodiment 1.

FIG. 58 illustrates a formation process of a self-assembled optical alignment film in the embodiment 1.

Each of the optical alignment films 11 and 13 is a self-assembled optical alignment film. That is, the optical alignment films 11 and 13 are formed as follows. As illustrated in FIG. 58, first, an alignment agent (varnish) containing an alignment film material having an optical functional group and a solvent is applied to each of the substrates 10 and 14 to form films. Then, the films (the films formed through application) are prefired. Immediately, each prefired film is irradiated with light to cause a reaction of the optical functional group. Then, the films irradiated with light are fired to form the optical alignment films 11 and 13.

The optical functional group included in the alignment film material is a functional group that exhibits reactivity to light. The optical functional group is not particularly limited and is preferably a group causing at least one reaction selected from a group configured of dimerization, isomerization, and photo-Fries rearrangement (relocation).

In the case of the optical functional group causing dimerization, the optical functional groups of a plurality of molecules respectively having the optical functional group form a dimer by light irradiation, and the plurality of molecules is linked through the dimer to form a cross-link structure (cross-link bond structure).

In the case of the optical functional group causing isomerization, the optical functional group is isomerized by light irradiation. For example, an optical functional group of a cis isomer (or a trans isomer) is changed by light irradiation into an optical functional group of a trans isomer (or a cis isomer) through excitation.

In the case of the optical functional group causing photo-Fries rearrangement, a part of the optical functional group is rearranged by light irradiation to form an aromatic hydroxy ketone skeleton.

A functional group including a skeleton such as a cinnamate skeleton, a chalcone skeleton, an azobenzene skeleton, a stilbene skeleton, a coumarin skeleton, a phenyl ester skeleton, or a cyclobutane skeleton is preferable as the optical functional group.

A cinnamate skeleton, a chalcone skeleton, and a coumarin skeleton can cause dimerization. An azobenzene skeleton and a stilbene skeleton can cause isomerization. A phenyl ester skeleton can cause photo-Fries rearrangement.

The alignment film material having the optical functional group may be a polymer having the above optical functional group and is exemplified by a polymer such as a vinyl polymer, an acrylic polymer, polyimide, polyamic acid, polysiloxane, polymaleimide, polyester, or polyamide.

A solvent that is generally used in an alignment agent can be used as the solvent included in the alignment agent, and the solvent is exemplified by, for example, N-methyl-2-pyrrolidone (NMP), Butyl Cellosolve (BC; ethylene glycol monobutyl ether), or the like. The proportion of the alignment film material (solids content) and the solvent in the alignment agent is not particularly limited, and the weight ratio of the alignment film material and the solvent is typically alignment film material:solvent=2:98 to 10:90, preferably alignment film material:solvent=3:97 to 5:95, and more preferably alignment film material:solvent=3.5:96.5 to 4.5:95.5.

An application method is not particularly limited and is exemplified by, for example, spin coating, flexography, or ink jet printing.

Prefiring is preferably performed at 50° C. to 100° C. and is preferably performed for 1 to 5 minutes.

Light with which the prefired films are irradiated and that causes a reaction of the optical functional group preferably includes an ultraviolet ray and preferably includes polarized light (more preferably, linearly polarized light) and more preferably includes a linearly polarized ultraviolet ray. The prefired films are typically irradiated with light from the front of (a direction normal to) the substrate 10 or 14 where the films are formed. In each of the optical alignment films 11 and 13, the direction in which an anisotropy is induced may be a direction perpendicular to the polarization axis of polarized light or may be a direction parallel thereto. Accordingly, while any optical alignment film of a type that aligns liquid crystal molecules perpendicular to the polarization axis of light and a type that aligns liquid crystal molecules parallel thereto can be used in the optical alignment films 11 and 13, liquid crystal molecules are always aligned parallel to the direction of the induced anisotropy (extraordinary refractive index axis) of each of the optical alignment films 11 and 13.

The expression "irradiation with light immediately after prefiring" means irradiation with light that causes a reaction of the optical functional group within 24 hours from prefiring.

Firing is preferably performed at 100° C. to 300° C. and is further preferably performed for 20 to 90 minutes.

The in-plane retardations of various alignment films measured by the inventors of the present invention are illustrated in Table 1 below. In Table 1, photolytic, photoisomeric, and photo-Fries rearrangement alignment films correspond to optical alignment films on which an optical alignment process as an alignment process is performed, and photoisomeric and photo-Fries rearrangement optical alignment films (alignment films E to H) that are fired after light irradiation correspond to self-assembled optical alignment films. Any alignment film has a film thickness of 100 nm.

TABLE 1

| Alignment Film | Alignment | Firing after Light Irradiation | Retardation |
| --- | --- | --- | --- |
| A | Rubbing | No | 0.1 nm |
| B | Photolytic | No | 0.8 nm |
| C | Photolytic | Yes | 0.5 nm |
| D | Photoisomeric | No | 0.1 nm |
| E | Photoisomeric | Yes | 1.8 nm |
| F | Photoisomeric | Yes | 15 nm |
| G | Photo-Fries Rearrangement | Yes | 5 nm |
| H | Photo-Fries Rearrangement | Yes | 21 nm |

As illustrated in Table 1, a rubbing alignment film and optical alignment films other than the self-assembled optical alignment films exhibit an in-plane retardation of less than 1 nm, and the self-assembled optical alignment films (the alignment films E to H) exhibit a great in-plane retardation of greater than or equal to 1 nm.

The first substrate 10 is bonded to the second substrate 14 by a linear seal that is disposed to surround a plurality of pixels, that is, the display area, between the substrates 10 and 14, and the horizontal-alignment liquid crystal layer 12 is formed by sealing a liquid crystal material (a composition including a liquid crystal component) in the gap between the substrates 10 and 14 surrounded by the seal.

The liquid crystal layer 12 is a layer exhibiting a nematic phase and contains at least liquid crystal molecules. The liquid crystal molecules in the liquid crystal layer 12 exhibits parallel alignment (horizontal alignment or homeotropic alignment) by alignment regulating force of the optical alignment films 11 and 13 when no voltage is applied, and have long axes thereof aligned approximately parallel to the surface of each of the substrates 10 and 14. The pretilt angle (polar angle) of the liquid crystal molecules (liquid crystal layer 12) is approximately zero. Being approximately zero means being greater than or equal to 0° and less than or equal to 0.5° (preferably less than or equal to 0.3° and more preferably less than or equal to 0.1°). The pretilt angle can be measured by using a polarization analyzing device manufactured by Shintech (model name: OPTIPRO).

The dielectric anisotropy ($\Delta\varepsilon$) of the liquid crystal layer 12 may be positive or negative and is preferably negative from the viewpoint of realizing a high transmittance. A specific value of the dielectric anisotropy of the liquid crystal layer 12 is not particularly limited and, in the case of being positive, preferably 3.0 to 20.0, more preferably 4.0 to 15.0, and further preferably 5.0 to 10.0 and, in the case of being negative, preferably −15.0 to −2.5, more preferably −10.0 to −3.0, and further preferably −7.0 to −4.0.

The product (panel retardation) of the thickness (cell gap) of the liquid crystal layer 12 and the refractive index anisotropy $\Delta n$ of the liquid crystal layer 12 is not particularly limited and is preferably 200 to 400 nm, more preferably 250 to 350 nm, and further preferably 275 to 325 nm.

Figure 5:
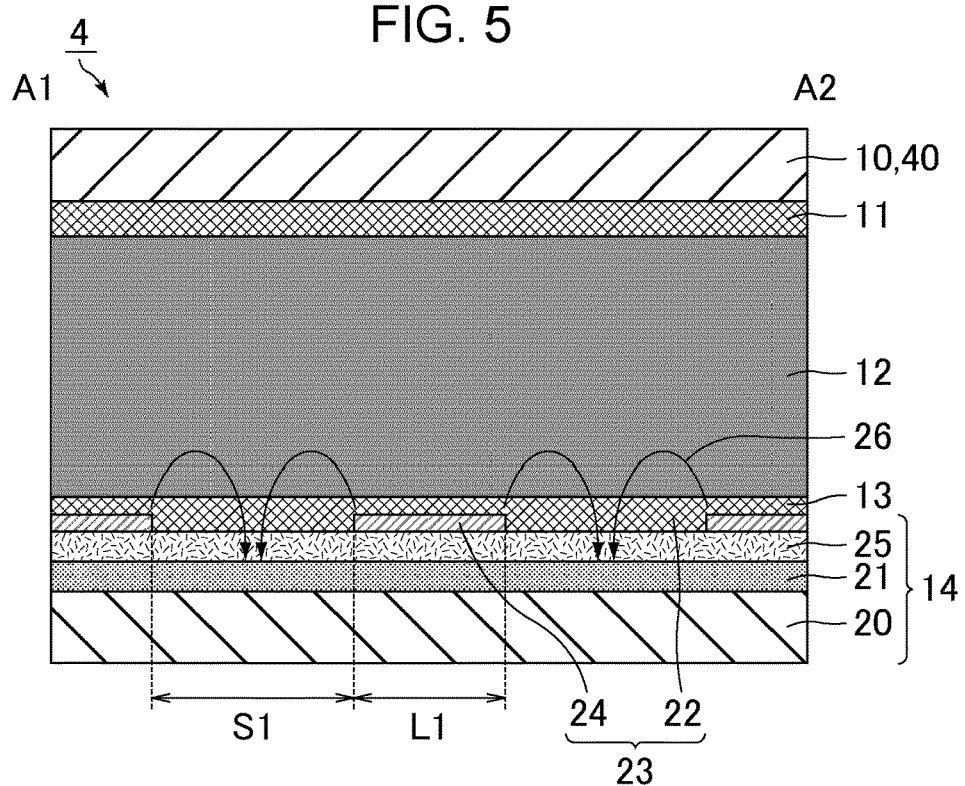
FIG. 5 is a schematic sectional view illustrating electrode arrangement in the liquid crystal display device according to the embodiment 1 and illustrates an A1-A2 section in FIG. 4.
Figure 7:
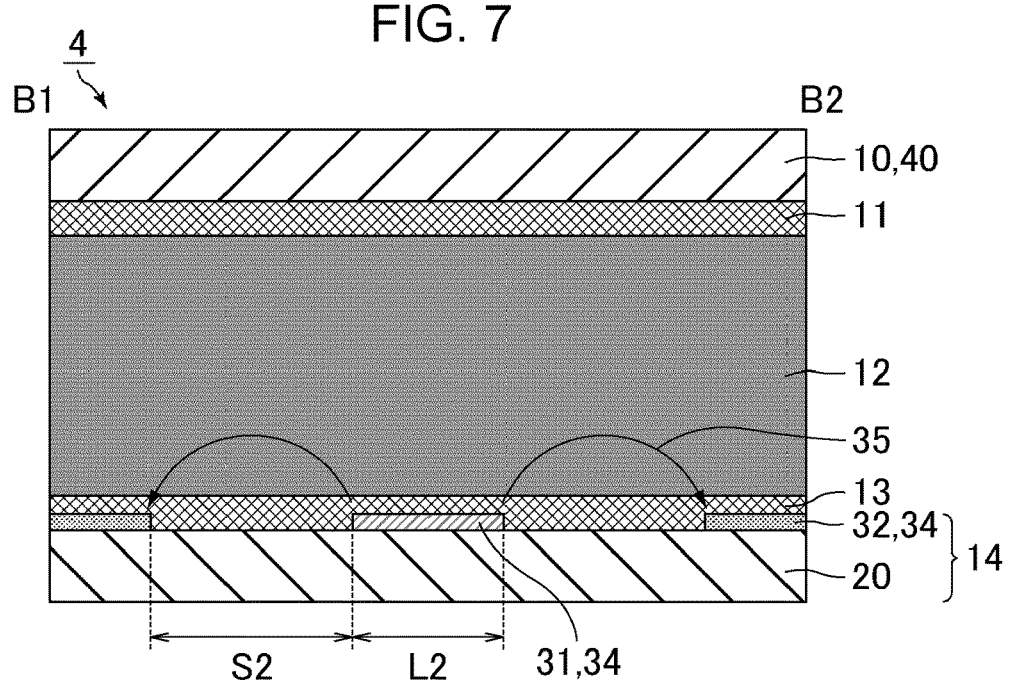
FIG. 7 is a schematic sectional view illustrating electrode arrangement in the liquid crystal display device according to the embodiment 1 and illustrates a B1-B2 section in FIG. 6.

The first substrate 10 is an opposite substrate positioned on the front side (the display surface side or the observer side) and includes a transparent insulating substrate 40 such as a glass substrate (refer to FIGS. 5 and 7 described later).

The first substrate 10 may include a black matrix disposed on the liquid crystal layer 12 side surface of the insulating substrate 40 and may further include a color filter in the case of display in color. In the case of displaying color, each pixel is configured of subpixels of a plurality of colors, and each subpixel has the same configuration as the pixel in the case of display in grayscale.

The second substrate 14 is an array substrate positioned on the rear side (the non-observer side) and includes a transparent insulating substrate 20 such as a glass substrate (refer to FIGS. 5 and 7 described later), a plurality of gate lines (gate bus lines) disposed on the insulating substrate 20, a gate insulating film covering the gate lines, a plurality of source lines (source bus lines) disposed on the gate insulating film, a plurality of TFT elements disposed in correspondence with the plurality of pixels (the plurality of subpixels in the case of display in color), and an interlayer insulating film (flattening film) covering the plurality of source lines and the plurality of TFT elements.

The signal electrode and the opposite electrode are disposed on the interlayer insulating film, and the signal electrode is disposed for each pixel (the subpixel in the case of display in color). The opposite electrode may be disposed for each pixel (or subpixel), may be disposed for every plurality of pixels (or every plurality of subpixels), or may be disposed to cover all of the pixels. The opposite electrode is supplied with a common signal for all of the pixels. The signal electrode and the opposite electrode are formed of a transparent conductive material such as indium tin oxide (ITO) or indium zinc oxide (IZO).

Figure 4:
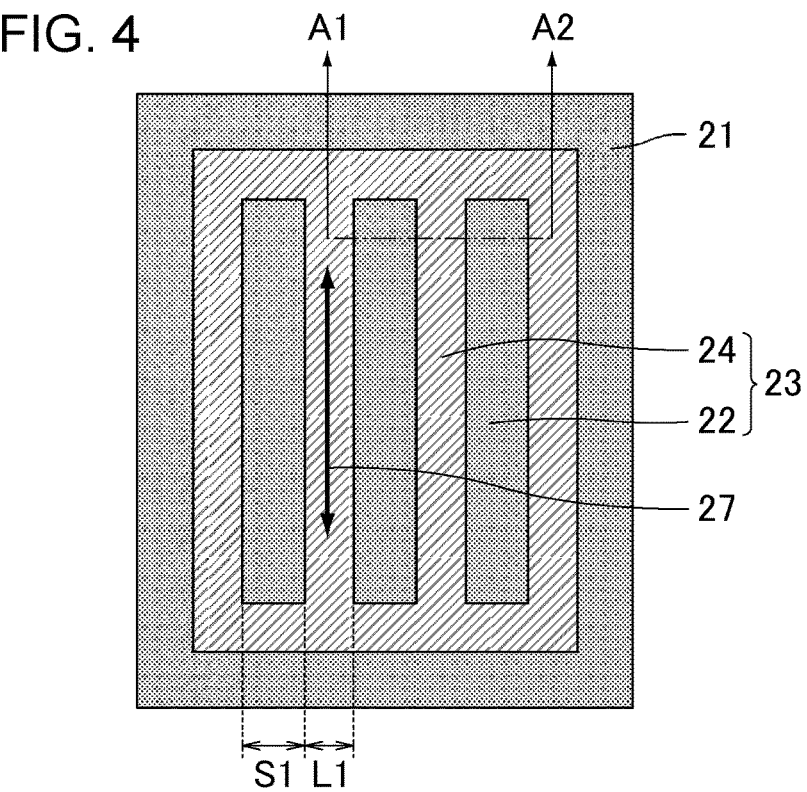
FIG. 4 is a schematic plan view illustrating electrode arrangement in the liquid crystal display device according to the embodiment 1.

FIG. 4 is a schematic plan view illustrating electrode arrangement in the liquid crystal display device according to the embodiment 1. FIG. 5 is a schematic sectional view illustrating electrode arrangement in the liquid crystal display device according to the embodiment 1 and illustrates an A1-A2 section in FIG. 4. FIGS. 4 and 5 illustrate the case of employing a fringe field switching (FFS) type as the transverse electric field type.

In the case of employing an FFS type as the transverse electric field type, in each pixel (each subpixel in the case of display in color), one of the signal electrode and the opposite electrode is a planar electrode 21, and the other is an electrode 23 in which a plurality of parallel electrode slits (parts where electrodes are not formed) 22, and has a plurality of parallel linear parts 24, as illustrated in FIG. 4. As illustrated in FIG. 5, an interlayer insulating film 25 is disposed on the electrode 21 on the interlayer insulating film (not illustrated), and the electrode 23 is arranged on the interlayer insulating film 25. The electrode 23 is stacked on the electrode 21 with the interlayer insulating film 25 interposed therebetween. When a voltage is applied between the electrodes 21 and 23, that is, the signal electrode and the opposite electrode, a parabolic electric field (fringe electric field) 26 is generated in the liquid crystal layer 12 near the electrode slit 22.

A width (short-direction length) L1 of each linear part 24 is preferably 2.0 to 10.0 µm, more preferably 2.5 to 7.0 µm, and further preferably 3.0 to 5.0 µm. Each interval between the adjacent linear parts 24, that is, a width (short-direction length) S1 of each electrode slit 22 is preferably 2.0 to 10.0 µm, more preferably 2.5 to 7.0 µm, and further preferably 3.0 to 5.0 µm.

The film thickness of the interlayer insulating film 25 is preferably 50 to 500 nm, more preferably 75 to 300 nm, and further preferably 100 to 200 nm. A dielectric constant ε of the interlayer insulating film 25 is preferably 3.0 to 10.0, more preferably 4.0 to 8.0, and further preferably 5.0 to 7.0.

Figure 6:
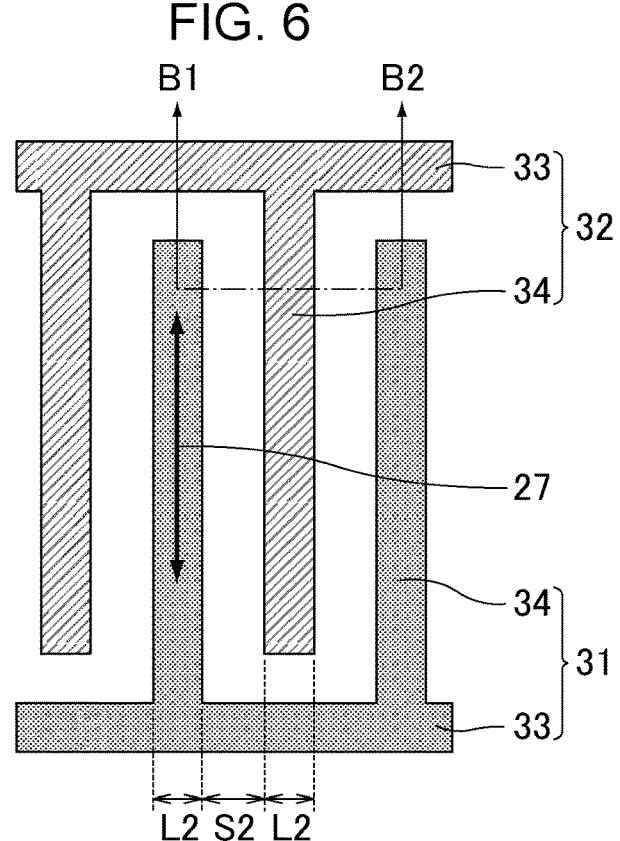
FIG. 6 is a schematic plan view illustrating electrode arrangement in the liquid crystal display device according to the embodiment 1.

FIG. 6 is a schematic plan view illustrating electrode arrangement in the liquid crystal display device according to the embodiment 1. FIG. 7 is a schematic sectional view illustrating electrode arrangement in the liquid crystal display device according to the embodiment 1 and illustrates a B1-B2 section in FIG. 6. FIGS. 6 and 7 illustrate the case of employing an in-plane switching (IPS) type as the transverse electric field type.

In the case of employing an IPS type as the transverse electric field type, in each pixel (each subpixel in the case of display in color), as illustrated in FIG. 6, the signal electrode 31 and the opposite electrode 32 are a pair of comb teeth electrodes having comb teeth thereof interlocking and has a shaft portion 33 and a plurality of parallel branch portions (comb teeth) 34 extending from the shaft portion 33. The branch portions 34 are alternately arranged at certain intervals (spaces). As illustrated in FIG. 7, when a voltage is applied between the signal electrode 31 and the opposite electrode 32, an electric field 35 that is approximately parallel to the substrate 14 is generated in the liquid crystal layer 12 near the space.

A width (short-direction length) L2 of each branch portion 34 is preferably 2.0 to 10.0 µm, more preferably 2.5 to 7.0 µm, and further preferably 3.0 to 5.0 µm. Each interval (short-direction length) S2 between the adjacent branch portions 34 is preferably 2.0 to 10.0 µm, more preferably 2.5 to 7.0 µm, and further preferably 3.0 to 5.0 µm.

Hereinafter, the direction in which each linear part 24 and each branch portion (comb teeth) 34 extends (longitudinal direction) will be referred to as an electrode long-edge direction 27 as well. The angle formed between the electrode long-edge direction 27 and the initial alignment direction 12a of liquid crystal molecules is, in the case of the liquid crystal layer 12 having a positive dielectric anisotropy, preferably 0° to 10°, more preferably 2.5° to 9°, and further preferably 5° to 8° as illustrated in FIGS. 2(a) and 2(b) and, in the case of the liquid crystal layer 12 having a negative dielectric anisotropy, preferably 90° to 80°, more preferably 87.5° to 81°, and further preferably 85° to 82° as illustrated in FIGS. 3(a) and 3(b).

The transverse electric field type is a type of controlling alignment of liquid crystals constituting the liquid crystal layer 12 by exerting, on the liquid crystal layer 12, an electric field (hereinafter, referred to as a transverse electric field) including a component parallel to the surface of each of the substrate 10 and 14 (parallel component). The transverse electric field is generated by applying a voltage between the signal electrode 31 and the opposite electrode 32 in accordance with a display signal. The transverse electric field includes the above electric field 35 that is approximately parallel to the substrate 14 in the IPS type, and the above parabolic electric field 26 in the FFS type. The transverse electric field type is not particularly limited and is preferably the IPS type or the FFS type.

The TFT element is a switching active element and is disposed in, for example, each intersection portion of the gate lines and the source lines for each pixel (subpixel in the case of display in color). Each TFT element includes a gate electrode electrically connected to the gate lines, a gate insulating film, a semiconductor layer disposed on the gate insulating film, a source electrode for electrically connecting the semiconductor layer to the source lines, and a drain electrode for electrically connecting the semiconductor layer to the signal electrode (pixel electrode). A contact hole (through hole) is disposed in correspondence with the drain electrode of each TFT element in the interlayer insulating film. Each signal electrode (each pixel electrode) is electrically connected to the drain electrode of the corresponding TFT element through the corresponding contact hole.

A driving method for each pixel (or each subpixel) is the same as that in the case of a general liquid crystal display device. Each gate line supplies a scan signal to the plurality of TFT elements connected to the gate line, and each source line supplies a display signal to the TFT element, of the plurality of TFT elements connected to the source line, in which the scan signal is applied to the gate electrode. The scan signal and the display signal are respectively supplied (applied) to each gate line and each source line from a gate line driving circuit and a source line driving circuit. The gate line driving circuit supplies the scan signal by selecting the plurality of gate lines in a predetermined order. The configuration of a driving circuit such as the gate line driving circuit or the source line driving circuit may be the same as that used in a general liquid crystal display device.

As described heretofore, the liquid crystal display device 1A according to the present embodiment is a transverse electric field type liquid crystal display device. The liquid crystal display device 1A includes the first polarizer 2, the first protective layer 3a, the first substrate 10, the first optical alignment film 11, the horizontal-alignment liquid crystal layer 12 including liquid crystal molecules, the second optical alignment film 13, the signal electrode, the second substrate 14 including the opposite electrode opposite the signal electrode, the second protective layer 5a, the second polarizer 6, and the backlight 7 in this order. The first and second protective layers 3a and 5a satisfy the relationship nx=ny≥nz. Each in-plane retardation of the first and second optical alignment films 11 and 13 is greater than or equal to 1 nm. Given that $R_1$ is each thickness-direction retardation of the first and second protective layers 3a and 5a and that $R_2$ is each retardation of the first and second optical alignment films 11 and 13, the transmission axis 6t of the second polarizer 6 is perpendicular to the initial alignment direction 12a of liquid crystal molecules in a plan view in the case of the transverse electric field type being the FFS type, $R_1$ and $R_2$ satisfying the relationship $R_1 \leq 0.047R_2^2 - 2.1R_2 + 44.3$, and the liquid crystal layer 12 having a positive dielectric anisotropy, in the case of the transverse electric field type being the FFS type, $R_1$ and $R_2$ satisfying the relationship $R_1 \leq 0.040R_2^2 - 2.2R_2 + 44.0$, and the liquid crystal layer 12 having a negative dielectric anisotropy, in the case of the transverse electric field type being the IPS type, the retardations $R_1$ and $R_2$ satisfying the relationship $R_1 \leq 0.140R_2^2 - 5.7R_2+95.0$, and the liquid crystal layer 12 having a positive dielectric anisotropy, or in the case of the transverse electric field type being the IPS type, the retardations $R_1$ and $R_2$ satisfying the relationship $R_1 \leq 0.107R_2^2 - 4.4R_2+72.0$, and the liquid crystal layer 12 having a negative dielectric anisotropy. The transmission axis 6t of the second polarizer 6 is parallel to the initial alignment direction 12a of liquid crystal molecules in a plan view in the case of the transverse electric field type being the FFS type, $R_1$ and $R_2$ satisfying the relationship $R_1 \geq 0.047R_2^2 - 2.1R_2+44.3$, and the liquid crystal layer 12 having a positive dielectric anisotropy, in the case of the transverse electric field type being the FFS type, $R_1$ and $R_2$ satisfying the relationship $R_1 \geq 0.040R_2^2 - 2.2R_2+44.0$, and the liquid crystal layer 12 having a negative dielectric anisotropy, in the case of the transverse electric field type being the IPS type, the retardations $R_1$ and $R_2$ satisfying the relationship $R_1 \geq 0.140R_2^2 - 5.7R_2+95.0$, and the liquid crystal layer 12 having a positive dielectric anisotropy, or in the case of the transverse electric field type being the IPS type, the retardations $R_1$ and $R_2$ satisfying the relationship $R_1 \geq 0.107R_2^2 - 4.4R_2+72.0$, and the liquid crystal layer 12 having a negative dielectric anisotropy. Accordingly, excellent viewing angle characteristics can be exhibited by arranging the transmission axis 6t of the second polarizer 6 perpendicular to the initial alignment direction 12a of liquid crystal molecules in the case of the transverse electric field type being the FFS type, $R_1$ and $R_2$ satisfying the relationship $R_1 \leq 0.047R_2^2 - 2.1R_2+44.3$, and the liquid crystal layer 12 having a positive dielectric anisotropy, in the case of the transverse electric field type being the FFS type, $R_1$ and $R_2$ satisfying the relationship $R_1 \leq 0.040R_2^2 - 2.2R_2+44.0$, and the liquid crystal layer 12 having a negative dielectric anisotropy, in the case of the transverse electric field type being the IPS type, the retardations $R_1$ and $R_2$ satisfying the relationship $R_1 \leq 0.140R_2^2 - 5.7R_2+95.0$, and the liquid crystal layer 12 having a positive dielectric anisotropy, or in the case of the transverse electric field type being the IPS type, the retardations $R_1$ and $R_2$ satisfying the relationship $R_1 \leq 0.107R_2^2 - 4.4R_2+72.0$, and the liquid crystal layer 12 having a negative dielectric anisotropy, and by arranging the transmission axis 6t of the second polarizer 6 parallel to the initial alignment direction 12a of liquid crystal molecules in the case of the transverse electric field type being the FFS type, $R_1$ and $R_2$ satisfying the relationship $R_1 \geq 0.047R_2^2 - 2.1R_2+44.3$, and the liquid crystal layer 12 having a positive dielectric anisotropy, in the case of the transverse electric field type being the FFS type, $R_1$ and $R_2$ satisfying the relationship $R_1 \geq 0.040R_2^2 - 2.2R_2+44.0$, and the liquid crystal layer 12 having a negative dielectric anisotropy, in the case of the transverse electric field type being the IPS type, the retardations $R_1$ and $R_2$ satisfying the relationship $R_1 \geq 0.140R_2^2 - 5.7R_2+95.0$, and the liquid crystal layer 12 having a positive dielectric anisotropy, or in the case of the transverse electric field type being the IPS type, the retardations $R_1$ and $R_2$ satisfying the relationship $R_1 \geq 0.107R_2^2 - 4.4R_2+72.0$, and the liquid crystal layer 12 having a negative dielectric anisotropy.

The liquid crystal layer 12 may have a negative dielectric anisotropy or may have a positive dielectric anisotropy. In the latter case, a high transmittance can be realized compared with the former case.

Each of the first and second optical alignment films 11 and 13 is preferably formed by applying an alignment agent containing an alignment film material having an optical functional group and a solvent to the first substrate 10 or the second substrate 14 to form a film, then prefiring the film, immediately irradiating the prefired film with light to cause a reaction of the optical functional group, and then firing the film irradiated with light. Accordingly, the first and second optical alignment films 11 and 13 having an in-plane retardation of greater than or equal to 1 nm can be easily formed.

The transverse electric field type is preferably the IPS type or the FFS type as described above.

Embodiment 2

Embodiment 2 is substantially the same as the embodiment 1 except that a second protective layer has different optical characteristics and that conditions for design of the optical axis are different. In the present embodiment, the second protective layer is optically isotropic. Duplicate contents of the present embodiment and the embodiment 1 will not be described.

Figure 8:
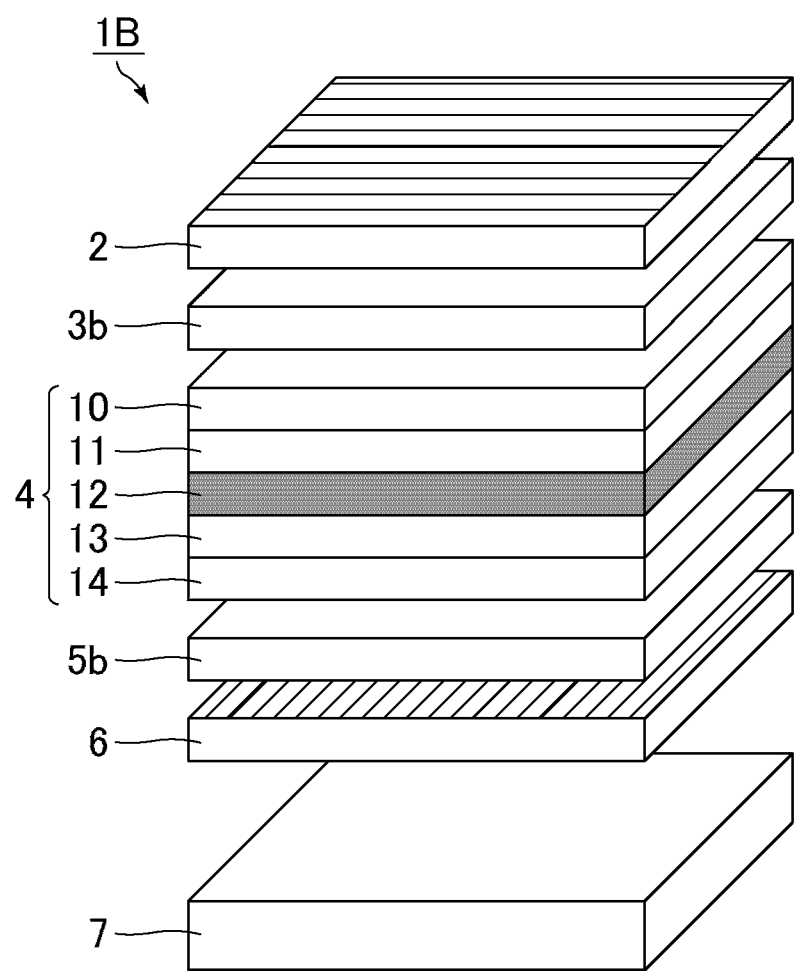
FIG. 8 is a schematic perspective view of a liquid crystal display device according to embodiment 2.

FIG. 8 is a schematic perspective view of a liquid crystal display device according to the embodiment 2. FIGS. 9(a) and 9(b) are schematic diagrams illustrating arrangement (in the axial direction) of the optical axis of each layer in a plan view in the liquid crystal display device according to the embodiment 2 and illustrate the case of a liquid crystal layer having a positive dielectric anisotropy. FIGS. 10(a) and 10(b) are schematic diagrams illustrating arrangement (in the axial direction) of the optical axis of each layer in a plan view in the liquid crystal display device according to the embodiment 2 and illustrate the case of the liquid crystal layer having a negative dielectric anisotropy.

As illustrated in FIG. 8, a liquid crystal display device 1B according to the present embodiment includes the first polarizer 2, a first protective layer 3b satisfying the relationship nx=ny≥nz, the liquid crystal panel 4 having the first substrate 10, the first optical alignment film 11, the liquid crystal layer 12, the second optical alignment film 13, and the second substrate 14, an optically isotropic second protective layer 5b, the second polarizer 6, and the backlight 7 in this order from the observer side.

The liquid crystal display device 1B does not include another retardation layer between the first substrate 10 and the first polarizer 2 and between the second substrate 14 and the second polarizer 6. That is, a retardation layer is not interposed between the first polarizer 2 and the first protective layer 3b. A retardation layer is not interposed between the first protective layer 3b and the first substrate 10. A retardation layer is not interposed between the second substrate 14 and the second protective layer 5b. A retardation layer is not interposed between the second protective layer 5b and the second polarizer 6. The first protective layer 3b is bonded to the first polarizer 2 and the first substrate 10 by a bonding member, and the second protective layer 5b is bonded to the second polarizer 6 and the second substrate 14 by a bonding member.

Viewing angle characteristics are worsened unless optical design considering the in-plane retardation of each of the optical alignment films 11 and 13, which are self-assembled optical alignment films, is performed. In the present embodiment, optical design considering these retardations is performed.

More specifically, the relationship between the transmission axis 6t of the second polarizer 6 and the initial alignment direction 12a of liquid crystal molecules is defined according to the relationship between the thickness-direction retardation $R_1$ of the first protective layer 3b and the retardation $R_2$ of each of the optical alignment films 11 and 13.

The transmission axis $6t$ of the second polarizer 6 is arranged perpendicular to the initial alignment direction $12a$ of liquid crystal molecules as illustrated in FIG. $9(b)$ and FIG. $10(b)$ in the case of employing the FFS type as the transverse electric field type, the retardations $R_1$ and $R_2$ satisfying the relationship $R_1 \leq -0.027R_2^2 - 0.4R_2 + 38.7$, and the liquid crystal layer 12 having a positive dielectric anisotropy, in the case of employing the FFS type as the transverse electric field type, the retardations $R_1$ and $R_2$ satisfying the relationship $R_1 \leq -0.053R_2^2 + 0.6R_2 + 35.3$, and the liquid crystal layer 12 having a negative dielectric anisotropy, or in the case of employing the IPS type as the transverse electric field type (in this case, the dielectric anisotropy of the liquid crystal layer 12 being positive or negative is not particularly limited). Accordingly, viewing angle characteristics can be improved compared with the case of parallel arrangement.

The transmission axis $6t$ of the second polarizer 6 is arranged parallel to the initial alignment direction $12a$ of liquid crystal molecules as illustrated in FIG. $9(a)$ and FIG. $10(a)$ in the case of employing the FFS type as the transverse electric field type, the retardations $R_1$ and $R_2$ satisfying the relationship $R_1 \geq -0.027R_2^2 - 0.4R_2 + 38.7$, and the liquid crystal layer 12 having a positive dielectric anisotropy, or in the case of employing the FFS type as the transverse electric field type, the retardations $R_1$ and $R_2$ satisfying the relationship $R_1 \geq -0.053R_2^2 + 0.6R_2 + 35.3$, and the liquid crystal layer 12 having a negative dielectric anisotropy. Accordingly, viewing angle characteristics can be improved compared with the case of perpendicular arrangement.

The transmission axis $6t$ of the second polarizer 6 may be arranged perpendicular or parallel to the initial alignment direction $12a$ of liquid crystal molecules in the case of employing the FFS type as the transverse electric field type, $R_1$ and $R_2$ satisfying the relationship $R_1 = -0.027R_2^2 - 0.4R_2 + 38.7$, and the liquid crystal layer 12 having a positive dielectric anisotropy, or in the case of employing the FFS type as the transverse electric field type, $R_1$ and $R_2$ satisfying the relationship $R_1 = -0.053R_2^2 + 0.6R_2 + 35.3$, and the liquid crystal layer 12 having a negative dielectric anisotropy.

The second protective layer $5b$ is an optically isotropic protective layer. Thus, the concept of setting an optical axis in plane is not applied to the second protective layer $5b$. Therefore, FIGS. $9(a)$ and $9(b)$ and FIGS. $10(a)$ and $10(b)$ do not illustrate the optical axis of the second protective layer $5b$.

As described heretofore, the liquid crystal display device 1B according to the present embodiment is a transverse electric field type liquid crystal display device. The liquid crystal display device 1B includes the first polarizer 2, the first protective layer $3b$, the first substrate 10, the first optical alignment film 11, the horizontal-alignment liquid crystal layer 12 including liquid crystal molecules, the second optical alignment film 13, the second substrate 14, the second protective layer $5b$, the second polarizer 6, and the backlight 7 in this order. The first protective layer $3b$ satisfies the relationship $nx=ny \geq nz$, and the second protective layer $5b$ is optically isotropic. Each in-plane retardation of the first and second optical alignment films 11 and 13 is greater than or equal to 1 nm. Given that $R_1$ is the thickness-direction retardation of the first protective layer $3b$ and that $R_2$ is each in-plane retardation of the first and second optical alignment films 11 and 13, the transmission axis $6t$ of the second polarizer 6 is perpendicular to the initial alignment direction $12a$ of liquid crystal molecules in a plan view in the case of the transverse electric field type being the FFS type, $R_1$ and $R_2$ satisfying the relationship $R_1 \leq -0.027R_2^2 - 0.4R_2 + 38.7$, and the liquid crystal layer 12 having a positive dielectric anisotropy, in the case of the transverse electric field type being the FFS type, $R_1$ and $R_2$ satisfying the relationship $R_1 \leq -0.053R_2^2 + 0.6R_2 + 35.3$, and the liquid crystal layer 12 having a negative dielectric anisotropy, or in the case of the transverse electric field type being the IPS type. The transmission axis $6t$ of the second polarizer 6 is parallel to the initial alignment direction $12a$ of liquid crystal molecules in a plan view in the case of the transverse electric field type being the FFS type, $R_1$ and $R_2$ satisfying the relationship $R_1 \geq -0.027R_2^2 - 0.4R_2 + 38.7$, and the liquid crystal layer 12 having a positive dielectric anisotropy, or in the case of the transverse electric field type being the FFS type, $R_1$ and $R_2$ satisfying the relationship $R_1 \geq -0.053R_2^2 + 0.6R_2 + 35.3$, and the liquid crystal layer 12 having a negative dielectric anisotropy. Accordingly, excellent viewing angle characteristics can be exhibited by arranging the transmission axis $6t$ of the second polarizer 6 perpendicular to the initial alignment direction $12a$ of liquid crystal molecules in the case of the transverse electric field type being the FFS type, $R_1$ and $R_2$ satisfying the relationship $R_1 \leq -0.027R_2^2 - 0.4R_2 + 38.7$, and the liquid crystal layer 12 having a positive dielectric anisotropy, in the case of the transverse electric field type being the FFS type, $R_1$ and $R_2$ satisfying the relationship $R_1 \leq -0.053R_2^2 + 0.6R_2 + 35.3$, and the liquid crystal layer 12 having a negative dielectric anisotropy, or in the case of the transverse electric field type being the IPS type, and by arranging the transmission axis $6t$ of the second polarizer 6 parallel to the initial alignment direction $12a$ of liquid crystal molecules in the case of the transverse electric field type being the FFS type, $R_1$ and $R_2$ satisfying the relationship $R_1 \geq -0.027R_2^2 - 0.4R_2 + 38.7$, and the liquid crystal layer 12 having a positive dielectric anisotropy, or in the case of the transverse electric field type being the FFS type, $R_1$ and $R_2$ satisfying the relationship $R_1 \geq -0.053R_2^2 + 0.6R_2 + 35.3$, and the liquid crystal layer 12 having a negative dielectric anisotropy.

In the same manner as the embodiment 1, the liquid crystal layer 12 may have a negative dielectric anisotropy or may have a positive dielectric anisotropy. In the latter case, a high transmittance can be realized compared with the former case.

In the same manner as the embodiment 1, each of the first and second optical alignment films 11 and 13 is preferably formed by applying an alignment agent containing an alignment film material having an optical functional group and a solvent to a substrate to form a film, then prefiring the film, immediately irradiating the prefired film with light to cause a reaction of the optical functional group, and then firing the film irradiated with light.

In the same manner as the embodiment 1, the transverse electric field type is preferably the IPS type or the FFS type as described above.

Embodiment 3

Embodiment 3 is substantially the same as the embodiment 1 except that a first protective layer has different optical characteristics and that conditions for design of the optical axis are different. In the present embodiment, the first protective layer is optically isotropic. Duplicate contents of the present embodiment and the embodiment 1 will not be described.

Figure 11:
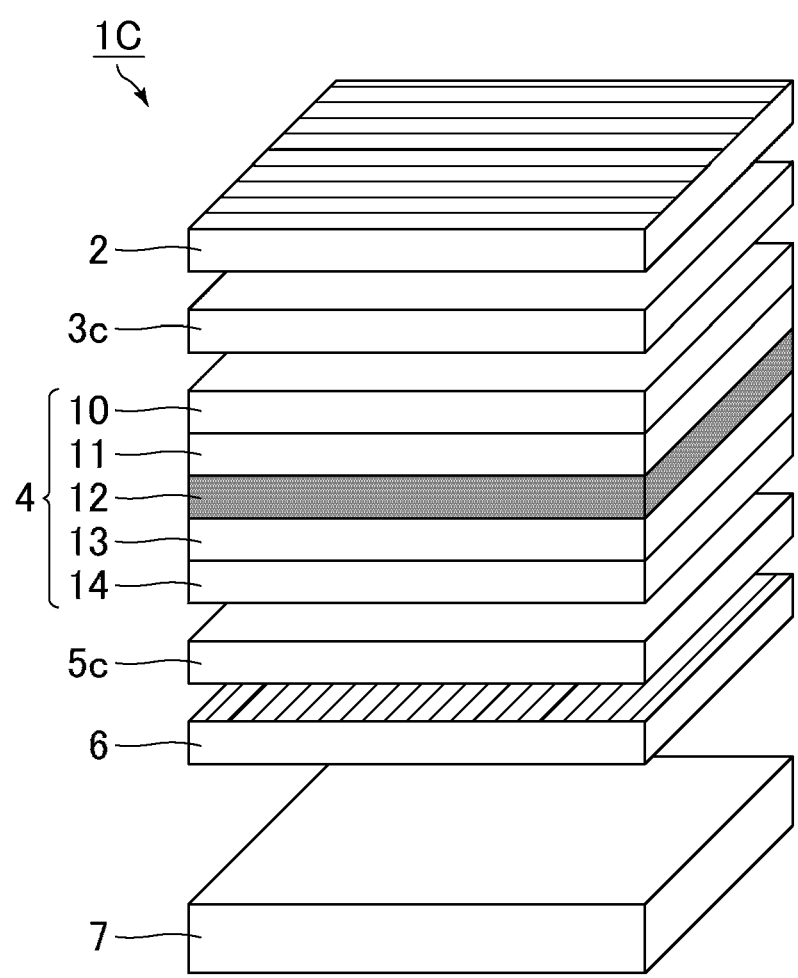
FIG. 11 is a schematic perspective view of a liquid crystal display device according to embodiment 3.
Figure 12:
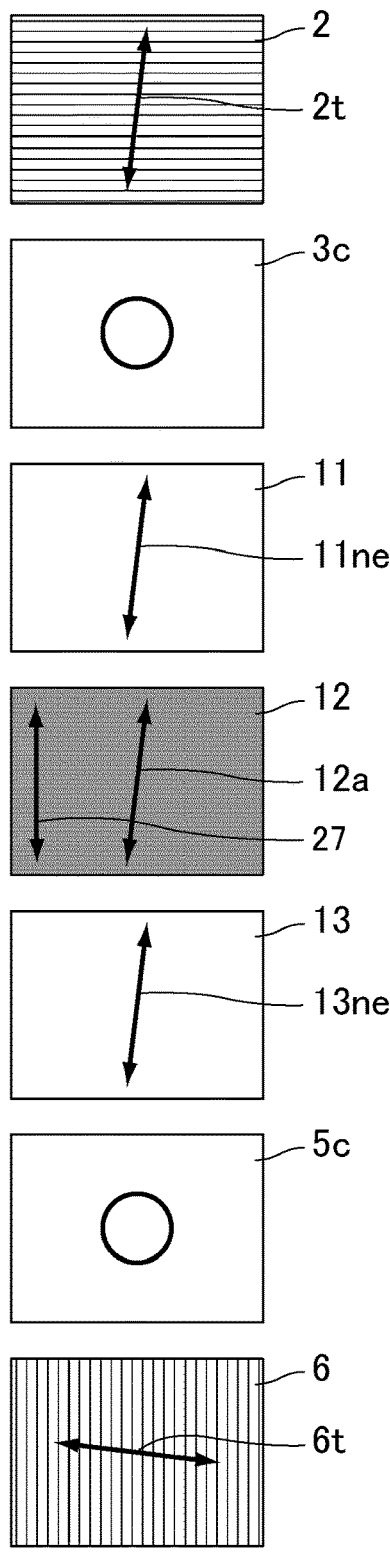
FIG. 12 is a schematic diagram illustrating arrangement (in the axial direction) of the optical axis of each layer in a plan view in the liquid crystal display device according to the embodiment 3 and illustrates the case of a liquid crystal layer having a positive dielectric anisotropy.
Figure 13:
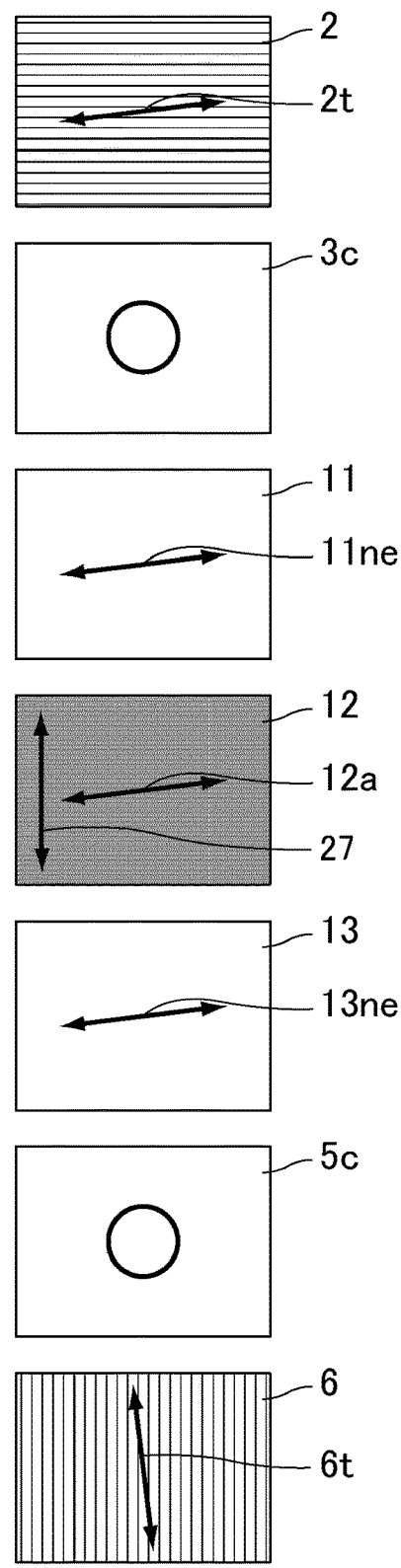
FIG. 13 is a schematic diagram illustrating arrangement (in the axial direction) of the optical axis of each layer in a plan view in the liquid crystal display device according to the embodiment 3 and illustrates the case of a liquid crystal layer having a negative dielectric anisotropy.

FIG. 11 is a schematic perspective view of a liquid crystal display device according to the embodiment 3. FIG. 12 is a schematic diagram illustrating arrangement (in the axial direction) of the optical axis of each layer in a plan view in the liquid crystal display device according to the embodiment 3 and illustrates the case of a liquid crystal layer having a positive dielectric anisotropy. FIG. 13 is a schematic diagram illustrating arrangement (in the axial direction) of the optical axis of each layer in a plan view in the liquid crystal display device according to the embodiment 3 and illustrates the case of the liquid crystal layer having a negative dielectric anisotropy.

As illustrated in FIG. 11, a liquid crystal display device 1C according to the present embodiment includes the first polarizer 2, an optically isotropic first protective layer 3c, the liquid crystal panel 4 having the first substrate 10, the first optical alignment film 11, the liquid crystal layer 12, the second optical alignment film 13, and the second substrate 14, a second protective layer 5c satisfying the relationship nx=ny≥nz, the second polarizer 6, and the backlight 7 in this order from the observer side.

The liquid crystal display device 1C does not include another retardation layer between the first substrate 10 and the first polarizer 2 and between the second substrate 14 and the second polarizer 6. That is, a retardation layer is not interposed between the first polarizer 2 and the first protective layer 3c. A retardation layer is not interposed between the first protective layer 3c and the first substrate 10. A retardation layer is not interposed between the second substrate 14 and the second protective layer 5c. A retardation layer is not interposed between the second protective layer 5c and the second polarizer 6. The first protective layer 3c is bonded to the first polarizer 2 and the first substrate 10 by a bonding member, and the second protective layer 5c is bonded to the second polarizer 6 and the second substrate 14 by a bonding member.

Viewing angle characteristics are worsened unless optical design considering the in-plane retardation of each of the optical alignment films 11 and 13, which are self-assembled optical alignment films, is performed. In the present embodiment, optical design considering these retardations is performed.

More specifically, the relationship between the transmission axis 6t of the second polarizer 6 and the initial alignment direction 12a of liquid crystal molecules is defined. In the present embodiment, the transmission axis 6t of the second polarizer 6 is arranged perpendicular to the initial alignment direction 12a of liquid crystal molecules as illustrated in FIGS. 12 and 13. Accordingly, viewing angle characteristics can be improved compared with the case of parallel arrangement.

The first protective layer 3c is an optically isotropic protective layer. Thus, the concept of setting an optical axis in plane is not applied to the first protective layer 3c. Therefore, FIGS. 12 and 13 do not illustrate the optical axis of the first protective layer 3c.

As described heretofore, the liquid crystal display device 1C according to the present embodiment is a transverse electric field type liquid crystal display device. The liquid crystal display device 1C includes the first polarizer 2, the first protective layer 3c, the first substrate 10, the first optical alignment film 11, the horizontal-alignment liquid crystal layer 12 including liquid crystal molecules, the second optical alignment film 13, the second substrate 14, the second protective layer 5c, the second polarizer 6, and the backlight 7 in this order. The first protective layer 3c is optically isotropic, and the second protective layer 5c satisfies the relationship nx=ny≥nz. Each in-plane retardation of the first and second optical alignment films 11 and 13 is greater than or equal to 1 nm. The transmission axis 6t of the second polarizer 6 is perpendicular to the initial alignment direction 12a of liquid crystal molecules in a plan view. Accordingly, in the present embodiment, excellent viewing angle characteristics can be exhibited by arranging the transmission axis 6t of the second polarizer 6 perpendicular to the initial alignment direction 12a of liquid crystal molecules regardless of the type of the transverse electric field type, the magnitude of the thickness-direction retardation of the first protective layer 3c, and whether the dielectric anisotropy of the liquid crystal layer 12 is positive or negative.

In the same manner as the embodiment 1, the liquid crystal layer 12 may have a negative dielectric anisotropy or may have a positive dielectric anisotropy. In the latter case, a high transmittance can be realized compared with the former case.

In the same manner as the embodiment 1, each of the first and second optical alignment films 11 and 13 is preferably formed by applying an alignment agent containing an alignment film material having an optical functional group and a solvent to a substrate to form a film, then prefiring the film, immediately irradiating the prefired film with light to cause a reaction of the optical functional group, and then firing the film irradiated with light.

In the same manner as the embodiment 1, the transverse electric field type is preferably the IPS type or the FFS type.

Hereinafter, simulation results for the liquid crystal display devices according to each embodiment will be described. In the present specification, each simulation is performed by using LCDMaster2D (Version 8.4.0.2) manufactured by Shintech. Hereinafter, description will be provided by appropriately using an orthogonal coordinate in which an x axis and a y axis exist in a horizontal plane and in which a z axis is directed in the vertical direction.

Example 1

Basic configuration: FFS mode, optical alignment film, positive liquid crystal, no protective layer having refractive index anisotropy.

Figure 14:
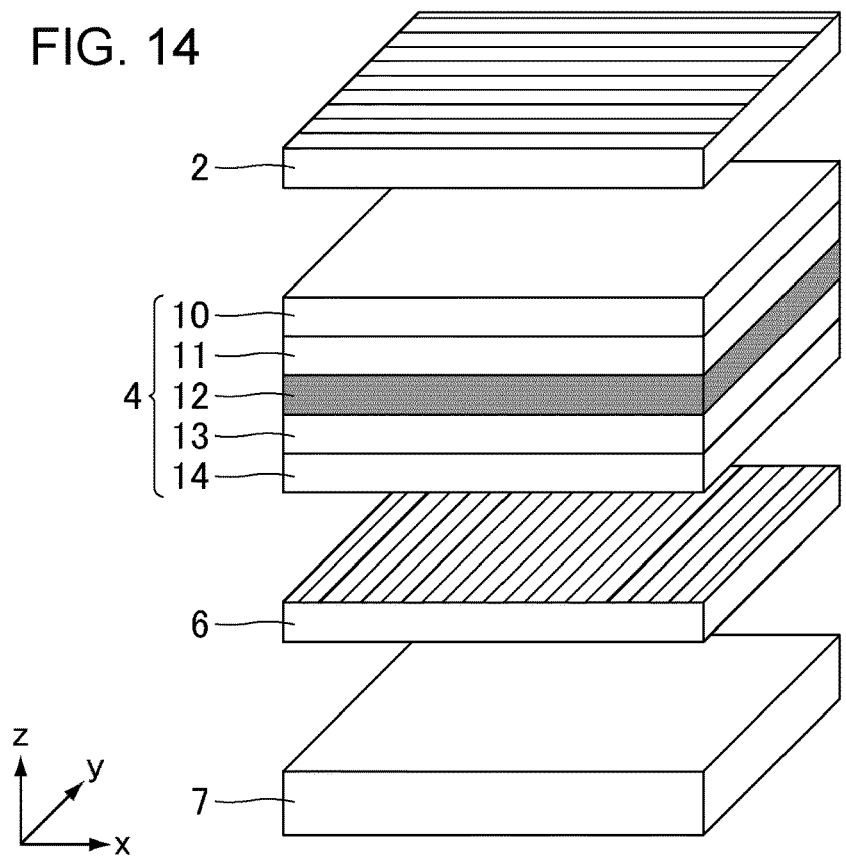
FIG. 14 is a schematic perspective view of a liquid crystal display device according to example 1.
Figure 15:
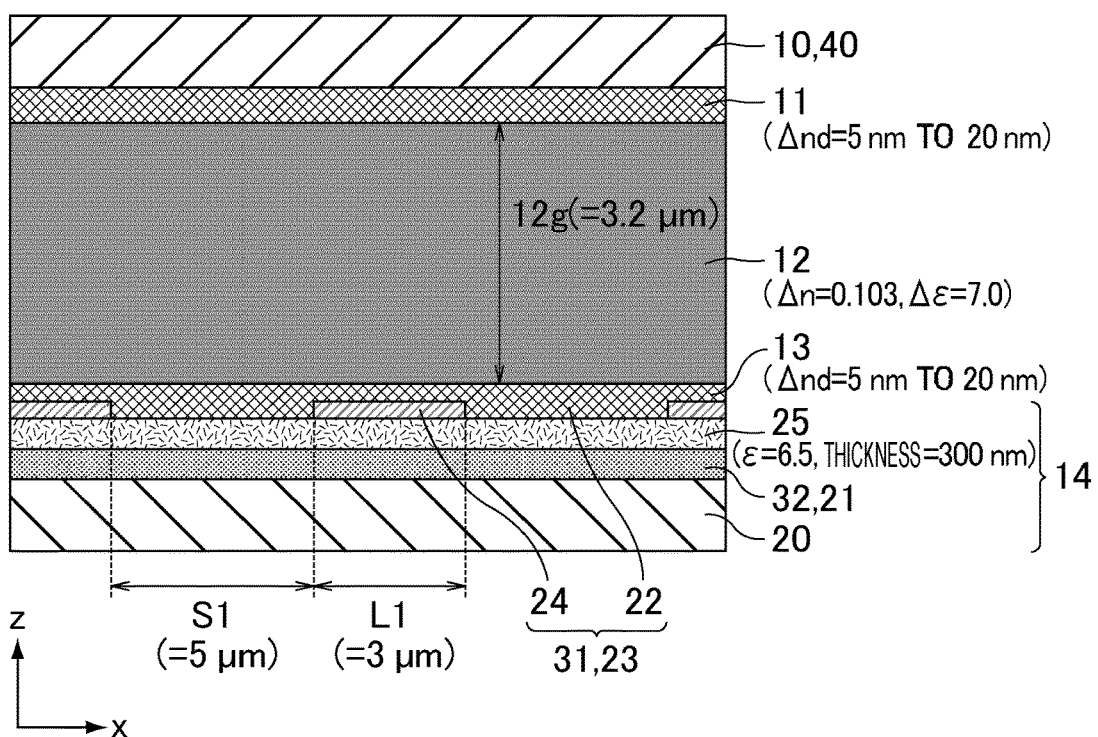
FIG. 15 is a schematic sectional view of a liquid crystal panel included in the liquid crystal display device according to the example 1.

FIG. 14 is a schematic perspective view of a liquid crystal display device according to example 1. FIG. 15 is a schematic sectional view of a liquid crystal panel included in the liquid crystal display device according to the example 1. FIGS. 16(a) and 16(b) are schematic diagrams illustrating arrangement (in the axial direction) of the optical axis of each layer of the liquid crystal display device according to the example 1 when viewed from the direction of the z axis.

As illustrated in FIG. 14, the first and second polarizers 2 and 6 are arranged outside of the liquid crystal panel 4 in the FFS mode. The polarizers 2 and 6 are configured of only a layer having an action of controlling (defining in one direction) the vibration direction of light and do not include layers such as a protective layer having a retardation and a phase difference compensation layer. The first polarizer 2 is arranged on the observer side and the second polarizer 6 on the backlight 7 side. In the present example, a protective layer having a refractive index anisotropy is not arranged. The present example assumes the case of each protective layer in the embodiment 1 being optically isotropic.

As illustrated in FIGS. 14 and 15, the first substrate 10 configured of only the insulating substrate 40, the second substrate 14 opposite the first substrate 10, the liquid crystal layer 12 between the substrates 10 and 14, the first optical alignment film 11 on the liquid crystal layer 12 side surface of the first substrate 10, and the second optical alignment film 13 on the liquid crystal layer 12 side surface of the second substrate 14 are disposed as the liquid crystal panel 4.

The optical alignment films 11 and 13 are assumed to be self-assembled optical alignment films, and the in-plane retardation of each of the optical alignment films 11 and 13 (the product Δnd of the refractive index anisotropy Δn, which is the difference between the ordinary light refractive index no and the extraordinary light refractive index ne, and the film thickness d) is 5 nm, 10 nm, or 20 nm. The in-plane retardations of the optical alignment films 11 and 13 have the same value. The optical alignment films 11 and 13 have a thickness-direction retardation of 0 nm. The liquid crystal layer 12 has the refractive index anisotropy Δn of 0.103, the dielectric anisotropy Δε of 7.0, and a thickness 12g of 3.2 μm.

The insulating substrate 20, the opposite electrode 32 on the insulating substrate 20, the interlayer insulating film 25 on the opposite electrode 32, and the signal electrode 31 on the interlayer insulating film 25 are disposed as the second substrate 14. The opposite electrode 32 is the planar (more specifically, rectangular) electrode 21. The dielectric constant E of the interlayer insulating film 25 is 6.5. The thickness of the interlayer insulating film 25 is 300 nm. The signal electrode 31 is the electrode 23 in which the plurality of parallel electrode slits 22 is formed. The plurality of parallel linear parts 24 is disposed in the signal electrode 31. The width L1 of each linear part 24 is 3 μm, and each interval between the adjacent linear parts 24, that is, the width S1 of each electrode slit 22, is 5 μm.

Each layer constituting the liquid crystal display device according to the present example is arranged in the xy plane, that is, parallel to the xy plane, and is stacked in the direction of the z axis.

As illustrated in FIGS. 16(a) and 16(b), arrangement of the optical axis of each layer is reviewed twice.

The transmission axis 6t of the second polarizer 6 on the backlight 7 side and the initial alignment direction 12a of liquid crystal molecules (that is, the long-axis direction of liquid crystal molecules when no voltage is applied, or the direction of the extraordinary light refractive index axis of liquid crystal molecules when no voltage is applied) are parallel (the angle formed therebetween is 0°) in FIG. 16(a) and are perpendicular (the angle formed therebetween is 90°) in FIG. 16(b). In either case of FIGS. 16(a) and 16(b), the extraordinary light refractive index axes 11ne and 13ne of the optical alignment films 11 and 13 are set in the same direction. In the case of using a self-assembled optical alignment film, the initial alignment direction 12a is parallel to the extraordinary light refractive index axes 11ne and 13ne of the optical alignment films 11 and 13. In order to define, in one direction, the direction of rotation of liquid crystal molecules in the xy plane when the display signal is input into the signal electrode 32, the initial alignment direction 12a is slanted at 7° to the electrode long-edge direction 27 (the direction in which each linear part 24 extends). The initial alignment direction 12a is slanted at 83° to the x axis, and the angle formed between the electrode long-edge direction 27 and the x axis is 90°. The polarizers 2 and 6 are arranged in the form of crossed Nicols, and the angle formed between the transmission axis 2t of the first polarizer 2 and the transmission axis 6t of the second polarizer 6 is 90°. In the arrangement in FIG. 16(a), the transmission axes 2t and 6t are respectively slanted at −7° and 83° to the x axis. In the arrangement in FIG. 16(b), the transmission axes 2t and 6t are respectively slanted at 83° and −7° to the x axis.

With the configuration illustrated in FIG. 14, gradation to normalized transmittance is calculated by using LCDMaster2D, and in the case of comparing the arrangements of FIGS. 16(a) and 16(b), FIG. 16(b) results in a smaller difference in a gradation to normalized transmittance curve between the front direction and a slantwise direction. That is, FIG. 16(b) has a smaller difference between display in the case of viewing the liquid crystal display device from the front and display in the case of viewing the liquid crystal display device slantwise and achieves favorable viewing angle characteristics. Therefore, in the case of a layer having a refractive index anisotropy not existing between the first substrate 10 and the first polarizer 2 and between the second substrate 14 and the second polarizer 6, the important point is to set the initial alignment direction 12a of liquid crystal molecules and the direction of the transmission axis 6t of the second polarizer 6 on the backlight 7 side in a perpendicular relationship. The reason is that in the case of considering the refractive index ellipsoid of each of the optical alignment films 11 and 13, when the refractive index with respect to ordinary light (hereinafter, referred to as the ordinary light refractive index no as well) is smaller than the extraordinary light refractive index ne with the transmission axis 6t of the second polarizer 6 being perpendicular to the initial alignment direction 12a of liquid crystal molecules, the transmission axis 6t is parallel to the axis along which the ordinary light refractive index no of each of the optical alignment films 11 and 13 is induced (ordinary light refractive index axis), and the refractive index anisotropy Δn of each of the optical alignment films 11 and 13 applied to light that is emitted from the backlight 7 and transmitted by the second polarizer 6 and is incident slantwise on the liquid crystal panel 4 can be decreased.

Figure 17:
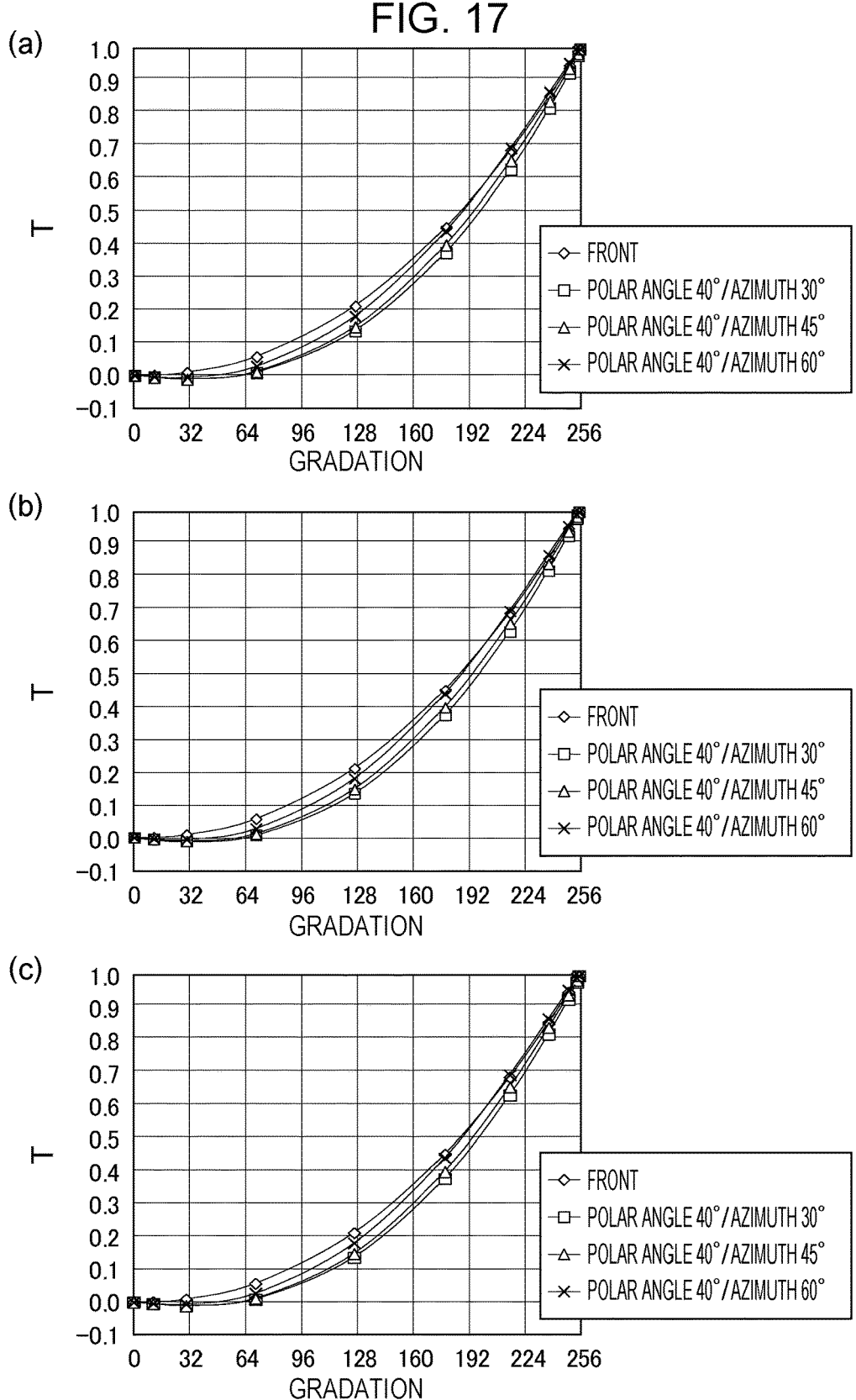
FIGS. 17(a), 17(b), and 17(c) illustrate gradation to normalized transmittance calculation results in the configuration of the example 1 in the case of the arrangement (parallel relationship) of the optical axes illustrated in FIG. 16(a).
Figure 18:
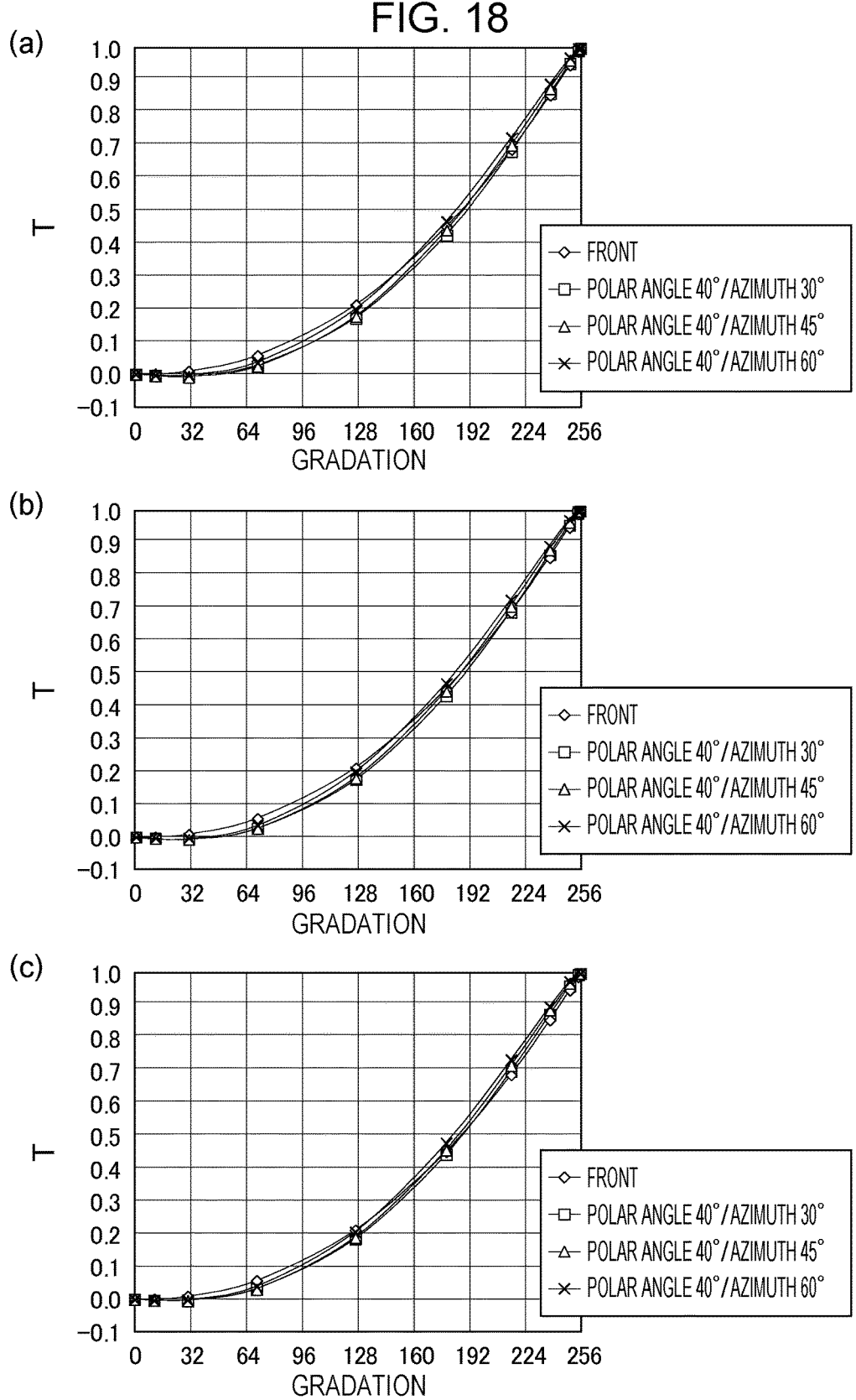
FIGS. 18(a), 18(b), and 18(c) illustrate gradation to normalized transmittance calculation results in the configuration of the example 1 in the case of the arrangement (perpendicular relationship) of the optical axes illustrated in FIG. 16(b).

FIGS. 17(a), 17(b), and 17(c) illustrate gradation to normalized transmittance calculation results in the configuration of the example 1 in the case of the arrangement (parallel relationship) of the optical axes illustrated in FIG. 16(a). FIG. 17(a) illustrates the case of the first and second optical alignment films having an in-plane retardation (Δnd) of 5 nm. FIG. 17(b) illustrates the case of the first and second optical alignment films having an in-plane retardation (Δnd) of 10 nm. FIG. 17(c) illustrates the case of the first and second optical alignment films having an in-plane retardation (Δnd) of 20 nm. FIGS. 18(a), 18(b), and 18(c) illustrate gradation to normalized transmittance calculation results in the configuration of the example 1 in the case of the arrangement (perpendicular relationship) of the optical axes illustrated in FIG. 16(b). FIG. 18(a) illustrates the case of the first and second optical alignment films having an in-plane retardation (Δnd) of 5 nm. FIG. 18(b) illustrates the case of the first and second optical alignment films having an in-plane retardation (Δnd) of 10 nm. FIG. 18(c) illustrates the case of the first and second optical alignment films having an in-plane retardation (Δnd) of 20 nm.

Each calculation is performed in the front direction (polar angle: 0°) of the liquid crystal panel and in three slantwise directions (polar angle: 40°/azimuth angle: 30°, 45°, and 60°) of the liquid crystal panel. The polar angle is the angle with respect to the z axis (the positive direction of the z axis is 0°), and the azimuth angle is the angle with respect to the x axis (the positive direction of the x axis is 0°). The normalized transmittance (T) is a transmittance that is normalized to a transmittance at the time of the maximum number of gradations (256 gradations).

As illustrated in FIGS. 17(a), 17(b), and 17(c) and FIGS. 18(a), 18(b), and 18(c), it is understood that a slantwise characteristic (a line passing through quadrangular, triangular, or × mark plots in each graph) is less shifted from a front characteristic (a line passing through rhombus plots in each graph) in the case of the axis arrangement illustrated in FIG. 16(b) than in the case of the axis arrangement illustrated in FIG. 16(a) for any retardation value.

A parameter (absolute value) that is defined as $|(T_{slantwise}/T_{front})-1|$ is defined as an index indicating the extent to which the gradation to normalized transmittance curve in the case of viewing the liquid crystal display device slantwise is separated from the gradation to normalized transmittance curve in the case of viewing the liquid crystal display device from the front. $T_{front}$ represents the normalized transmittance at the time of display in 176 gradations in the front direction (polar angle: 0°), and $T_{slantwise}$ represents the normalized transmittance that yields the highest value of $|(T_{slantwise}/T_{front})-1|$ of three normalized transmittances at the time of display in the same number of gradations (176 gradations) in the three slantwise directions (polar angle: 40°/azimuth angle: 30°, 45°, and 60°). As $|(T_{slantwise}/T_{front})-1|$ approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

Table 2 below illustrates $|(T_{slantwise}/T_{front})-1|$ in the present example.

TABLE 2

| In-Plane Retardation of Optical Alignment Film | Parallel | Perpendicular |
| --- | --- | --- |
| 5 nm | 0.17 | 0.06 |
| 10 nm | 0.17 | 0.05 |
| 20 nm | 0.17 | 0.05 |

As illustrated in Table 2, $|(T_{slantwise}/T_{front})-1|$ is smaller in the arrangement in FIG. 16(b) than in the arrangement in FIG. 16(a) for any retardation value. Therefore, with the configuration (FFS mode) illustrated in FIGS. 14 and 15, the axis arrangement in FIG. 16(b) (the initial alignment direction 12a of liquid crystal molecules is in a perpendicular relationship with the direction of the transmission axis 6t of the second polarizer 6 on the backlight 7 side) has a smaller difference between the display characteristics in the case of viewing the liquid crystal panel from the front and the display characteristics in the case of viewing the liquid crystal display panel from the slantwise direction than the axis arrangement in FIG. 16(a) (the initial alignment direction 12a of liquid crystal molecules is in a parallel relationship with the direction of the transmission axis 6t of the second polarizer 6 on the backlight 7 side) and is said to be capable of realizing a display panel having more excellent viewing angle characteristics.

Example 2

Basic configuration: IPS mode, optical alignment film, positive liquid crystal, no protective layer having refractive index anisotropy.

Figure 19:
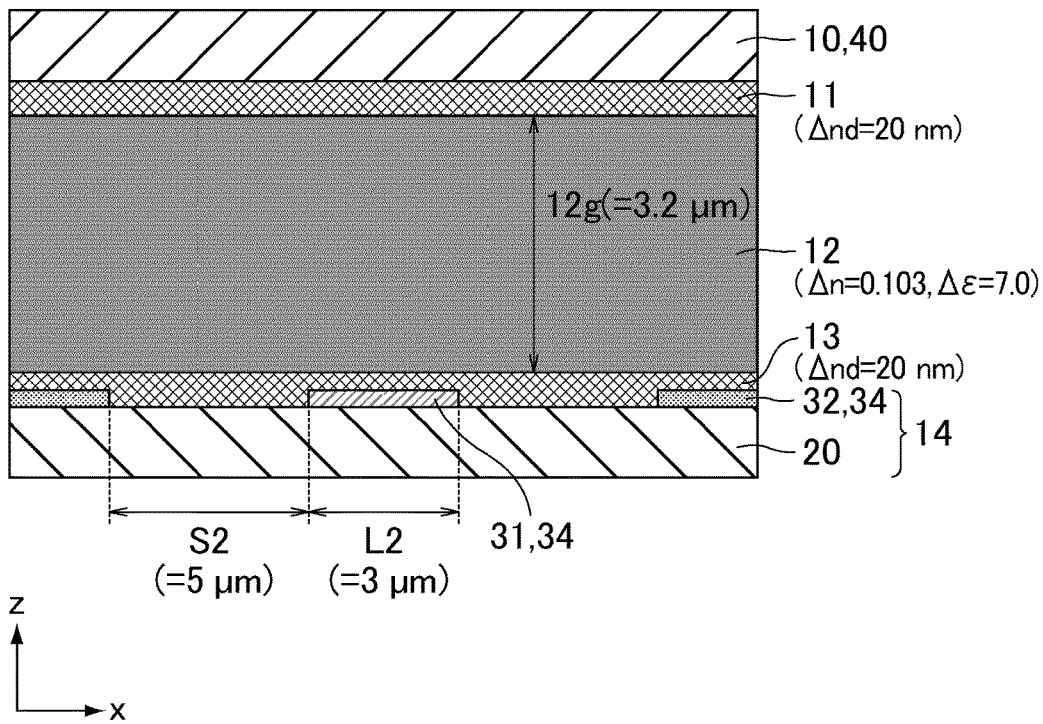
FIG. 19 is a schematic sectional view of a liquid crystal panel included in a liquid crystal display device according to example 2.

FIG. 19 is a schematic sectional view of a liquid crystal panel included in a liquid crystal display device according to example 2.

The present example is the same as the example 1 except for the following points.

As illustrated in FIG. 19, the liquid crystal mode of the liquid crystal panel 4 is changed to the IPS mode. The insulating substrate 20 and the signal electrode 31 and the opposite electrode 32 on the insulating substrate 20 are disposed as the second substrate 14. The signal electrode 31 and the opposite electrode 32 are a pair of comb-teeth electrodes having comb teeth thereof interlocking, in which a shaft portion and the plurality of parallel branch portions (comb teeth) 34 extending from the shaft portion are disposed with the branch portions 34 alternately arranged at certain intervals. The width L2 of each branch portion 34 is 3 μm, and each interval S2 between the adjacent branch portions 34 is 5 μm. The optical alignment films 11 and 13 have an in-plane retardation of 20 nm.

Arrangement of the optical axis of each layer when viewed from the direction of the z axis in the present example is the same as that in the case of the example 1 and has two types of arrangement illustrated in FIGS. 16(a) and 16(b).

Figure 20:
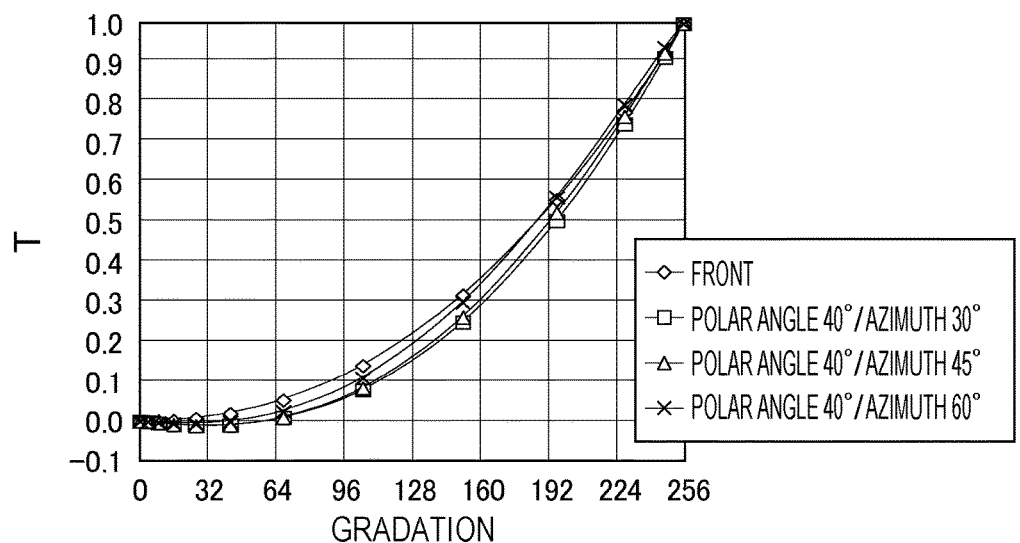
FIG. 20 illustrates a gradation to normalized transmittance calculation result in the configuration of the example 2 in the case of the arrangement (parallel relationship) of the optical axes illustrated in FIG. 16(a).
Figure 21:
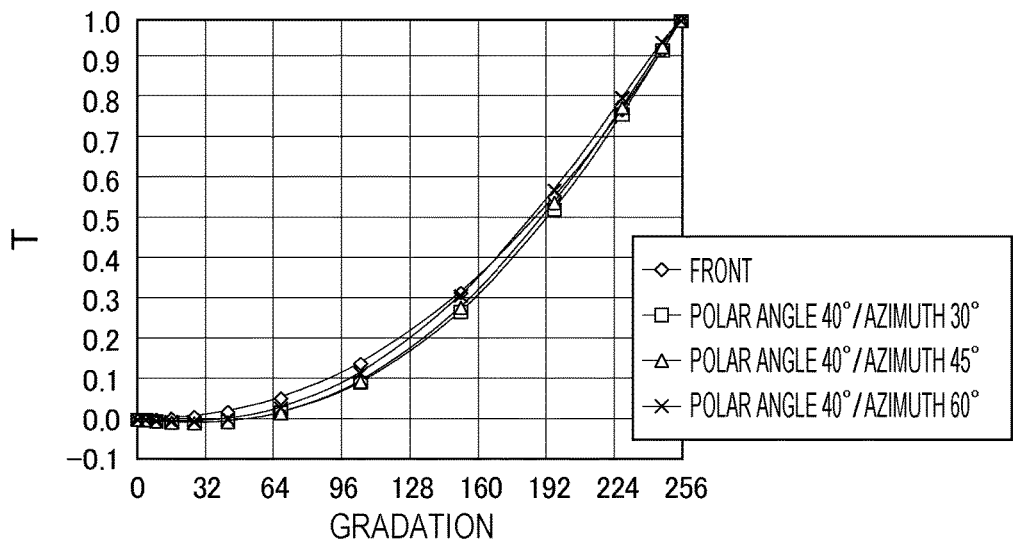
FIG. 21 illustrates a gradation to normalized transmittance calculation result in the configuration of the example 2 in the case of the arrangement (perpendicular relationship) of the optical axes illustrated in FIG. 16(b).

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIG. 20 illustrates a gradation to normalized transmittance calculation result in the configuration of the example 2 in the case of the arrangement (parallel relationship) of the optical axes illustrated in FIG. 16(a). FIG. 21 illustrates a gradation to normalized transmittance calculation result in the configuration of the example 2 in the case of the arrangement (perpendicular relationship) of the optical axes illustrated in FIG. 16(b).

As illustrated in FIGS. 20 and 21, it is understood that the slantwise characteristic (a line passing through quadrangular, triangular, or × mark plots in each graph) is less shifted from the front characteristic (a line passing through rhombus plots in each graph) in the case of the axis arrangement illustrated in FIG. 16(b) than in the case of the axis arrangement illustrated in FIG. 16(a), although the shift is not so noticeable as that in the case of the example 1.

Table 3 below illustrates $|(T_{slantwise}/T_{front})-1|$ in the present example.

TABLE 3

| In-Plane Retardation of Optical Alignment Film | Parallel | Perpendicular |
| --- | --- | --- |
| 20 nm | 0.21 | 0.15 |

As illustrated in Table 3, $|(T_{slantwise}/T_{front})-1|$ is smaller in the arrangement in FIG. 16(b) than in the arrangement in FIG. 16(a). Therefore, with the configuration (IPS mode) illustrated in FIG. 19, the axis arrangement in FIG. 16(b) (the initial alignment direction 12a of liquid crystal molecules is in a perpendicular relationship with the direction of the transmission axis 6t of the second polarizer 6 on the backlight 7 side) has a smaller difference between the display characteristics in the case of viewing the liquid crystal panel from the front and the display characteristics in the case of viewing the liquid crystal display panel from the slantwise direction than the axis arrangement in FIG. 16(a) (the initial alignment direction 12a of liquid crystal molecules is in a parallel relationship with the direction of the transmission axis 6t of the second polarizer 6 on the backlight 7 side) and is said to be capable of realizing a display panel having more excellent viewing angle characteristics.

Example 3

Basic configuration: FFS mode, optical alignment film, negative liquid crystal, no protective layer having refractive index anisotropy.

Figure 22:
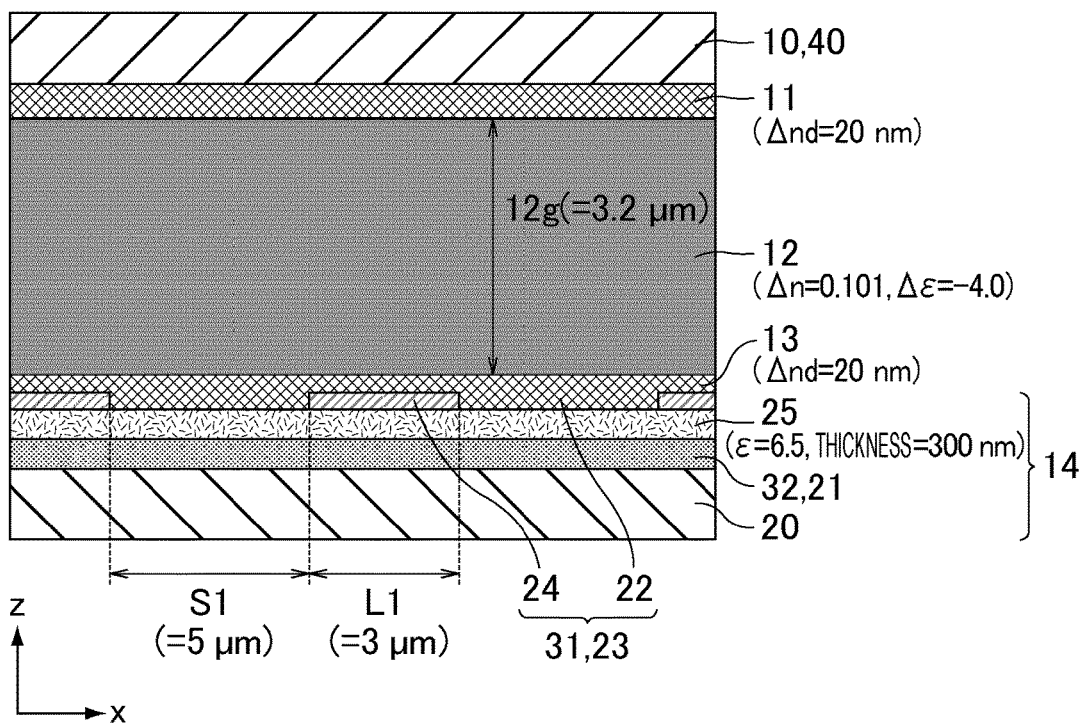
FIG. 22 is a schematic sectional view of a liquid crystal panel included in a liquid crystal display device according to example 3.

FIG. 22 is a schematic sectional view of a liquid crystal panel included in a liquid crystal display device according to example 3. FIGS. 23(a) and 23(b) are schematic diagrams illustrating arrangement (in the axial direction) of the optical axis of each layer of the liquid crystal display device according to the example 3 when viewed from the direction of the z axis.

The present example is the same as the example 1 except for the following points.

As illustrated in FIG. 22, the optical alignment films 11 and 13 have an in-plane retardation of 20 nm. The liquid crystal layer 12 has the refractive index anisotropy Δn of 0.101 and the dielectric anisotropy Δε of −4.0. The thickness 12g of the liquid crystal layer 12 is 3.2 μm which is the same as that in the example 1. Since the liquid crystal layer 12 has negative liquid crystals, the initial alignment direction 12a of liquid crystal molecules and the extraordinary light refractive index axes 11ne and 13ne of the optical alignment films 11 and 13 are slanted at 7° to the x axis as illustrated in FIGS. 23(a) and 23(b). Accordingly, the transmission axes 2t and 6t of the first and second polarizers 2 and 6 are changed. In the arrangement in FIG. 23(a), the transmission axes 2t and 6t are respectively slanted at 97° and 7° to the x axis. In the arrangement in FIG. 23(b), the transmission axes 2t and 6t are respectively slanted at 7° and 97° to the x axis.

The initial alignment direction 12a of liquid crystal molecules is in a parallel relationship with the direction of the transmission axis 6t of the second polarizer 6 on the backlight 7 side in FIG. 23(a). The initial alignment direction 12a of liquid crystal molecules is in a perpendicular relationship with the direction of the transmission axis 6t of the second polarizer 6 on the backlight 7 side in FIG. 23(b). These relationships are the same as those in the case of FIGS. 16(a) and 16(b) of the example 1.

Figure 24:
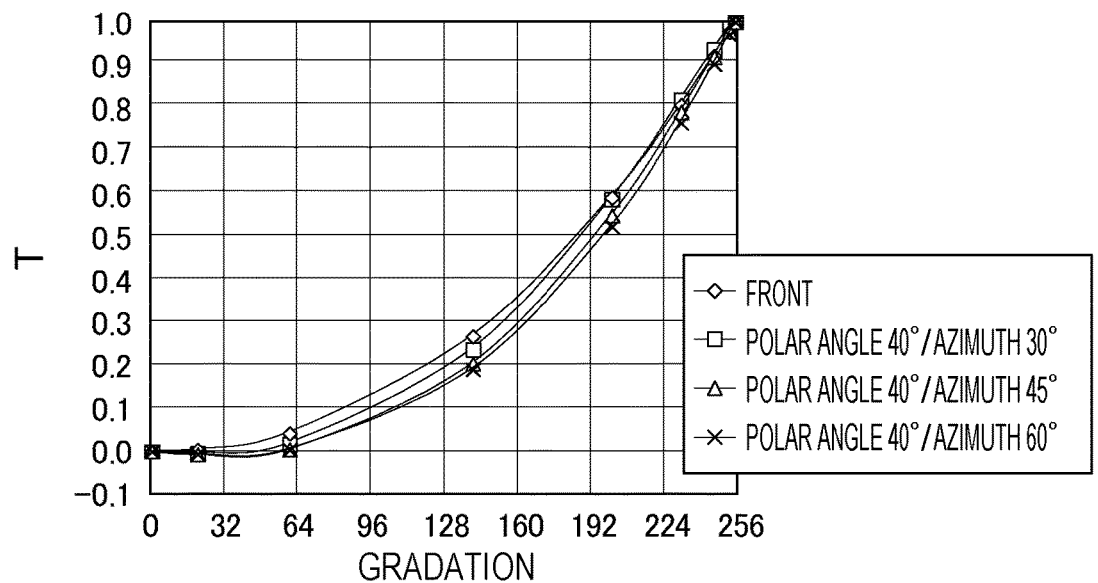
FIG. 24 illustrates a gradation to normalized transmittance calculation result in the configuration of the example 3 in the case of the arrangement (parallel relationship) of the optical axes illustrated in FIG. 23(a).
Figure 25:
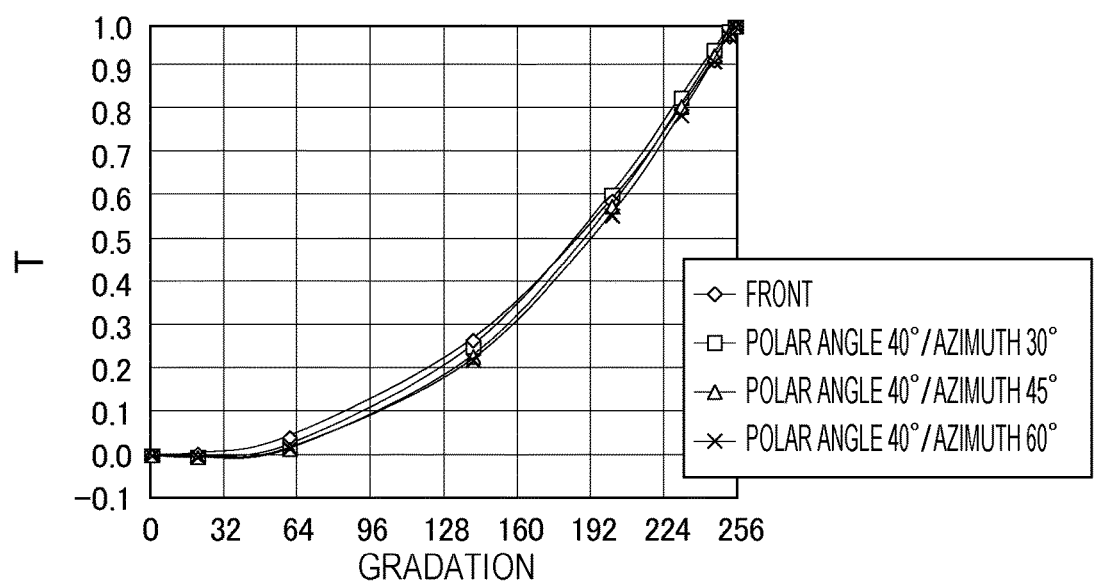
FIG. 25 illustrates a gradation to normalized transmittance calculation result in the configuration of the example 3 in the case of the arrangement (perpendicular relationship) of the optical axes illustrated in FIG. 23(b).

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIG. 24 illustrates a gradation to normalized transmittance calculation result in the configuration of the example 3 in the case of the arrangement (parallel relationship) of the optical axes illustrated in FIG. 23(a). FIG. 25 illustrates a gradation to normalized transmittance calculation result in the configuration of the example 3 in the case of the arrangement (perpendicular relationship) of the optical axes illustrated in FIG. 23(b).

As illustrated in FIGS. 24 and 25, it is understood that the slantwise characteristic (a line passing through quadrangular, triangular, or × mark plots in each graph) is less shifted from the front characteristic (a line passing through rhombus plots in each graph) in the case of the axis arrangement illustrated in FIG. 23(b) than in the case of the axis arrangement illustrated in FIG. 23(a).

Table 4 below illustrates $|(T_{slantwise}/T_{front})-1|$ in the present example.

TABLE 4

| In-Plane Retardation of Optical Alignment Film | Parallel | Perpendicular |
|---|---|---|
| 20 nm | 0.12 | 0.05 |

As illustrated in Table 4, $|(T_{slantwise}/T_{front})-1|$ is smaller in the arrangement in FIG. 23(b) than in the arrangement in FIG. 23(a). Therefore, in the case of employing negative liquid crystals, the axis arrangement in FIG. 23(b) (the initial alignment direction 12a of liquid crystal molecules is in a perpendicular relationship with the direction of the transmission axis 6t of the second polarizer 6 on the backlight 7 side) has a smaller difference between the display characteristics in the case of viewing the liquid crystal panel from the front and the display characteristics in the case of viewing the liquid crystal display panel from the slantwise direction than the axis arrangement in FIG. 23(a) (the initial alignment direction 12a of liquid crystal molecules is in a parallel relationship with the direction of the transmission axis 6t of the second polarizer 6 on the backlight 7 side) and is said to be capable of realizing a display panel having more excellent viewing angle characteristics.

When the transmittance in the case of viewing the liquid crystal panel from the front with a voltage of 4.5 V applied to the signal electrode is compared between the example 1 employing positive liquid crystals and the example 3 employing negative liquid crystals, the transmittance in the case of the example 3 is 36.7% which is higher than 27.9% in the case of the example 1. Thus, employing negative liquid crystals can realize a liquid crystal display panel having a higher transmittance.

Example 4

Basic configuration: FFS mode, optical alignment film, positive liquid crystal, protective layer having refractive index anisotropy on each of observer side and backlight side.

Figure 26:
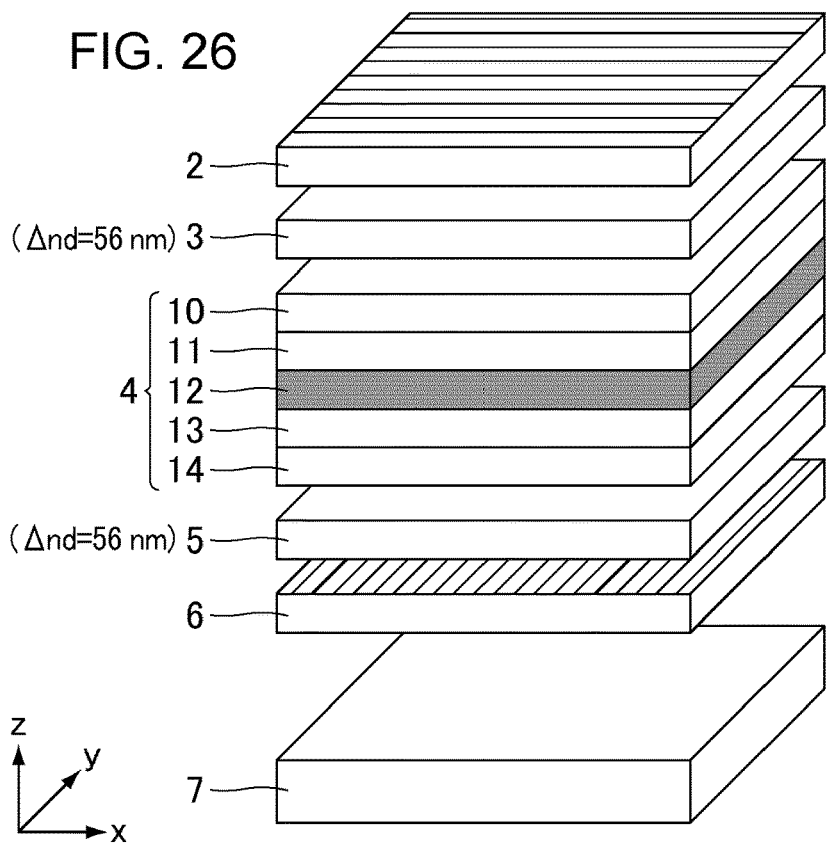
FIG. 26 is a schematic perspective view of a liquid crystal display device according to example 4.
Figure 27:
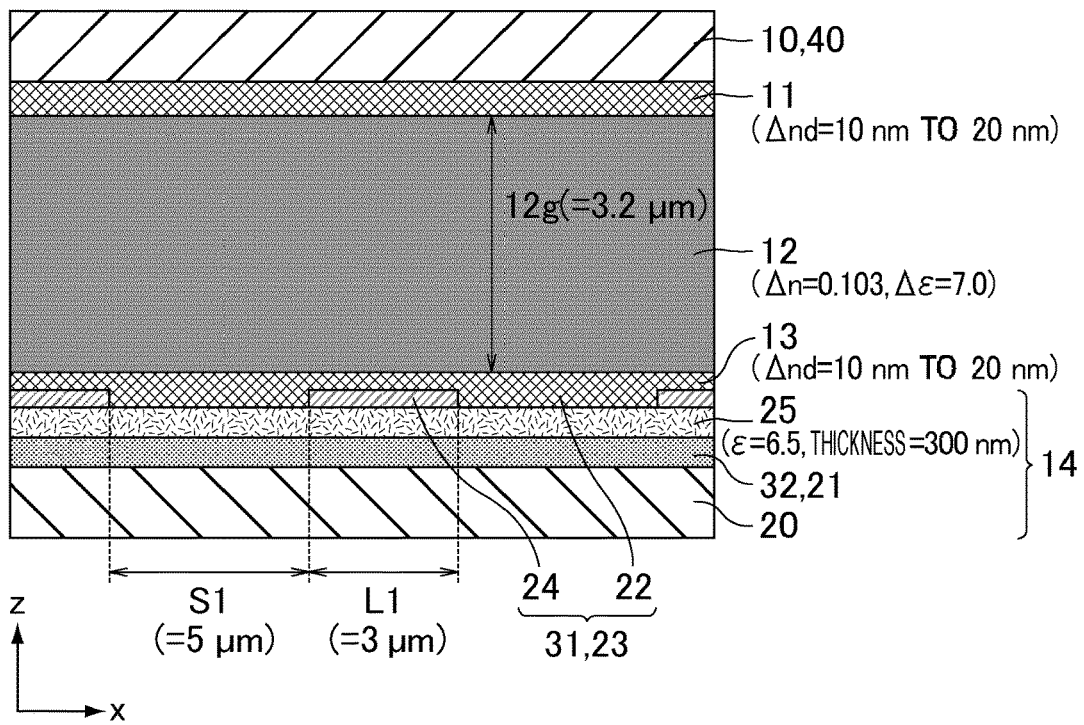
FIG. 27 is a schematic sectional view of a liquid crystal panel included in the liquid crystal display device according to the example 4.
Figure 28:
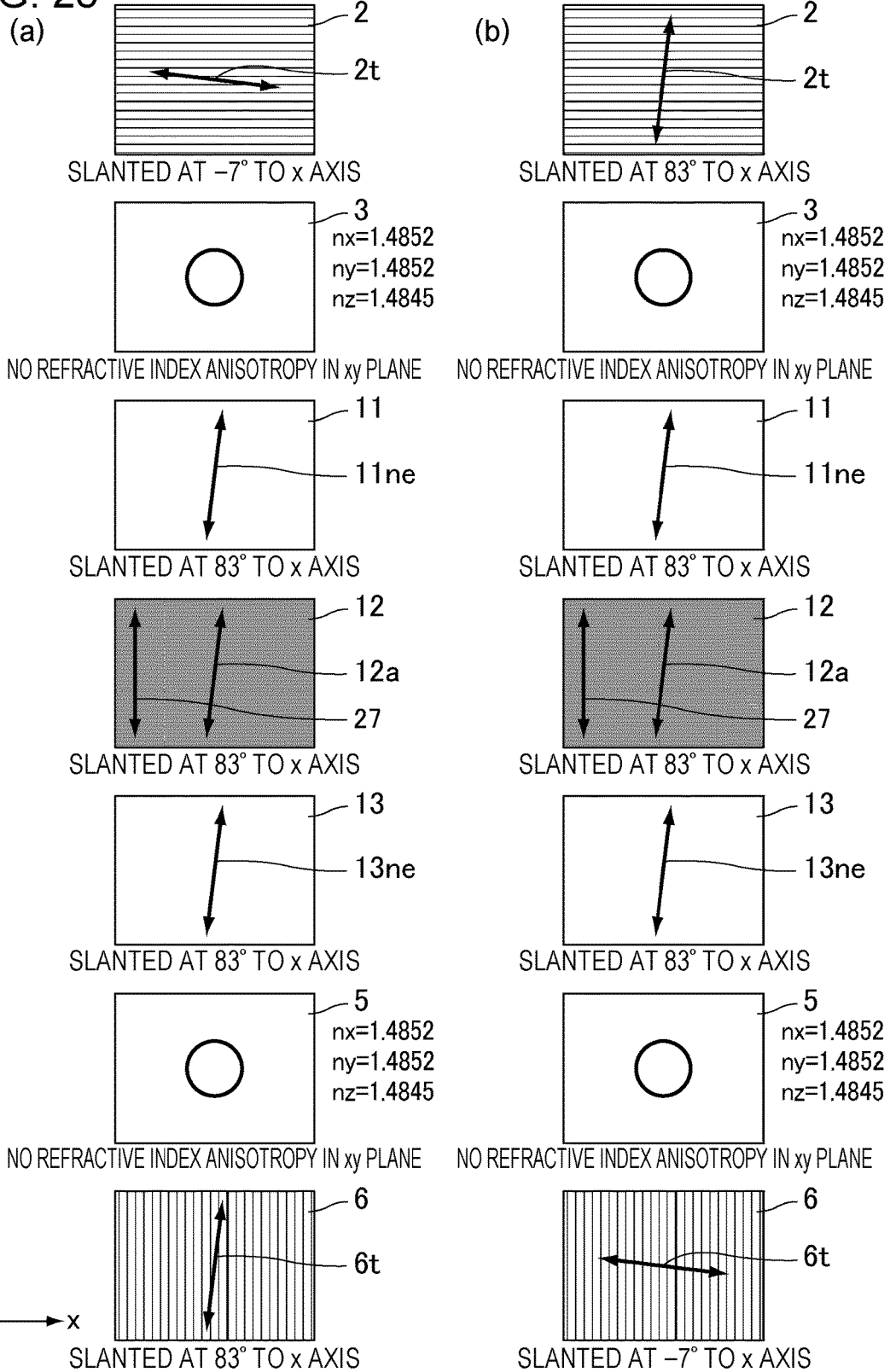
FIGS. 28(a) and 28(b) are schematic diagrams illustrating arrangement (in the axial direction) of the optical axis of each layer of the liquid crystal display device according to the example 4 when viewed from the direction of the z axis.

FIG. 26 is a schematic perspective view of a liquid crystal display device according to example 4. FIG. 27 is a schematic sectional view of a liquid crystal panel included in the liquid crystal display device according to the example 4. FIGS. 28(a) and 28(b) are schematic diagrams illustrating arrangement (in the axial direction) of the optical axis of each layer of the liquid crystal display device according to the example 4 when viewed from the direction of the z axis.

The present example is the same as the example 1 except for the following points.

As illustrated in FIG. 27, the optical alignment films 11 and 13 have an in-plane retardation of 10 nm or 20 nm. As illustrated in FIG. 26, a triacetylcellulose (TAC) layer is assumed as a polarizer protective layer. A first protective layer 3 is arranged between the first substrate 10 and the first polarizer 2, and a second protective layer 5 is arranged between the second substrate 14 and the second polarizer 6. Each of the protective layers 3 and 5 have the x-direction refractive index nx of 1.4852, the y-direction refractive index ny of 1.4852, and the z-direction refractive index nz of 1.4845. Each of the protective layers 3 and 5 satisfies nx=ny>nz, does not exhibit a refractive index anisotropy in the xy plane, and exhibits a refractive index anisotropy in the xz plane. The thickness-direction retardation of each of the protective layers 3 and 5 is 56 nm, and the in-plane retardation of each of the protective layers 3 and 5 is 0 nm. Each of the protective layers 3 and 5 does not exhibit a refractive index anisotropy in the xy plane. Thus, as illustrated in FIGS. 28(a) and 28(b), the concept of setting an axis in the xy plane is not applied to each of the protective layers 3 and 5. The present example assumes the case of each protective layer in the embodiment 1 being a layer having a refractive index anisotropy.

Arrangement of the optical axis of each layer other than the protective layers 3 and 5 is the same as that in the case of the example 1 illustrated in FIGS. 16(a) and 16(b).

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. Consequently, contrary to the case of the example 1, the arrangement in FIG. 28(a) (the initial alignment direction 12a of liquid crystal molecules is in a parallel relationship with the direction of the transmission axis 6t of the second polarizer 6 on the backlight side 7) results in a smaller difference in gradation to normalized transmittance curve between the front direction and the slantwise direction than the arrangement in FIG. 28(b) (the initial alignment direction 12a of liquid crystal molecules is in a perpendicular relationship with the direction of the transmission axis 6t of the second polarizer 6 on the backlight 7 side). That is, the arrangement in FIG. 28(a) has a smaller difference between display in the case of viewing the liquid crystal display device from the front and display in the case of viewing the liquid crystal display device slantwise than the arrangement in FIG. 28(b) and achieves more favorable viewing angle characteristics. Therefore, in the case of a layer having a refractive index anisotropy with nx=ny>nz existing between the first substrate 10 and the first polarizer 2 and between the second substrate 14 and the second polarizer 6, the important point is to set the initial alignment direction 12a of liquid crystal molecules and the direction of the transmission axis 6t of the second polarizer 6 on the backlight 7 side in a parallel relationship.

FIGS. 29(a) and 29(b) illustrate gradation to normalized transmittance calculation results in the configuration of the example 4 in the case of the arrangement (parallel relationship) of the optical axes illustrated in FIG. 28(a). FIG. 29(a) illustrates the case of the first and second optical alignment films having an in-plane retardation (Δnd) of 10 nm. FIG. 29(b) illustrates the case of the first and second optical alignment films having an in-plane retardation (Δnd) of 20 nm. FIGS. 30(a) and 30(b) illustrate gradation to normalized transmittance calculation results in the configuration of the example 4 in the case of the arrangement (perpendicular relationship) of the optical axes illustrated in FIG. 28(b). FIG. 30(a) illustrates the case of the first and second optical alignment films having an in-plane retardation (Δnd) of 10 nm. FIG. 30(b) illustrates the case of the first and second optical alignment films having an in-plane retardation (Δnd) of 20 nm.

As illustrated in FIGS. 29(a) and 29(b) and FIGS. 30(a) and 30(b), it is understood that the slantwise characteristic (a line passing through quadrangular, triangular, or × mark plots in each graph) is less shifted from the front characteristic (a line passing through rhombus plots in each graph) in the case of the axis arrangement illustrated in FIG. 28(a) than in the case of the axis arrangement illustrated in FIG. 28(b) for any retardation value.

Table 5 below illustrates $|(T_{slantwise}/T_{front})-1|$ in the present example.

TABLE 5

| In-Plane Retardation of Optical Alignment Film | Parallel | Perpendicular |
| --- | --- | --- |
| 10 nm | 0.06 | 0.14 |
| 20 nm | 0.08 | 0.19 |

As illustrated in Table 5, $|(T_{slantwise}/T_{front})-1|$ is smaller in the arrangement in FIG. 28(a) than in the arrangement in FIG. 28(b) for any retardation value. Therefore, with the configuration illustrated in FIGS. 26 and 27, the axis arrangement in FIG. 28(a) (the initial alignment direction 12a of liquid crystal molecules is in a parallel relationship with the direction of the transmission axis 6t of the second polarizer 6 on the backlight 7 side) has a smaller difference between the display characteristics in the case of viewing the liquid crystal panel from the front and the display characteristics in the case of viewing the liquid crystal display panel from the slantwise direction than the axis arrangement in FIG. 28(b) (the initial alignment direction 12a of liquid crystal molecules is in a perpendicular relationship with the direction of the transmission axis 6t of the second polarizer 6 on the backlight 7 side) and is said to be capable of realizing a display panel having more excellent viewing angle characteristics.

Example 5

Basic configuration: IPS mode, optical alignment film, positive liquid crystal, protective layer having refractive index anisotropy on each of observer side and backlight side.

Figure 31:
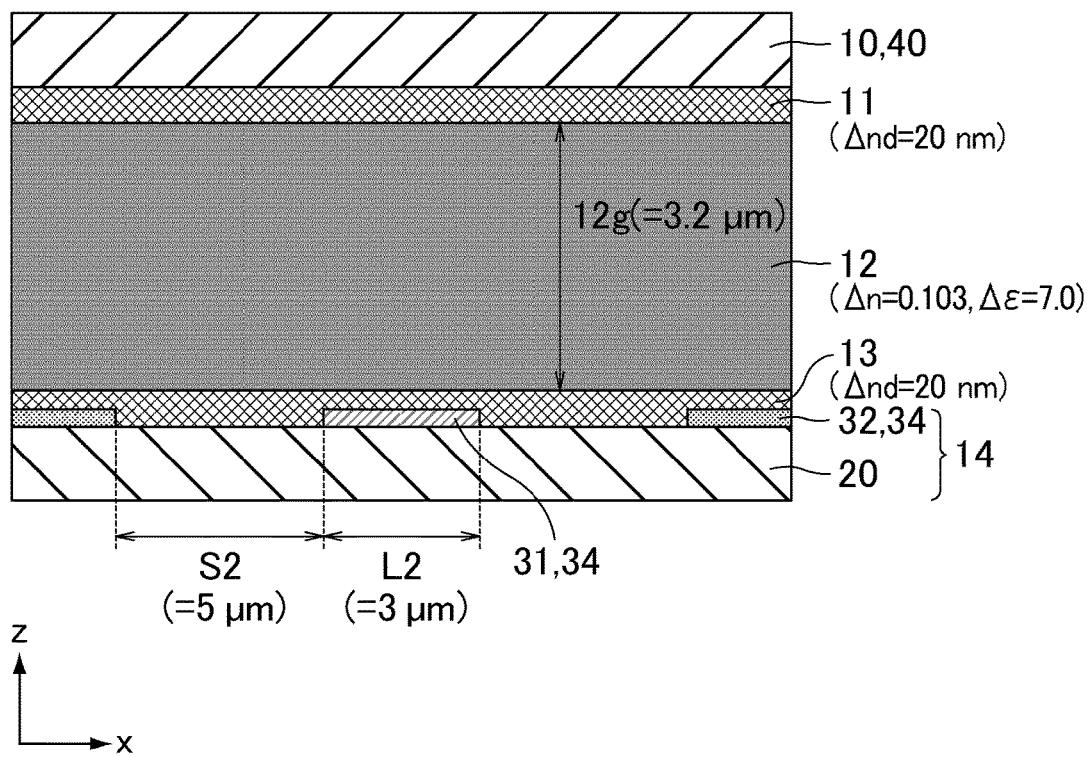
FIG. 31 is a schematic sectional view of a liquid crystal panel included in a liquid crystal display device according to example 5.

FIG. 31 is a schematic sectional view of a liquid crystal panel included in a liquid crystal display device according to example 5.

The present example is the same as the example 4 except for the following points.

As illustrated in FIG. 31, the liquid crystal mode of the liquid crystal panel 4 is changed to the IPS mode. The insulating substrate 20 and the signal electrode 31 and the opposite electrode 32 on the insulating substrate 20 are disposed as the second substrate 14, and the signal electrode 31 and the opposite electrode 32 are arranged in the same layer. The signal electrode 31 and the opposite electrode 32 are a pair of comb-teeth electrodes having comb teeth thereof interlocking, in which a shaft portion and the plurality of parallel branch portions (comb teeth) 34 extending from the shaft portion are disposed with the branch portions 34 alternately arranged at certain intervals. The width L2 of each branch portion 34 is 3 μm, and each interval S2 between the adjacent branch portions 34 is 5 μm. The optical alignment films 11 and 13 have an in-plane retardation of 20 nm.

Arrangement of the optical axis of each layer when viewed from the direction of the z axis in the present example is the same as that in the case of the example 4 and has two types of arrangement illustrated in FIGS. 28(a) and 28(b).

Figure 32:
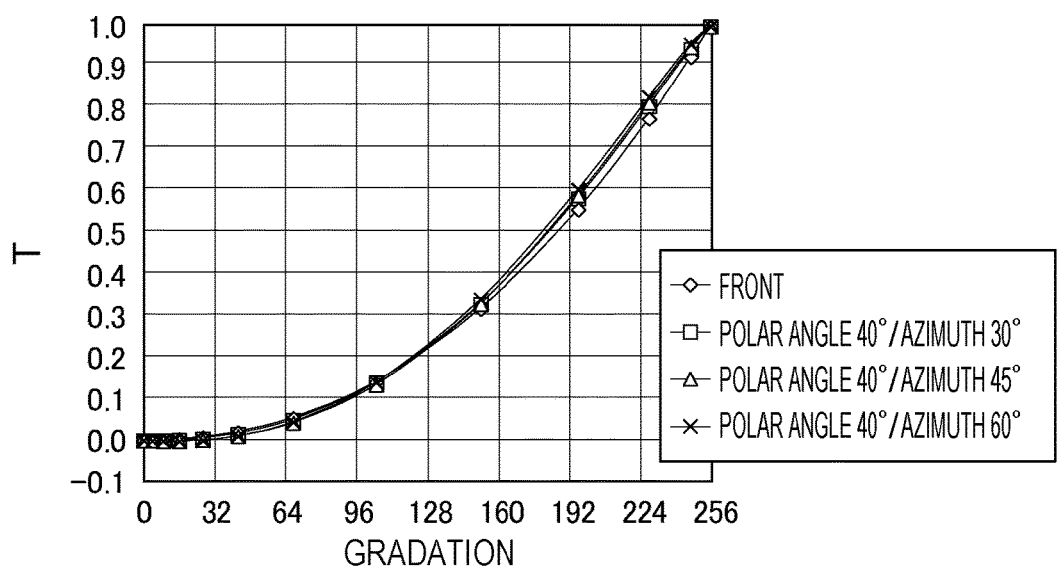
FIG. 32 illustrates a gradation to normalized transmittance calculation result in the configuration of the example 5 in the case of the arrangement (parallel relationship) of the optical axes illustrated in FIG. 28(a).

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIG. 32 illustrates a gradation to normalized transmittance calculation result in the configuration of the example 5 in the case of the arrangement (parallel relationship) of the optical axes illustrated in FIG. 28(a).

Figure 33:
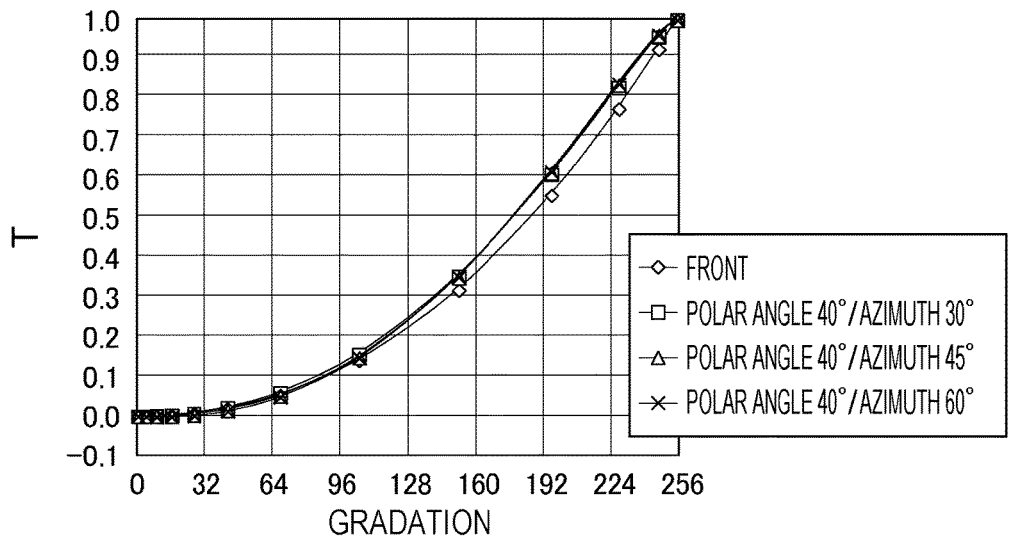
FIG. 33 illustrates a gradation to normalized transmittance calculation result in the configuration of the example 5 in the case of the arrangement (perpendicular relationship) of the optical axes illustrated in FIG. 28(b).

FIG. 33 illustrates a gradation to normalized transmittance calculation result in the configuration of the example 5 in the case of the arrangement (perpendicular relationship) of the optical axes illustrated in FIG. 28(b).

As illustrated in FIGS. 32 and 33, it is understood that the slantwise characteristic (a line passing through quadrangular, triangular, or × mark plots in each graph) is less shifted from the front characteristic (a line passing through rhombus plots in each graph) in the case of the axis arrangement illustrated in FIG. 28(a) than in the case of the axis arrangement illustrated in FIG. 28(b), although the shift is not so noticeable as that in the case of the example 4.

Table 6 below illustrates $|(T_{slantwise}/T_{front})-1|$ in the present example.

TABLE 6

| In-Plane Retardation of Optical Alignment Film | Parallel | Perpendicular |
| --- | --- | --- |
| 20 nm | 0.09 | 0.11 |

As illustrated in Table 6, $|(T_{slantwise}/T_{front})-1|$ is smaller in FIG. 28(a) than in the arrangement in FIG. 28(b). Therefore, with the configuration (IPS mode) illustrated in FIG. 31, the axis arrangement in FIG. 28(a) (the initial alignment direction 12a of liquid crystal molecules is in a parallel relationship with the direction of the transmission axis 6t of the second polarizer 6 on the backlight 7 side) has a smaller difference between the display characteristics in the case of viewing the liquid crystal panel from the front and the display characteristics in the case of viewing the liquid crystal display panel from the slantwise direction than the axis arrangement in FIG. 28(b) (the initial alignment direction 12a of liquid crystal molecules is in a perpendicular relationship with the direction of the transmission axis 6t of the second polarizer 6 on the backlight 7 side) and is said to be capable of realizing a display panel having more excellent viewing angle characteristics.

Example 6

Basic configuration: FFS mode, optical alignment film, negative liquid crystal, protective layer having refractive index anisotropy on each of observer side and backlight side.

Figure 34:
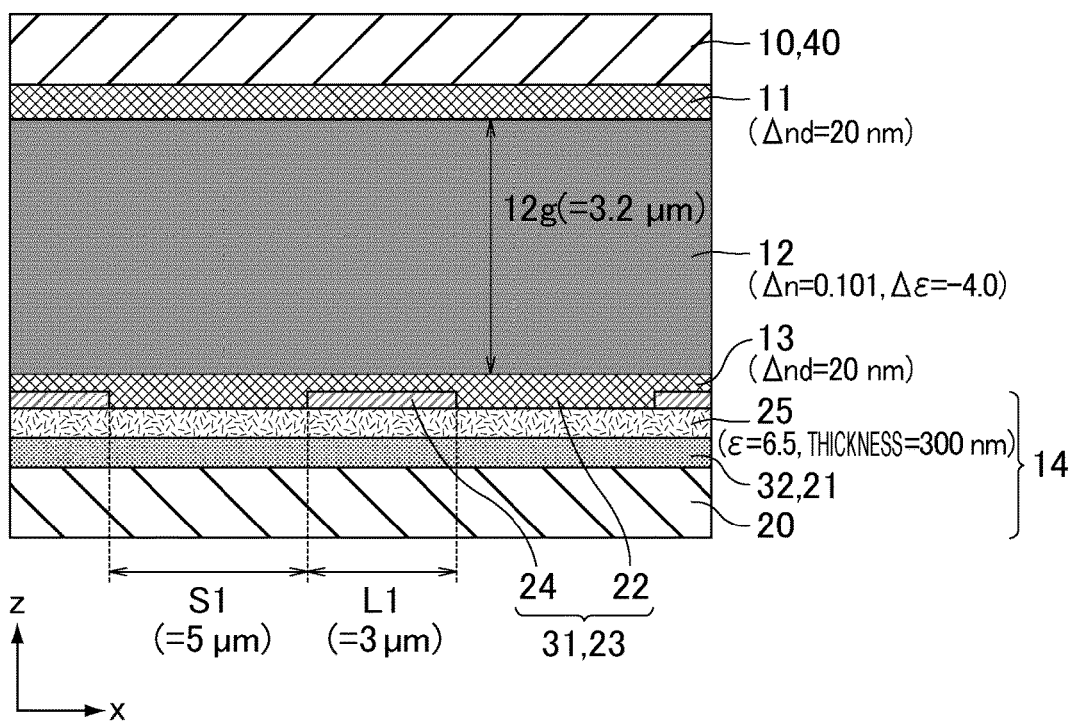
FIG. 34 is a schematic sectional view of a liquid crystal panel included in a liquid crystal display device according to example 6.

FIG. 34 is a schematic sectional view of a liquid crystal panel included in a liquid crystal display device according to example 6. FIGS. 35(a) and 35(b) are schematic diagrams illustrating arrangement (in the axial direction) of the optical axis of each layer of the liquid crystal display device according to the example 6 when viewed from the direction of the z axis.

The present example is the same as the example 4 except for the following points.

As illustrated in FIG. 34, the optical alignment films 11 and 13 have an in-plane retardation of 20 nm. The liquid crystal layer 12 has the refractive index anisotropy Δn of 0.101 and the dielectric anisotropy Δε of −4.0. The thickness 12g of the liquid crystal layer 12 is 3.2 μm which is the same as that in the example 4. Since the liquid crystal layer 12 has negative liquid crystals, the initial alignment direction 12a of liquid crystal molecules and the extraordinary light refractive index axes 11ne and 13ne of the optical alignment films 11 and 13 are slanted at 7° to the x axis as illustrated in FIGS. 35(a) and 35(b). Accordingly, the transmission axes 2t and 6t of the first and second polarizers 2 and 6 are changed. In the arrangement in FIG. 35(a), the transmission axes 2t and 6t are respectively slanted at 97° and 7° to the x axis. In the arrangement in FIG. 35(b), the transmission axes 2t and 6t are respectively slanted at 7° and 97° to the x axis.

The initial alignment direction 12a of liquid crystal molecules is in a parallel relationship with the direction of the transmission axis 6t of the second polarizer 6 on the backlight 7 side in FIG. 35(a). The initial alignment direction 12a of liquid crystal molecules is in a perpendicular relationship with the direction of the transmission axis 6t of the second polarizer 6 on the backlight 7 side in FIG. 35(b). These relationships are the same as those in the case of FIGS. 28(a) and 28(b) of the example 4.

Figure 36:
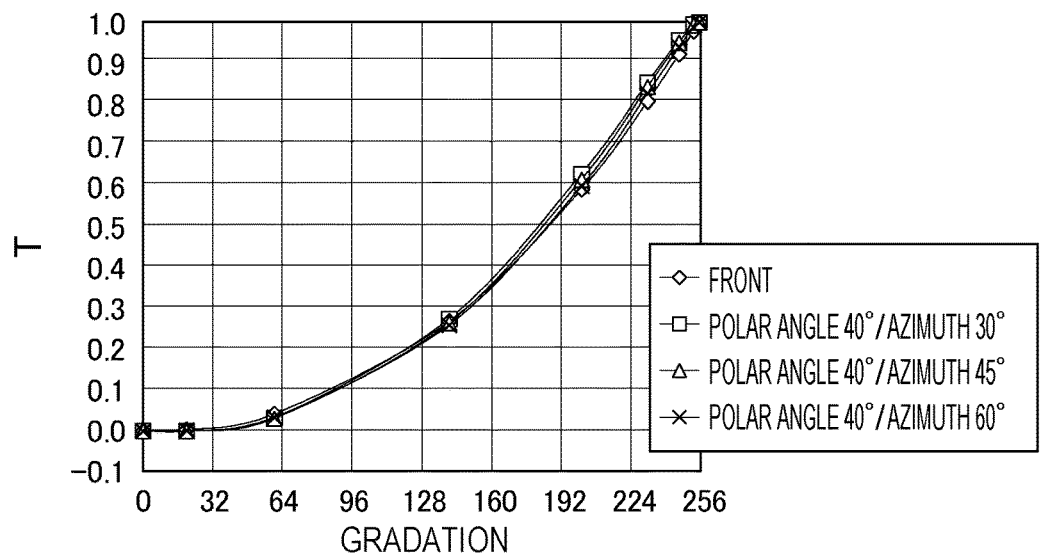
FIG. 36 illustrates a gradation to normalized transmittance calculation result in the configuration of the example 6 in the case of the arrangement (parallel relationship) of the optical axes illustrated in FIG. 35(a).
Figure 37:
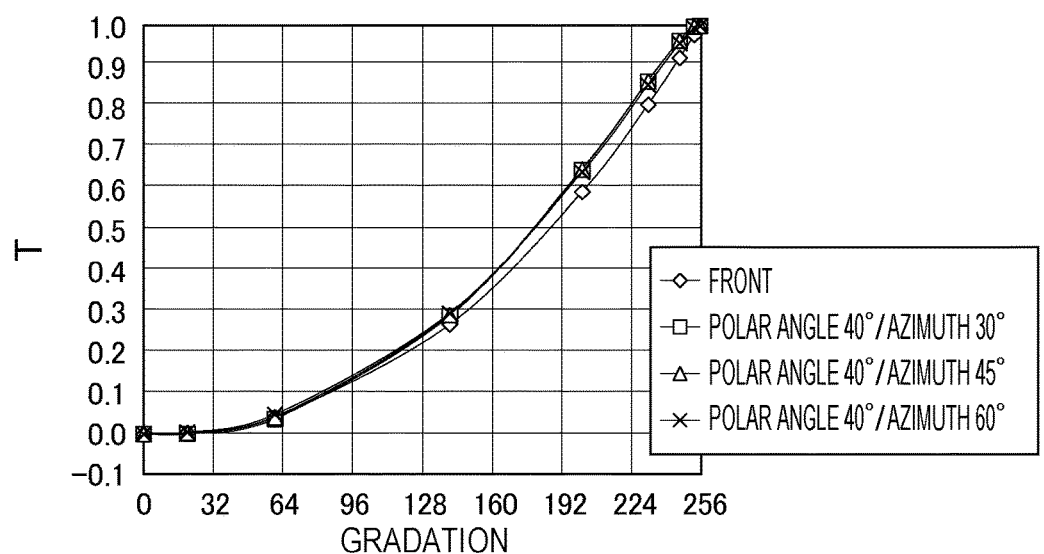
FIG. 37 illustrates a gradation to normalized transmittance calculation result in the configuration of the example 6 in the case of the arrangement (perpendicular relationship) of the optical axes illustrated in FIG. 35(b).

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIG. 36 illustrates a gradation to normalized transmittance calculation result in the configuration of the example 6 in the case of the arrangement (parallel relationship) of the optical axes illustrated in FIG. 35(a). FIG. 37 illustrates a gradation to normalized transmittance calculation result in the configuration of the example 6 in the case of the arrangement (perpendicular relationship) of the optical axes illustrated in FIG. 35(b).

As illustrated in FIGS. 36 and 37, it is understood that the slantwise characteristic (a line passing through quadrangular, triangular, or × mark plots in each graph) is less shifted from the front characteristic (a line passing through rhombus plots in each graph) in the case of the axis arrangement illustrated in FIG. 35(a) than in the case of the axis arrangement illustrated in FIG. 35(b).

Table 7 below illustrates $|(T_{slantwise}/T_{front})-1|$ in the present example.

TABLE 7

| In-Plane Retardation of Optical Alignment Film | Parallel | Perpendicular |
| --- | --- | --- |
| 20 nm | 0.09 | 0.13 |

As illustrated in Table 7, $|(T_{slantwise}/T_{front})-1|$ is smaller in the arrangement in FIG. 35(a) than in the arrangement in FIG. 35(b). Therefore, in the case of employing negative liquid crystals, the axis arrangement in FIG. 35(a) (the initial alignment direction 12a of liquid crystal molecules is in a parallel relationship with the direction of the transmission axis 6t of the second polarizer 6 on the backlight 7 side) has a smaller difference between the display characteristics in the case of viewing the liquid crystal panel from the front and the display characteristics in the case of viewing the liquid crystal display panel from the slantwise direction than the axis arrangement in FIG. 35(b) (the initial alignment direction 12a of liquid crystal molecules is in a perpendicular relationship with the direction of the transmission axis 6t of the second polarizer 6 on the backlight 7 side) and is said to be capable of realizing a display panel having more excellent viewing angle characteristics.

When the transmittance in the case of viewing the liquid crystal panel from the front with a voltage of 4.5 V applied to the signal electrode is compared between the example 4 employing positive liquid crystals and the example 6 employing negative liquid crystals, the transmittance in the case of the example 6 is 36.7% which is higher than 27.9% in the case of the example 4. Thus, employing negative liquid crystals can realize a liquid crystal display panel having a higher transmittance. The transmittance in the case of viewing the liquid crystal panel from the front does not receive influence of the in-plane retardation of each of the optical alignment films 11 and 13 and the thickness-direction retardation of each of the protective layers 3 and 5 satisfying nx=ny>nz. Thus, the transmittances of the examples 4 and 6 are respectively the same as the transmittances of the examples 1 and 3.

Example 7

Basic configuration: FFS mode, optical alignment film, positive liquid crystal, protective layer satisfying the relationship nx=ny≥nz on each of observer side and backlight side (thickness-direction retardation of 0 nm to 56 nm).

Figure 38:
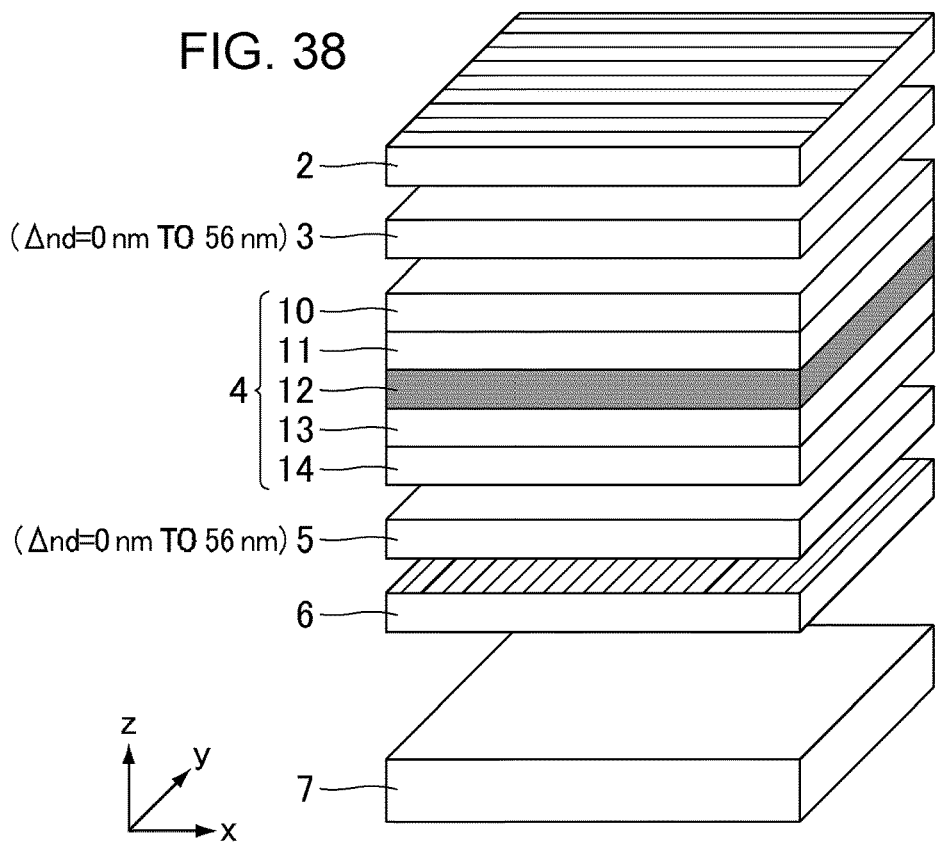
FIG. 38 is a schematic perspective view of a liquid crystal display device according to example 7.
Figure 39:
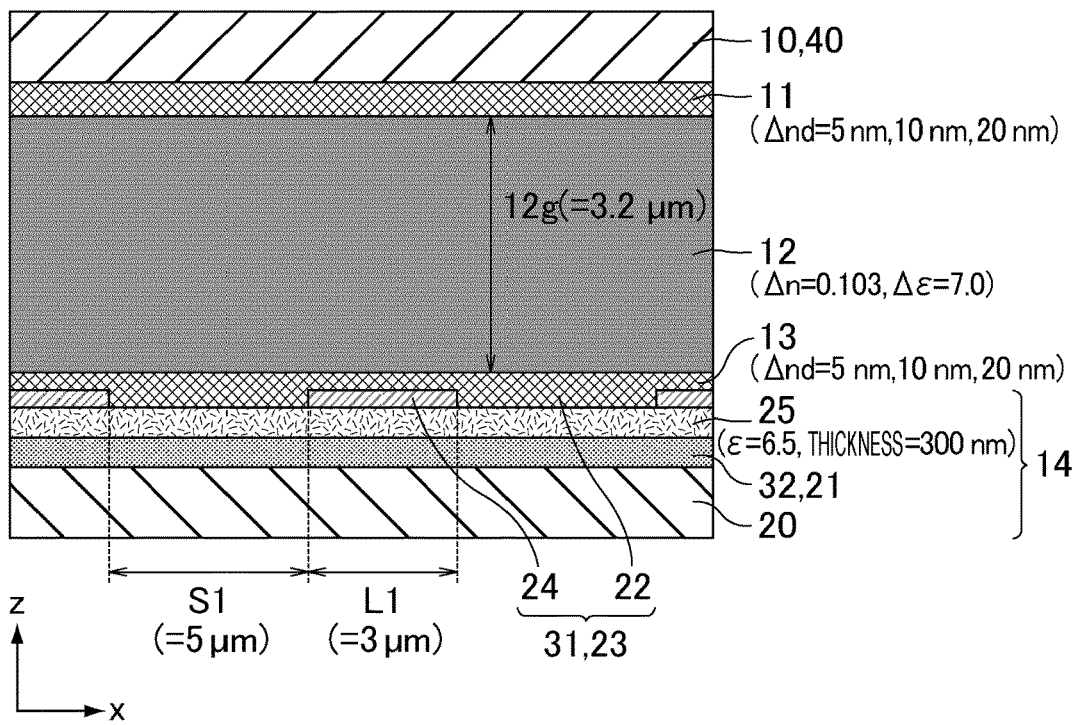
FIG. 39 is a schematic sectional view of a liquid crystal panel included in the liquid crystal display device according to the example 7.

FIG. 38 is a schematic perspective view of a liquid crystal display device according to example 7. FIG. 39 is a schematic sectional view of a liquid crystal panel included in the liquid crystal display device according to the example 7.

The present example is the same as the example 4 except for the following points.

As illustrated in FIG. 38, in order to limit the range of the thickness-direction retardation of each of the protective layers 3 and 5, each of the protective layers 3 and 5 has the thickness d changed in the range of 0 µm to 80 µm and has a thickness-direction retardation changed in the range of 0 nm to 56 nm. The thickness-direction retardations of the protective layers 3 and 5 have the same value. The case of the thickness of each of the protective layers 3 and 5 being 0 µm is optically equivalent to the case of arranging an optically isotropic protective layer instead of each of the protective layers 3 and 5. As illustrated in FIG. 39, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The present example assumes the embodiment 1 with the first protective layer satisfying the relationship nx=ny≥nz disposed on the observer side and the second protective layer satisfying the relationship nx=ny≥nz disposed on the backlight side.

Arrangement of the optical axis of each layer when viewed from the direction of the z axis in the present example is the same as that in the case of the example 4 and has two types of arrangement illustrated in FIGS. 28(a) and 28(b).

Figure 40:
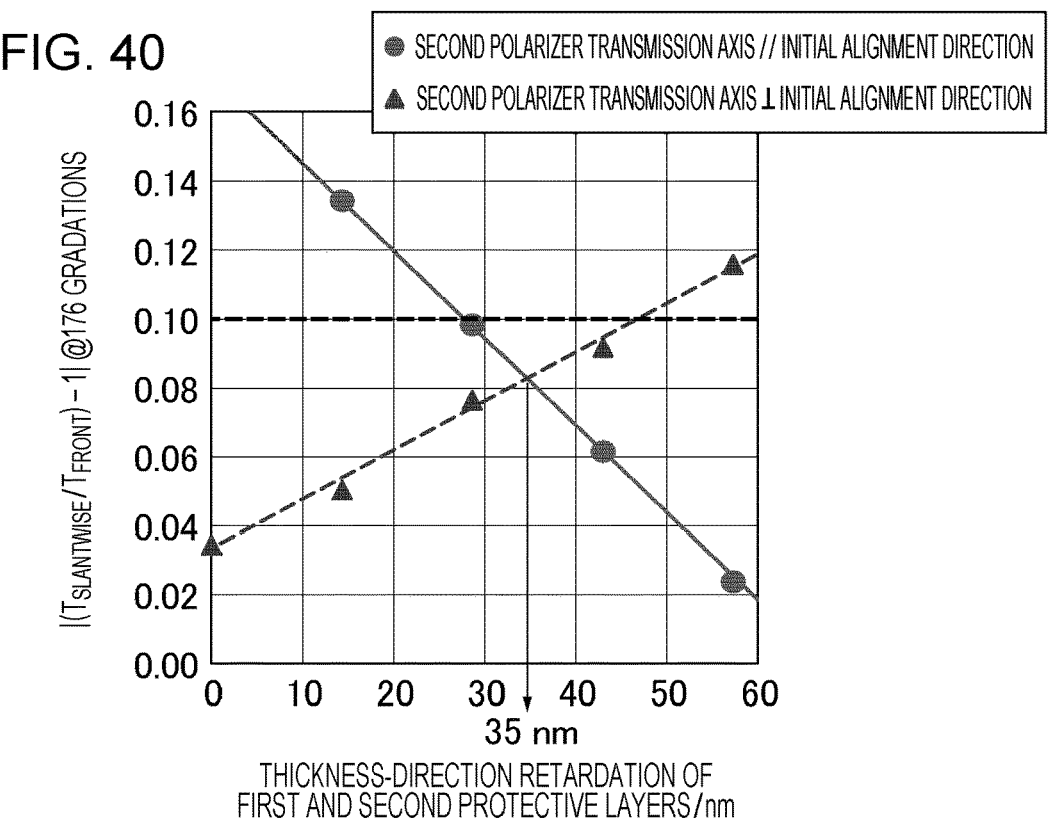
FIG. 40 illustrates a graph in the case of plotting the thickness-direction retardation of first and second protective layers on the horizontal axis and plotting $|(T_{slantwise}/T_{front})-1|$ on the vertical axis in the example 7 and illustrates the case of first and second optical alignment films having an in-plane retardation of 5 nm.
Figure 41:
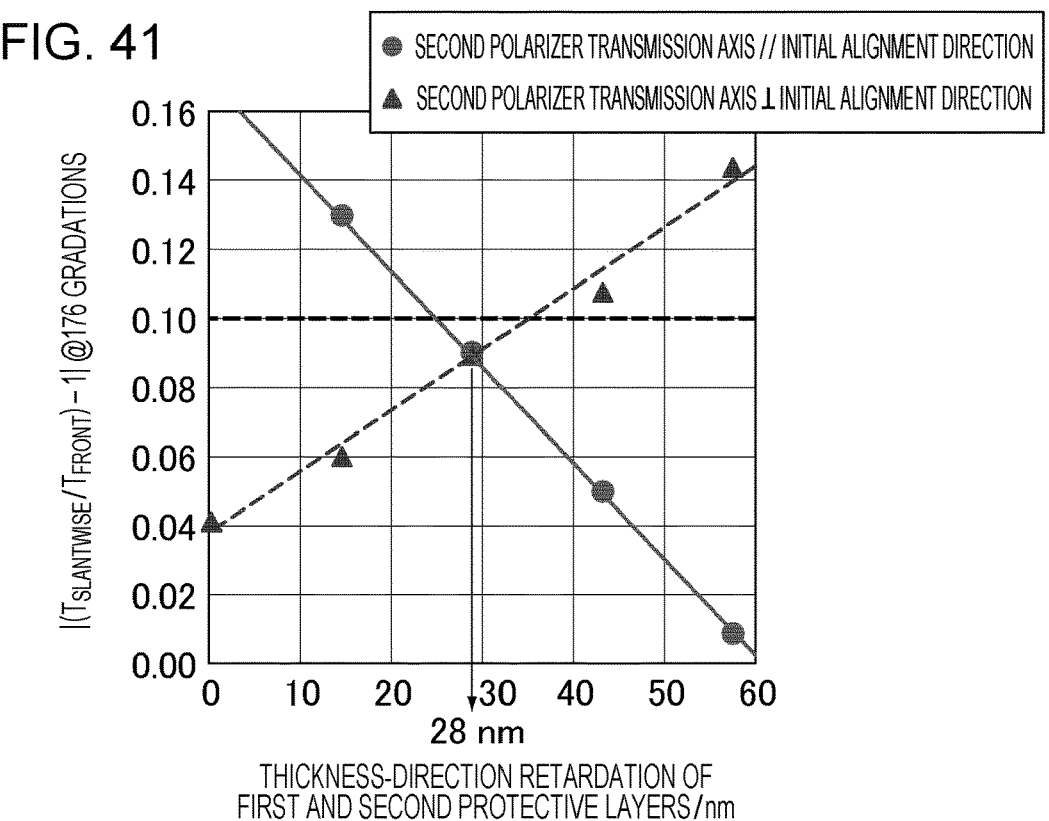
FIG. 41 illustrates a graph in the case of plotting the thickness-direction retardation of the first and second protective layers on the horizontal axis and plotting $|(T_{slantwise}/T_{front})-1|$ on the vertical axis in the example 7 and illustrates the case of the first and second optical alignment films having an in-plane retardation of 10 nm.
Figure 42:
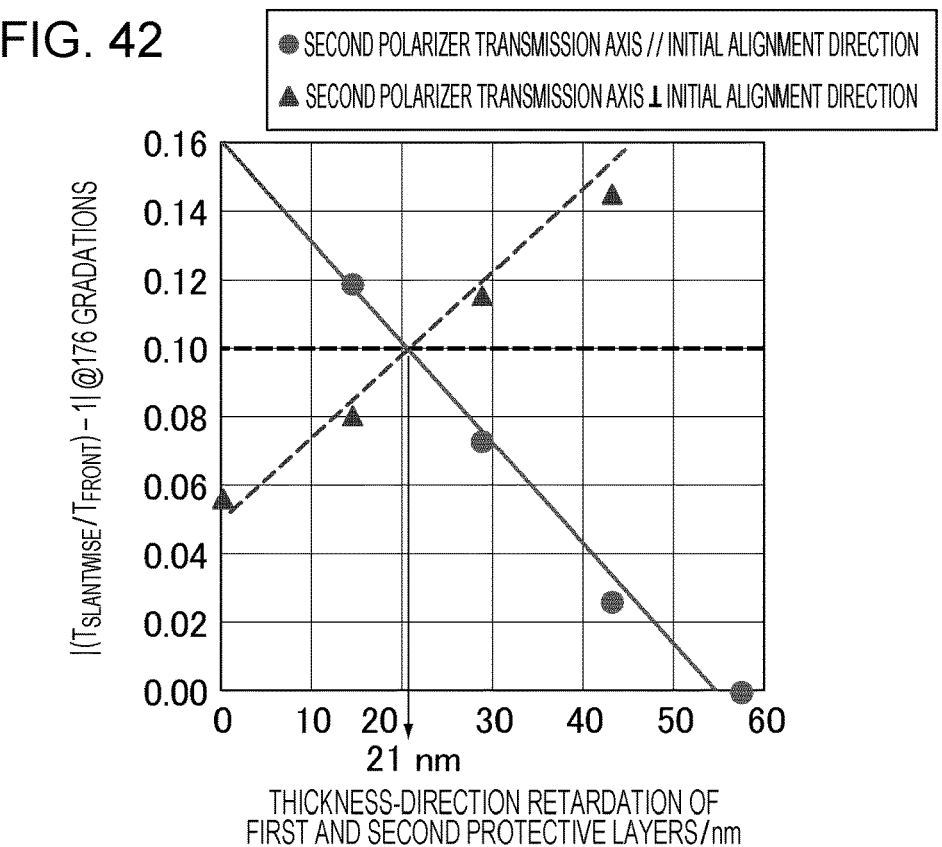
FIG. 42 illustrates a graph in the case of plotting the thickness-direction retardation of the first and second protective layers on the horizontal axis and plotting $|(T_{slantwise}/T_{front})-1|$ on the vertical axis in the example 7 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 40 to 42 illustrate graphs in the case of plotting the thickness-direction retardation of the first and second protective layers on the horizontal axis and plotting $|(T_{slantwise}/T_{front})-1|$ on the vertical axis in the example 7. FIGS. 40, 41, and 42 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 40 to 42, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 40 to 42, while the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in an area where the protective layers 3 and 5 have a small thickness-direction retardation, it is understood that the viewing angle is more favorable in the parallelism of the transmission axis 6t of the second polarizer 6 and the initial alignment direction 12a of liquid crystal molecules than in the case of the perpendicularity thereof when the thickness-direction retardations of the protective layers 3 and 5 are greater than or equal to a certain value.

The thickness-direction retardation of the first and second protective layers 3 and 5 at a point of a favorable viewing angle and of inversion of the relationship between the transmission axis 6t of the second polarizer 6 and the initial alignment direction 12a of liquid crystal molecules is read from FIGS. 40 to 42, and the value of the thickness-direction retardation is plotted on a graph on the vertical axis and the in-plane retardation of the first and second optical alignment films 11 and 13 at that time on the horizontal axis. This graph is illustrated in FIG. 43.

Figure 43:
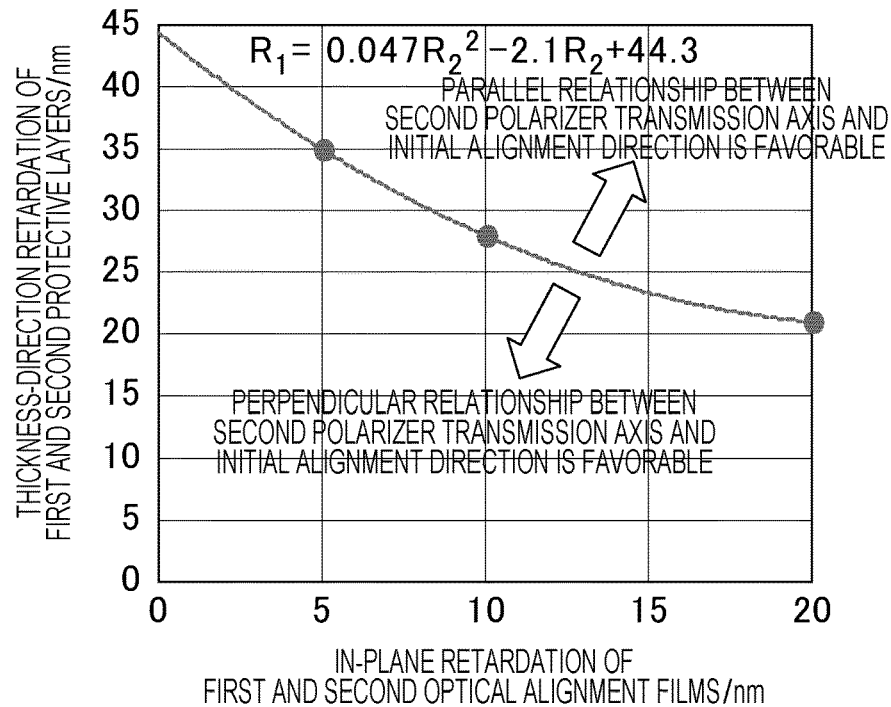
FIG. 43 is a graph acquired by reading, from FIGS. 40 to 42, the thickness-direction retardation of the first and second protective layers at a point of a favorable viewing angle and of inversion of the relationship between the transmission axis of a second polarizer and the initial alignment direction of liquid crystal molecules and plotting the value of the thickness-direction retardation on the vertical axis and the in-plane retardation of the first and second optical alignment films at that time on the horizontal axis.

In FIG. 43, given that $R_1$ is the thickness-direction retardation of each of the protective layers 3 and 5 and that $R_2$ is the in-plane retardation of each of the optical alignment films 11 and 13, it is understood that a boundary of a favorable viewing angle and of inversion of the relationship between the transmission axis 6t of the second polarizer 6 and the initial alignment direction 12a of liquid crystal molecules can be approximated by a curve of $R_1=0.047R_2^2-2.1R_2+44.3$. Thus, in the FFS mode in which the liquid crystal layer has a positive dielectric anisotropy with a protective layer satisfying the relationship nx=ny≥nz existing on each of the observer side and the backlight side as in the present example, the following optical design can provide a liquid crystal display panel that has a favorable viewing angle in the case of using a self-assembled optical alignment film.

i) In the case of satisfying $R_1 \leq 0.047R_2^2-2.1R_2+44.3$, the second polarizer on the backlight side is arranged to have a transmission axis thereof perpendicular to the initial alignment direction of liquid crystal molecules.

ii) In the case of satisfying $R_1 \geq 0.047R_2^2-2.1R_2+44.3$, the second polarizer on the backlight side is arranged to have a transmission axis thereof parallel to the initial alignment direction of liquid crystal molecules.

Example 8

Basic configuration: FFS mode, optical alignment film, positive liquid crystal, protective layer satisfying the relationship nx=ny≥nz on only observer side (thickness-direction retardation of 0 nm to 56 nm).

Figure 44:
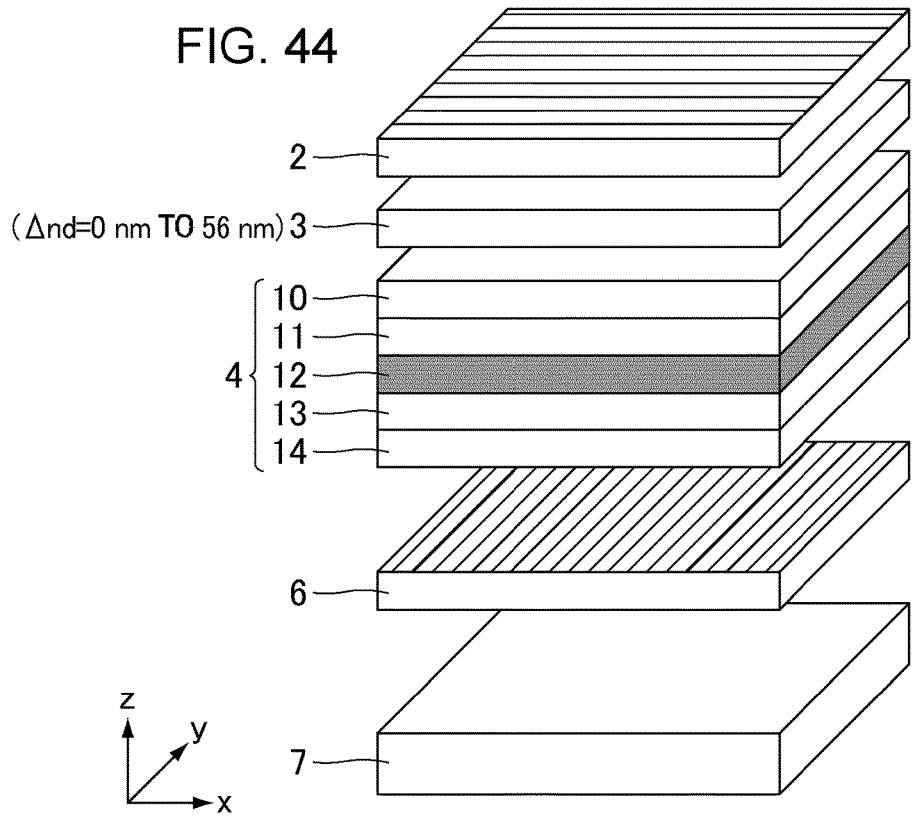
FIG. 44 is a schematic perspective view of a liquid crystal display device according to example 8.
Figure 45:
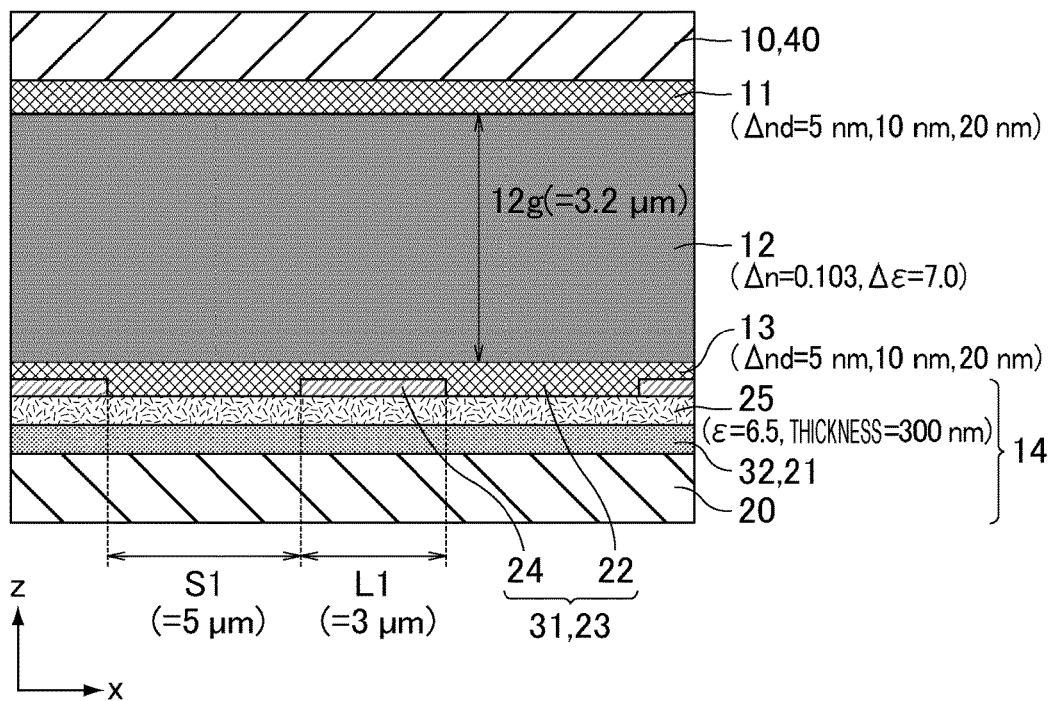
FIG. 45 is a schematic sectional view of a liquid crystal panel included in the liquid crystal display device according to the example 8.

FIG. 44 is a schematic perspective view of a liquid crystal display device according to example 8. FIG. 45 is a schematic sectional view of a liquid crystal panel included in the liquid crystal display device according to the example 8. FIGS. 46(a) and 46(b) are schematic diagrams illustrating arrangement (in the axial direction) of the optical axis of each layer of the liquid crystal display device according to the example 8 when viewed from the direction of the z axis.

The present example is the same as the example 4 except for the following points.

Figure 46:
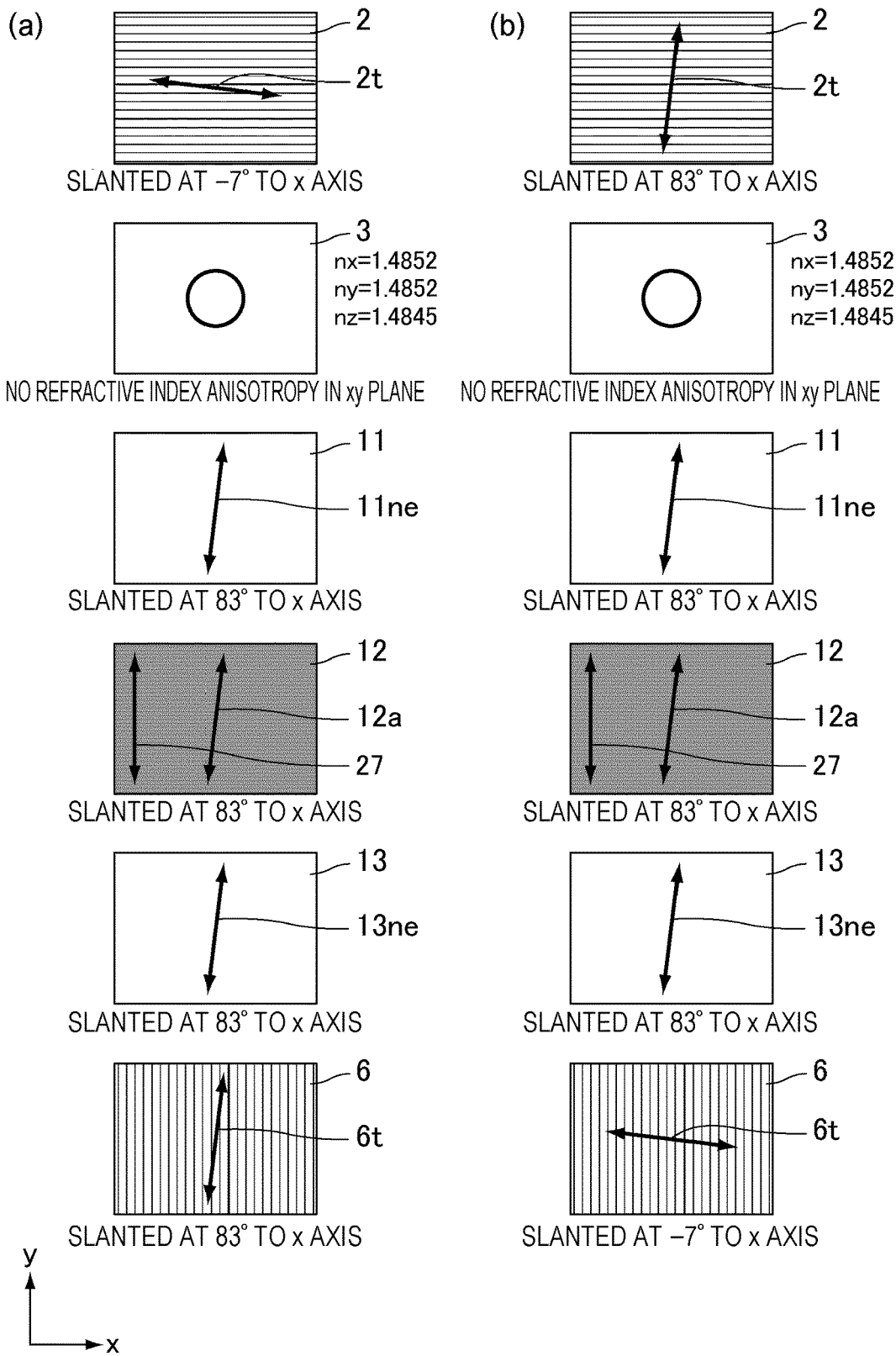
FIGS. 46(a) and 46(b) are schematic diagrams illustrating arrangement (in the axial direction) of the optical axis of each layer of the liquid crystal display device according to the example 8 when viewed from the direction of the z axis.

As illustrated in FIG. 44, only the protective layer 3 is disposed between the first substrate 10 and the first polarizer 2 on the observer side. That is, the second protective layer 5 between the second substrate 14 and the second polarizer 6 on the backlight 7 side is removed from the configuration of the example 4. In order to limit the range of the thickness-direction retardation of the protective layer 3, the protective layer 3 has the thickness d changed in the range of 0 μm to 80 μm and has a thickness-direction retardation changed in the range of 0 nm to 56 nm. The case of the thickness of the protective layer 3 being 0 μm is optically equivalent to the case of arranging an optically isotropic protective layer instead of the protective layer 3. As illustrated in FIG. 46, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The configuration according to the present example is optically equivalent to a configuration in which an optically isotropic second protective layer is arranged between the second substrate 14 and the second polarizer 6 on the backlight 7 side in the present example. Accordingly, the present example assumes the embodiment 2 with the first protective layer satisfying the relationship nx=ny≥nz disposed on the observer side and the optically isotropic second protective layer disposed on the backlight side.

Arrangement of the optical axis of each layer when viewed from the direction of the z axis in the present example is the same as that in the case of the example 4 except for the absence of the second protective layer between the second substrate and the second polarizer and has two types of arrangement illustrated in FIGS. 46(a) and 46(b).

Figure 47:
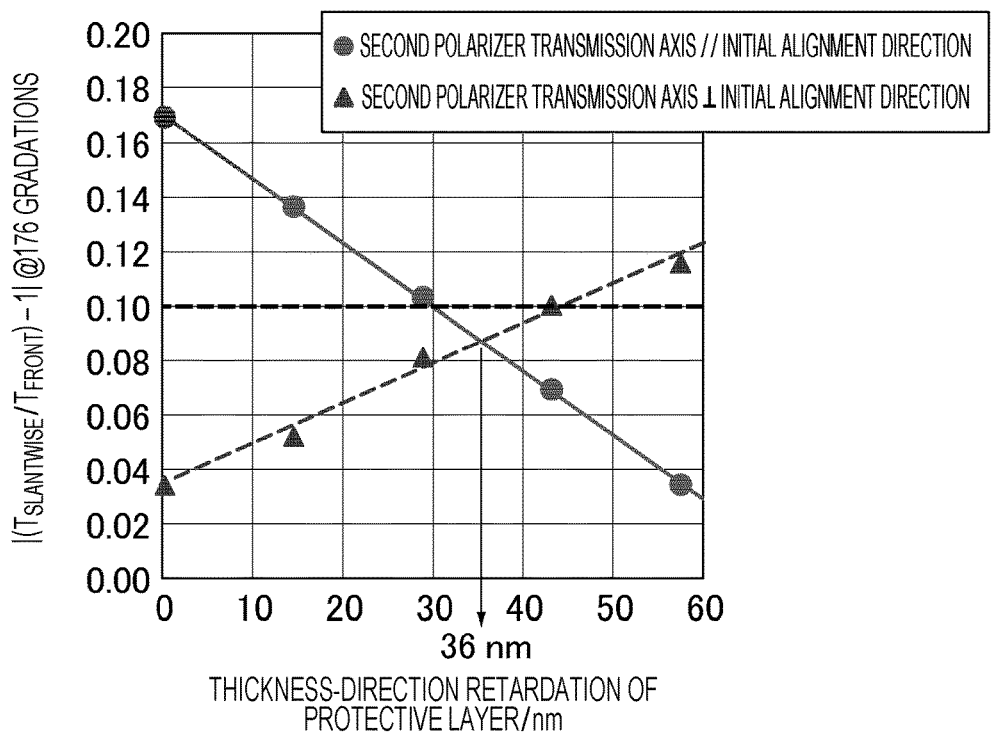
FIG. 47 illustrates a graph in the case of plotting the thickness-direction retardation of a protective layer on the horizontal axis and plotting $|(T_{slantwise}/T_{front})-1|$ on the vertical axis in the example 8 and illustrates the case of first and second optical alignment films having an in-plane retardation of 5 nm.
Figure 48:
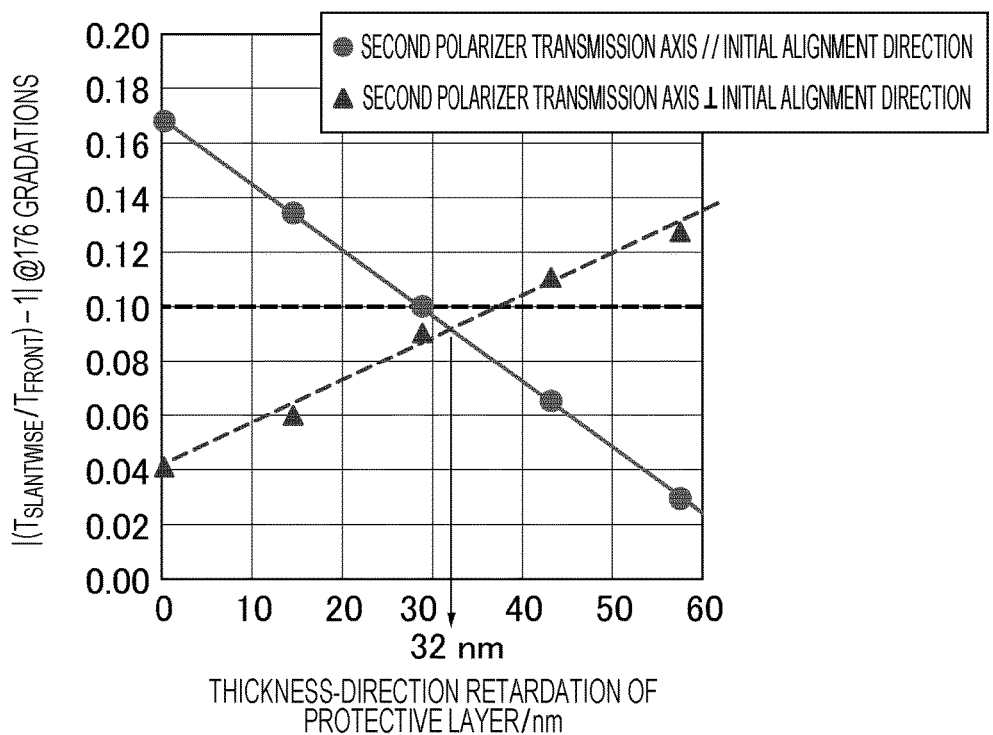
FIG. 48 illustrates a graph in the case of plotting the thickness-direction retardation of the protective layer on the horizontal axis and plotting $|(T_{slantwise}/T_{front})-1|$ on the vertical axis in the example 8 and illustrates the case of the first and second optical alignment films having an in-plane retardation of 10 nm.
Figure 49:
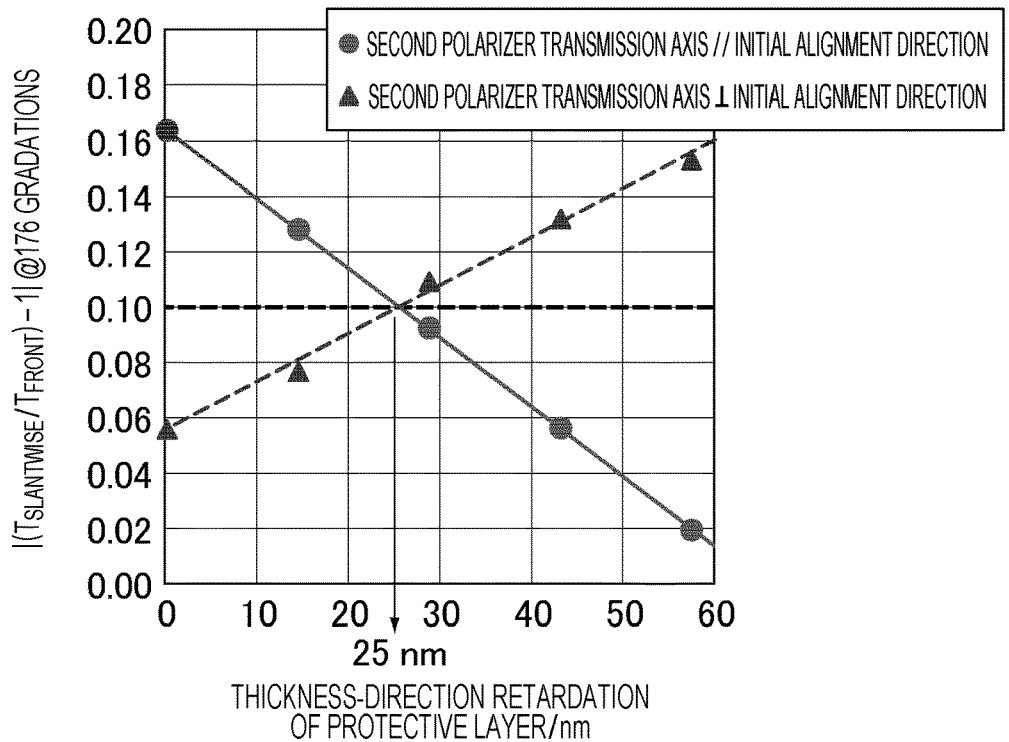
FIG. 49 illustrates a graph in the case of plotting the thickness-direction retardation of the protective layer on the horizontal axis and plotting $|(T_{slantwise}/T_{front})-1|$ on the vertical axis in the example 8 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 47 to 49 illustrate graphs in the case of plotting the thickness-direction retardation of the protective layer on the horizontal axis and plotting $|(T_{slantwise}/T_{front})-1|$ on the vertical axis in the example 8. FIGS. 47, 48, and 49 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 47 to 49, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 47 to 49, while the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in an area where the protective layer 3 has a small thickness-direction retardation, it is understood that the viewing angle is more favorable in the parallelism of the transmission axis 6t of the second polarizer 6 and the initial alignment direction 12a of liquid crystal molecules than in the case of the perpendicularity thereof when the thickness-direction retardation of the protective layer 3 is greater than or equal to a certain value.

The thickness-direction retardation of the protective layer 3 at a point of a favorable viewing angle and of inversion of the relationship between the transmission axis 6t of the second polarizer 6 and the initial alignment direction 12a of liquid crystal molecules is read from FIGS. 47 to 49, and the value of the thickness-direction retardation is plotted on a graph on the vertical axis and the in-plane retardation of the first and second optical alignment films 11 and 13 at that time on the horizontal axis. This graph is illustrated in FIG. 50.

Figure 50:
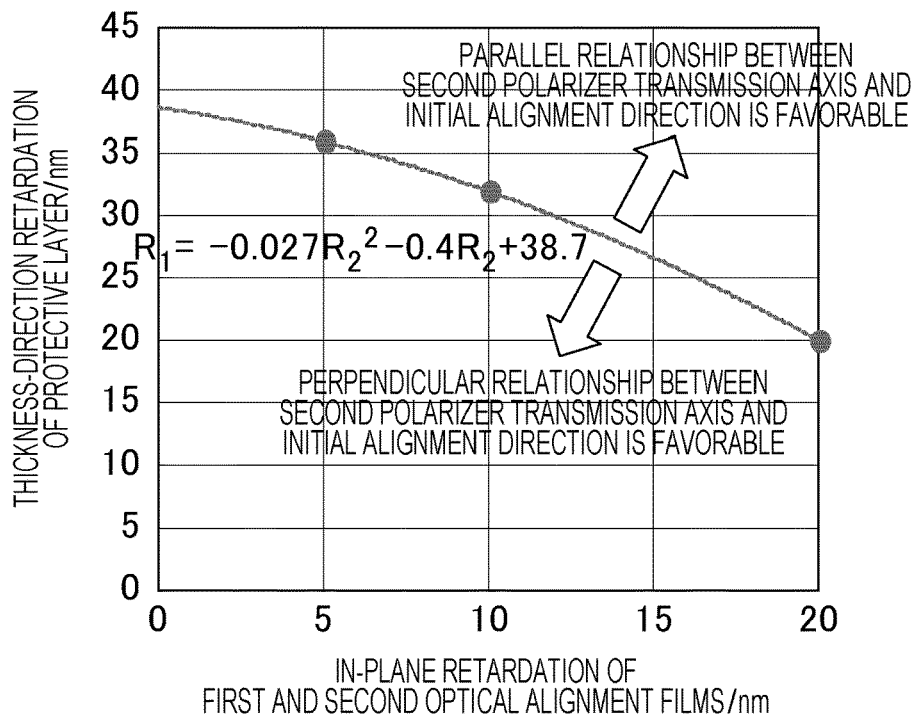
FIG. 50 is a graph acquired by reading, from FIGS. 47 to 49, the thickness-direction retardation of the protective layer at a point of a favorable viewing angle and of inversion of the relationship between the transmission axis of a second polarizer and the initial alignment direction of liquid crystal molecules and plotting the value of the thickness-direction retardation on the vertical axis and the in-plane retardation of the first and second optical alignment films at that time on the horizontal axis.

In FIG. 50, given that $R_1$ is the thickness-direction retardation of the protective layer 3 and that $R_2$ is the in-plane retardation of each of the optical alignment films 11 and 13, it is understood that a boundary of a favorable viewing angle and of inversion of the relationship between the transmission axis 6t of the second polarizer 6 and the initial alignment direction 12a of liquid crystal molecules can be approximated by a curve of $R_1=-0.027R_2^2-0.4R_2+38.7$. Thus, in the FFS mode in which the liquid crystal layer has a positive dielectric anisotropy with a protective layer satisfying the relationship nx=ny≥nz existing on only the observer side as in the present example, the following optical design can provide a liquid crystal display panel that has a favorable viewing angle in the case of using a self-assembled optical alignment film.

i) In the case of satisfying $R_1 \leq -0.027R_2^2-0.4R_2+38.7$, the second polarizer on the backlight side is arranged to have a transmission axis thereof perpendicular to the initial alignment direction of liquid crystal molecules.

ii) In the case of satisfying $R_1 \geq -0.027R_2^2-0.4R_2+38.7$, the second polarizer on the backlight side is arranged to have a transmission axis thereof parallel to the initial alignment direction of liquid crystal molecules.

Example 9

Basic configuration: FFS mode, optical alignment film, positive liquid crystal, protective layer satisfying the relationship nx=ny≥nz on only backlight side (thickness-direction retardation of 0 nm to 56 nm).

Figure 51:
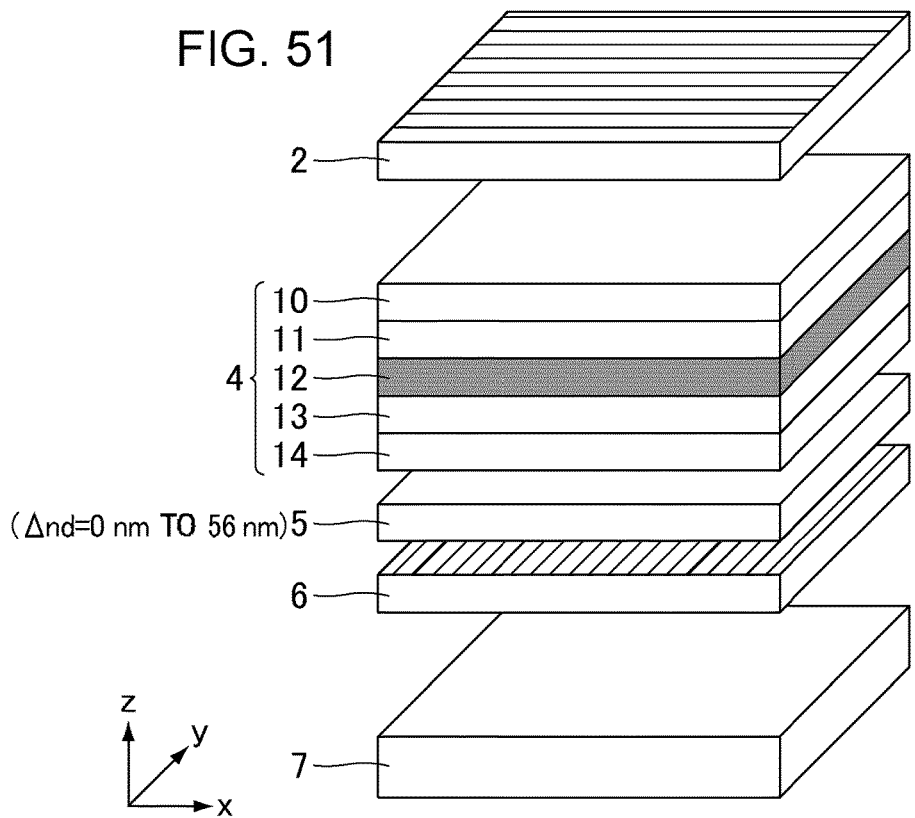
FIG. 51 is a schematic perspective view of a liquid crystal display device according to example 9.
Figure 52:
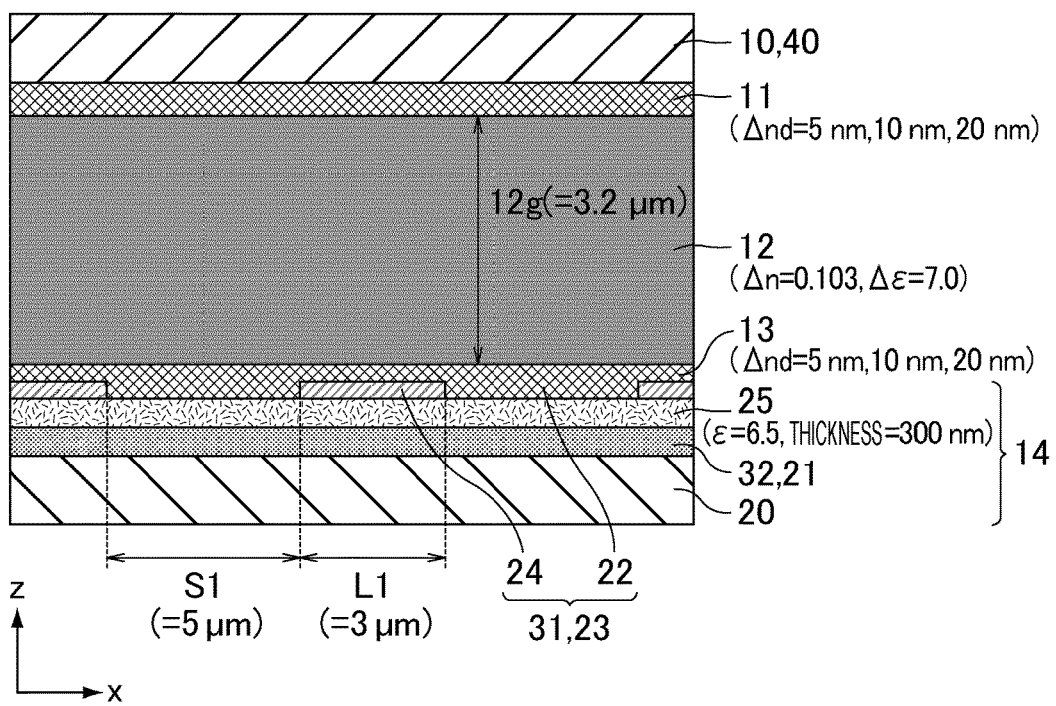
FIG. 52 is a schematic sectional view of a liquid crystal panel included in the liquid crystal display device according to the example 9.

FIG. 51 is a schematic perspective view of a liquid crystal display device according to example 9. FIG. 52 is a schematic sectional view of a liquid crystal panel included in the liquid crystal display device according to the example 9. FIGS. 53(a) and 53(b) are schematic diagrams illustrating arrangement (in the axial direction) of the optical axis of each layer of the liquid crystal display device according to the example 9 when viewed from the direction of the z axis.

The present example is the same as the example 4 except for the following points.

As illustrated in FIG. 51, only the protective layer 5 is disposed between the second substrate 14 and the second polarizer 6 on the backlight 7 side. That is, the first protective layer 3 between the first substrate 10 and the first polarizer 2 on the observer side is removed from the configuration of the example 4. In order to limit the range of the thickness-direction retardation of the protective layer 5, the protective layer 5 has the thickness d changed in the range of 0 μm to 80 μm and has a thickness-direction retardation changed in the range of 0 nm to 56 nm. The case of the thickness of the protective layer 5 being 0 μm is optically equivalent to the case of arranging an optically isotropic protective layer instead of the protective layer 5. As illustrated in FIG. 52, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The configuration according to the present example is optically equivalent to a configuration in which an optically isotropic first protective layer is arranged between the first substrate 10 and the first polarizer 2 on the observer side in the present example. Accordingly, the present example assumes the embodiment 3 with the optically isotropic first protective layer disposed on the observer side and the second protective layer satisfying the relationship nx=ny≥nz disposed on the backlight side.

Figure 53:
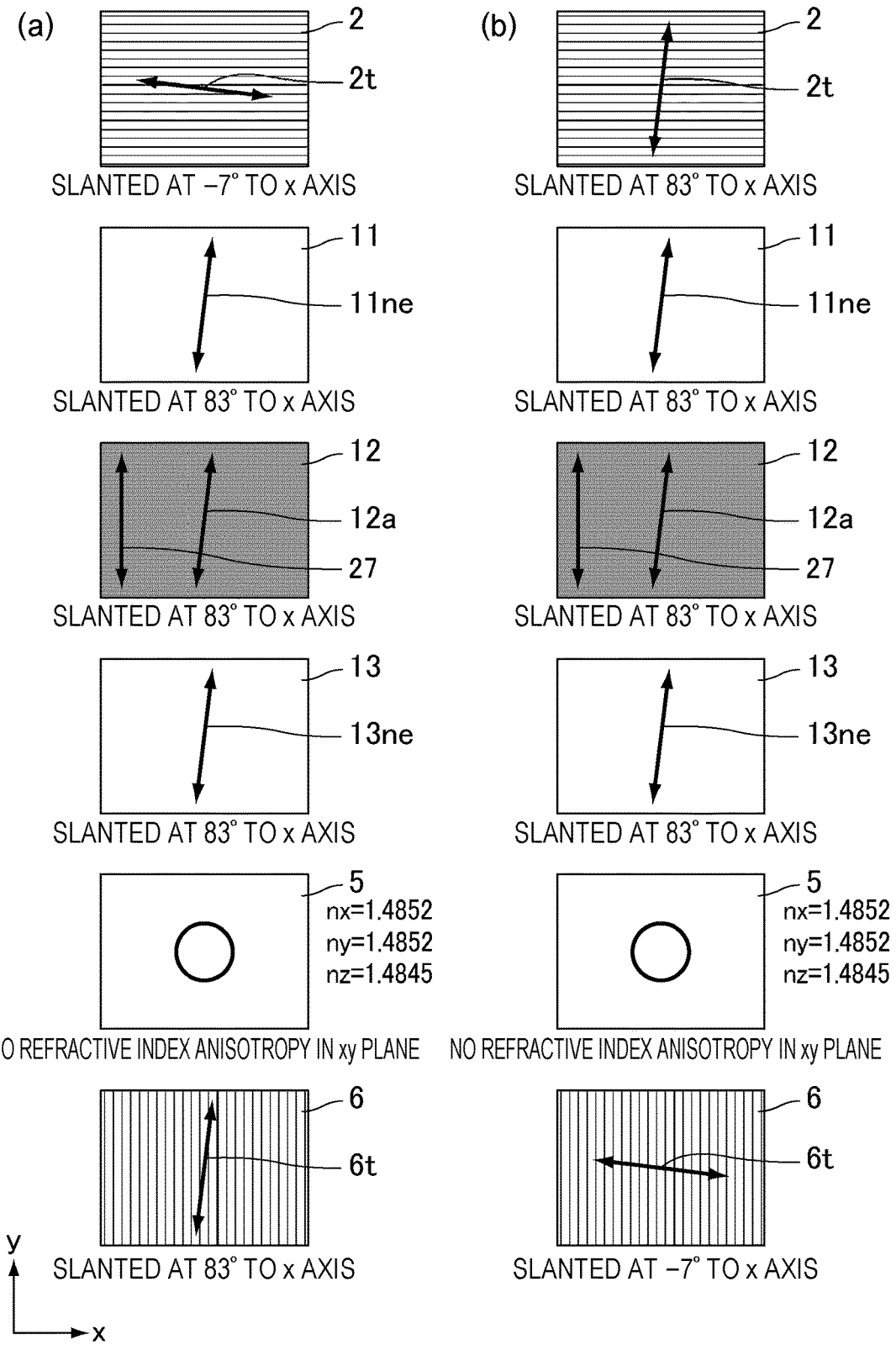
FIGS. 53(a) and 53(b) are schematic diagrams illustrating arrangement (in the axial direction) of the optical axis of each layer of the liquid crystal display device according to the example 9 when viewed from the direction of the z axis.

Arrangement of the optical axis of each layer when viewed from the direction of the z axis in the present example is the same as that in the case of the example 4 except for the absence of the first protective layer between the first substrate and the first polarizer and has two types of arrangement illustrated in FIGS. 53(*a*) and 53(*b*).

Figure 54:
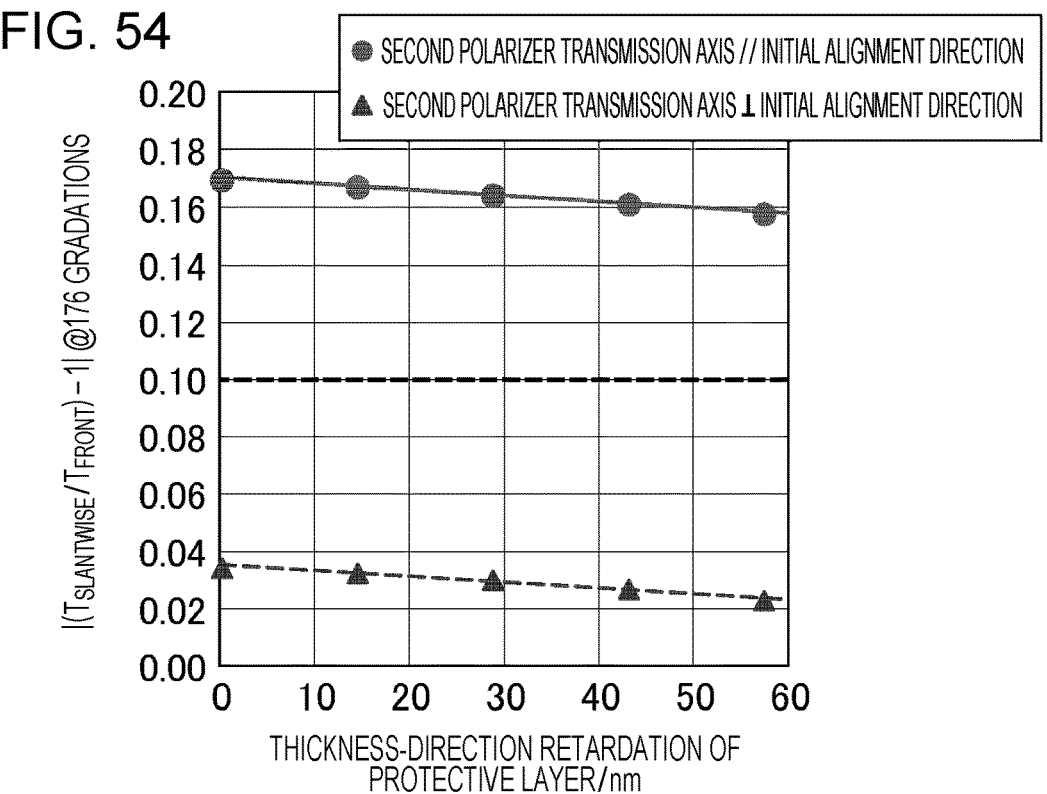
FIG. 54 illustrates a graph in the case of plotting the thickness-direction retardation of a protective layer on the horizontal axis and plotting $|(T_{slantwise}/T_{front})-1|$ on the vertical axis in the example 9 and illustrates the case of first and second optical alignment films having an in-plane retardation of 5 nm.
Figure 55:
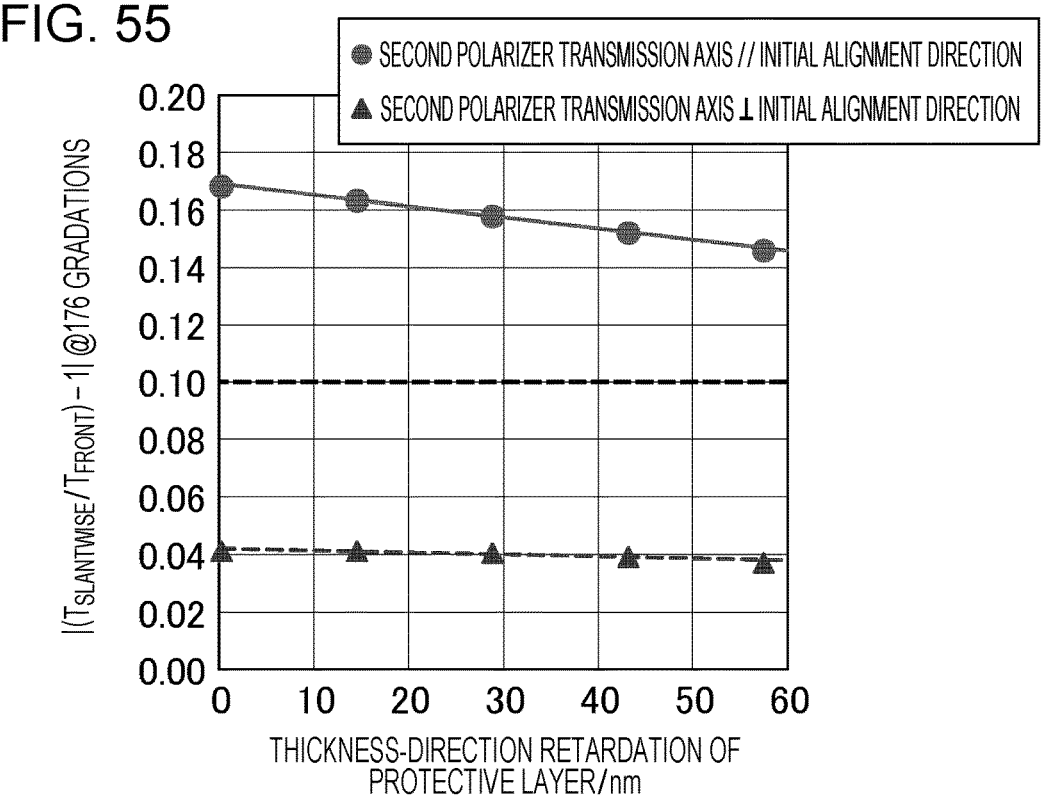
FIG. 55 illustrates a graph in the case of plotting the thickness-direction retardation of the protective layer on the horizontal axis and plotting $|(T_{slantwise}/T_{front})-1|$ on the vertical axis in the example 9 and illustrates the case of the first and second optical alignment films having an in-plane retardation of 10 nm.
Figure 56:
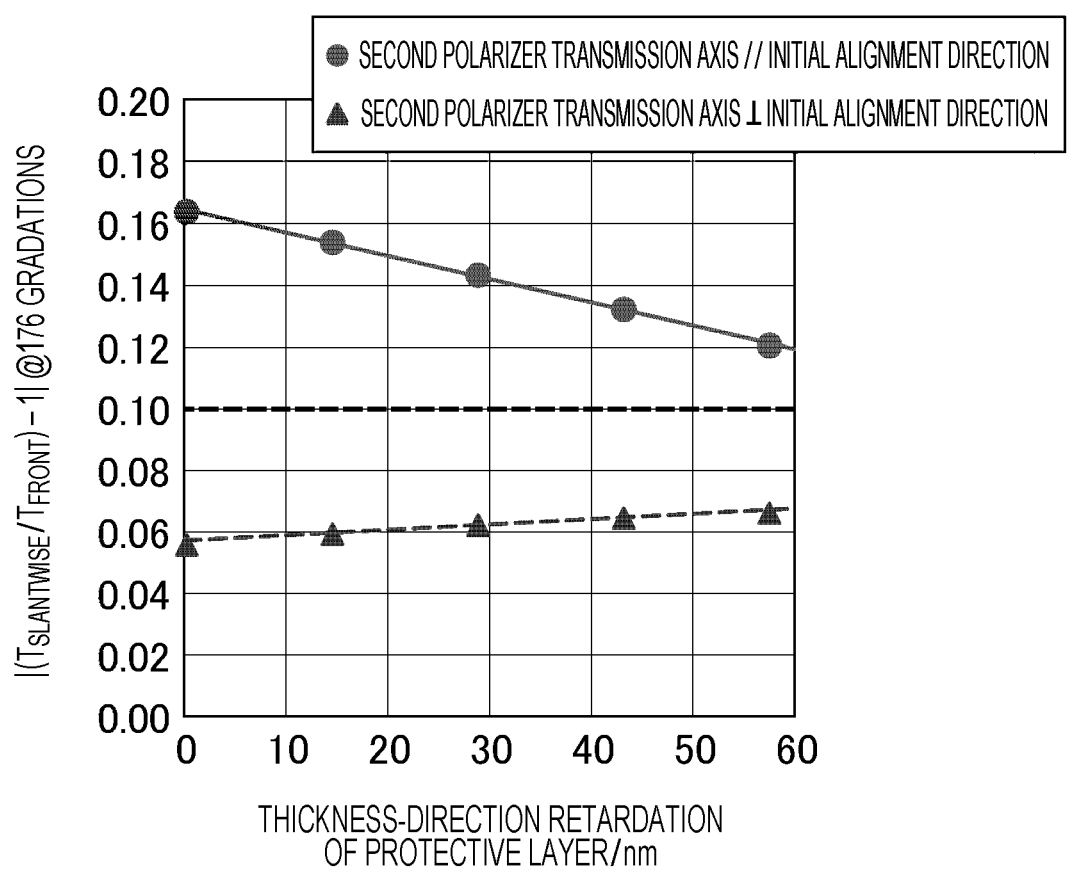
FIG. 56 illustrates a graph in the case of plotting the thickness-direction retardation of the protective layer on the horizontal axis and plotting $|(T_{slantwise}/T_{front})-1|$ on the vertical axis in the example 9 and illustrates the case of the first and second optical alignment films having an in-plane retardation of 20 nm.
Figure 57:
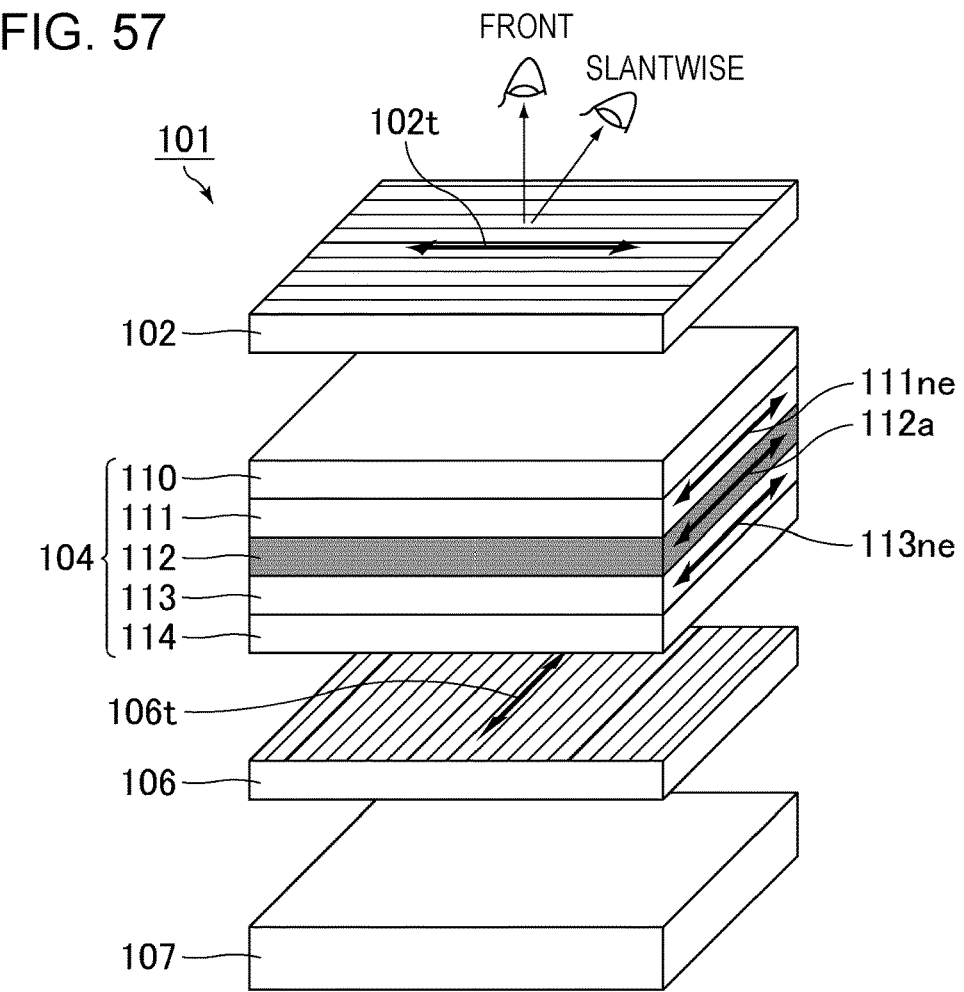
FIG. 57 is a schematic perspective view of a liquid crystal display device according to comparative embodiment 1 reviewed by the inventors of the present invention.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 54 to 56 illustrate graphs in the case of plotting the thickness-direction retardation of the protective layer on the horizontal axis and plotting |(T$_{slantwise}$/T$_{front}$)−1| on the vertical axis in the example 9. FIGS. 54, 55, and 56 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, |(T$_{slantwise}$/T$_{front}$)−1| is calculated from the normalized transmittance that yields the maximum value of |(T$_{slantwise}$/T$_{front}$)−1| of the three normalized transmittances. In FIGS. 54 to 56, as the vertical axis, that is, |(T$_{slantwise}$/T$_{front}$)−1|, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 54 to 56, it is understood that the perpendicular relationship between the transmission axis 6*t* of the second polarizer 6 and the extraordinary light refractive index axes 11*ne* and 13*ne* of the optical alignment films 11 and 13, that is, the initial alignment direction 12*a* of liquid crystal molecules, has a more favorable viewing angle than the parallel relationship therebetween in the entire range of the thickness-direction retardation of the protective layer 5 confirmed by calculation (greater than or equal to 0 nm and less than or equal to 56 nm). Thus, in the FFS mode in which the liquid crystal layer has a positive dielectric anisotropy with a protective layer satisfying the relationship nx=ny≥nz existing on only the backlight side as in the present example, arranging the second polarizer on the backlight side to have a transmission axis thereof perpendicular to the initial alignment direction of liquid crystal molecules can provide a liquid crystal display panel that has a favorable viewing angle in the case of using a self-assembled optical alignment film.

Example 10

Basic configuration: FFS mode, optical alignment film, negative liquid crystal, protective layer satisfying the relationship nx=ny≥nz on each of observer side and backlight side (thickness-direction retardation of 0 nm to 56 nm).

Figure 59:
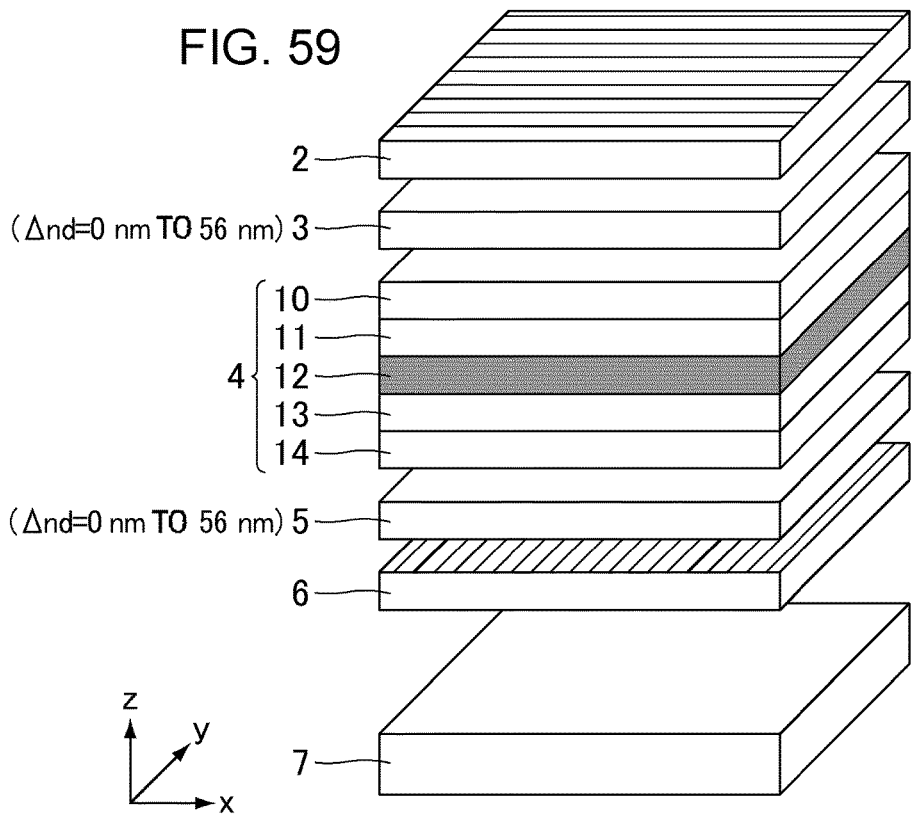
FIG. 59 is a schematic perspective view of a liquid crystal display device according to example 10.
Figure 60:
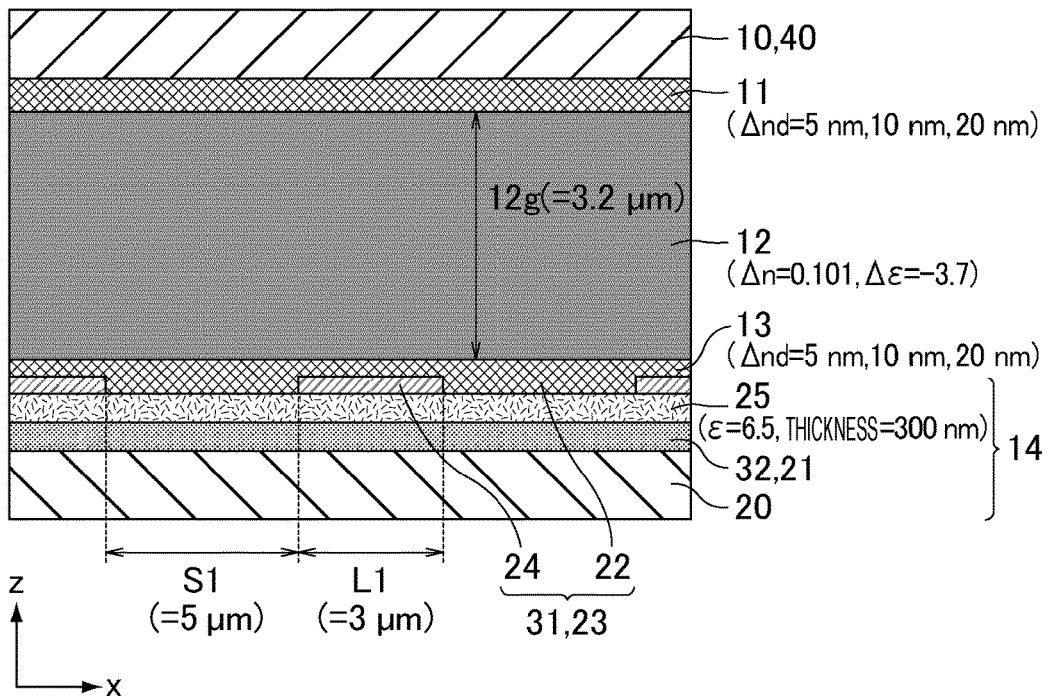
FIG. 60 is a schematic sectional view of a liquid crystal panel included in the liquid crystal display device according to the example 10.

FIG. 59 is a schematic perspective view of a liquid crystal display device according to example 10. FIG. 60 is a schematic sectional view of a liquid crystal panel included in the liquid crystal display device according to the example 10.

The present example is the same as the example 6 except for the following points.

As illustrated in FIG. 59, in order to limit the range of the thickness-direction retardation of each of the protective layers 3 and 5, each of the protective layers 3 and 5 has the thickness d changed in the range of 0 μm to 80 μm and has a thickness-direction retardation changed in the range of 0 nm to 56 nm. The thickness-direction retardations of the protective layers 3 and 5 have the same value. The case of the thickness of each of the protective layers 3 and 5 being 0 μm is optically equivalent to the case of arranging an optically isotropic protective layer instead of each of the protective layers 3 and 5. As illustrated in FIG. 60, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The liquid crystal layer 12 has the refractive index anisotropy Δn of 0.101 and the dielectric anisotropy Δε of −3.7. The present example assumes the embodiment 1 with the first protective layer satisfying the relationship nx=ny≥nz disposed on the observer side and the second protective layer satisfying the relationship nx=ny≥nz disposed on the backlight side.

Arrangement of the optical axis of each layer when viewed from the direction of the z axis in the present example is the same as that in the case of the example 6 and has two types of arrangement illustrated in FIGS. 35(*a*) and 35(*b*).

Figure 61:
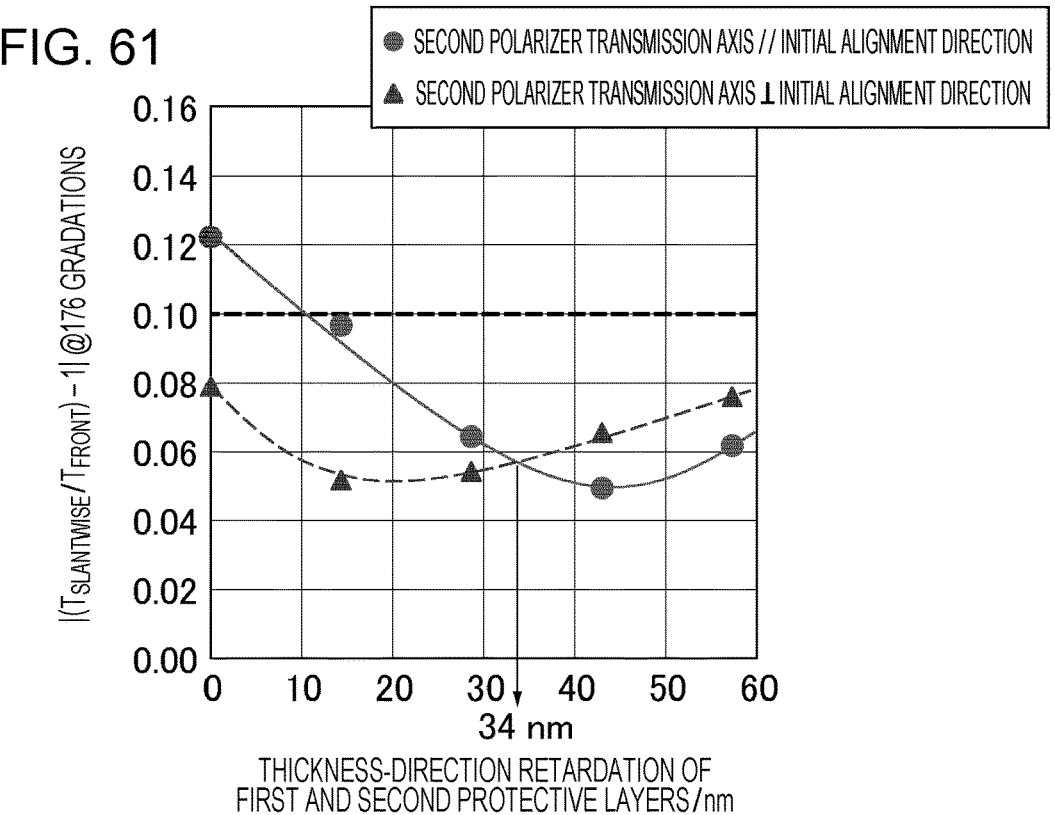
FIG. 61 illustrates a graph in the case of plotting the thickness-direction retardation of first and second protective layers on the horizontal axis and plotting $|(T_{slantwise}/T_{front})-1|$ on the vertical axis in the example 10 and illustrates the case of first and second optical alignment films having an in-plane retardation of 5 nm.
Figure 62:
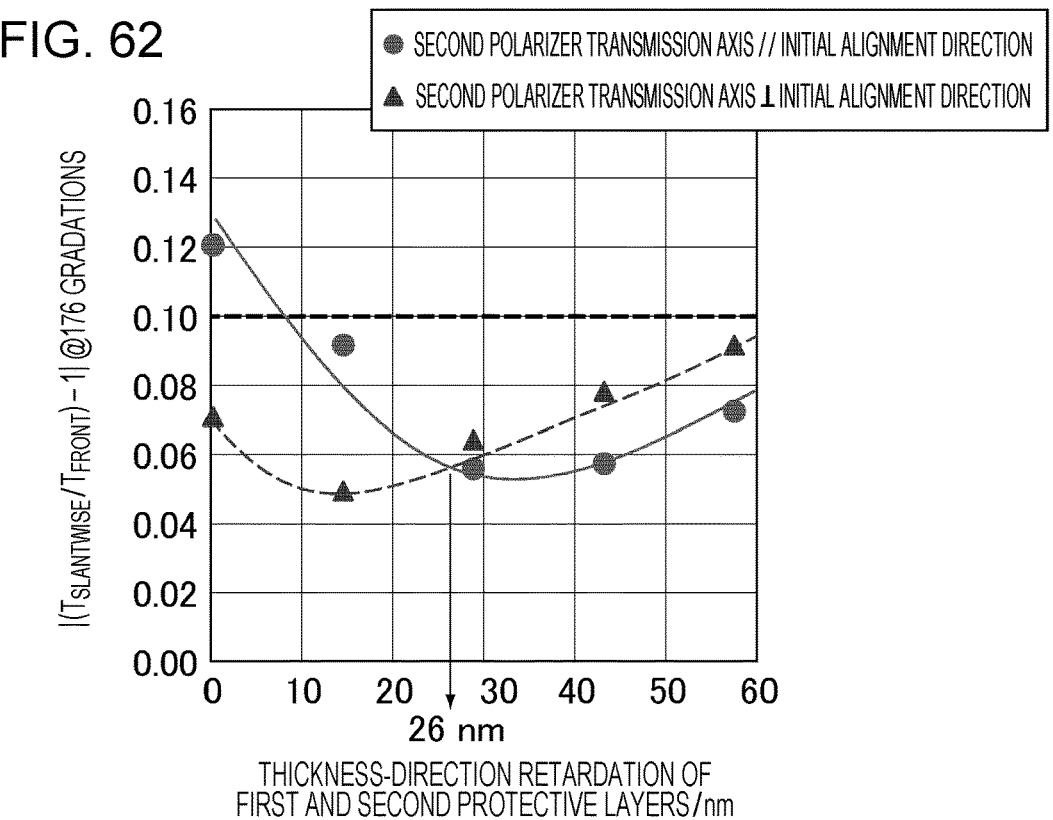
FIG. 62 illustrates a graph in the case of plotting the thickness-direction retardation of the first and second protective layers on the horizontal axis and plotting $|(T_{slantwise}/T_{front})-1|$ on the vertical axis in the example 10 and illustrates the case of the first and second optical alignment films having an in-plane retardation of 10 nm.
Figure 63:
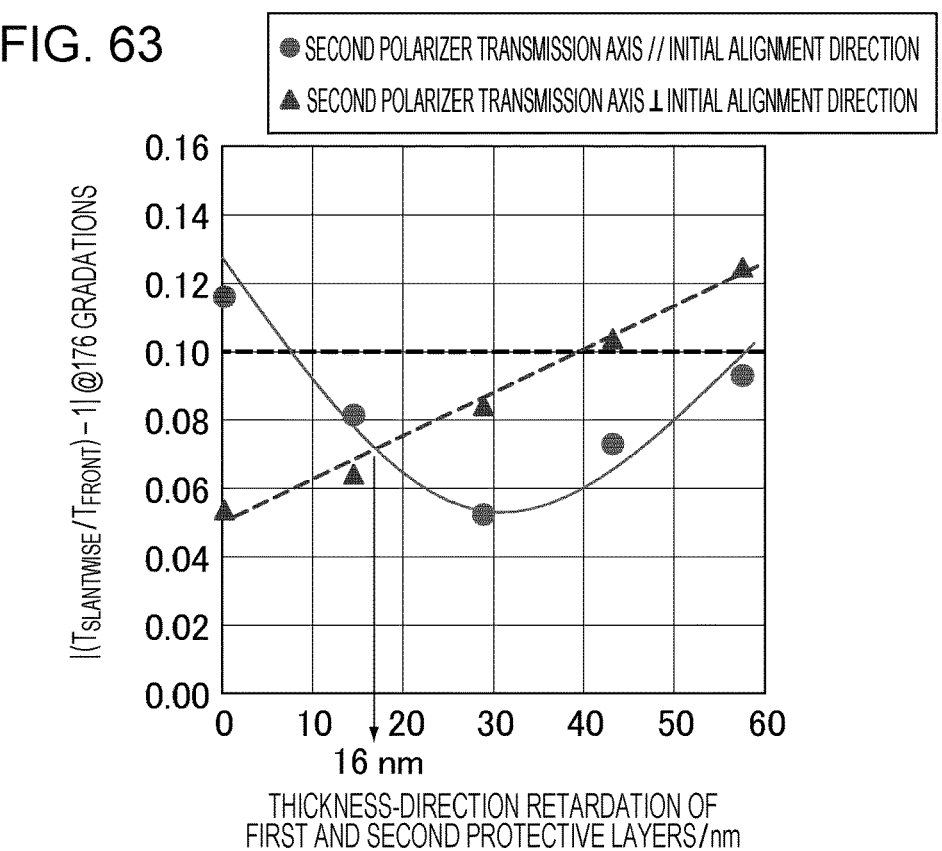
FIG. 63 illustrates a graph in the case of plotting the thickness-direction retardation of the first and second protective layers on the horizontal axis and plotting $|(T_{slantwise}/T_{front})-1|$ on the vertical axis in the example 10 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 61 to 63 illustrate graphs in the case of plotting the thickness-direction retardation of the first and second protective layers on the horizontal axis and plotting |(T$_{slantwise}$/T$_{front}$)−1| on the vertical axis in the example 10. FIGS. 61, 62, and 63 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, |(T$_{slantwise}$/T$_{front}$)−1| is calculated from the normalized transmittance that yields the maximum value of |(T$_{slantwise}$/T$_{front}$)−1| of the three normalized transmittances. In FIGS. 61 to 63, as the vertical axis, that is, |(T$_{slantwise}$/T$_{front}$)−1|, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 61 to 63, while the perpendicular relationship between the transmission axis 6*t* of the second polarizer 6 and the extraordinary light refractive index axes 11*ne* and 13*ne* of the optical alignment films 11 and 13, that is, the initial alignment direction 12*a* of liquid crystal molecules, has a more favorable viewing angle than the parallel relationship therebetween in an area where the protective layers 3 and 5 have a small thickness-direction retardation, it is understood that the viewing angle is more favorable in the parallelism of the transmission axis 6*t* of the second polarizer 6 and the initial alignment direction 12*a* of liquid crystal molecules than in the case of the perpendicularity thereof when the thickness-direction retardations of the protective layers 3 and 5 are greater than or equal to a certain value.

The thickness-direction retardation of the first and second protective layers 3 and 5 at a point of a favorable viewing angle and of inversion of the relationship between the transmission axis 6*t* of the second polarizer 6 and the initial alignment direction 12*a* of liquid crystal molecules is read from FIGS. 61 to 63, and the value of the thickness-direction retardation is plotted on a graph on the vertical axis and the in-plane retardation of the first and second optical alignment films 11 and 13 at that time on the horizontal axis. This graph is illustrated in FIG. 64.

Figure 64:
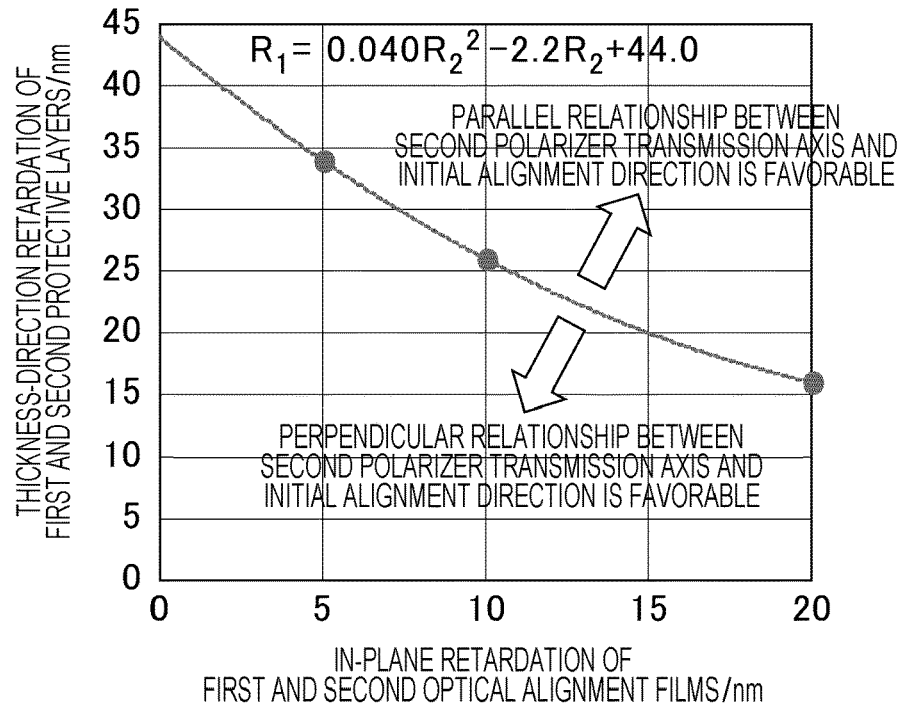
FIG. 64 is a graph acquired by reading, from FIGS. 61 to 63, the thickness-direction retardation of the first and second protective layers at a point of a favorable viewing angle and of inversion of the relationship between the transmission axis of a second polarizer and the initial alignment direction of liquid crystal molecules and plotting the value of the thickness-direction retardation on the vertical axis and the in-plane retardation of the first and second optical alignment films at that time on the horizontal axis.

In FIG. 64, given that $R_1$ is the thickness-direction retardation of each of the protective layers 3 and 5 and that $R_2$ is the in-plane retardation of each of the optical alignment films 11 and 13, it is understood that a boundary of a favorable viewing angle and of inversion of the relationship between the transmission axis 6*t* of the second polarizer 6 and the initial alignment direction 12*a* of liquid crystal molecules can be approximated by a curve of $R_1=0.040R_2^2-2.2R_2+44.0$. Thus, in the FFS mode in which the liquid crystal layer has a negative dielectric anisotropy with a protective layer satisfying the relationship nx=ny≥nz existing on each of the observer side and the backlight side as in the present example, the following optical design can provide a liquid crystal display panel that has a favorable viewing angle in the case of using a self-assembled optical alignment film.

i) In the case of satisfying $R_1 \le 0.040R_2^2-2.2R_2+44.0$, the second polarizer on the backlight side is arranged to have a transmission axis thereof perpendicular to the initial alignment direction of liquid crystal molecules.

ii) In the case of satisfying $R_1 \ge 0.040R_2^2-2.2R_2+44.0$, the second polarizer on the backlight side is arranged to have a transmission axis thereof parallel to the initial alignment direction of liquid crystal molecules.

Example 11

Basic configuration: FFS mode, optical alignment film, negative liquid crystal, protective layer satisfying the relationship nx=ny≥nz on only observer side (thickness-direction retardation of 0 nm to 56 nm).

Figure 65:
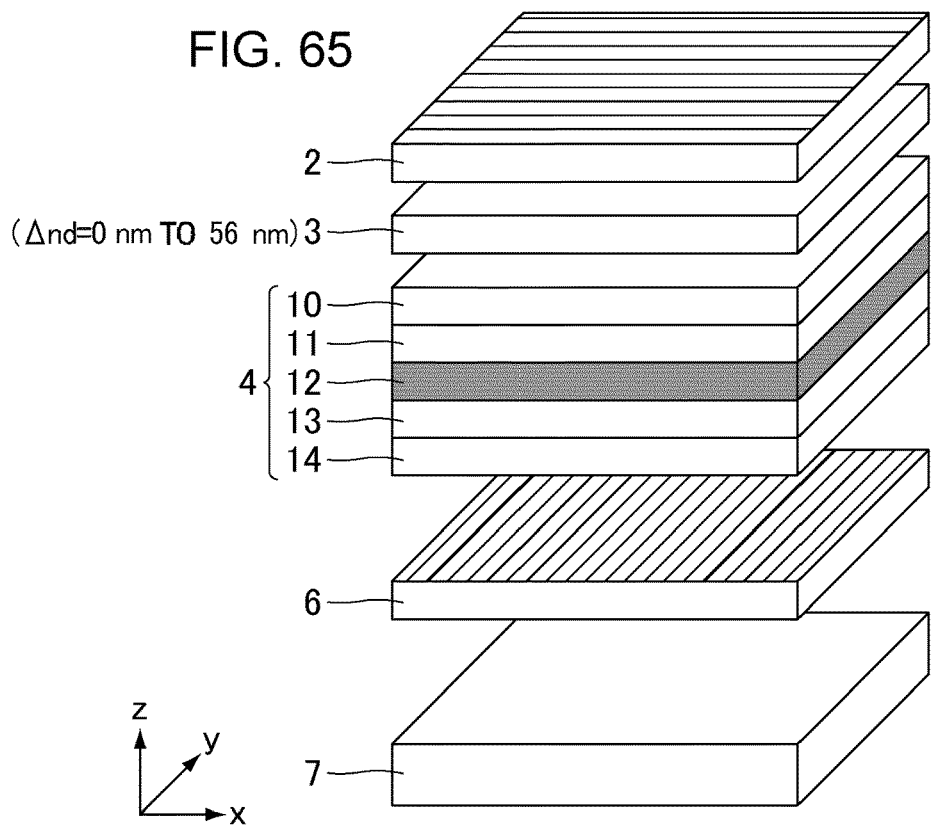
FIG. 65 is a schematic perspective view of a liquid crystal display device according to example 11.
Figure 66:
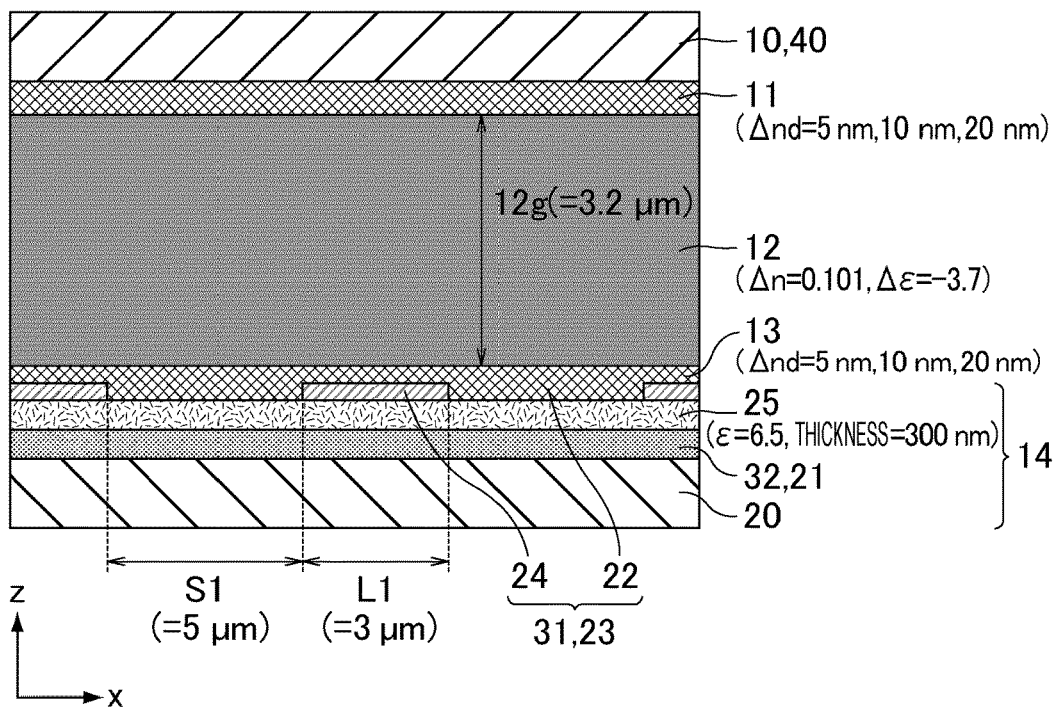
FIG. 66 is a schematic sectional view of a liquid crystal panel included in the liquid crystal display device according to the example 11.
Figure 67:
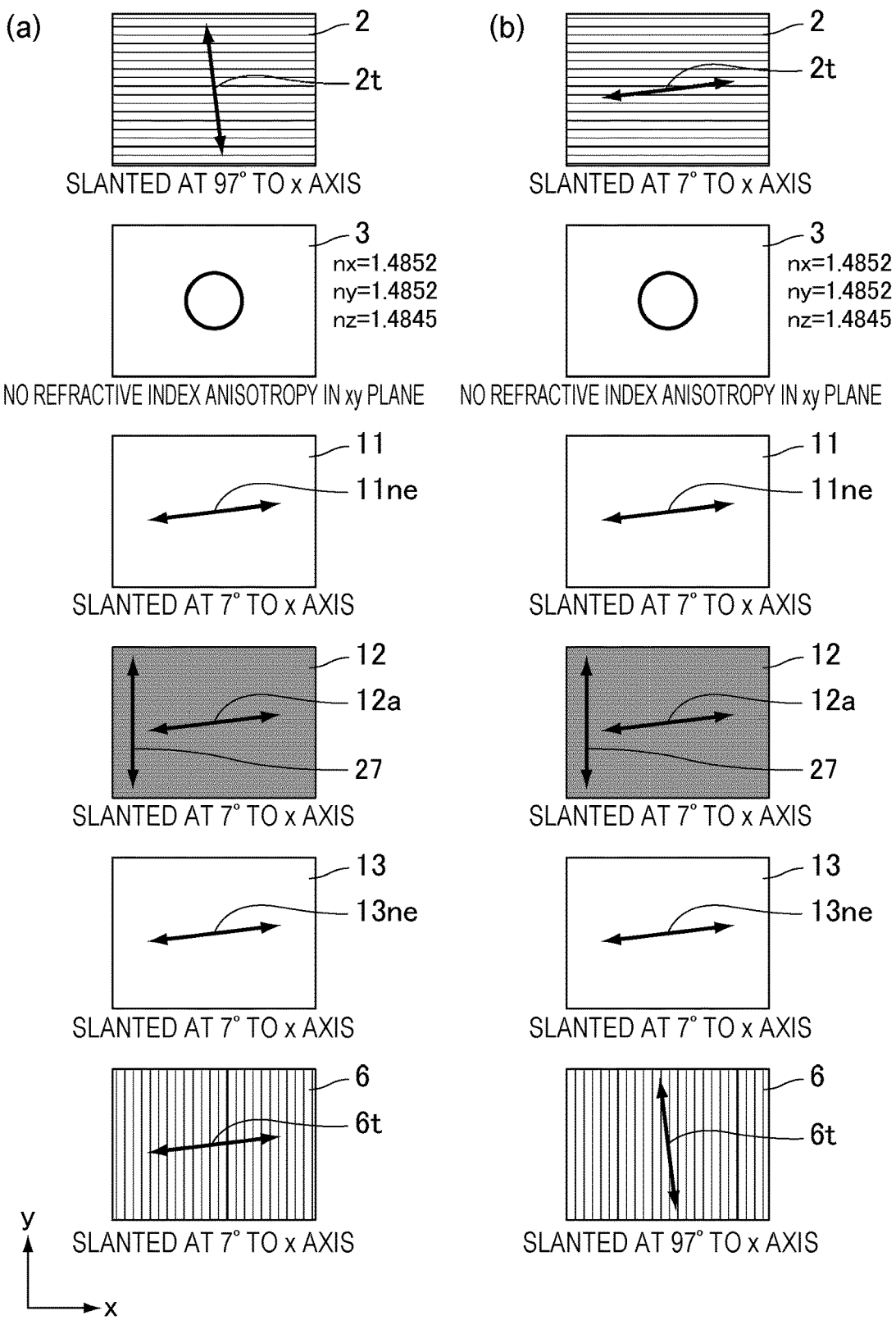
FIGS. 67(a) and 67(b) are schematic diagrams illustrating arrangement (in the axial direction) of the optical axis of each layer of the liquid crystal display device according to the example 11 when viewed from the direction of the z axis.

FIG. 65 is a schematic perspective view of a liquid crystal display device according to example 11. FIG. 66 is a schematic sectional view of a liquid crystal panel included in the liquid crystal display device according to the example 11. FIGS. 67(*a*) and 67(*b*) are schematic diagrams illustrating arrangement (in the axial direction) of the optical axis of each layer of the liquid crystal display device according to the example 11 when viewed from the direction of the z axis.

The present example is the same as the example 4 except for the following points.

As illustrated in FIG. 65, only the protective layer 3 is disposed between the first substrate 10 and the first polarizer 2 on the observer side. That is, the second protective layer 5 between the second substrate 14 and the second polarizer 6 on the backlight 7 side is removed from the configuration of the example 4. In order to limit the range of the thickness-direction retardation of the protective layer 3, the protective layer 3 has the thickness d changed in the range of 0 μm to 80 μm and has a thickness-direction retardation changed in the range of 0 nm to 56 nm. The case of the thickness of the protective layer 3 being 0 μm is optically equivalent to the case of arranging an optically isotropic protective layer instead of the protective layer 3. As illustrated in FIG. 66, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The liquid crystal layer 12 has the refractive index anisotropy Δn of 0.101 and the dielectric anisotropy Δε of −3.7. The thickness 12*g* of the liquid crystal layer 12 is 3.2 μm which is the same as that in the example 4. The configuration according to the present example is optically equivalent to a configuration in which an optically isotropic second protective layer is arranged between the second substrate 14 and the second polarizer 6 on the backlight 7 side in the present example. Accordingly, the present example assumes the embodiment 2 with the first protective layer satisfying the relationship nx=ny≥nz disposed on the observer side and the optically isotropic second protective layer disposed on the backlight side.

Arrangement of the optical axis of each layer when viewed from the direction of the z axis in the present example is the same as that in the case of the example 6 except for the absence of the second protective layer between the second substrate and the second polarizer and has two types of arrangement illustrated in FIGS. 67(*a*) and 67(*b*).

Figure 68:
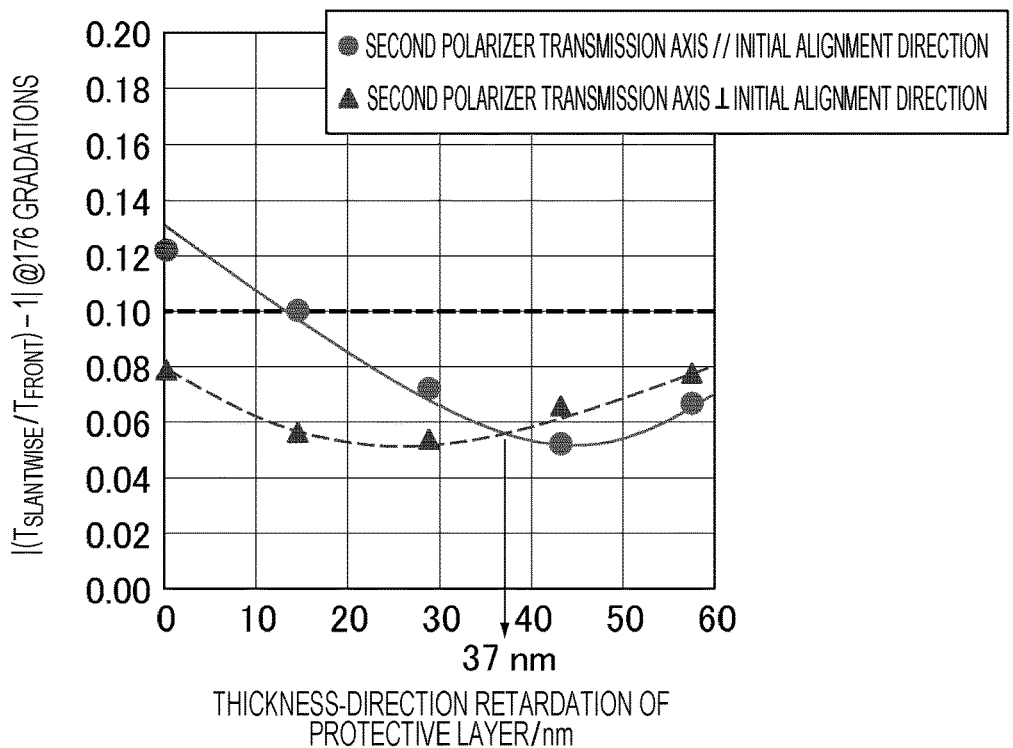
FIG. 68 illustrates a graph in the case of plotting the thickness-direction retardation of a protective layer on the horizontal axis and plotting $|(T_{slantwise}/T_{front})-1|$ on the vertical axis in the example 11 and illustrates the case of first and second optical alignment films having an in-plane retardation of 5 nm.
Figure 69:
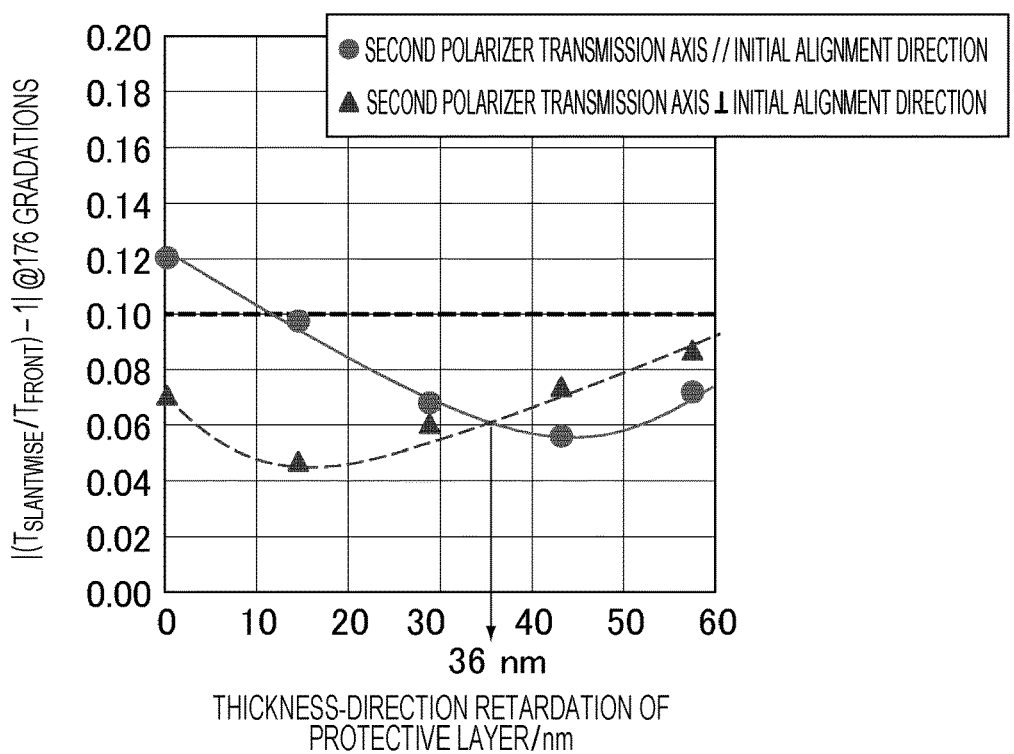
FIG. 69 illustrates a graph in the case of plotting the thickness-direction retardation of the protective layer on the horizontal axis and plotting $|(T_{slantwise}/T_{front})-1|$ on the vertical axis in the example 11 and illustrates the case of the first and second optical alignment films having an in-plane retardation of 10 nm.
Figure 70:
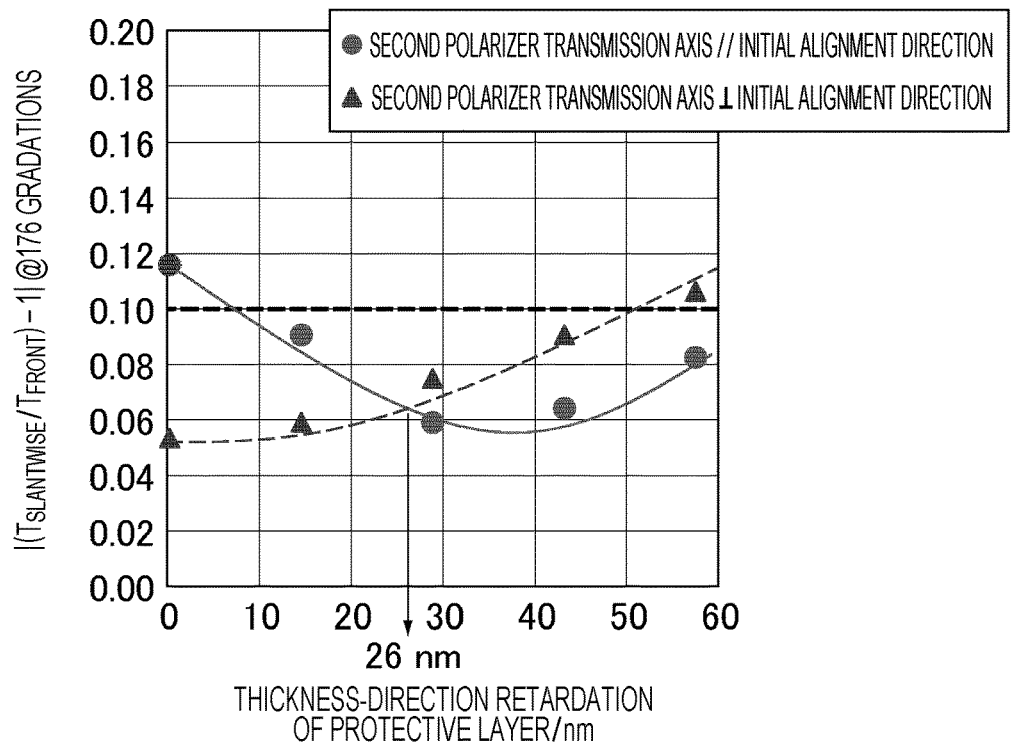
FIG. 70 illustrates a graph in the case of plotting the thickness-direction retardation of the protective layer on the horizontal axis and plotting $|(T_{slantwise}/T_{front})-1|$ on the vertical axis in the example 11 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 68 to 70 illustrate graphs in the case of plotting the thickness-direction retardation of the protective layer on the horizontal axis and plotting $|(T_{slantwise}/T_{front})-1|$ on the vertical axis in the example 11. FIGS. 68, 69, and 70 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 68 to 70, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 68 to 70, while the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in an area where the protective layer 3 has a small thickness-direction retardation, it is understood that the viewing angle is more favorable in the parallelism of the transmission axis 6t of the second polarizer 6 and the initial alignment direction 12a of liquid crystal molecules than in the case of the perpendicularity thereof when the thickness-direction retardation of the protective layer 3 is greater than or equal to a certain value.

The thickness-direction retardation of the protective layer 3 at a point of a favorable viewing angle and of inversion of the relationship between the transmission axis 6t of the second polarizer 6 and the initial alignment direction 12a of liquid crystal molecules is read from FIGS. 68 to 70, and the value of the thickness-direction retardation is plotted on a graph on the vertical axis and the in-plane retardation of the first and second optical alignment films 11 and 13 at that time on the horizontal axis. This graph is illustrated in FIG. 71.

Figure 71:
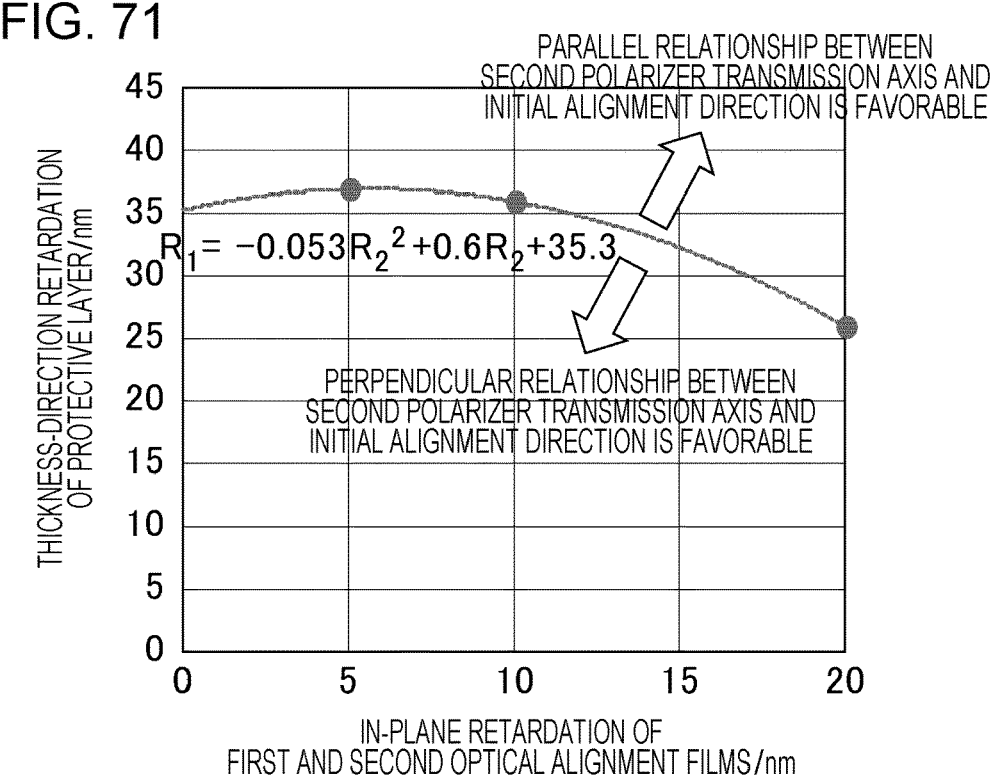
FIG. 71 is a graph acquired by reading, from FIGS. 68 to 70, the thickness-direction retardation of the protective layer at a point of a favorable viewing angle and of inversion of the relationship between the transmission axis of a second polarizer and the initial alignment direction of liquid crystal molecules and plotting the value of the thickness-direction retardation on the vertical axis and the in-plane retardation of the first and second optical alignment films at that time on the horizontal axis.

In FIG. 71, given that $R_1$ is the thickness-direction retardation of the protective layer 3 and that $R_2$ is the in-plane retardation of each of the optical alignment films 11 and 13, it is understood that a boundary of a favorable viewing angle and of inversion of the relationship between the transmission axis 6t of the second polarizer 6 and the initial alignment direction 12a of liquid crystal molecules can be approximated by a curve of $R_1 = -0.053R_2^2 + 0.6R_2 + 35.3$. Thus, in the FFS mode in which the liquid crystal layer has a negative dielectric anisotropy with a protective layer satisfying the relationship nx=ny≥nz existing on only the observer side as in the present example, the following optical design can provide a liquid crystal display panel that has a favorable viewing angle in the case of using a self-assembled optical alignment film.

i) In the case of satisfying $R_1 \leq -0.053R_2^2 + 0.6R_2 + 35.3$, the second polarizer on the backlight side is arranged to have a transmission axis thereof perpendicular to the initial alignment direction of liquid crystal molecules.

ii) In the case of satisfying $R_1 \geq -0.053R_2^2 + 0.6R_2 + 35.3$, the second polarizer on the backlight side is arranged to have a transmission axis thereof parallel to the initial alignment direction of liquid crystal molecules.

Example 12

Basic configuration: FFS mode, optical alignment film, negative liquid crystal, protective layer satisfying the relationship nx=ny≥nz on only backlight side (thickness-direction retardation of 0 nm to 56 nm).

Figure 72:
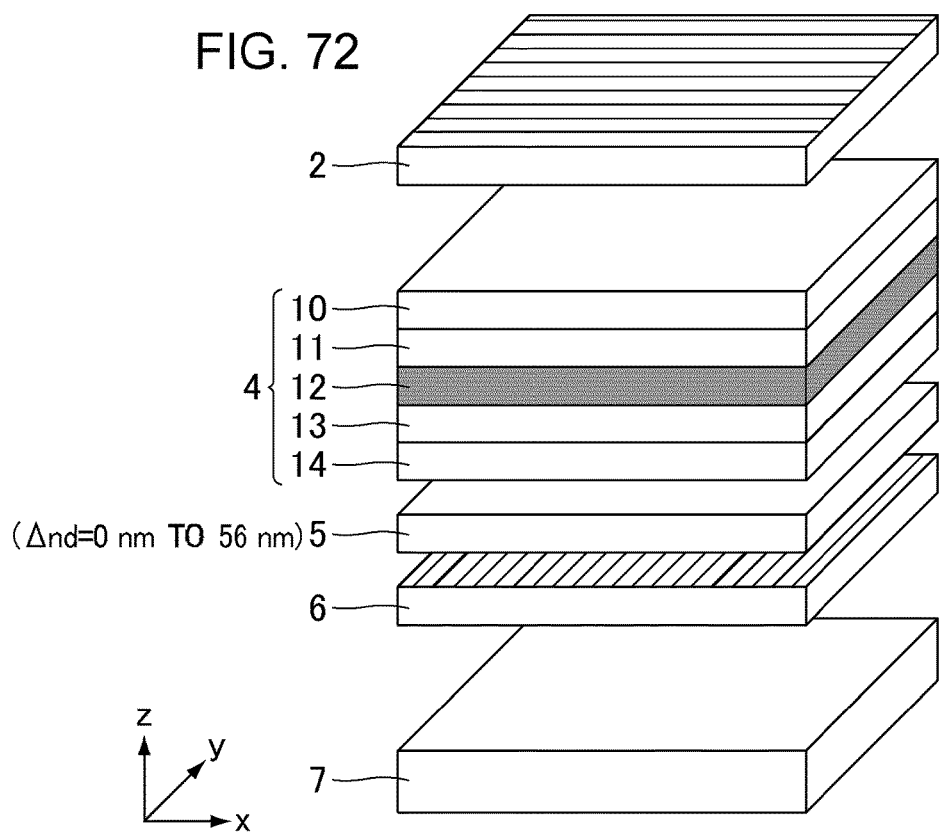
FIG. 72 is a schematic perspective view of a liquid crystal display device according to example 12.
Figure 73:
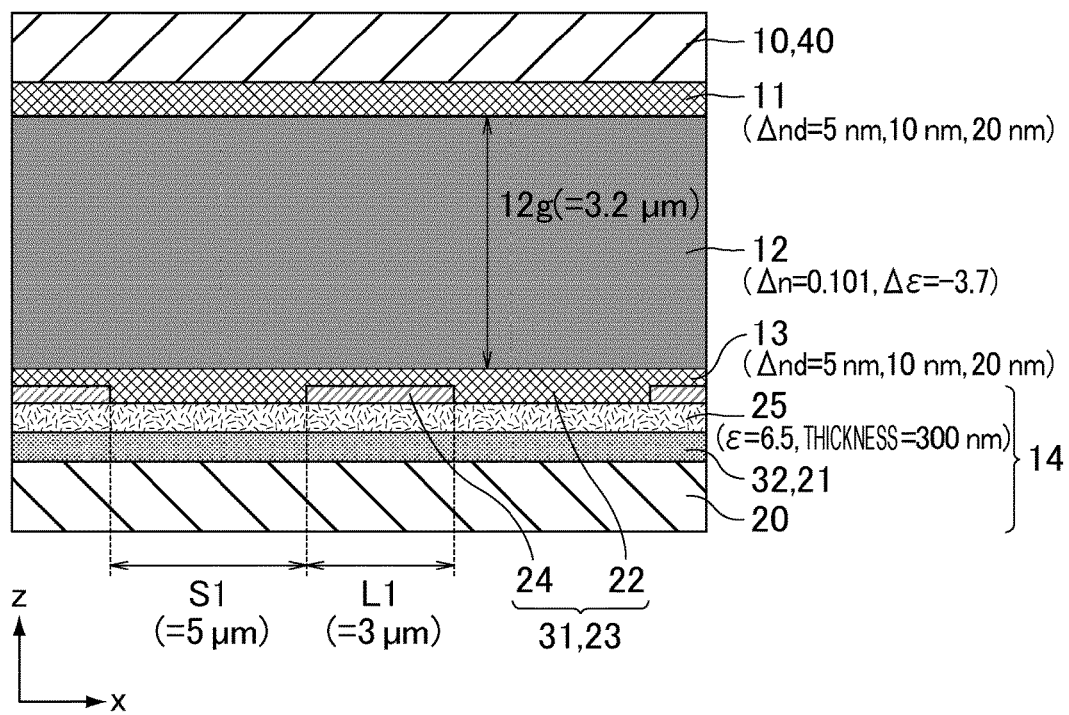
FIG. 73 is a schematic sectional view of a liquid crystal panel included in the liquid crystal display device according to the example 12.
Figure 74:
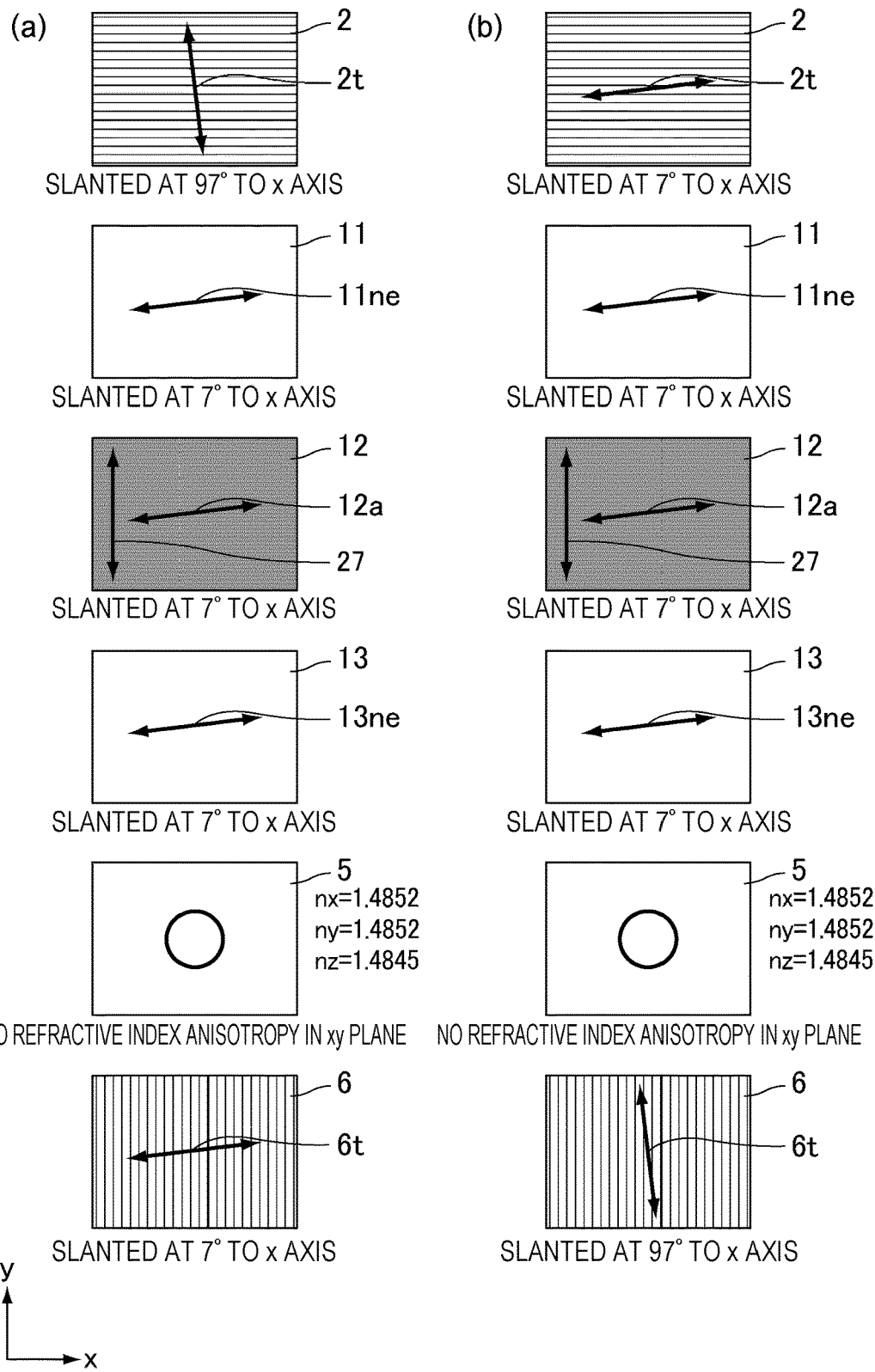
FIGS. 74(a) and 74(b) are schematic diagrams illustrating arrangement (in the axial direction) of the optical axis of each layer of the liquid crystal display device according to the example 12 when viewed from the direction of the z axis.

FIG. 72 is a schematic perspective view of a liquid crystal display device according to example 12. FIG. 73 is a schematic sectional view of a liquid crystal panel included in the liquid crystal display device according to the example 12. FIGS. 74(a) and 74(b) are schematic diagrams illustrating arrangement (in the axial direction) of the optical axis of each layer of the liquid crystal display device according to the example 12 when viewed from the direction of the z axis.

The present example is the same as the example 4 except for the following points.

As illustrated in FIG. 72, only the protective layer 5 is disposed between the second substrate 14 and the second polarizer 6 on the backlight 7 side. That is, the first protective layer 3 between the first substrate 10 and the first polarizer 2 on the observer side is removed from the configuration of the example 4. In order to limit the range of the thickness-direction retardation of the protective layer 5, the protective layer 5 has the thickness d changed in the range of 0 µm to 80 µm and has a thickness-direction retardation changed in the range of 0 nm to 56 nm. The case of the thickness of the protective layer 5 being 0 µm is optically equivalent to the case of arranging an optically isotropic protective layer instead of the protective layer 5. As illustrated in FIG. 73, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The liquid crystal layer 12 has the refractive index anisotropy Δn of 0.101 and the dielectric anisotropy Δε of −3.7. The thickness 12g of the liquid crystal layer 12 is 3.2 µm which is the same as that in the example 4. The configuration according to the present example is optically equivalent to a configuration in which an optically isotropic first protective layer is arranged between the first substrate 10 and the first polarizer 2 on the observer side in the present example. Accordingly, the present example assumes the embodiment 3 with the optically isotropic first protective layer disposed on the observer side and the second protective layer satisfying the relationship nx=ny≥nz disposed on the backlight side.

Arrangement of the optical axis of each layer when viewed from the direction of the z axis in the present example is the same as that in the case of the example 6 except for the absence of the first protective layer between the first substrate and the first polarizer and has two types of arrangement illustrated in FIGS. 74(a) and 74(b).

Figure 75:
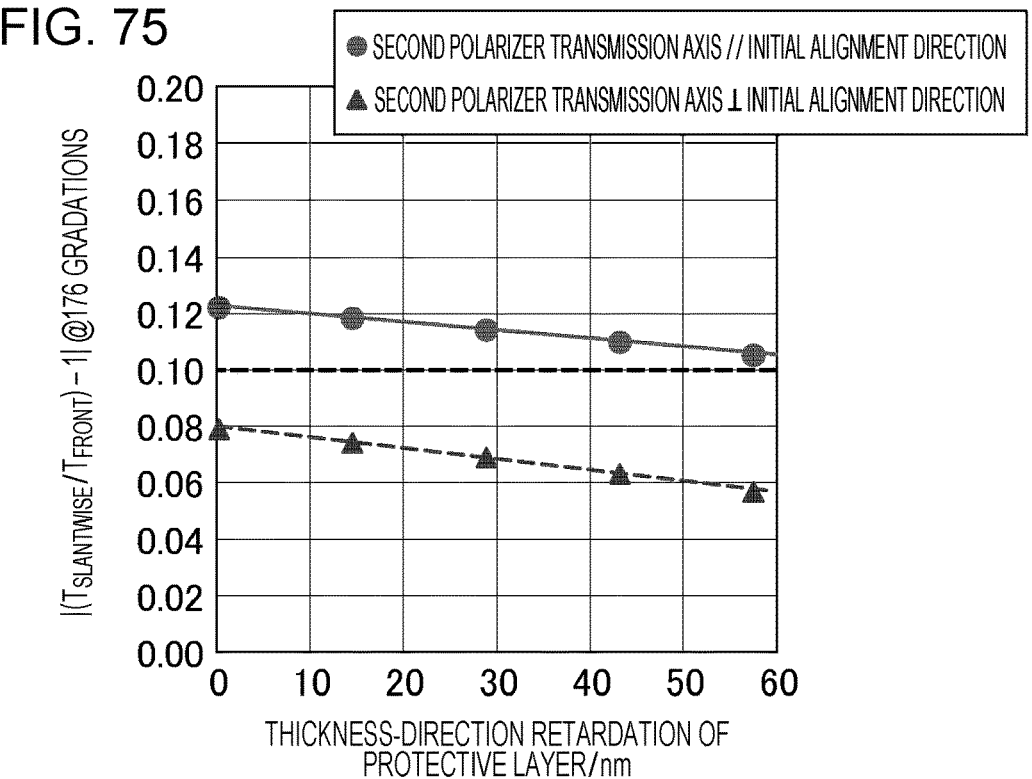
FIG. 75 illustrates a graph in the case of plotting the thickness-direction retardation of a protective layer on the horizontal axis and plotting $|(T_{slantwise}/T_{front})-1|$ on the vertical axis in the example 12 and illustrates the case of first and second optical alignment films having an in-plane retardation of 5 nm.
Figure 76:
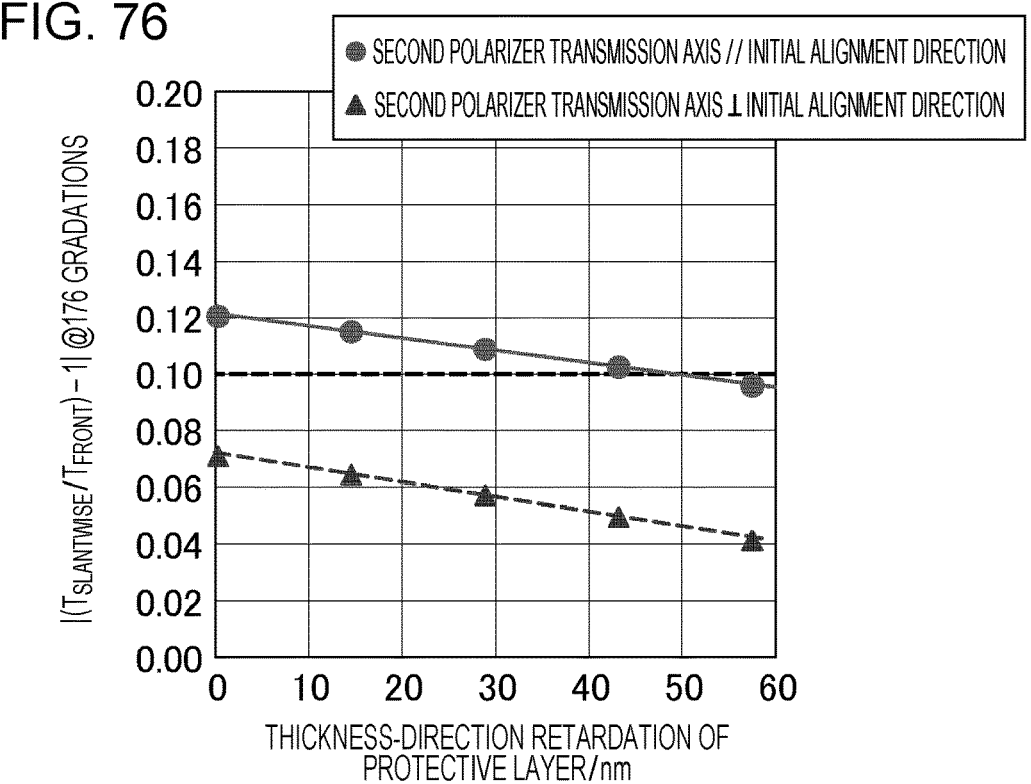
FIG. 76 illustrates a graph in the case of plotting the thickness-direction retardation of the protective layer on the horizontal axis and plotting $|(T_{slantwise}/T_{front})-1|$ on the vertical axis in the example 12 and illustrates the case of the first and second optical alignment films having an in-plane retardation of 10 nm.
Figure 77:
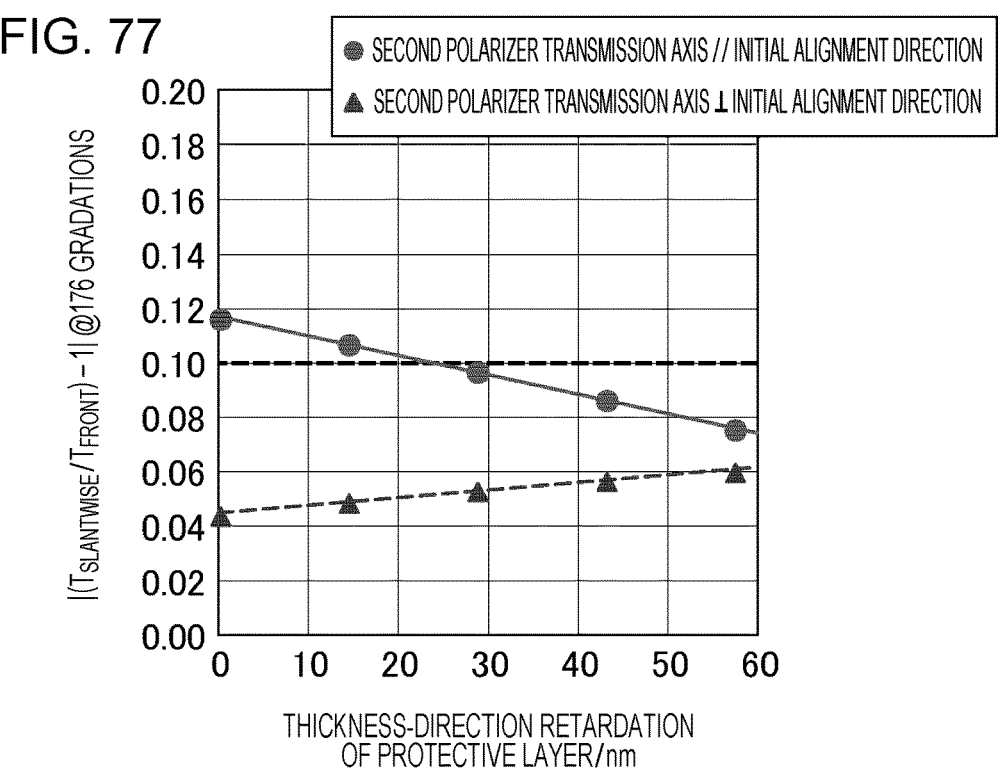
FIG. 77 illustrates a graph in the case of plotting the thickness-direction retardation of the protective layer on the horizontal axis and plotting $|(T_{slantwise}/T_{front})-1|$ on the vertical axis in the example 12 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 75 to 77 illustrate graphs in the case of plotting the thickness-direction retardation of the protective layer on the horizontal axis and plotting $|(T_{slantwise}/T_{front})-1|$ on the vertical axis in the example 12. FIGS. 75, 76, and 77 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 75 to 77, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 75 to 77, it is understood that the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in the entire range of the thickness-direction retardation of the protective layer 5 confirmed by calculation (greater than or equal to 0 nm and less than or equal to 56 nm). Thus, in the FFS mode in which the liquid crystal layer has a negative dielectric anisotropy with a protective layer satisfying the relationship nx=ny≥nz existing on only the backlight side as in the present example, arranging the second polarizer on the backlight side to have a transmission axis thereof perpendicular to the initial alignment direction of liquid crystal molecules can provide a liquid crystal display panel that has a favorable viewing angle in the case of using a self-assembled optical alignment film.

Example 13

Basic configuration: IPS mode, optical alignment film, positive liquid crystal, protective layer satisfying the relationship nx=ny≥nz on each of observer side and backlight side (thickness-direction retardation of 0 nm to 56 nm).

Figure 78:
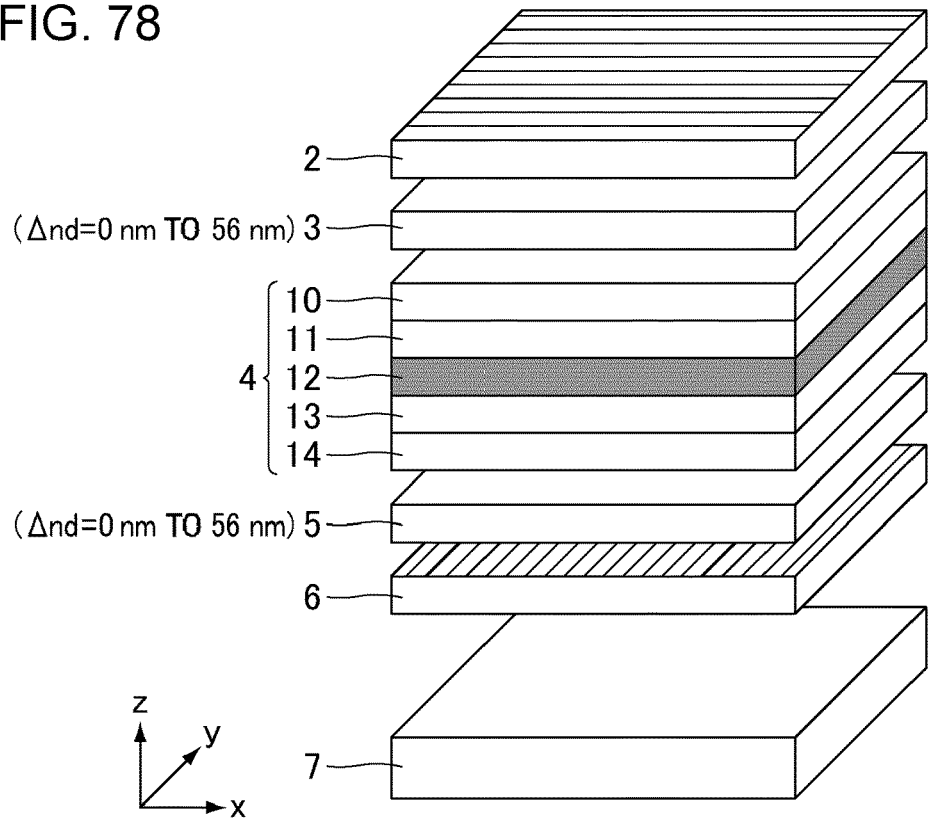
FIG. 78 is a schematic perspective view of a liquid crystal display device according to example 13.
Figure 79:
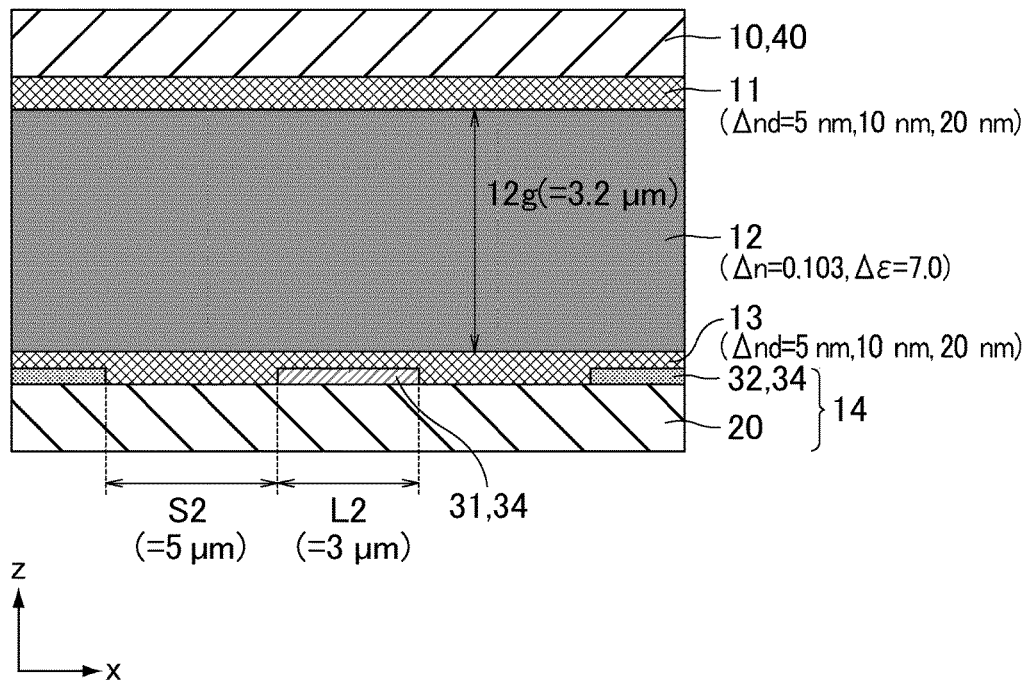
FIG. 79 is a schematic sectional view of a liquid crystal panel included in the liquid crystal display device according to the example 13.

FIG. 78 is a schematic perspective view of a liquid crystal display device according to example 13. FIG. 79 is a schematic sectional view of a liquid crystal panel included in the liquid crystal display device according to the example 13.

The present example is the same as the example 5 except for the following points.

As illustrated in FIG. 78, in order to limit the range of the thickness-direction retardation of each of the protective layers 3 and 5, each of the protective layers 3 and 5 has the thickness d changed in the range of 0 μm to 80 μm and has a thickness-direction retardation changed in the range of 0 nm to 56 nm. The thickness-direction retardations of the protective layers 3 and 5 have the same value. The case of the thickness of each of the protective layers 3 and 5 being 0 μm is optically equivalent to the case of arranging an optically isotropic protective layer instead of each of the protective layers 3 and 5. As illustrated in FIG. 79, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The present example assumes the embodiment 1 with the first protective layer satisfying the relationship nx=ny≥nz disposed on the observer side and the second protective layer satisfying the relationship nx=ny≥nz disposed on the backlight side.

Arrangement of the optical axis of each layer when viewed from the direction of the z axis in the present example is the same as that in the case of the fourth and example 5s and has two types of arrangement illustrated in FIGS. 28(a) and 28(b).

Figure 80:
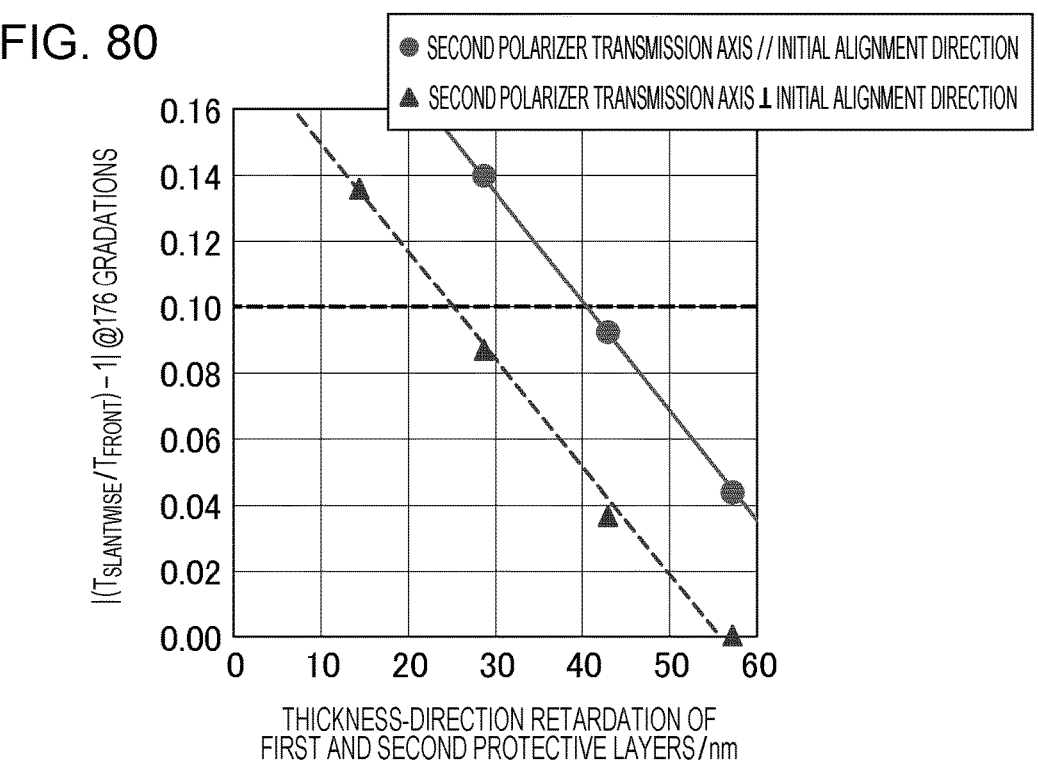
FIG. 80 illustrates a graph in the case of plotting the thickness-direction retardation of first and second protective layers on the horizontal axis and plotting $|(T_{slantwise}/T_{front})-1|$ on the vertical axis in the example 13 and illustrates the case of first and second optical alignment films having an in-plane retardation of 5 nm.
Figure 81:
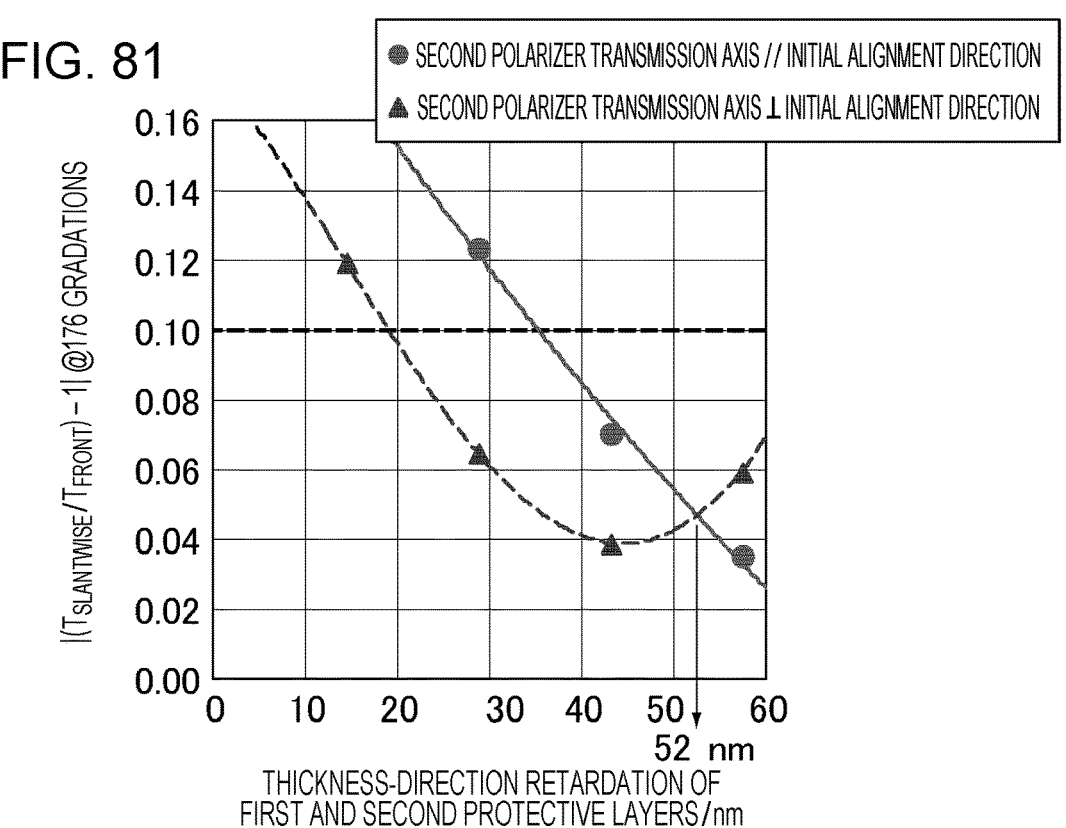
FIG. 81 illustrates a graph in the case of plotting the thickness-direction retardation of the first and second protective layers on the horizontal axis and plotting $|(T_{slantwise}/T_{front})-1|$ on the vertical axis in the example 13 and illustrates the case of the first and second optical alignment films having an in-plane retardation of 10 nm.
Figure 82:
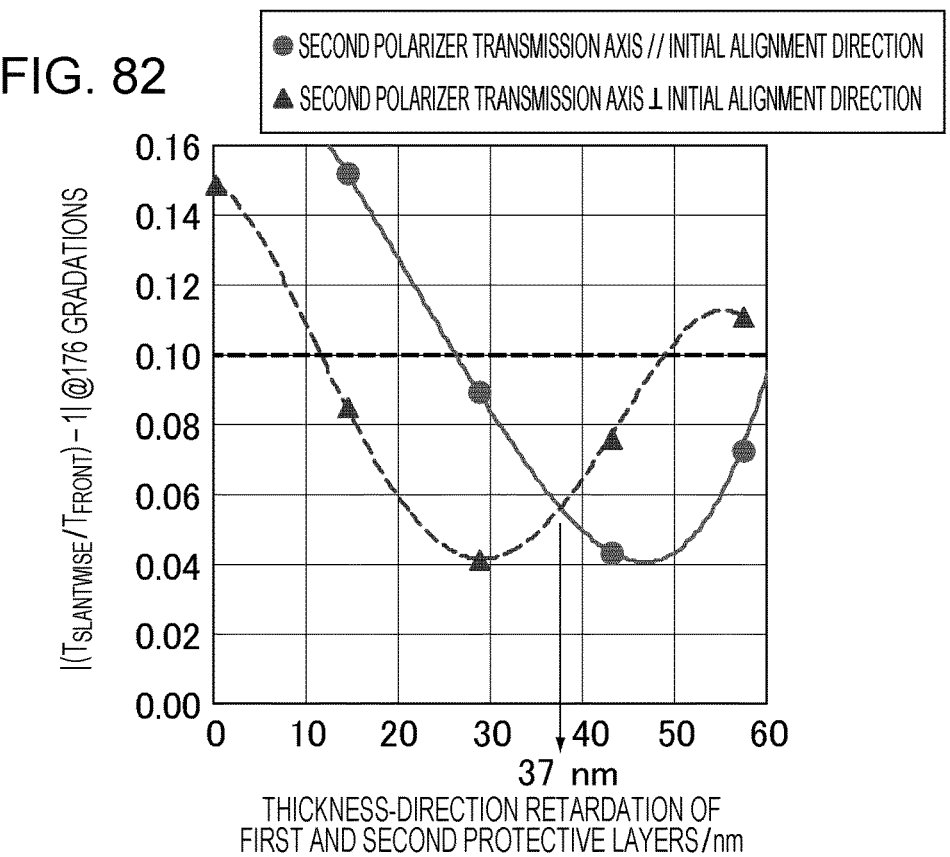
FIG. 82 illustrates a graph in the case of plotting the thickness-direction retardation of the first and second protective layers on the horizontal axis and plotting $|(T_{slantwise}/T_{front})-1|$ on the vertical axis in the example 13 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 80 to 82 illustrate graphs in the case of plotting the thickness-direction retardation of the first and second protective layers on the horizontal axis and plotting $|(T_{slantwise}/T_{front})-1|$ on the vertical axis in the example 13. FIGS. 80, 81, and 82 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 80 to 82, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

In the case of each of the optical alignment films 11 and 13 having a great in-plane retardation as illustrated in FIGS. 81 and 82, while the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in an area where the protective layers 3 and 5 have a small thickness-direction retardation, it is understood that the viewing angle is more favorable in the parallelism of the transmission axis 6t of the second polarizer 6 and the initial alignment direction 12a of liquid crystal molecules than in the case of the perpendicularity thereof when the thickness-direction retardations of the protective layers 3 and 5 are greater than or equal to a certain value.

Meanwhile, in the case of each of the optical alignment films 11 and 13 having a small in-plane retardation as illustrated in FIG. 80, it is understood that the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in the entire range of the thickness-direction retardation of the protective layers 3 and 5 confirmed by calculation (greater than or equal to 0 nm and less than or equal to 56 nm).

The thickness-direction retardation of the first and second protective layers 3 and 5 at a point of a favorable viewing angle and of inversion of the relationship between the transmission axis 6t of the second polarizer 6 and the initial alignment direction 12a of liquid crystal molecules is read from FIGS. 81 and 82, and the value of the thickness-direction retardation is plotted on a graph on the vertical axis and the in-plane retardation of the first and second optical alignment films 11 and 13 at that time on the horizontal axis. This graph is illustrated in FIG. 83.

Figure 83:
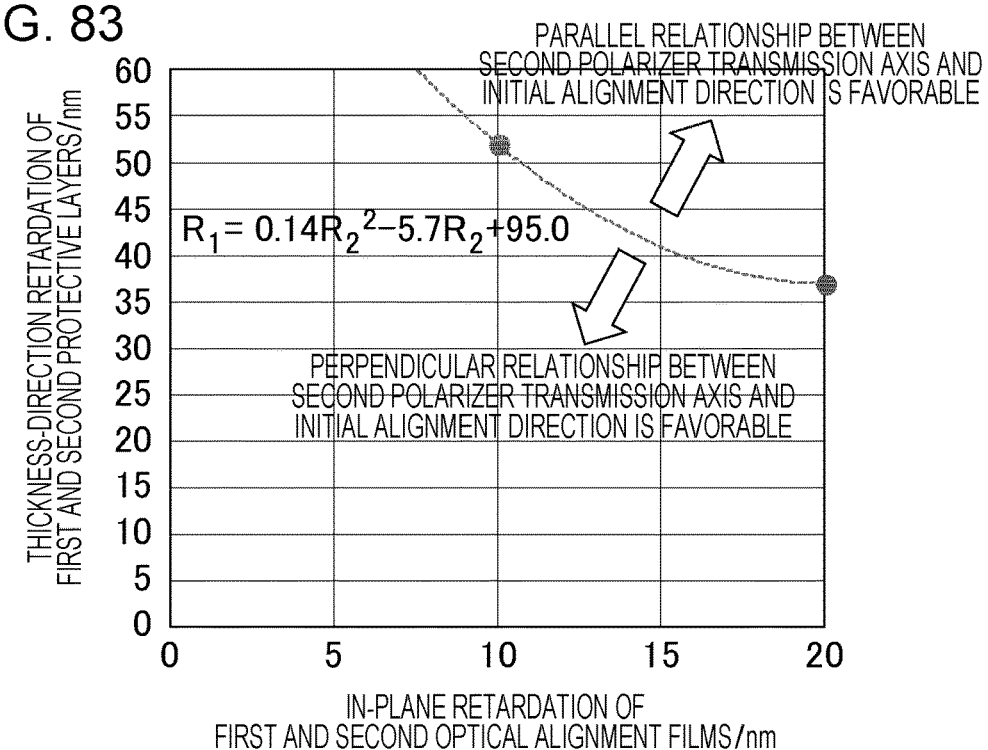
FIG. 83 is a graph acquired by reading, from FIGS. 81 and 82, the thickness-direction retardation of a protective layer at a point of a favorable viewing angle and of inversion of the relationship between the transmission axis of a second polarizer and the initial alignment direction of liquid crystal molecules and plotting the value of the thickness-direction retardation on the vertical axis and the in-plane retardation of the first and second optical alignment films at that time on the horizontal axis.

In FIG. 83, given that $R_1$ is the thickness-direction retardation of each of the protective layers 3 and 5 and that $R_2$ is the in-plane retardation of each of the optical alignment films 11 and 13, it is understood that a boundary of a favorable viewing angle and of inversion of the relationship between the transmission axis 6t of the second polarizer 6 and the initial alignment direction 12a of liquid crystal molecules can be approximated by a curve of $R_1=0.14R_2^2-5.7R_2+95.0$ in the case of each of the optical alignment films 11 and 13 having not only a great in-plane retardation but also a small in-plane retardation. Thus, in the IPS mode in which the liquid crystal layer has a positive dielectric anisotropy with a protective layer satisfying the relationship nx=ny≥nz existing on each of the observer side and the backlight side as in the present example, the following optical design can provide a liquid crystal display panel that has a favorable viewing angle in the case of using a self-assembled optical alignment film.

i) In the case of satisfying $R_1 \leq 0.14R_2^2 - 5.7R_2 + 95.0$, the second polarizer on the backlight side is arranged to have a transmission axis thereof perpendicular to the initial alignment direction of liquid crystal molecules.

ii) In the case of satisfying $R_1 \geq 0.14R_2^2 - 5.7R_2 + 95.0$, the second polarizer on the backlight side is arranged to have a transmission axis thereof parallel to the initial alignment direction of liquid crystal molecules.

Example 14

Basic configuration: IPS mode, optical alignment film, positive liquid crystal, protective layer satisfying the relationship nx=ny≥nz on only observer side (thickness-direction retardation of 0 nm to 56 nm).

Figure 84:
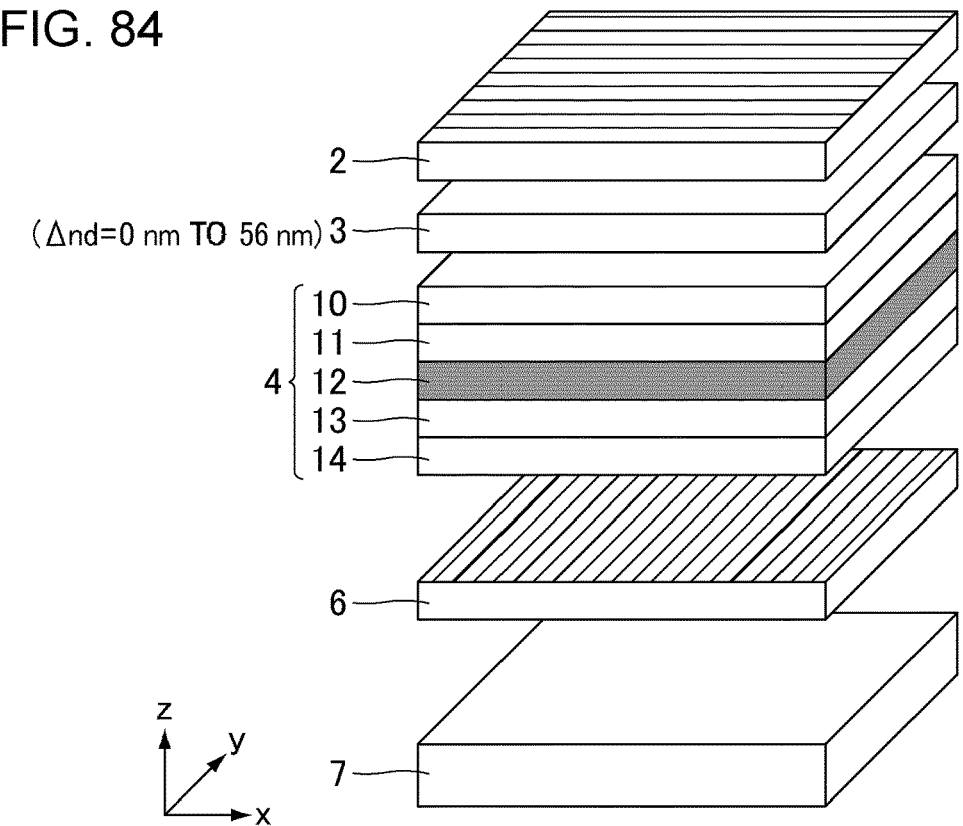
FIG. 84 is a schematic perspective view of a liquid crystal display device according to example 14.
Figure 85:
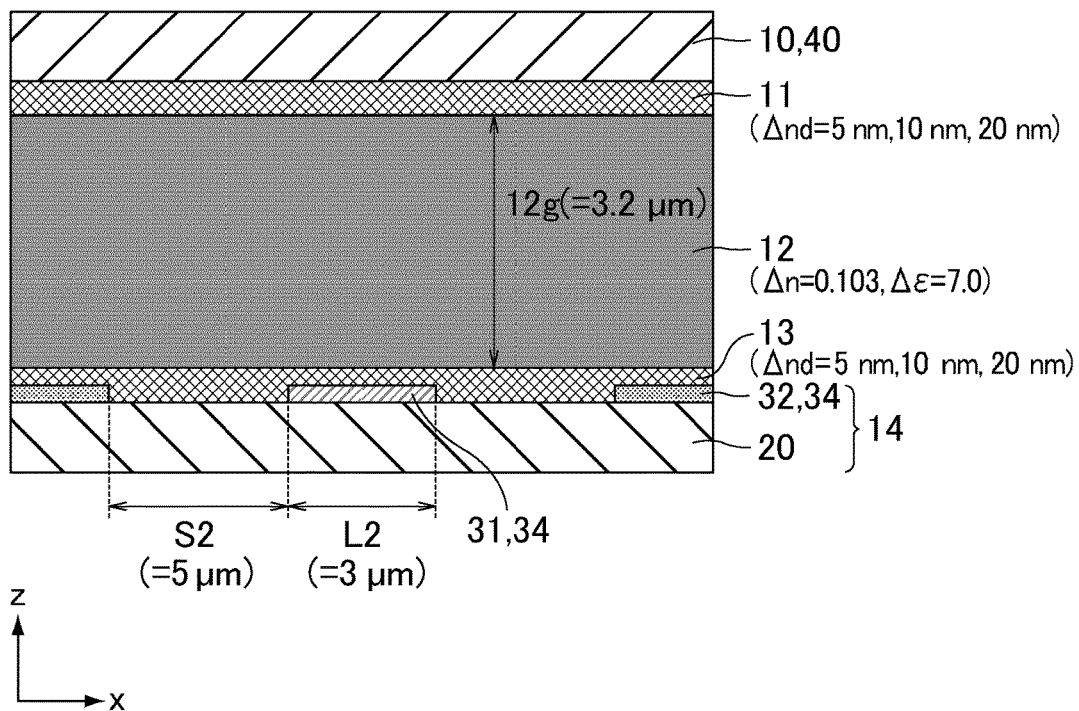
FIG. 85 is a schematic sectional view of a liquid crystal panel included in the liquid crystal display device according to the example 14.

FIG. 84 is a schematic perspective view of a liquid crystal display device according to example 14. FIG. 85 is a schematic sectional view of a liquid crystal panel included in the liquid crystal display device according to the example 14. FIGS. 86(a) and 86(b) are schematic diagrams illustrating arrangement (in the axial direction) of the optical axis of each layer of the liquid crystal display device according to the example 14 when viewed from the direction of the z axis.

The present example is the same as the example 5 except for the following points.

Figure 86:
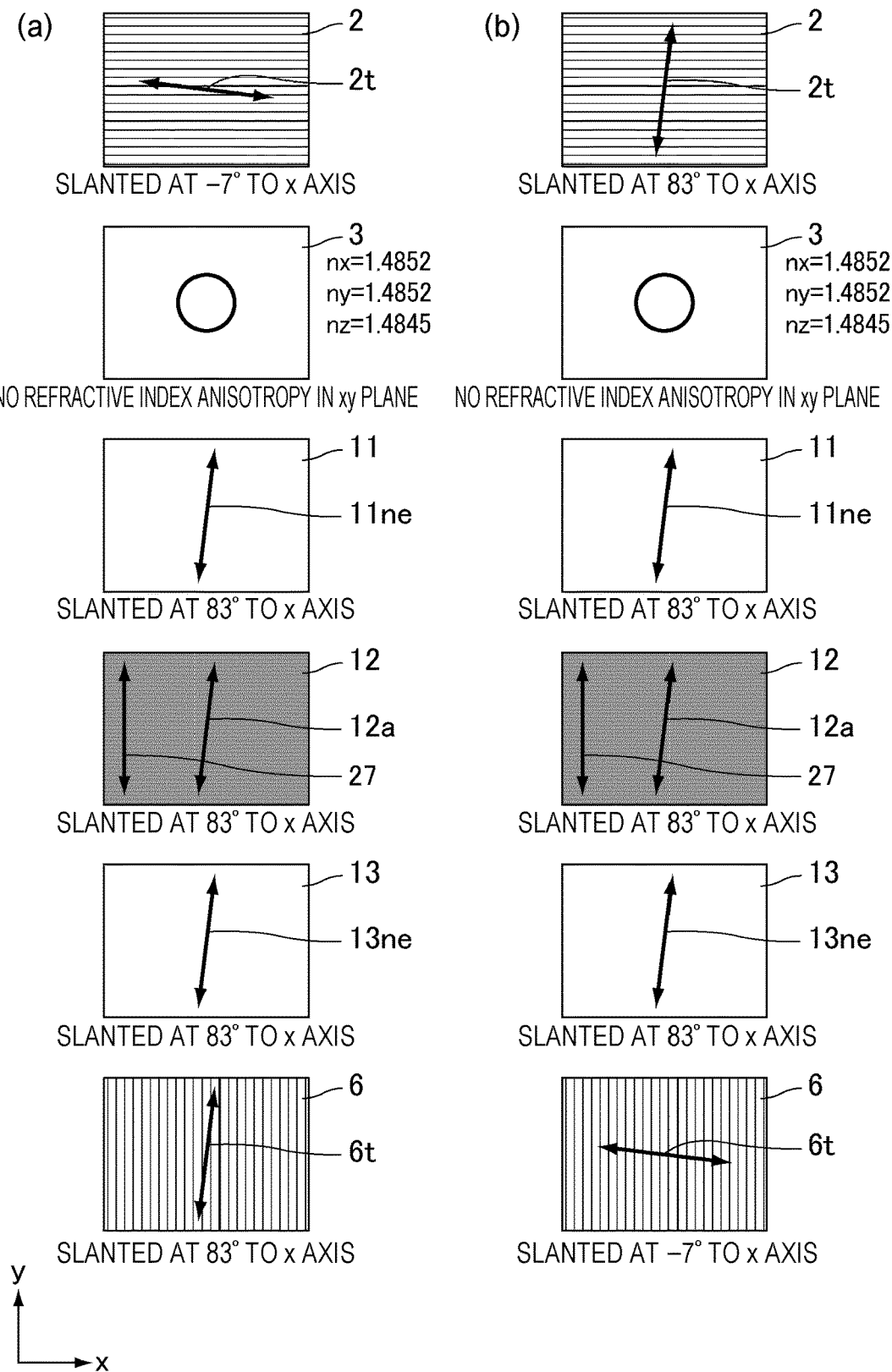
FIGS. 86(a) and 86(b) are schematic diagrams illustrating arrangement (in the axial direction) of the optical axis of each layer of the liquid crystal display device according to the example 14 when viewed from the direction of the z axis.

As illustrated in FIG. 84, only the protective layer 3 is disposed between the first substrate 10 and the first polarizer 2 on the observer side. That is, the second protective layer 5 between the second substrate 14 and the second polarizer 6 on the backlight 7 side is removed from the configuration of the example 5. In order to limit the range of the thickness-direction retardation of the protective layer 3, the protective layer 3 has the thickness d changed in the range of 0 μm to 80 μm and has a thickness-direction retardation changed in the range of 0 nm to 56 nm. The case of the thickness of the protective layer 3 being 0 μm is optically equivalent to the case of arranging an optically isotropic protective layer instead of the protective layer 3. As illustrated in FIG. 86, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The configuration according to the present example is optically equivalent to a configuration in which an optically isotropic second protective layer is arranged between the second substrate 14 and the second polarizer 6 on the backlight 7 side in the present example. Accordingly, the present example assumes the embodiment 2 with the first protective layer satisfying the relationship nx=ny≥nz disposed on the observer side and the optically isotropic second protective layer disposed on the backlight side.

Arrangement of the optical axis of each layer when viewed from the direction of the z axis in the present example is the same as that in the case of the fourth and example 5s except for the absence of the second protective layer between the second substrate and the second polarizer and has two types of arrangement illustrated in FIGS. 86(a) and 86(b).

Figure 87:
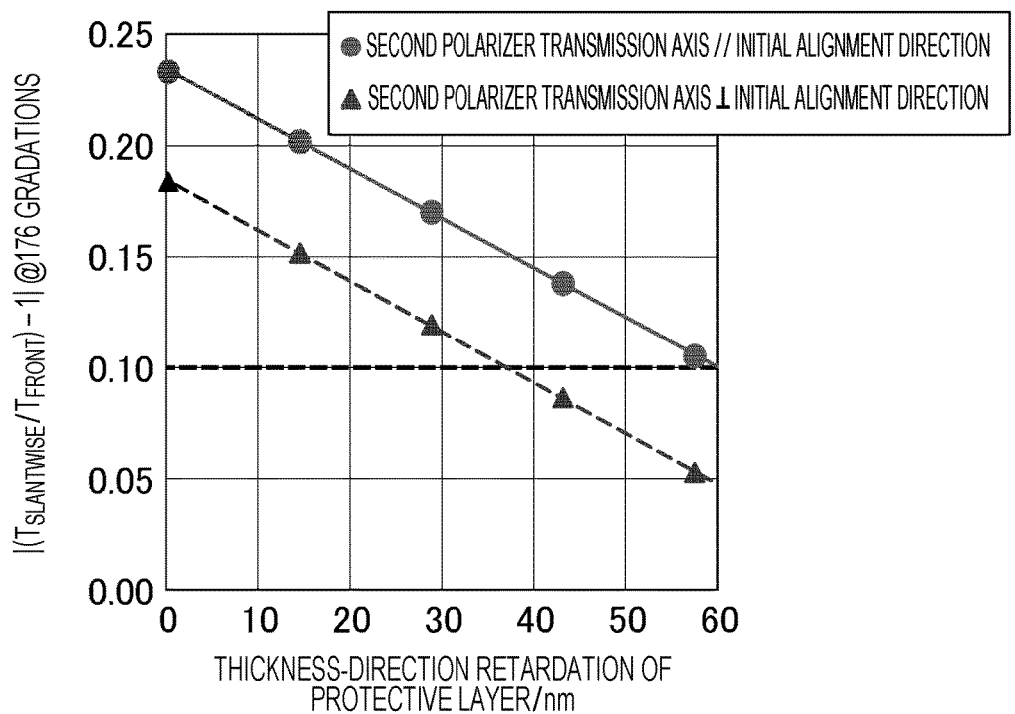
FIG. 87 illustrates a graph in the case of plotting the thickness-direction retardation of a protective layer on the horizontal axis and plotting $|(T_{slantwise}/T_{front})-1|$ on the vertical axis in the example 14 and illustrates the case of first and second optical alignment films having an in-plane retardation of 5 nm.
Figure 88:
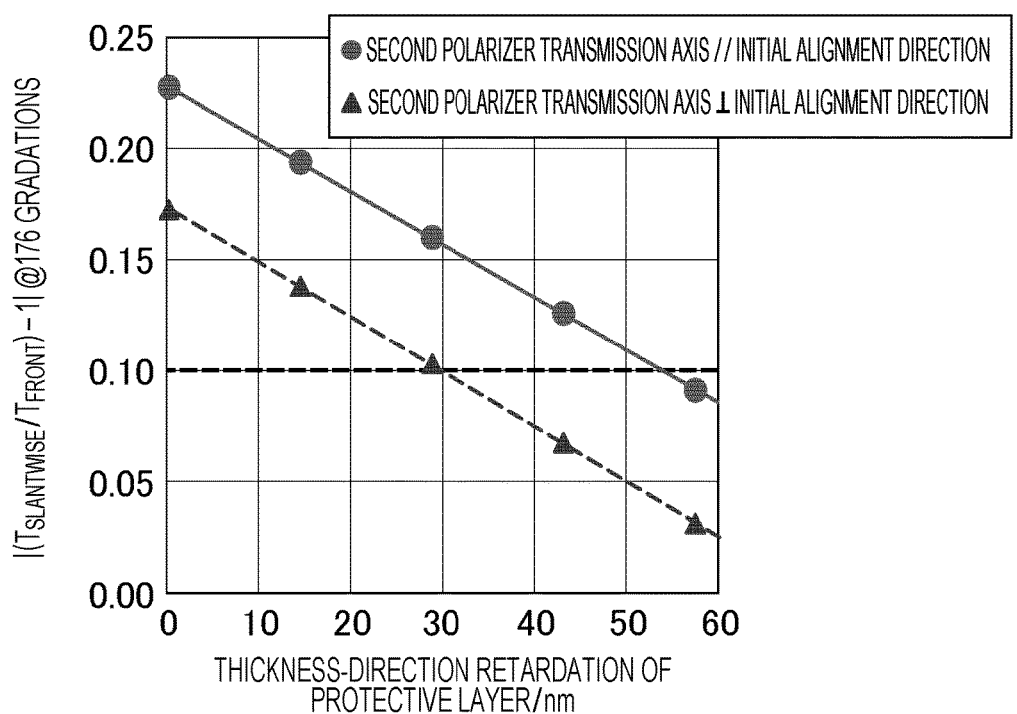
FIG. 88 illustrates a graph in the case of plotting the thickness-direction retardation of the protective layer on the horizontal axis and plotting $|(T_{slantwise}/T_{front})-1|$ on the vertical axis in the example 14 and illustrates the case of the first and second optical alignment films having an in-plane retardation of 10 nm.
Figure 89:
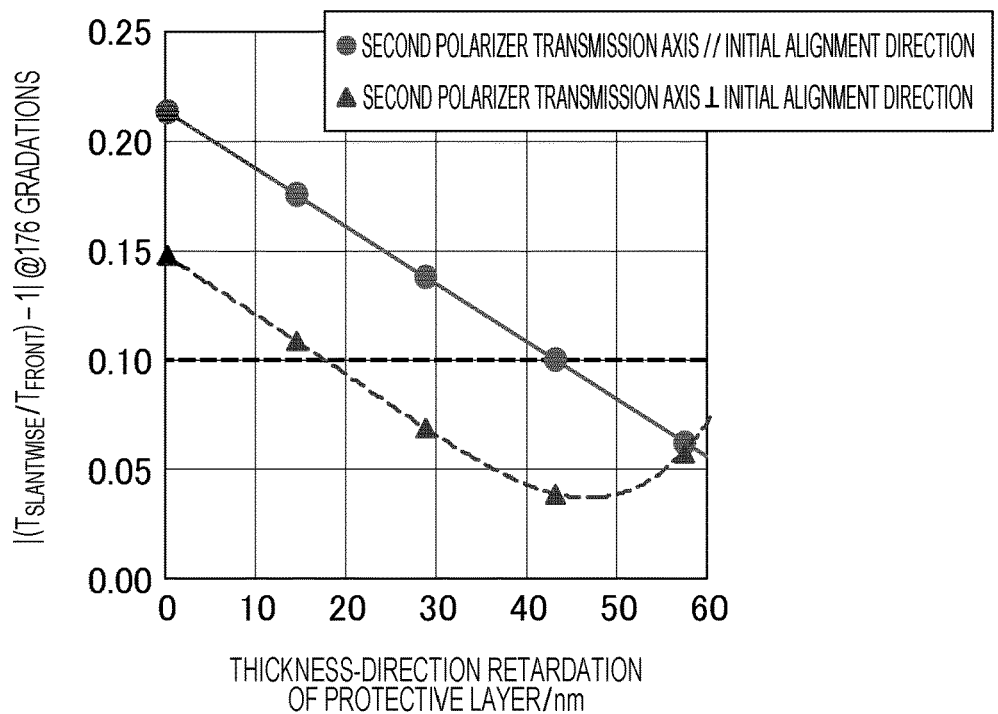
FIG. 89 illustrates a graph in the case of plotting the thickness-direction retardation of the protective layer on the horizontal axis and plotting $|(T_{slantwise}/T_{front})-1|$ on the vertical axis in the example 14 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 87 to 89 illustrate graphs in the case of plotting the thickness-direction retardation of the protective layer on the horizontal axis and plotting $|(T_{slantwise}/T_{front})-1|$ on the vertical axis in the example 14. FIGS. 87, 88, and 89 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 87 to 89, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 87 to 89, it is understood that the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in the entire range of the thickness-direction retardation of the protective layer 5 confirmed by calculation (greater than or equal to 0 nm and less than or equal to 56 nm). Thus, in the IPS mode in which the liquid crystal layer has a positive dielectric anisotropy with a protective layer satisfying the relationship nx=ny≥nz existing on only the observer side as in the present example, arranging the second polarizer on the backlight side to have a transmission axis thereof perpendicular to the initial alignment direction of liquid crystal molecules can provide a liquid crystal display panel that has a favorable viewing angle in the case of using a self-assembled optical alignment film.

Example 15

Basic configuration: IPS mode, optical alignment film, positive liquid crystal, protective layer satisfying the relationship nx=ny≥nz on only backlight side (thickness-direction retardation of 0 nm to 56 nm).

Figure 90:
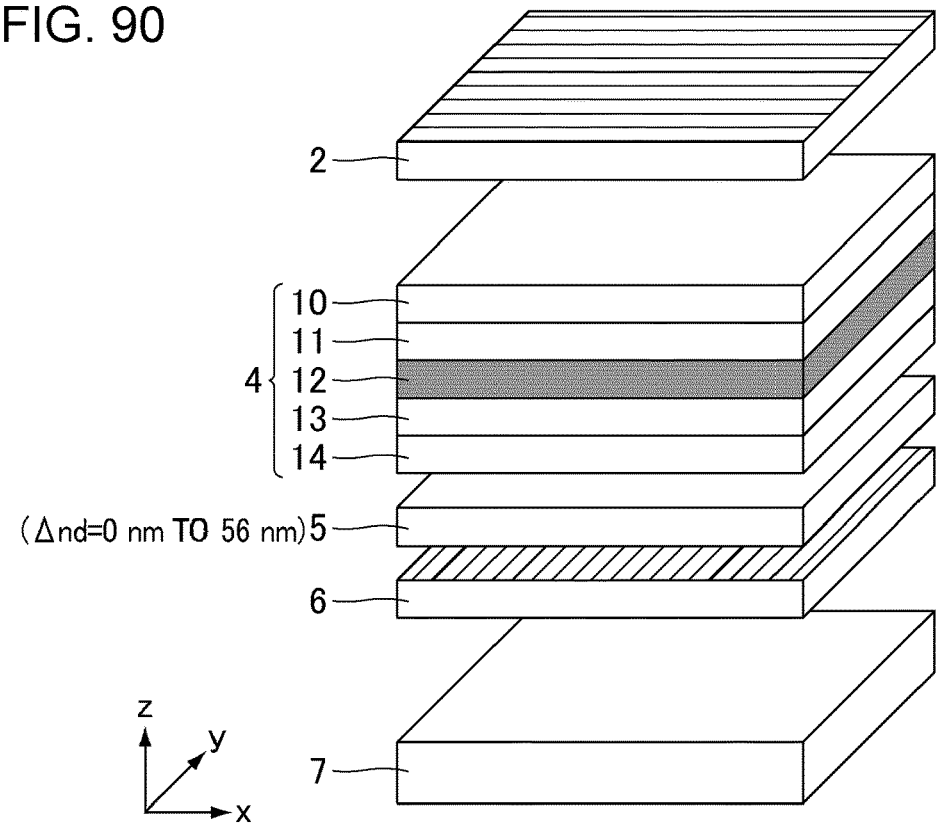
FIG. 90 is a schematic perspective view of a liquid crystal display device according to example 15.
Figure 91:
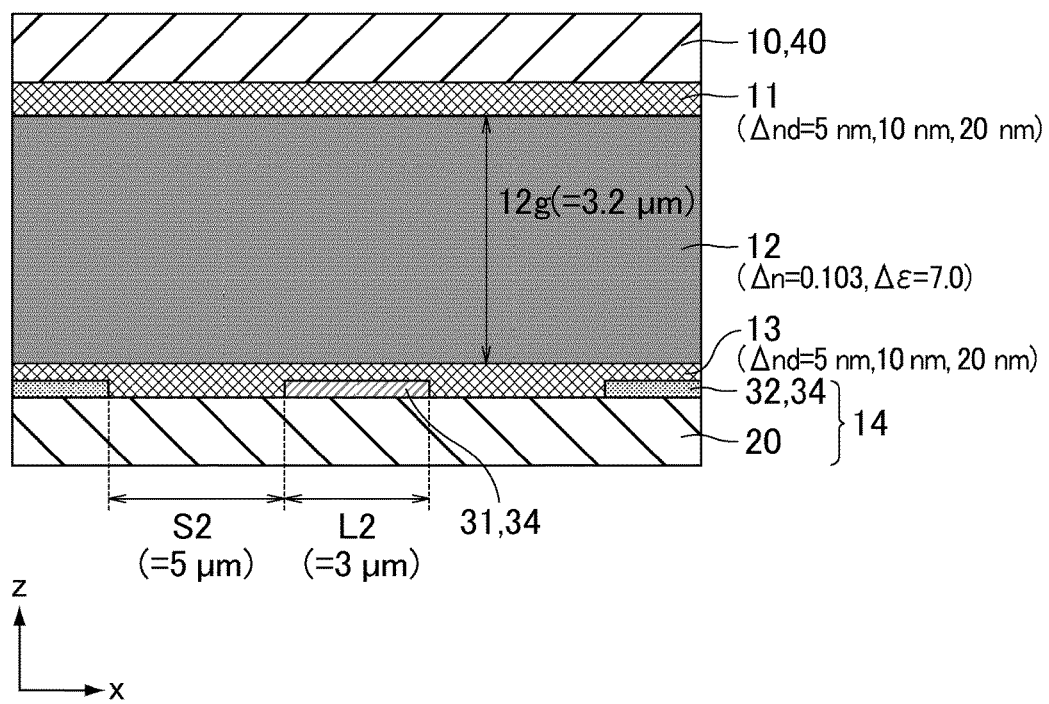
FIG. 91 is a schematic sectional view of a liquid crystal panel included in the liquid crystal display device according to the example 15.
Figure 92:
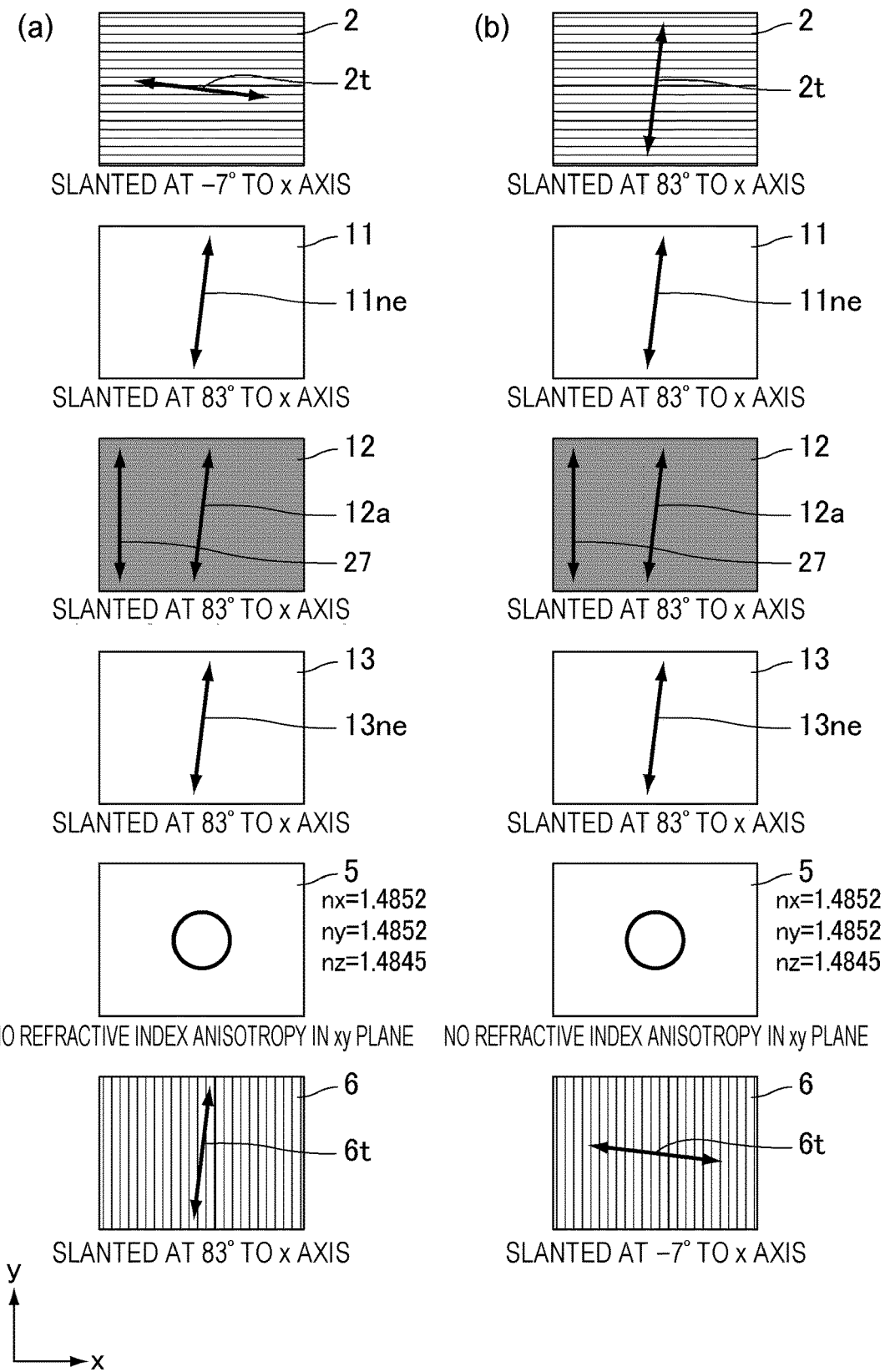
FIGS. 92(a) and 92(b) are schematic diagrams illustrating arrangement (in the axial direction) of the optical axis of each layer of the liquid crystal display device according to the example 15 when viewed from the direction of the z axis.

FIG. 90 is a schematic perspective view of a liquid crystal display device according to example 15. FIG. 91 is a schematic sectional view of a liquid crystal panel included in the liquid crystal display device according to the example 15. FIGS. 92(a) and 92(b) are schematic diagrams illustrating arrangement (in the axial direction) of the optical axis of each layer of the liquid crystal display device according to the example 15 when viewed from the direction of the z axis.

The present example is the same as the example 5 except for the following points.

As illustrated in FIG. 90, only the protective layer 5 is disposed between the second substrate 14 and the second polarizer 6 on the backlight 7 side. That is, the first protective layer 3 between the first substrate 10 and the first polarizer 2 on the observer side is removed from the configuration of the example 5. In order to limit the range of the thickness-direction retardation of the protective layer 5, the protective layer 5 has the thickness d changed in the range of 0 μm to 80 μm and has a thickness-direction retardation changed in the range of 0 nm to 56 nm. The case of the thickness of the protective layer 5 being 0 μm is optically equivalent to the case of arranging an optically isotropic protective layer instead of the protective layer 5. As illustrated in FIG. 91, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The configuration according to the present example is optically equivalent to a configuration in which an optically isotropic first protective layer is arranged between the first substrate 10 and the first polarizer 2 on the observer side in the present example. Accordingly, the present example assumes the embodiment 3 with the optically isotropic first protective layer disposed on the observer side and the second protective layer satisfying the relationship nx=ny≥nz disposed on the backlight side.

Arrangement of the optical axis of each layer when viewed from the direction of the z axis in the present example is the same as that in the case of the fourth and example 5s except for the absence of the first protective layer between the first substrate and the first polarizer and has two types of arrangement illustrated in FIGS. 92(a) and 92(b).

Figure 93:
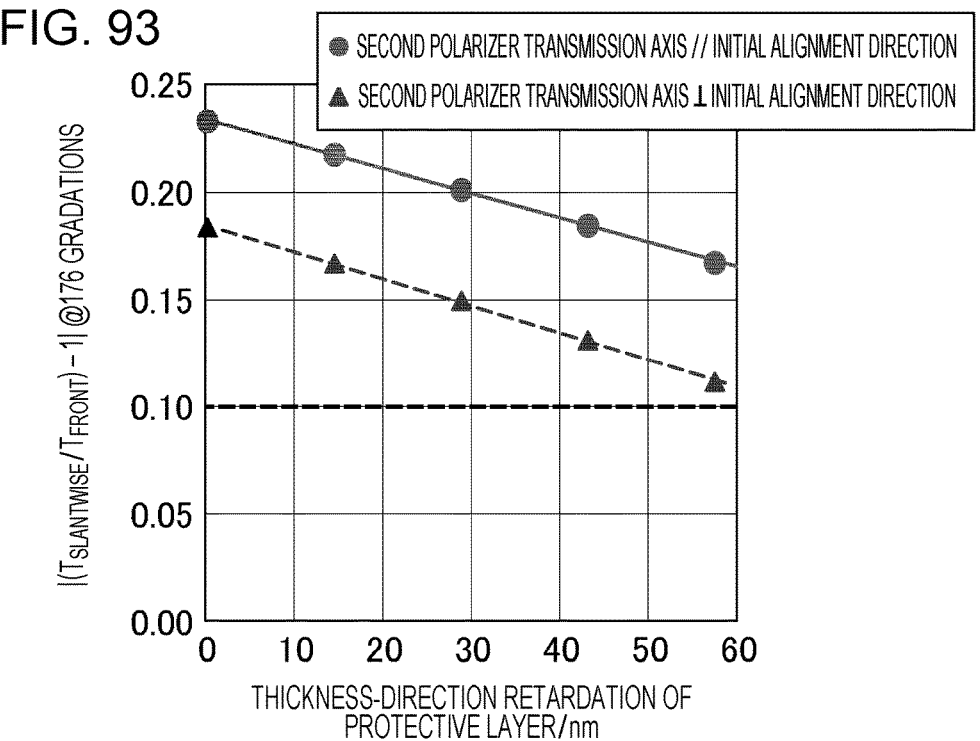
FIG. 93 illustrates a graph in the case of plotting the thickness-direction retardation of a protective layer on the horizontal axis and plotting $|(T_{slantwise}/T_{front})-1|$ on the vertical axis in the example 15 and illustrates the case of first and second optical alignment films having an in-plane retardation of 5 nm.
Figure 94:
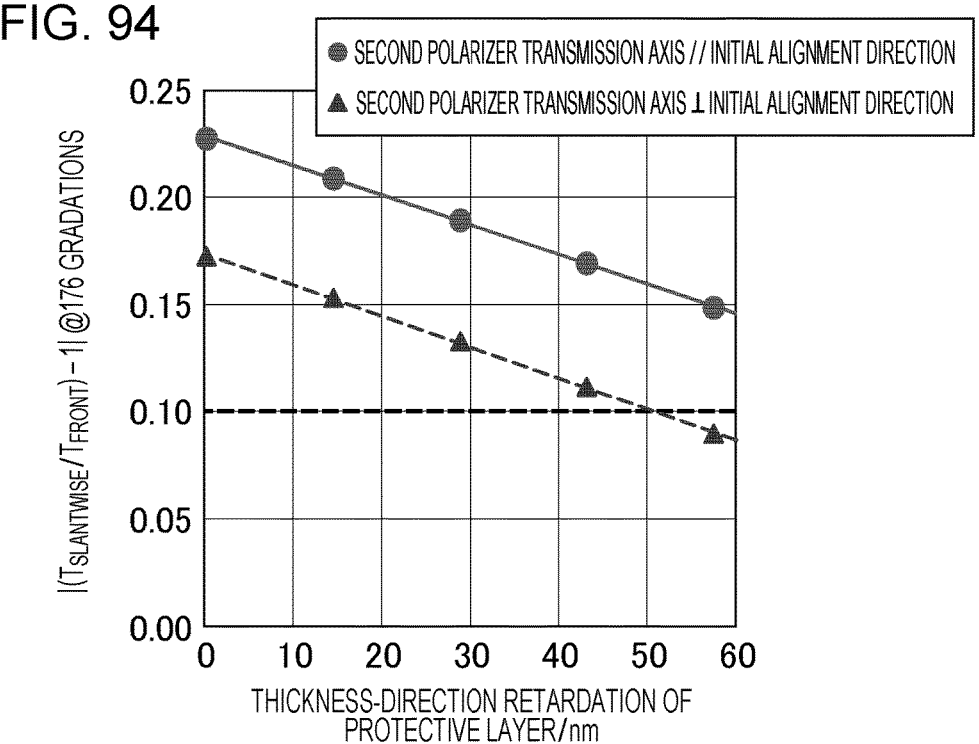
FIG. 94 illustrates a graph in the case of plotting the thickness-direction retardation of the protective layer on the horizontal axis and plotting $|(T_{slantwise}/T_{front})-1|$ on the vertical axis in the example 15 and illustrates the case of the first and second optical alignment films having an in-plane retardation of 10 nm.
Figure 95:
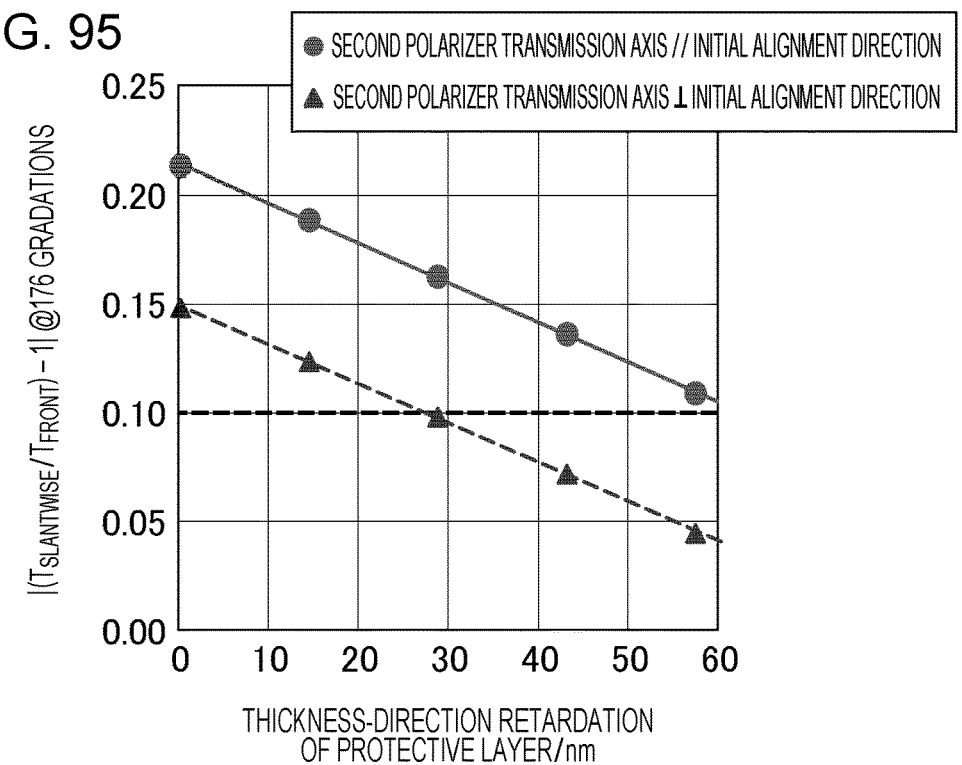
FIG. 95 illustrates a graph in the case of plotting the thickness-direction retardation of the protective layer on the horizontal axis and plotting $|(T_{slantwise}/T_{front})-1|$ on the vertical axis in the example 15 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 93 to 95 illustrate graphs in the case of plotting the thickness-direction retardation of the protective layer on the horizontal axis and plotting $|(T_{slantwise}/T_{front})-1|$ on the vertical axis in the example 15. FIGS. 93, 94, and 95 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 93 to 95, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 93 to 95, it is understood that the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in the entire range of the thickness-direction retardation of the protective layer 5 confirmed by calculation (greater than or equal to 0 nm and less than or equal to 56 nm). Thus, in the IPS mode in which the liquid crystal layer has a positive dielectric anisotropy with a protective layer satisfying the relationship nx=ny≥nz existing on only the backlight side as in the present example, arranging the second polarizer on the backlight side to have a transmission axis thereof perpendicular to the initial alignment direction of liquid crystal molecules can provide a liquid crystal display panel that has a favorable viewing angle in the case of using a self-assembled optical alignment film.

Example 16

Basic configuration: IPS mode, optical alignment film, negative liquid crystal, protective layer satisfying the relationship nx=ny≥nz on each of observer side and backlight side (thickness-direction retardation of 0 nm to 56 nm).

Figure 96:
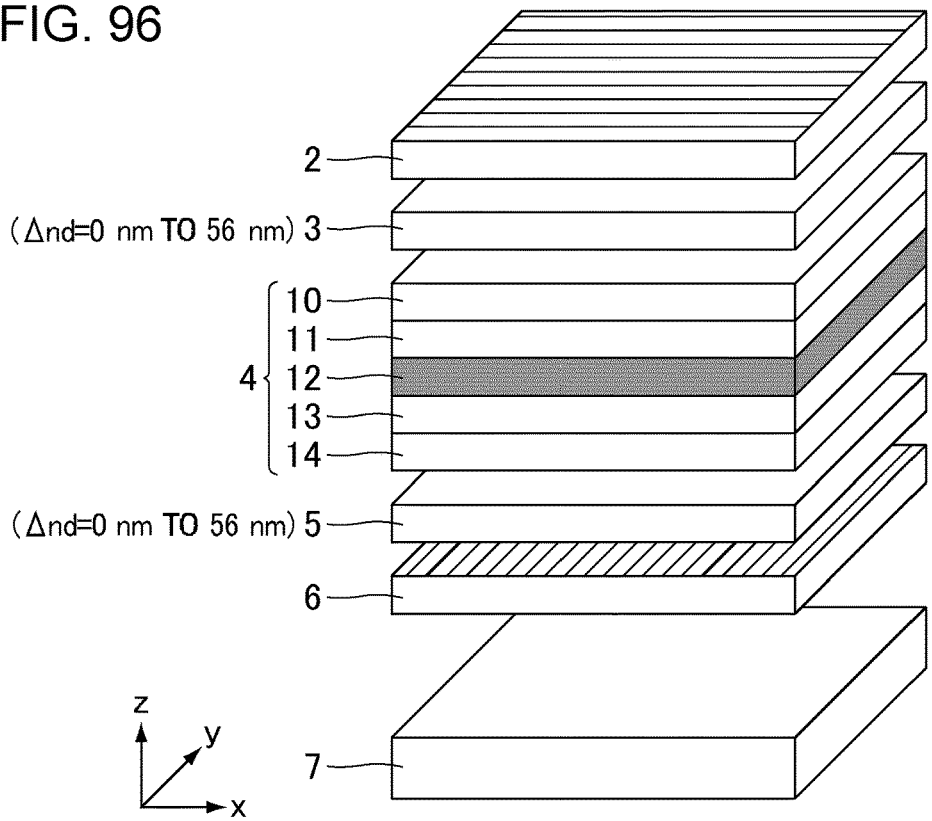
FIG. 96 is a schematic perspective view of a liquid crystal display device according to example 16.
Figure 97:
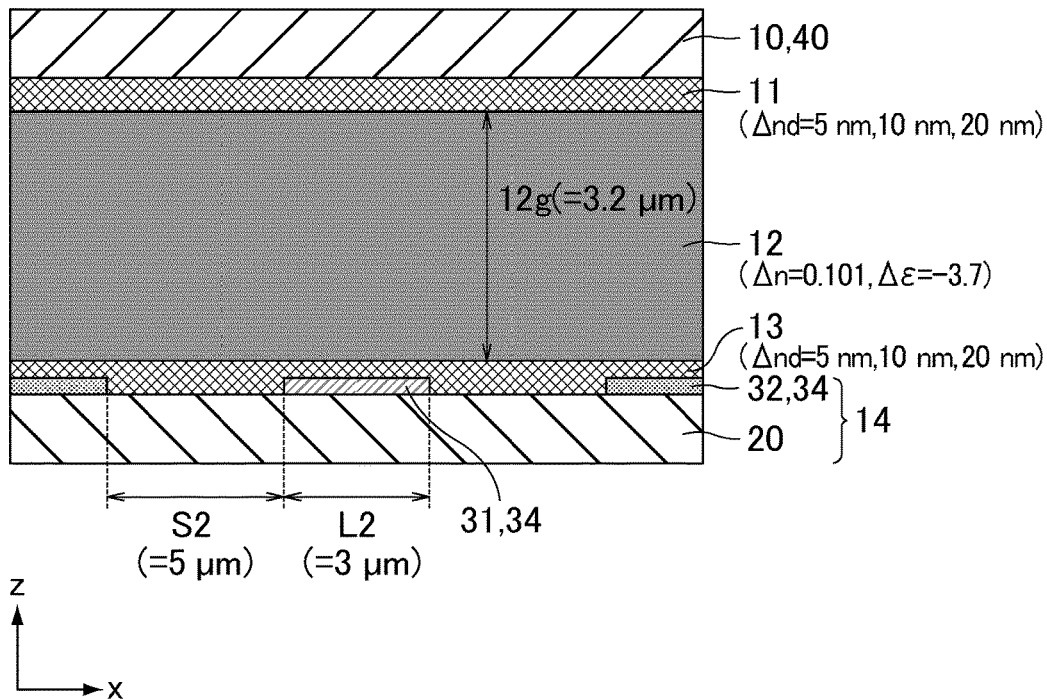
FIG. 97 is a schematic sectional view of a liquid crystal panel included in the liquid crystal display device according to the example 16.

FIG. 96 is a schematic perspective view of a liquid crystal display device according to example 16. FIG. 97 is a schematic sectional view of a liquid crystal panel included in the liquid crystal display device according to the example 16.

The present example is the same as the example 5 except for the following points. As illustrated in FIG. 96, in order to limit the range of the thickness-direction retardation of each of the protective layers 3 and 5, each of the protective layers 3 and 5 has the thickness d changed in the range of 0 μm to 80 μm and has a thickness-direction retardation changed in the range of 0 nm to 56 nm. The thickness-direction retardations of the protective layers 3 and 5 have the same value. The case of the thickness of each of the protective layers 3 and 5 being 0 μm is optically equivalent to the case of arranging an optically isotropic protective layer instead of each of the protective layers 3 and 5. As illustrated in FIG. 97, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The polarity of liquid crystals employed in the liquid crystal layer 12 is negative. The liquid crystal layer 12 has the refractive index anisotropy Δn of 0.101 and the dielectric anisotropy Δε of −3.7. The present example assumes the embodiment 1 with the first protective layer satisfying the relationship nx=ny≥nz disposed on the observer side and the second protective layer satisfying the relationship nx=ny≥nz disposed on the backlight side.

Since negative liquid crystals are employed in the present example, arrangement of the optical axis of each layer when viewed from the direction of the z axis in the present example is the same as that in the case of the example 6 of the FFS mode employing negative liquid crystals and has two types of arrangement illustrated in FIGS. 35(a) and 35(b).

Figure 98:
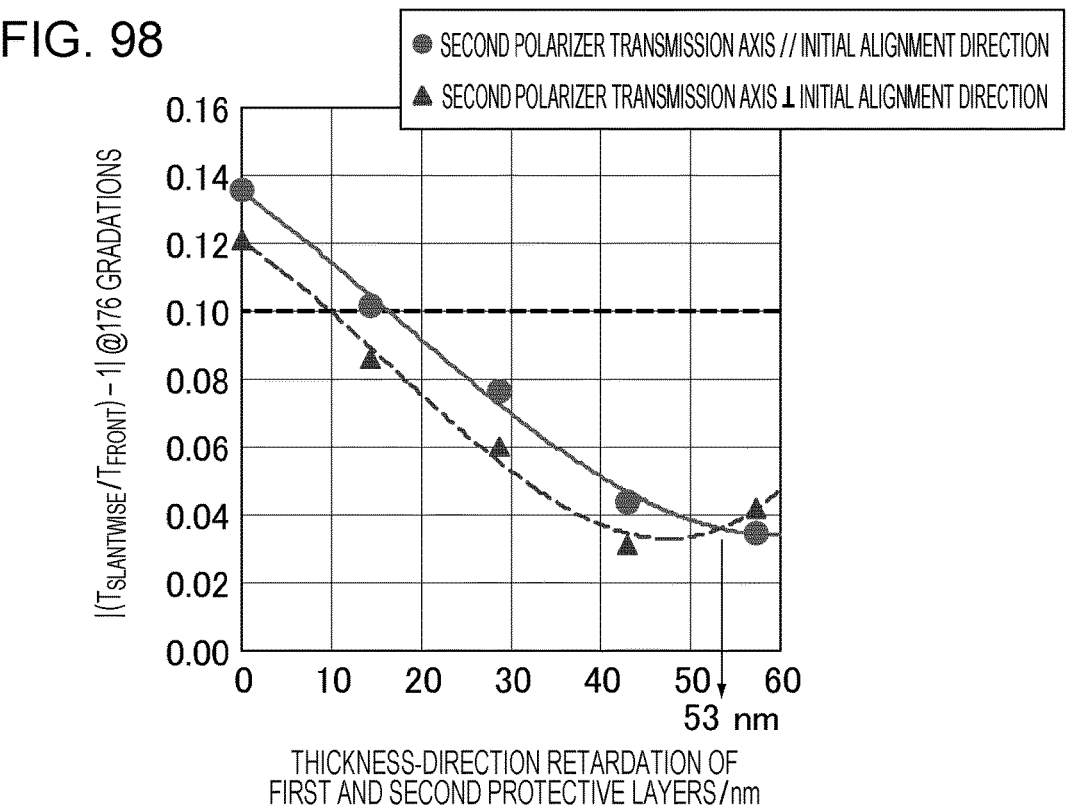
FIG. 98 illustrates a graph in the case of plotting the thickness-direction retardation of first and second protective layers on the horizontal axis and plotting $|(T_{slantwise}/T_{front})-1|$ on the vertical axis in the example 16 and illustrates the case of first and second optical alignment films having an in-plane retardation of 5 nm.
Figure 99:
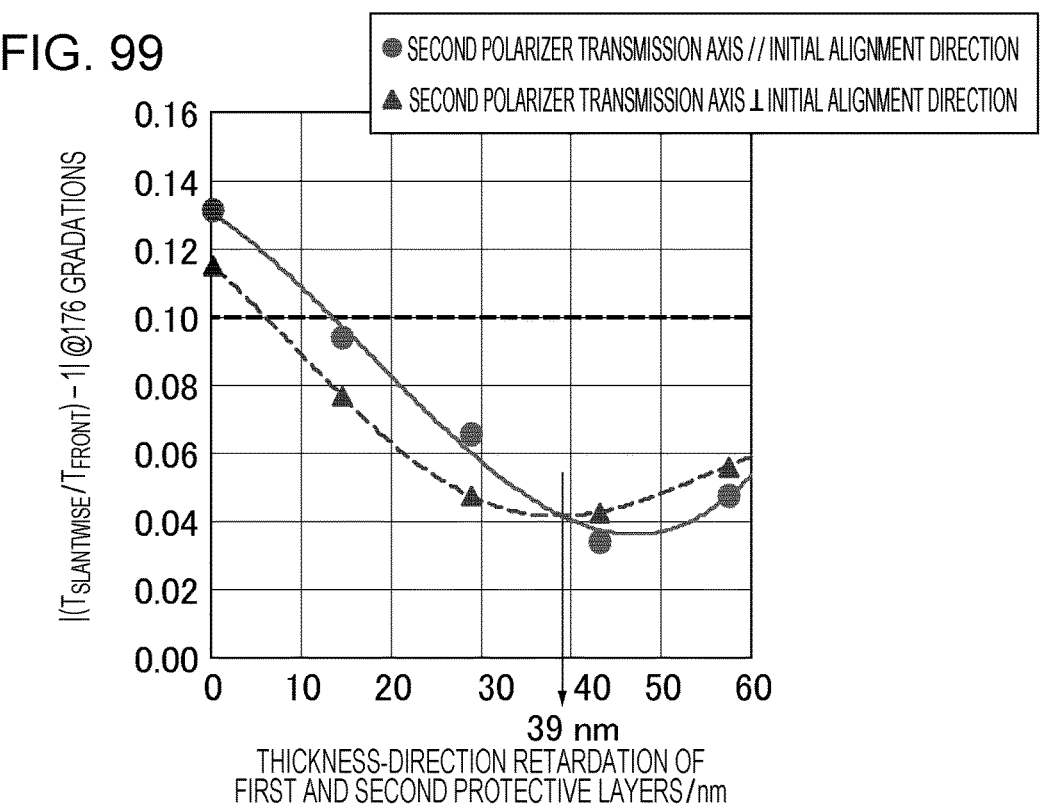
FIG. 99 illustrates a graph in the case of plotting the thickness-direction retardation of the first and second protective layers on the horizontal axis and plotting $|(T_{slantwise}/T_{front})-1|$ on the vertical axis in the example 16 and illustrates the case of the first and second optical alignment films having an in-plane retardation of 10 nm.
Figure 100:
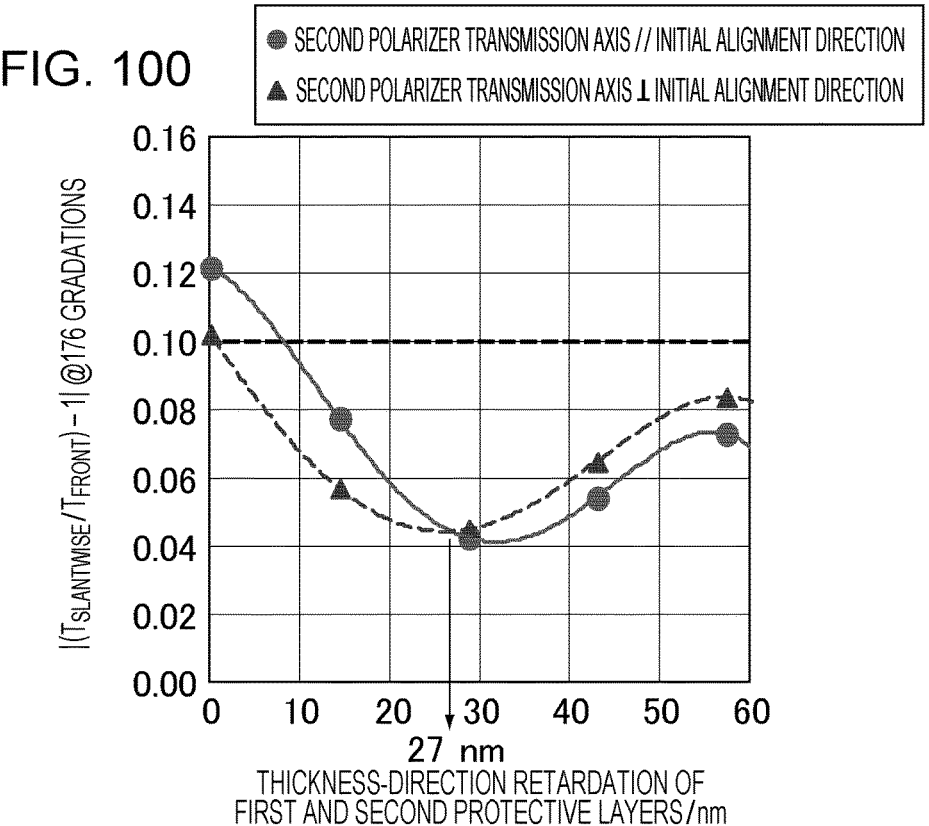
FIG. 100 illustrates a graph in the case of plotting the thickness-direction retardation of the first and second protective layers on the horizontal axis and plotting $|(T_{slantwise}/T_{front})-1|$ on the vertical axis in the example 16 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 98 to 100 illustrate graphs in the case of plotting the thickness-direction retardation of the first and second protective layers on the horizontal axis and plotting $|(T_{slantwise}/T_{front})-1|$ on the vertical axis in the example 16. FIGS. 98, 99, and 100 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 98 to 100, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 98 to 100, while the perpendicular relationship between the transmission axis 6*t* of the second polarizer 6 and the extraordinary light refractive index axes 11*ne* and 13*ne* of the optical alignment films 11 and 13, that is, the initial alignment direction 12*a* of liquid crystal molecules, has a more favorable viewing angle than the parallel relationship therebetween in an area where the protective layers 3 and 5 have a small thickness-direction retardation, it is understood that the viewing angle is more favorable in the parallelism of the transmission axis 6*t* of the second polarizer 6 and the initial alignment direction 12*a* of liquid crystal molecules than in the case of the perpendicularity thereof when the thickness-direction retardations of the protective layers 3 and 5 are greater than or equal to a certain value.

The thickness-direction retardation of the first and second protective layers 3 and 5 at a point of a favorable viewing angle and of inversion of the relationship between the transmission axis 6*t* of the second polarizer 6 and the initial alignment direction 12*a* of liquid crystal molecules is read from FIGS. 98 to 100, and the value of the thickness-direction retardation is plotted on a graph on the vertical axis and the in-plane retardation of the first and second optical alignment films 11 and 13 at that time on the horizontal axis. This graph is illustrated in FIG. 101.

Figure 101:
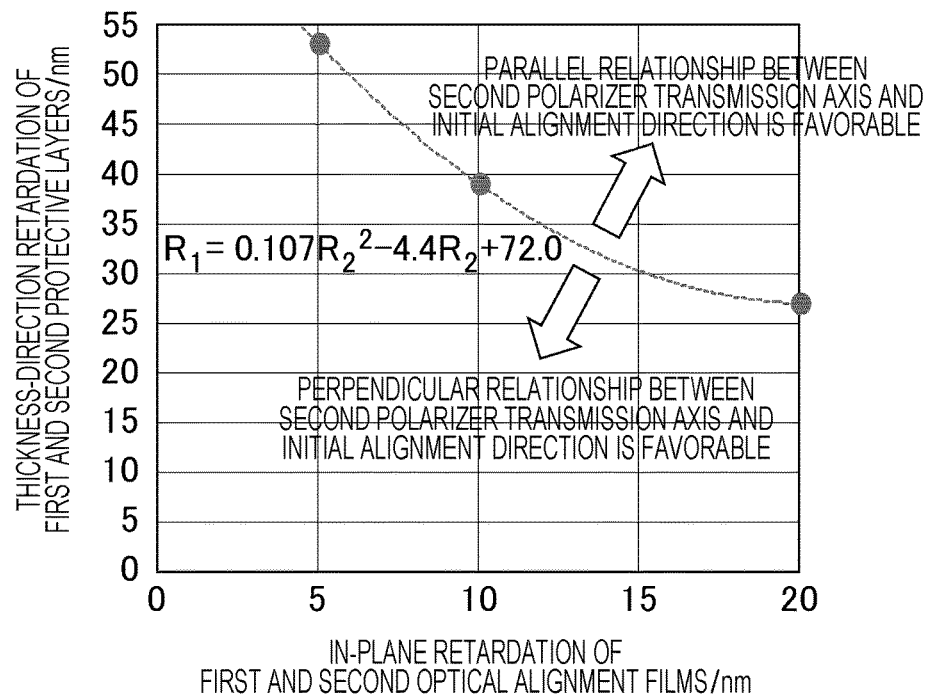
FIG. 101 is a graph acquired by reading, from FIGS. 98 to 100, the thickness-direction retardation of a protective layer at a point of a favorable viewing angle and of inversion of the relationship between the transmission axis of a second polarizer and the initial alignment direction of liquid crystal molecules and plotting the value of the thickness-direction retardation on the vertical axis and the in-plane retardation of the first and second optical alignment films at that time on the horizontal axis.

In FIG. 101, given that $R_1$ is the thickness-direction retardation of each of the protective layers 3 and 5 and that $R_2$ is the in-plane retardation of each of the optical alignment films 11 and 13, it is understood that a boundary of a favorable viewing angle and of inversion of the relationship between the transmission axis 6*t* of the second polarizer 6 and the initial alignment direction 12*a* of liquid crystal molecules can be approximated by a curve of $R_1 = 0.107R_2^2 - 4.4R_2 + 72.0$. Thus, in the IPS mode in which the liquid crystal layer has a negative dielectric anisotropy with a protective layer satisfying the relationship nx=ny≥nz existing on each of the observer side and the backlight side as in the present example, the following optical design can provide a liquid crystal display panel that has a favorable viewing angle in the case of using a self-assembled optical alignment film.

i) In the case of satisfying $R_1 \leq 0.107R_2^2 - 4.4R_2 + 72.0$, the second polarizer on the backlight side is arranged to have a transmission axis thereof perpendicular to the initial alignment direction of liquid crystal molecules.

ii) In the case of satisfying $R_1 \geq 0.107R_2^2 - 4.4R_2 + 72.0$, the second polarizer on the backlight side is arranged to have a transmission axis thereof parallel to the initial alignment direction of liquid crystal molecules.

Example 17

Basic configuration: IPS mode, optical alignment film, negative liquid crystal, protective layer satisfying the relationship nx=ny≥nz on only observer side (thickness-direction retardation of 0 nm to 56 nm).

Figure 102:
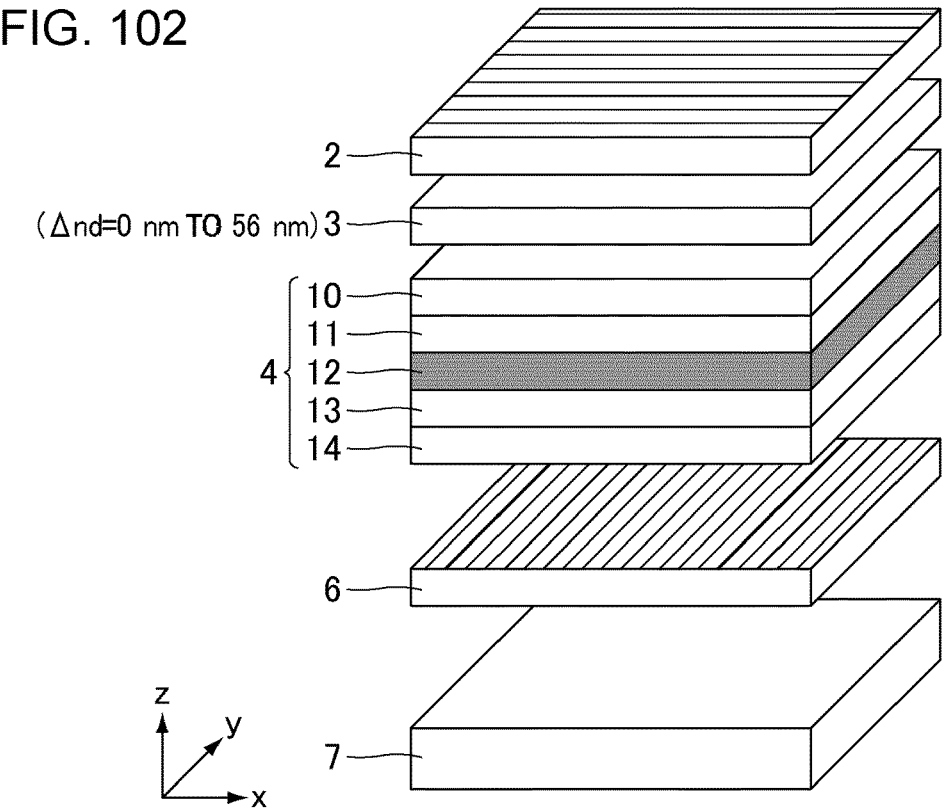
FIG. 102 is a schematic perspective view of a liquid crystal display device according to example 17.
Figure 103:
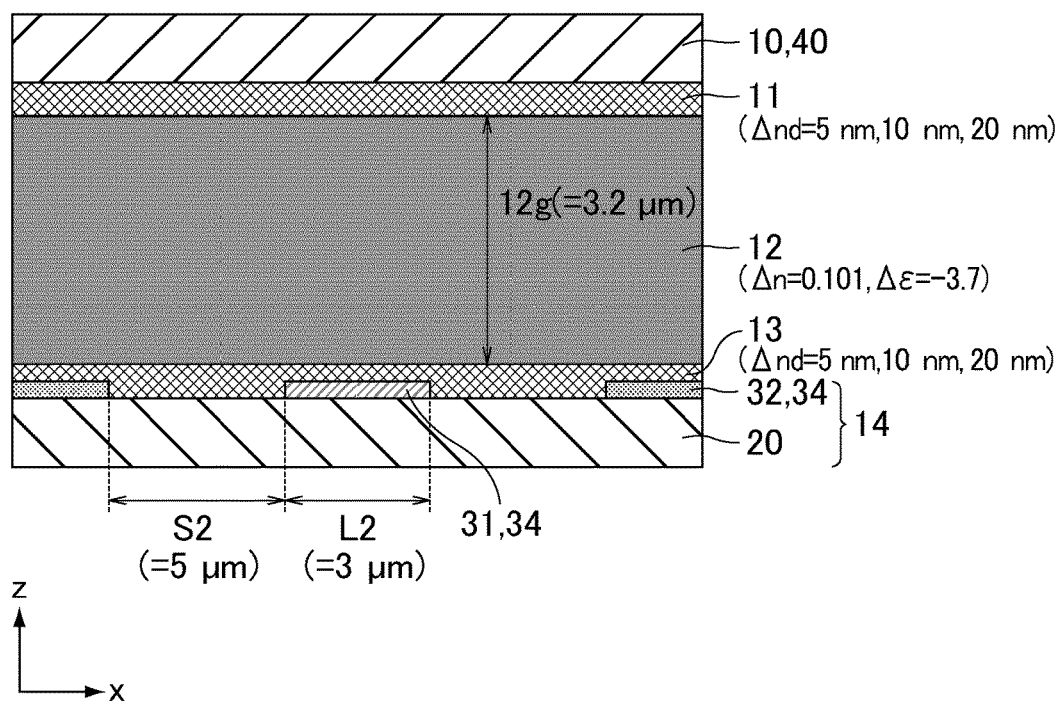
FIG. 103 is a schematic sectional view of a liquid crystal panel included in the liquid crystal display device according to the example 17.
Figure 104:
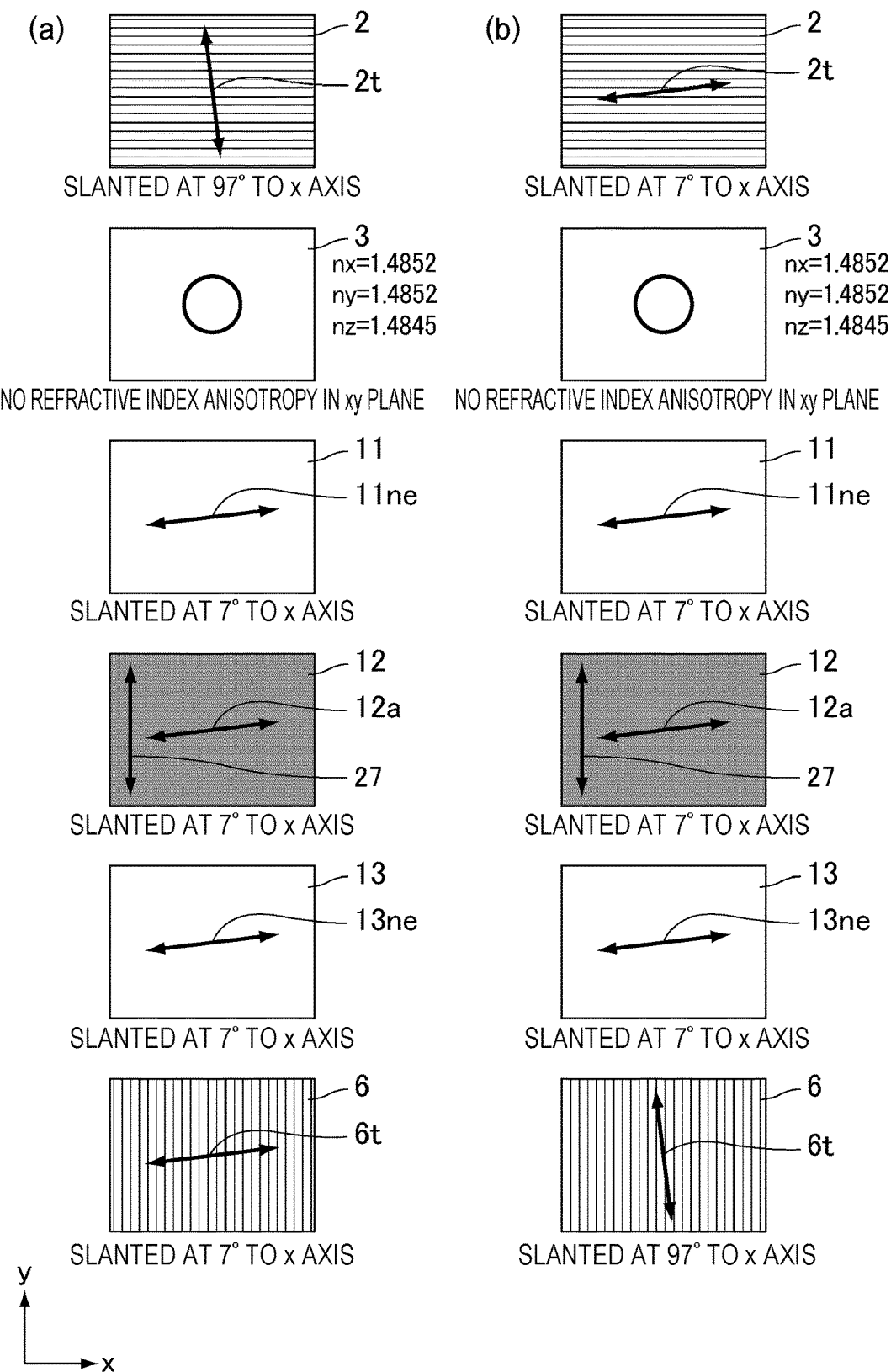
FIGS. 104(a) and 104(b) are schematic diagrams illustrating arrangement (in the axial direction) of the optical axis of each layer of the liquid crystal display device according to the example 17 when viewed from the direction of the z axis.

FIG. 102 is a schematic perspective view of a liquid crystal display device according to example 17. FIG. 103 is a schematic sectional view of a liquid crystal panel included in the liquid crystal display device according to the example 17. FIGS. 104(*a*) and 104(*b*) are schematic diagrams illustrating arrangement (in the axial direction) of the optical axis of each layer of the liquid crystal display device according to the example 17 when viewed from the direction of the z axis.

The present example is the same as the example 5 except for the following points.

As illustrated in FIG. 102, only the protective layer 3 is disposed between the first substrate 10 and the first polarizer 2 on the observer side. That is, the second protective layer 5 between the second substrate 14 and the second polarizer 6 on the backlight 7 side is removed from the configuration of the example 5. In order to limit the range of the thickness-direction retardation of the protective layer 3, the protective layer 3 has the thickness d changed in the range of 0 μm to 80 μm and has a thickness-direction retardation changed in the range of 0 nm to 56 nm. The case of the thickness of the protective layer 3 being 0 μm is optically equivalent to the case of arranging an optically isotropic protective layer instead of the protective layer 3. As illustrated in FIG. 103, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The polarity of liquid crystals employed in the liquid crystal layer 12 is negative. The liquid crystal layer 12 has the refractive index anisotropy Δn of 0.101 and the dielectric anisotropy Δε of −3.7. The configuration according to the present example is optically equivalent to a configuration in which an optically isotropic second protective layer is arranged between the second substrate 14 and the second polarizer 6 on the backlight 7 side in the present example. Accordingly, the present example assumes the embodiment 2 with the first protective layer satisfying the relationship nx=ny≥nz disposed on the observer side and the optically isotropic second protective layer disposed on the backlight side.

Since negative liquid crystals are employed in the present example, arrangement of the optical axis of each layer when viewed from the direction of the z axis in the present example is the same as that in the case of the example 6 of the FFS mode employing negative liquid crystals except for the absence of the second protective layer between the second substrate and the second polarizer and has two types of arrangement illustrated in FIGS. 104(*a*) and 104(*b*).

Figure 105:
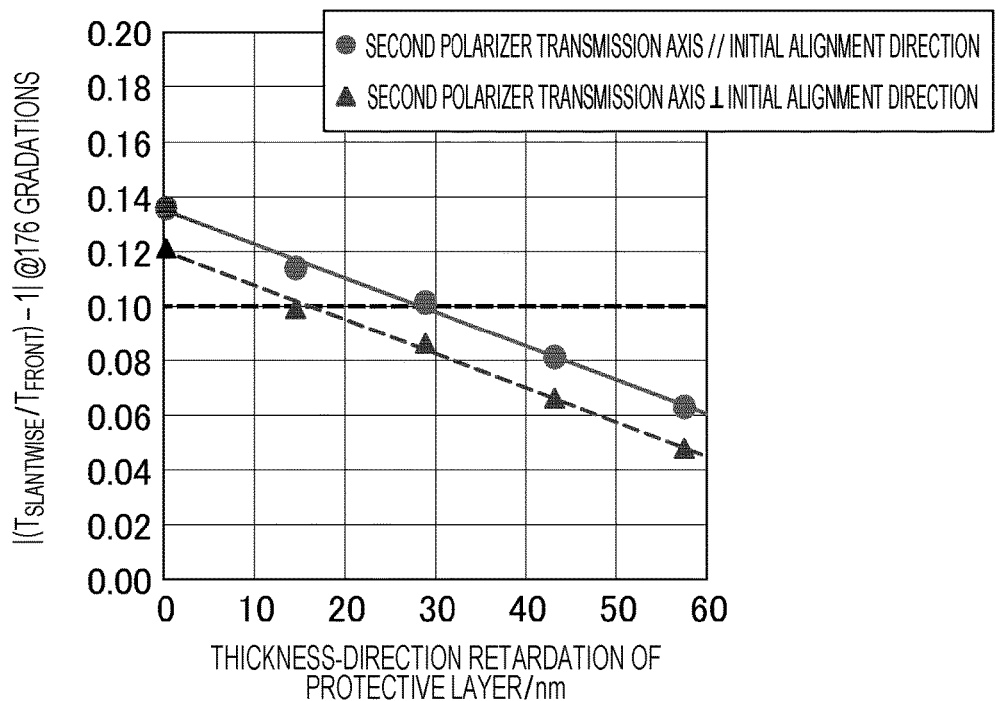
FIG. 105 illustrates a graph in the case of plotting the thickness-direction retardation of a protective layer on the horizontal axis and plotting $|(T_{slantwise}/T_{front})-1|$ on the vertical axis in the example 17 and illustrates the case of first and second optical alignment films having an in-plane retardation of 5 nm.
Figure 106:
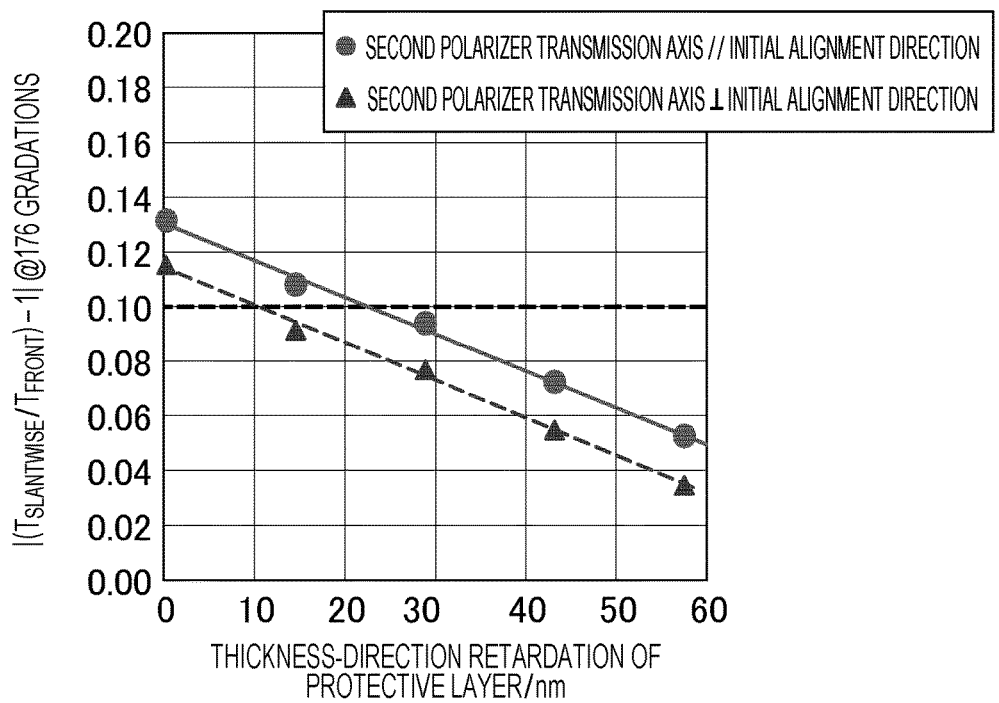
FIG. 106 illustrates a graph in the case of plotting the thickness-direction retardation of the protective layer on the horizontal axis and plotting $|(T_{slantwise}/T_{front})-1|$ on the vertical axis in the example 17 and illustrates the case of the first and second optical alignment films having an in-plane retardation of 10 nm.
Figure 107:
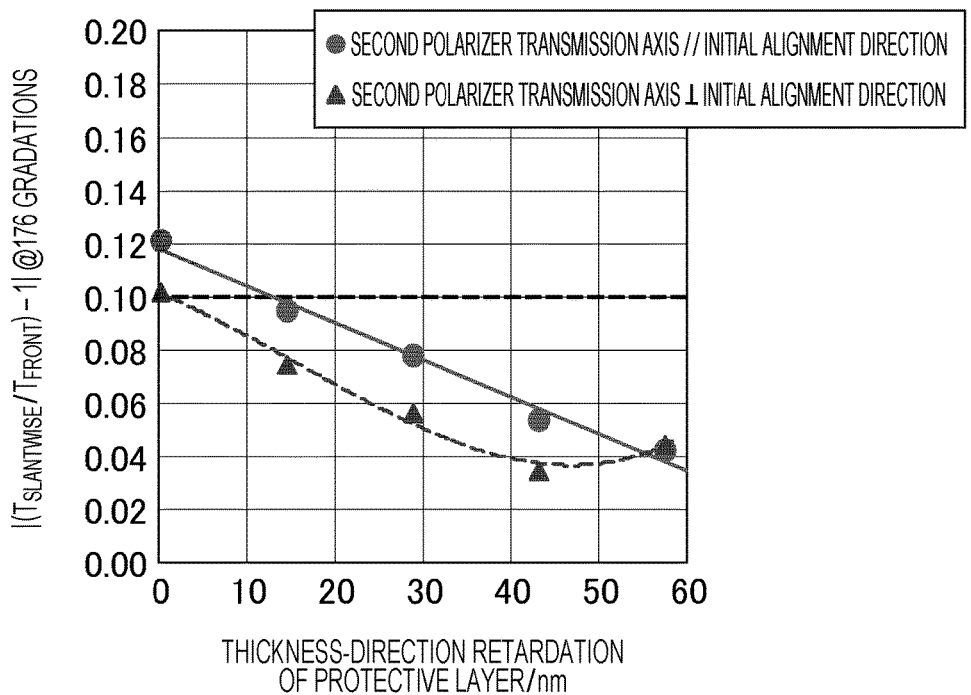
FIG. 107 illustrates a graph in the case of plotting the thickness-direction retardation of the protective layer on the horizontal axis and plotting $|(T_{slantwise}/T_{front})-1|$ on the vertical axis in the example 17 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 105 to 107 illustrate graphs in the case of plotting the thickness-direction retardation of the protective layer on the horizontal axis and plotting $|(T_{slantwise}/T_{front})-1|$ on the vertical axis in the example 17. FIGS. 105, 106, and 107 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 105 to 107, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 105 to 107, it is understood that the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in the entire range of the thickness-direction retardation of the protective layer 5 confirmed by calculation (greater than or equal to 0 nm and less than or equal to 56 nm). Thus, in the IPS mode in which the liquid crystal layer has a negative dielectric anisotropy with a protective layer satisfying the relationship nx=ny≥nz existing on only the observer side as in the present example, arranging the second polarizer on the backlight side to have a transmission axis thereof perpendicular to the initial alignment direction of liquid crystal molecules can provide a liquid crystal display panel that has a favorable viewing angle in the case of using a self-assembled optical alignment film.

Example 18

Basic configuration: IPS mode, optical alignment film, negative liquid crystal, protective layer satisfying the relationship nx=ny≥nz on only backlight side (thickness-direction retardation of 0 nm to 56 nm).

Figure 108:
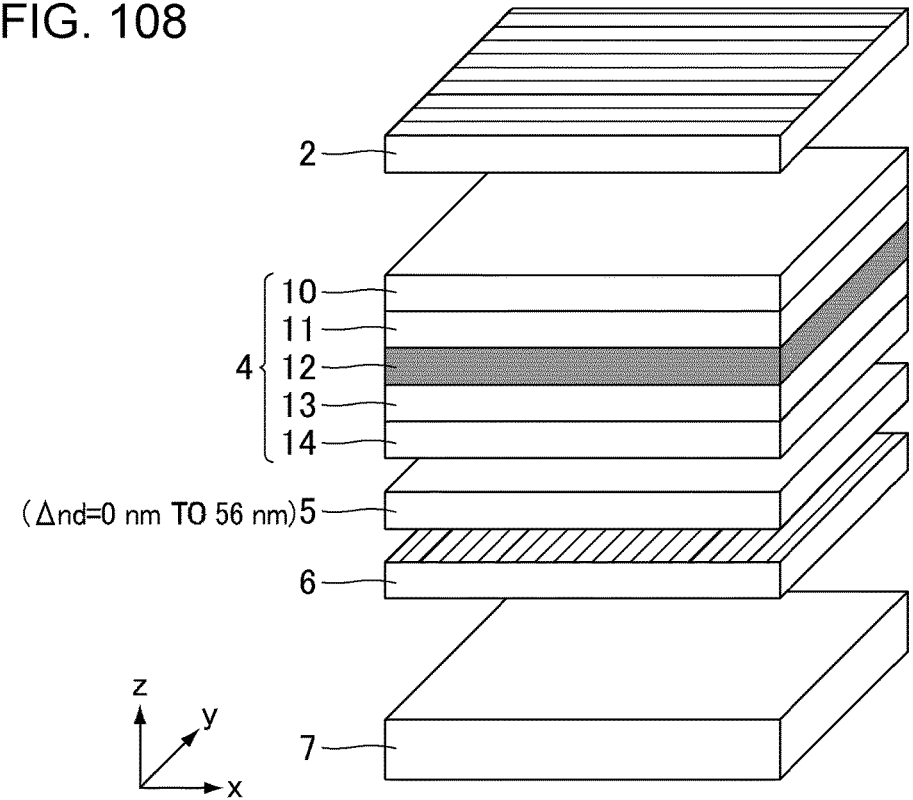
FIG. 108 is a schematic perspective view of a liquid crystal display device according to example 18.
Figure 109:
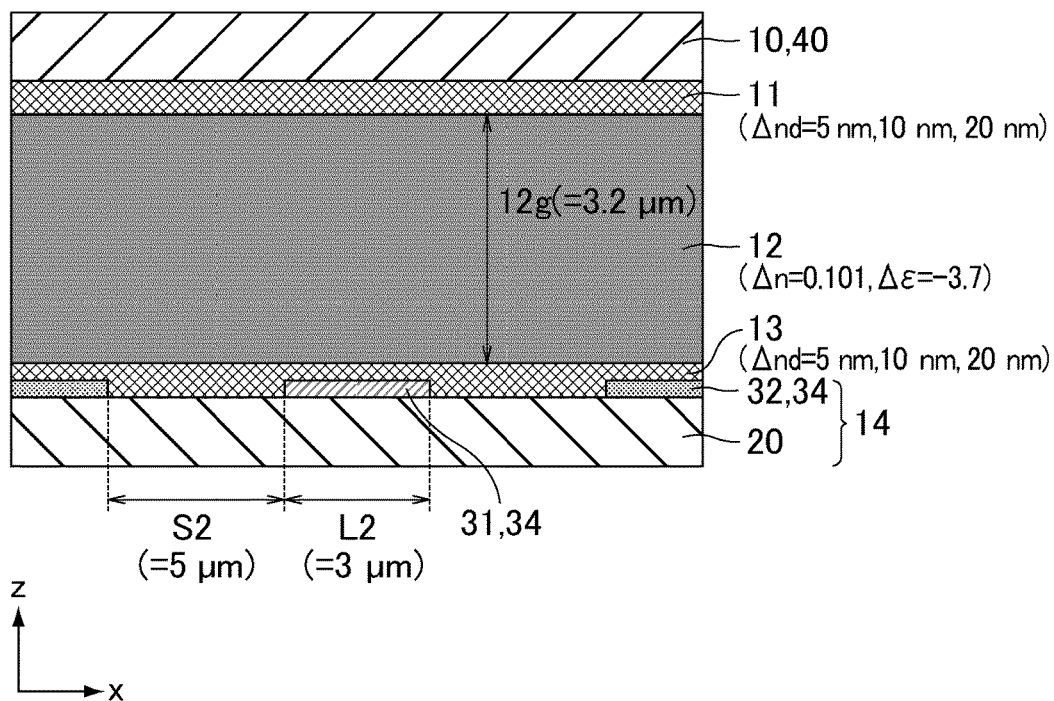
FIG. 109 is a schematic sectional view of a liquid crystal panel included in the liquid crystal display device according to the example 18.

FIG. 108 is a schematic perspective view of a liquid crystal display device according to example 18. FIG. 109 is a schematic sectional view of a liquid crystal panel included in the liquid crystal display device according to the example 18. FIGS. 110(a) and 110(b) are schematic diagrams illustrating arrangement (in the axial direction) of the optical axis of each layer of the liquid crystal display device according to the example 18 when viewed from the direction of the z axis.

The present example is the same as the example 5 except for the following points.

As illustrated in FIG. 108, only the protective layer 5 is disposed between the second substrate 14 and the second polarizer 6 on the backlight 7 side. That is, the first protective layer 3 between the first substrate 10 and the first polarizer 2 on the observer side is removed from the configuration of the example 5. In order to limit the range of the thickness-direction retardation of the protective layer 5, the protective layer 5 has the thickness d changed in the range of 0 μm to 80 μm and has a thickness-direction retardation changed in the range of 0 nm to 56 nm. The case of the thickness of the protective layer 5 being 0 μm is optically equivalent to the case of arranging an optically isotropic protective layer instead of the protective layer 5. As illustrated in FIG. 109, the optical alignment films 11 and 13 have an in-plane retardation of 5 nm, 10 nm or 20 nm. The in-plane retardations of the optical alignment films 11 and 13 have the same value. The optical alignment films 11 and 13 have a thickness-direction retardation of 0 nm. The polarity of liquid crystals employed in the liquid crystal layer 12 is negative. The liquid crystal layer 12 has the refractive index anisotropy Δn of 0.101 and the dielectric anisotropy Δε of −3.7. The configuration according to the present example is optically equivalent to a configuration in which an optically isotropic first protective layer is arranged between the first substrate 10 and the first polarizer 2 on the observer side in the present example. Accordingly, the present example assumes the embodiment 3 with the optically isotropic first protective layer disposed on the observer side and the second protective layer satisfying the relationship nx=ny≥nz disposed on the backlight side.

Since negative liquid crystals are employed in the present example, arrangement of the optical axis of each layer when viewed from the direction of the z axis in the present example is the same as that in the case of the example 6 of the FFS mode employing negative liquid crystals except for the absence of the first protective layer between the first substrate and the first polarizer and has two types of arrangement illustrated in FIGS. 110(a) and 110(b).

Figure 111:
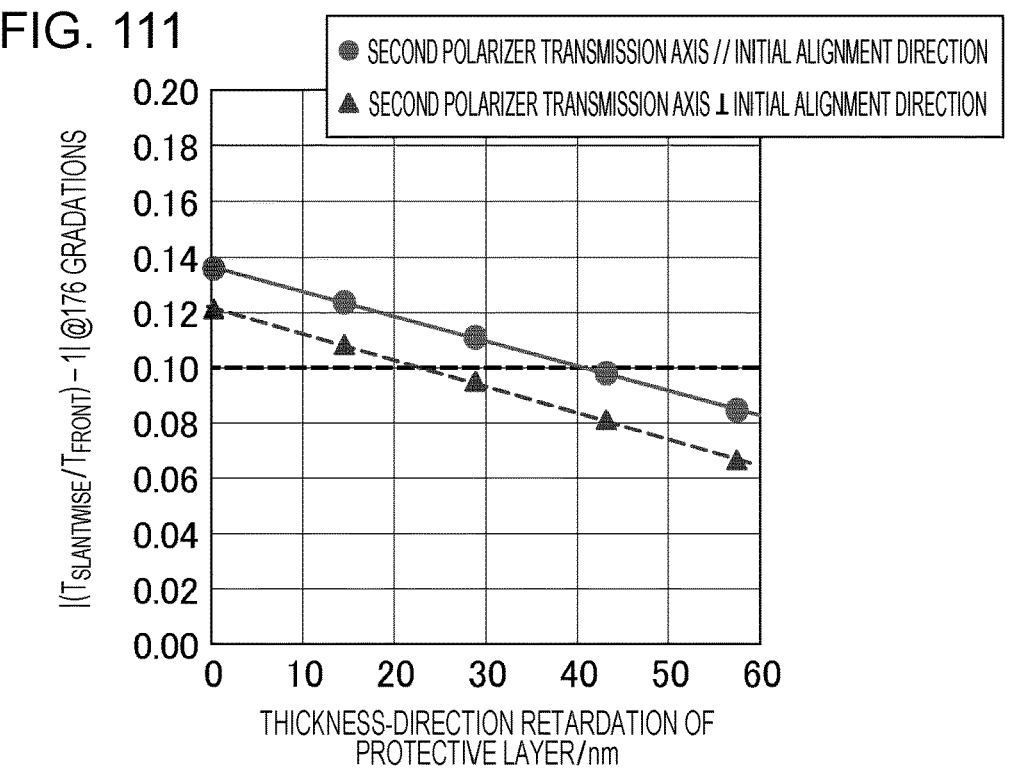
FIG. 111 illustrates a graph in the case of plotting the thickness-direction retardation of a protective layer on the horizontal axis and plotting $|(T_{slantwise}/T_{front})-1|$ on the vertical axis in the example 18 and illustrates the case of first and second optical alignment films having an in-plane retardation of 5 nm.
Figure 112:
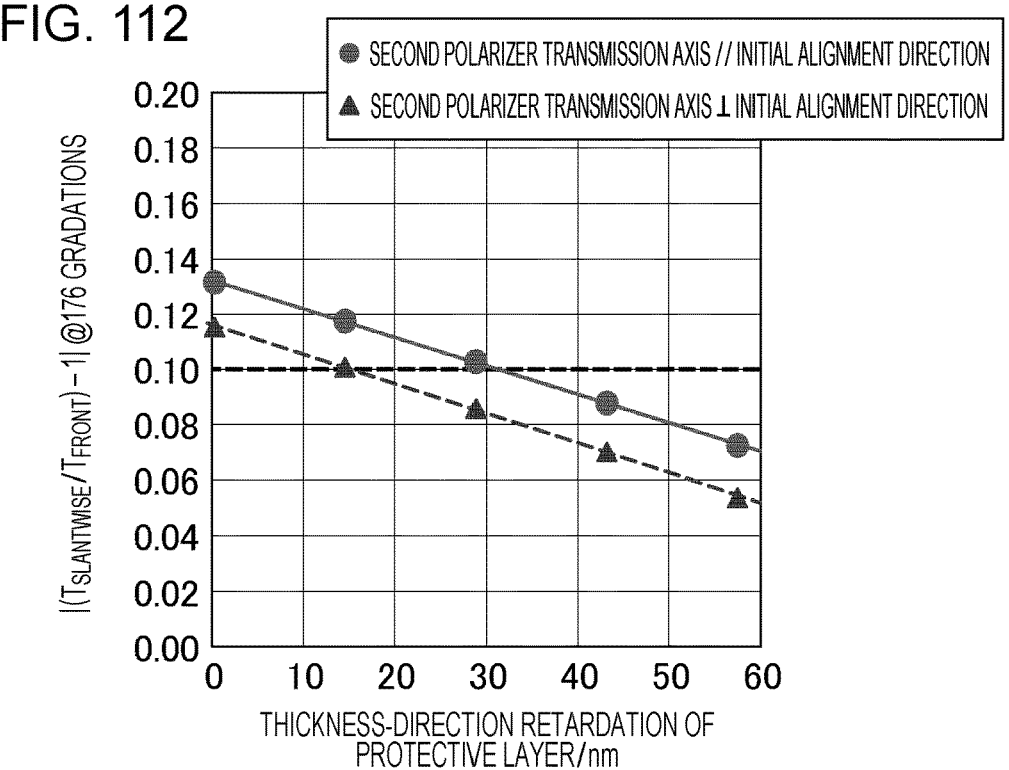
FIG. 112 illustrates a graph in the case of plotting the thickness-direction retardation of the protective layer on the horizontal axis and plotting $|(T_{slantwise}/T_{front})-1|$ on the vertical axis in the example 18 and illustrates the case of the first and second optical alignment films having an in-plane retardation of 10 nm.
Figure 113:
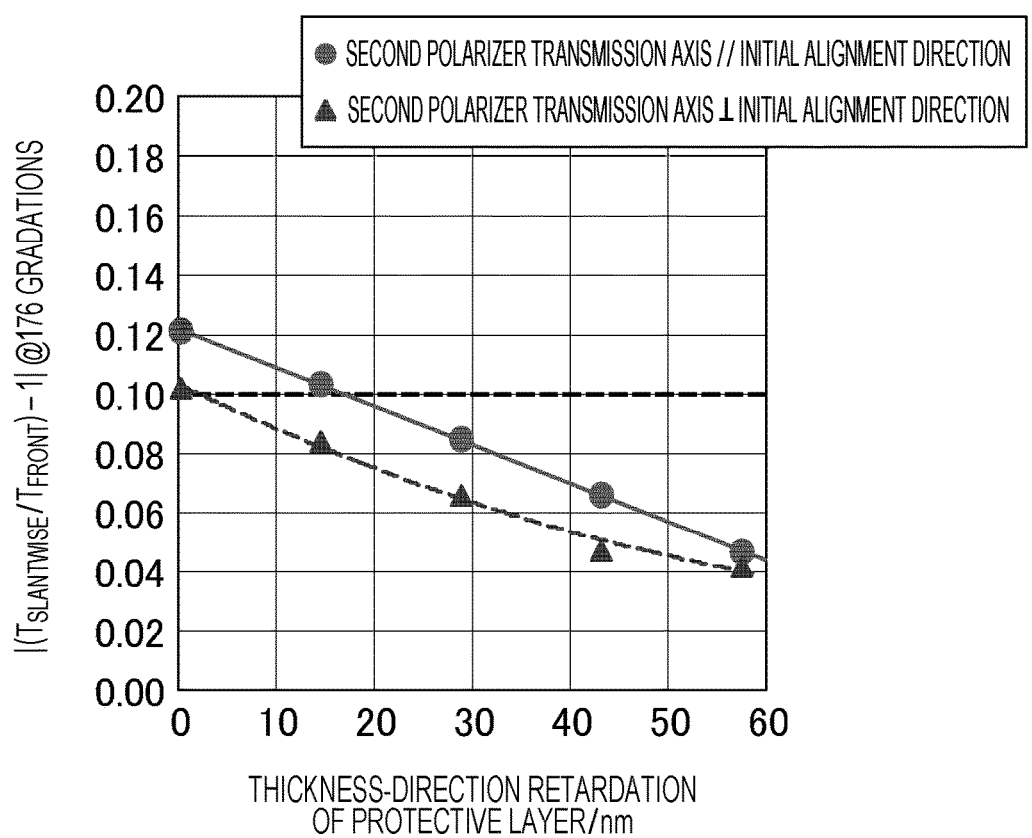
FIG. 113 illustrates a graph in the case of plotting the thickness-direction retardation of the protective layer on the horizontal axis and plotting $|(T_{slantwise}/T_{front})-1|$ on the vertical axis in the example 18 and illustrates the case of the first and second optical alignment films having an in-plane retardation of 20 nm.

In the configuration of the present example, gradation to normalized transmittance is calculated in the front direction (polar angle: 0°) of the liquid crystal panel and in three slantwise directions (polar angle: 40°/azimuth angle: 30°, 45°, and 60°) of the liquid crystal panel in the same manner as the example 1. FIGS. 111 to 113 illustrate graphs in the case of plotting the thickness-direction retardation of the protective layer on the horizontal axis and plotting $|(T_{slantwise}/T_{front})-1|$ on the vertical axis in the example 18. FIGS. 111, 112, and 113 illustrate the case of the first and second optical alignment films having an in-plane retardation of 5 nm, 10 nm, and 20 nm. While three conditions of azimuth angles of 30°, 45°, and 60° are posed for the slantwise direction and three normalized transmittances for the slantwise direction, $|(T_{slantwise}/T_{front})-1|$ is calculated from the normalized transmittance that yields the maximum value of $|(T_{slantwise}/T_{front})-1|$ of the three normalized transmittances. In FIGS. 111 to 113, as the vertical axis, that is, $|(T_{slantwise}/T_{front})-1|$, approaches "0", the display characteristics in the case of viewing the liquid crystal panel slantwise are represented as being more similar to the display characteristics in the case of viewing the liquid crystal panel from the front. If the value thereof is less than or equal to 0.1, a change in display due to a difference in the direction of observation is not visually recognized and is determined to be within a product level.

As is common in FIGS. 111 to 113, it is understood that the perpendicular relationship between the transmission axis 6t of the second polarizer 6 and the extraordinary light refractive index axes 11ne and 13ne of the optical alignment films 11 and 13, that is, the initial alignment direction 12a of liquid crystal molecules, has a more favorable viewing angle than the parallel relationship therebetween in the entire range of the thickness-direction retardation of the protective layer 5 confirmed by calculation (greater than or equal to 0 nm and less than or equal to 56 nm). Thus, in the IPS mode in which the liquid crystal layer has a negative dielectric anisotropy with a protective layer satisfying the relationship nx=ny≥nz existing on only the backlight side as in the present example, arranging the second polarizer on the backlight side to have a transmission axis thereof perpendicular to the initial alignment direction of liquid crystal molecules can provide a liquid crystal display panel that has a favorable viewing angle in the case of using a self-assembled optical alignment film.

REFERENCE SIGNS LIST 1A, 1B, 1C LIQUID CRYSTAL DISPLAY DEVICE
2 FIRST POLARIZER
2t TRANSMISSION AXIS OF FIRST POLARIZER
3, 3a, 3b, 3c FIRST PROTECTIVE LAYER
4 LIQUID CRYSTAL PANEL
5, 5a, 5b, 5c SECOND PROTECTIVE LAYER
6 SECOND POLARIZER
6t TRANSMISSION AXIS OF SECOND POLARIZER

7 BACKLIGHT
10 FIRST SUBSTRATE (OPPOSITE SUBSTRATE)
11 FIRST OPTICAL ALIGNMENT FILM
11ne EXTRAORDINARY LIGHT REFRACTIVE INDEX AXIS OF FIRST OPTICAL ALIGNMENT FILM
12 LIQUID CRYSTAL LAYER
12a INITIAL ALIGNMENT DIRECTION OF LIQUID CRYSTAL MOLECULES
12g THICKNESS OF LIQUID CRYSTAL LAYER
13 SECOND OPTICAL ALIGNMENT FILM
13ne EXTRAORDINARY LIGHT REFRACTIVE INDEX AXIS OF SECOND OPTICAL ALIGNMENT FILM
14 SECOND SUBSTRATE (ARRAY SUBSTRATE)
20, 40 INSULATING SUBSTRATE
21 PLANAR ELECTRODE
22 ELECTRODE SLIT
23 ELECTRODE IN WHICH ELECTRODE SLIT IS FORMED
24 LINEAR PART
25 INTERLAYER INSULATING FILM
26, 35 ELECTRIC FIELD
27 ELECTRODE LONG-EDGE DIRECTION
31 SIGNAL ELECTRODE (PIXEL ELECTRODE)
32 OPPOSITE ELECTRODE (COMMON ELECTRODE)
33 SHAFT PORTION
34 BRANCH PORTION (COMB TEETH)

The invention claimed is:

1. A liquid crystal display device of a fringe field switching (FFS) type, comprising:
   a first polarizer;
   a first protective layer;
   a first substrate;
   a first optical alignment film that is a photoisomeric or photo-Fries rearrangement optical alignment film;
   a horizontal-alignment liquid crystal layer including liquid crystal molecules;
   a second optical alignment film that is a photoisomeric or photo-Fries rearrangement optical alignment film;
   a second substrate including a signal electrode and an opposite electrode opposite the signal electrode;
   a second protective layer;
   a second polarizer; and
   backlight in this order, wherein
   the first protective layer and the second protective layer satisfy the relationship of nx=ny≥nz, where nx and ny represent main refractive indices in an in-plane direction, and nz represents a main refractive index in an out-of-plane direction,
   an in-plane retardation of each of the first optical alignment film and the second optical alignment films is greater than or equal to 1 nm,
   given that $R_1$ is a thickness-direction retardation of each of the first protective layer and the second protective layer and that $R_2$ is the in-plane retardation of each of the first optical alignment film and the second optical alignment film,
   $R_1$ and $R_2$ satisfy the relationship $R_1 \leq 0.047 R_2^2 - 2.1 R_2 + 44.3$,
   the liquid crystal layer has a positive dielectric anisotropy,
   a transmission axis of the second polarizer is perpendicular to an initial alignment direction of the liquid crystal molecules in a plan view,
   no retardation layer is interposed between the first polarizer and the first protective layer, between the first protective layer and the first substrate, between the second substrate and the second protective layer, and between the second protective layer and the second polarizer, and
   at least one of the in-plane retardation and the thickness-direction retardation of the first optical alignment film and the second optical alignment film is greater than or equal to 10 nm.

2. The liquid crystal display device according to claim 1, wherein each of the first optical alignment film and the second optical alignment film is defined by applying an alignment agent containing an alignment film material having an optical functional group and a solvent to a substrate to define a film, then prefiring the film, immediately irradiating the prefired film with light to cause a reaction of the optical functional group, and then firing the film irradiated with the light.

3. A liquid crystal display device of a fringe field switching (FFS) type, comprising:
   a first polarizer;
   a first protective layer;
   a first substrate;
   a first optical alignment film that is a photoisomeric or photo-Fries rearrangement optical alignment film;
   a horizontal-alignment liquid crystal layer including liquid crystal molecules;
   a second optical alignment film that is a photoisomeric or photo-Fries rearrangement optical alignment film;
   a second substrate including a signal electrode and an opposite electrode opposite the signal electrode;
   a second protective layer;
   a second polarizer; and
   backlight in this order, wherein
   the first protective layer and the second protective layer satisfy the relationship of nx=ny≥nz, where nx and ny represent main refractive indices in an in-plane direction, and nz represents a main refractive index in an out-of-plane direction,
   an in-plane retardation of each of the first optical alignment film and the second optical alignment film is greater than or equal to 1 nm,
   given that $R_1$ is a thickness-direction retardation of each of the first protective layer and the second protective layer and that $R_2$ is the in-plane retardation of each of the first optical alignment film and the second optical alignment film,
   $R_1$ and $R_2$ satisfy the relationship $R_1 \leq 0.040 R_2^2 - 2.2 R_2 + 44.0$,
   the liquid crystal layer has a negative dielectric anisotropy,
   a transmission axis of the second polarizer is perpendicular to an initial alignment direction of the liquid crystal molecules in a plan view,
   no retardation layer is interposed between the first polarizer and the first protective layer, between the first protective layer and the first substrate, between the second substrate and the second protective layer, and between the second protective layer and the second polarizer, and
   at least one of the in-plane retardation and the thickness-direction retardation of the first optical alignment film and the second optical alignment film is greater than or equal to 10 nm.

4. A liquid crystal display device of a fringe field switching (FFS) type, comprising:
   a first polarizer;
   a first protective layer;
   a first substrate;

a first optical alignment film that is a photoisomeric or photo-Fries rearrangement optical alignment film;
a horizontal-alignment liquid crystal layer including liquid crystal molecules;
a second optical alignment film that is a photoisomeric or photo-Fries rearrangement optical alignment film;
a second substrate including a signal electrode and an opposite electrode opposite the signal electrode;
a second protective layer;
a second polarizer; and
backlight in this order, wherein
the first protective layer and the second protective layer satisfy the relationship of nx=ny≥nz, where nx and ny represent main refractive indices in an in-plane direction, and nz represents a main refractive index in an out-of-plane direction,
an in-plane retardation of each of the first optical alignment film and the second optical alignment film is greater than or equal to 1 nm,
given that $R_1$ is a thickness-direction retardation of each of the first protective layer and the second protective layer and that $R_2$ is the in-plane retardation of each of the first optical alignment film and the second optical alignment films,
$R_1$ and $R_2$ satisfy the relationship $R_1 \geq 0.040 R_2^2 - 2.2 R_2 + 44.0$,
the liquid crystal layer has a negative dielectric anisotropy,
a transmission axis of the second polarizer is parallel to an initial alignment direction of the liquid crystal molecules in a plan view,
no retardation layer is interposed between the first polarizer and the first protective layer, between the first protective layer and the first substrate, between the second substrate and the second protective layer, and between the second protective layer and the second polarizer, and
at least one of the in-plane retardation and the thickness-direction retardation of the first optical alignment film and the second optical alignment film is greater than or equal to 10 nm.

* * * * *